(12) United States Patent
Westmoreland

(10) Patent No.: US 10,156,222 B2
(45) Date of Patent: Dec. 18, 2018

(54) MASS LEVITATOR WITH ENERGY CONVERSION

(71) Applicant: Doug Westmoreland, Clarence, NY (US)

(72) Inventor: Doug Westmoreland, Clarence, NY (US)

( * ) Notice: Subject to any disclaimer, the term of this patent is extended or adjusted under 35 U.S.C. 154(b) by 0 days.

(21) Appl. No.: 15/652,595

(22) Filed: Jul. 18, 2017

(65) Prior Publication Data
US 2017/0321651 A1  Nov. 9, 2017

Related U.S. Application Data

(62) Division of application No. 14/151,923, filed on Jan. 10, 2014, now Pat. No. 9,745,952.

(60) Provisional application No. 61/751,336, filed on Jan. 11, 2013.

(51) Int. Cl.
| | |
|---|---|
| *F02B 63/04* | (2006.01) |
| *F03G 7/08* | (2006.01) |
| *F03B 17/04* | (2006.01) |
| *F03G 3/00* | (2006.01) |
| *F03B 17/00* | (2006.01) |

(52) U.S. Cl.
CPC ............ *F03B 17/04* (2013.01); *F03B 17/005* (2013.01); *F03G 3/00* (2013.01); *Y10S 415/916* (2013.01)

(58) Field of Classification Search
CPC  F03B 7/006; F03B 9/00; F03B 11/004; F03B 17/005; F03G 3/04; F03G 17/10
USPC .................................................. 60/495, 496
See application file for complete search history.

(56) References Cited

U.S. PATENT DOCUMENTS

| | | | |
|---|---|---|---|
| 271,040 | A | 1/1883 | Cook |
| 447,921 | A | 3/1891 | Tesla |
| 3,537,192 | A | 11/1970 | Churchill |
| 3,857,242 | A | 12/1974 | Gilmore |
| 3,938,337 | A | 2/1976 | Fawcett et al. |
| 4,326,132 | A | 4/1982 | Bokel |
| 4,407,130 | A | 10/1983 | Jackson |
| 4,713,937 | A | 12/1987 | De Shon |
| 4,742,242 | A | 5/1988 | De Shon |
| 4,981,015 | A | 1/1991 | Simpson |
| 6,155,291 | A | 12/2000 | Powell |
| 6,269,638 | B1 | 8/2001 | Murata |

(Continued)

*Primary Examiner* — Tulsidas C Patel
*Assistant Examiner* — Thomas Quigley
(74) *Attorney, Agent, or Firm* — Hamilton, Brook, Smith & Reynolds, P.C.

(57) ABSTRACT

The various embodiments disclosed herein provide a generalized system for extracting gravitational energy from the planet and provide for a general, pollution free, mass lifting and energy conversion system in which the laws of fluid flow, and in particular buoyancy and gravity are utilized to lift an arbitrary mass to a higher gravitational potential energy, where upon the increased potential energy can be converted to other forms of energy. Novel and non-obvious features of the fluid interface device, used to insert the buoyant object into the buoyant fluid, insure that the insertion energy is less than the potential energy gained by the object. The net increase in potential energy can be converted to other forms of energy such as electrical power or mechanical energy. It is shown in that energy gain is effectively extracted from the gravitational field of the planet without breaking the laws of conservation of energy.

8 Claims, 48 Drawing Sheets

(56) References Cited

U.S. PATENT DOCUMENTS

| | | | |
|---|---|---|---|
| 6,343,618 | B1 | 2/2002 | Britt et al. |
| 6,443,181 | B1 | 9/2002 | Powell |
| 6,447,243 | B1 | 9/2002 | Kittle |
| 6,734,574 | B2 | 5/2004 | Shin |
| 8,015,807 | B1 | 9/2011 | Akustu |
| 8,171,729 | B2 * | 5/2012 | O'Briant ................. F03B 17/04 290/1 R |
| 9,745,952 | B2 | 8/2017 | Westmoreland |
| 2003/0168105 | A1 | 9/2003 | Funderburk |
| 2009/0235659 | A1 | 9/2009 | Lin |
| 2010/0095666 | A1 | 4/2010 | Brumfield |
| 2010/0180587 | A1 | 7/2010 | Manakkattupadeettathil |
| 2010/0307149 | A1 | 12/2010 | Kwok |
| 2012/0198833 | A1 | 8/2012 | Francis |
| 2012/0235510 | A1 | 9/2012 | Lin et al. |
| 2016/0215753 | A1 | 7/2016 | Westmoreland |

* cited by examiner

| Power Type | % of total Power | Power source | Issues | Notes |
|---|---|---|---|---|
| Non-renewable Fossil Fuels | 86.4% | Non-renewable coal, natural gas, petroleum | Various forms of pollutants, fly ash, $CO_2$ gas generation, heat pollution, | Power is generated from the burning of coal, natural gas, petroleum to generate heat which powers steam power turbines |
| Nuclear | 8.5% | Nuclear fissionable Isotopes | Storage and long term management of spent fuel | Use of fission or fusion products to heat steam which turns power turbines |
| Hydroelectric | 6.3% | Elevated Water source of significant quantity | Limited natural and constructed locations with sufficiently elevated water that can be tapped all year long | Clean efficient and renewable |
| Solar | >0.9% | Light from sun | Not generated after dark | Generated by the sun – free and renewable |
| Wind | >0.9% | Planetary motion | Subject to the weather | Generated by the planetary motion and solar activities – free and renewable |
| geothermal | >0.9% | | Subject to scattered thermally active locations. | Generated by planetary mechanisms – free and renewable |

Fig. 1A

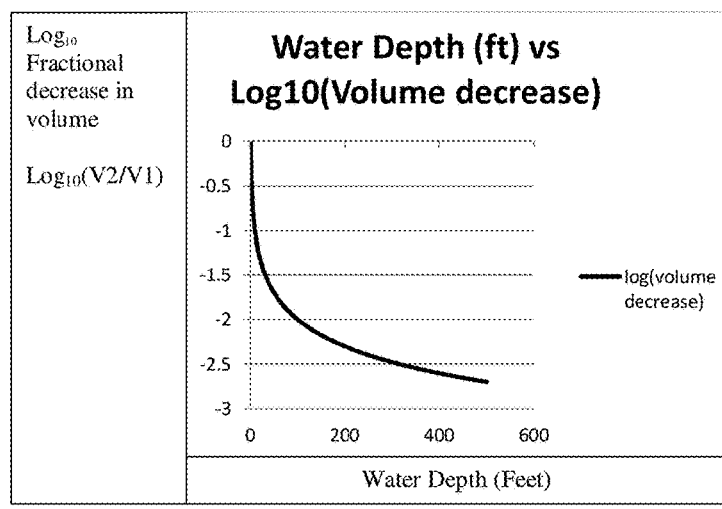

Fig. 1B

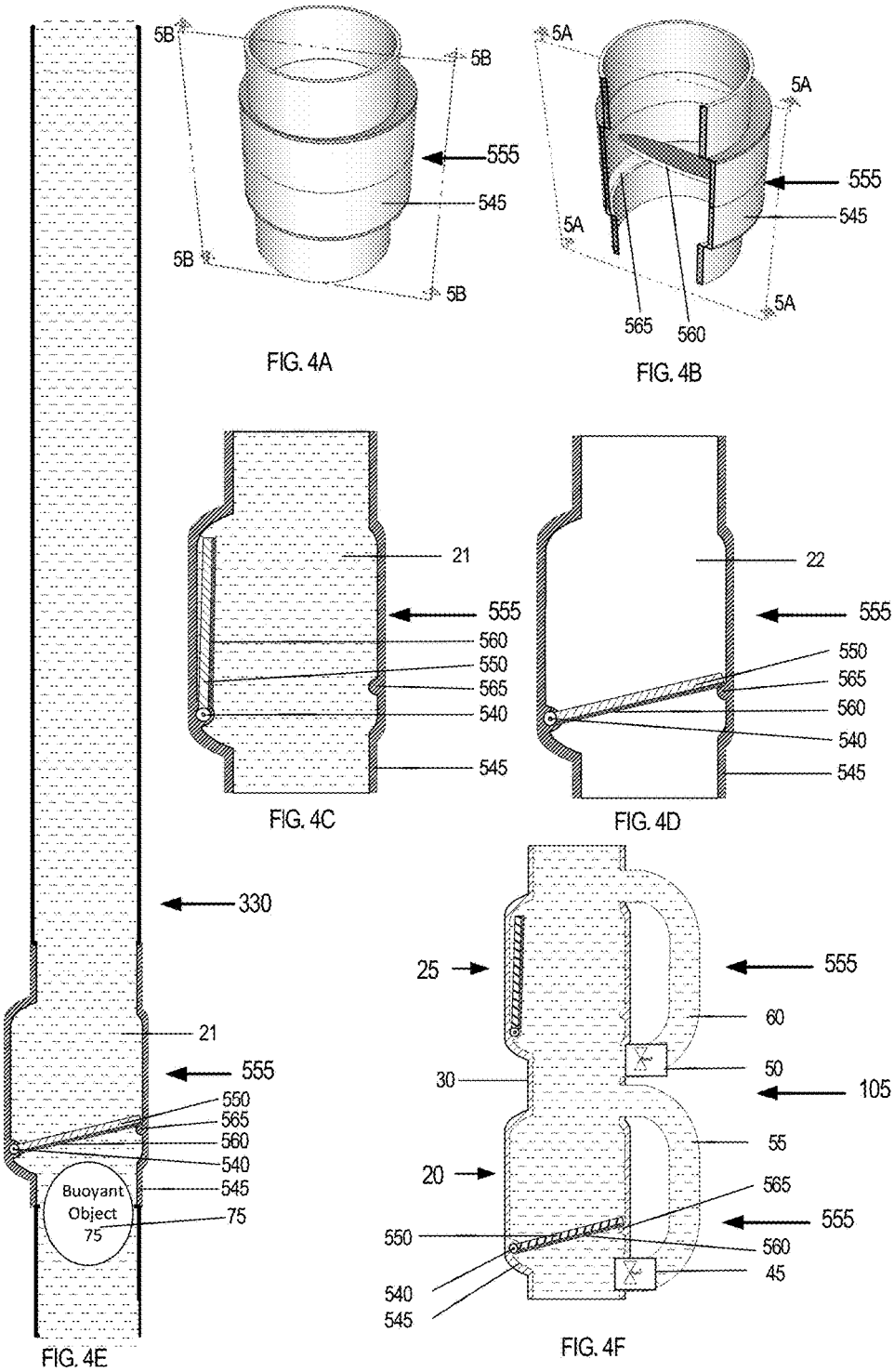

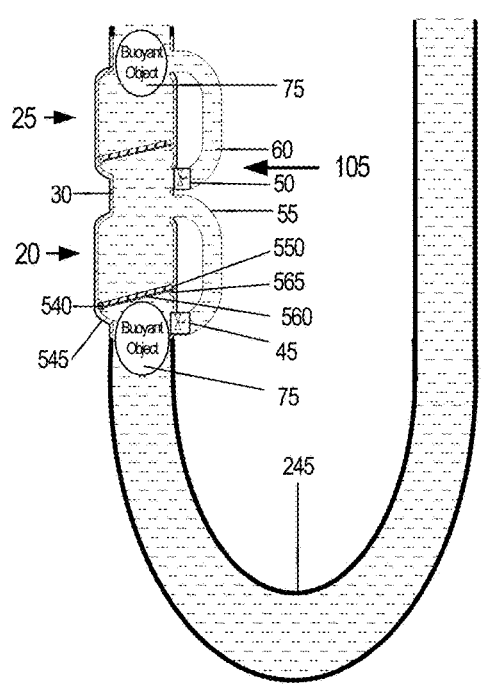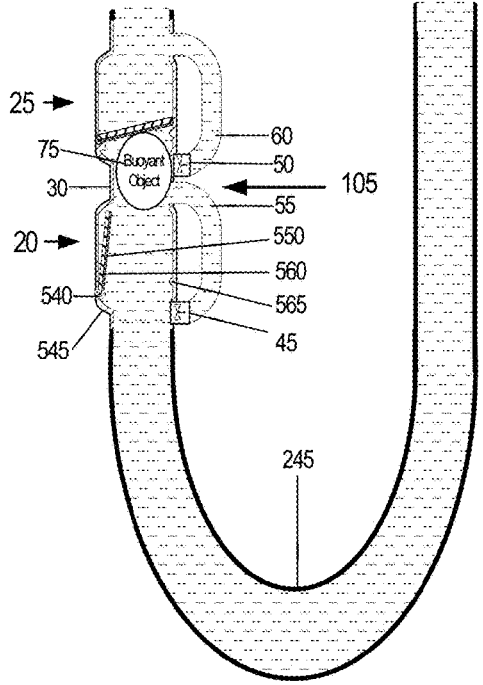
FIG. 5A  FIG. 5B
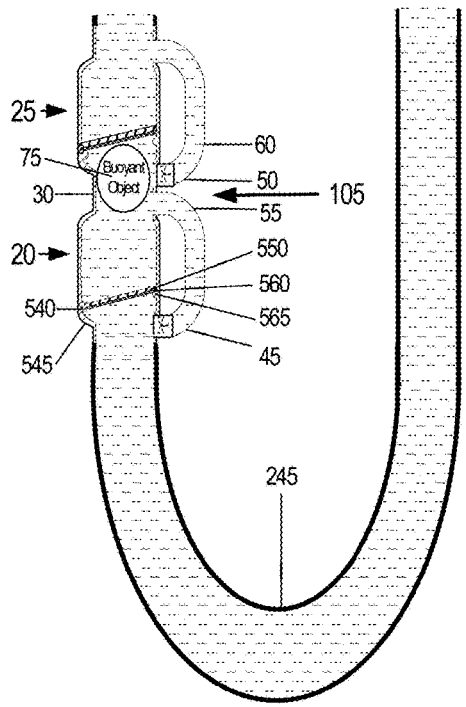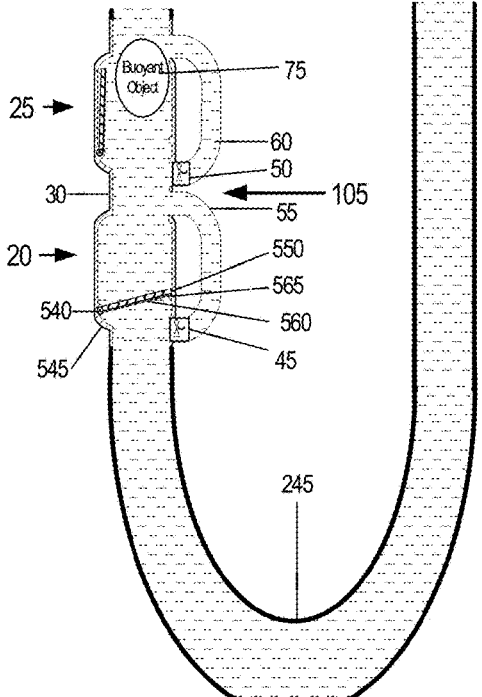
FIG. 5C  FIG. 5D

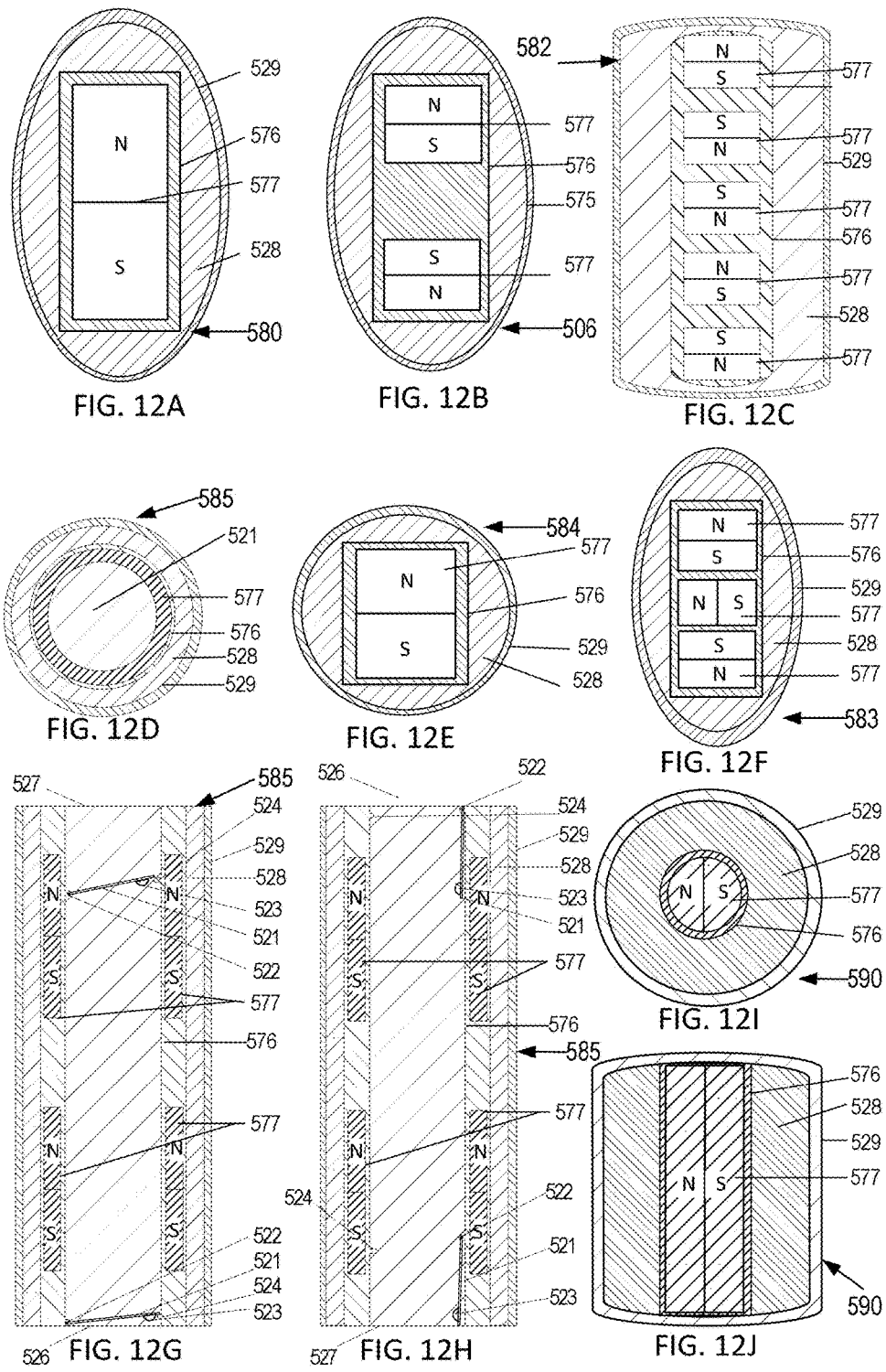

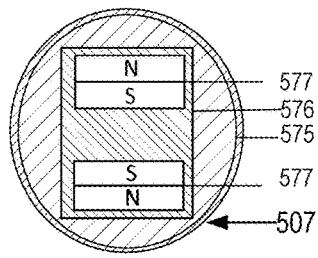
FIG. 13A
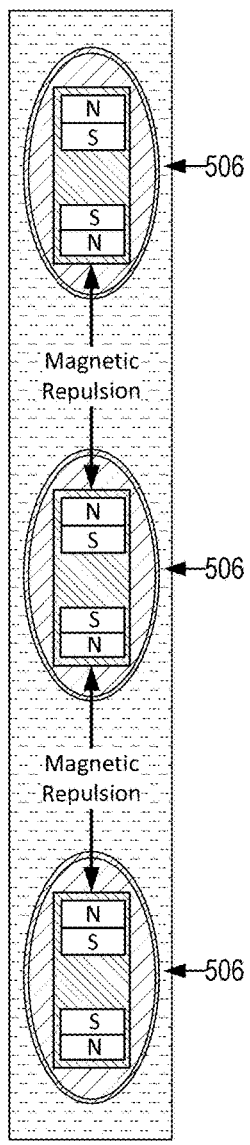
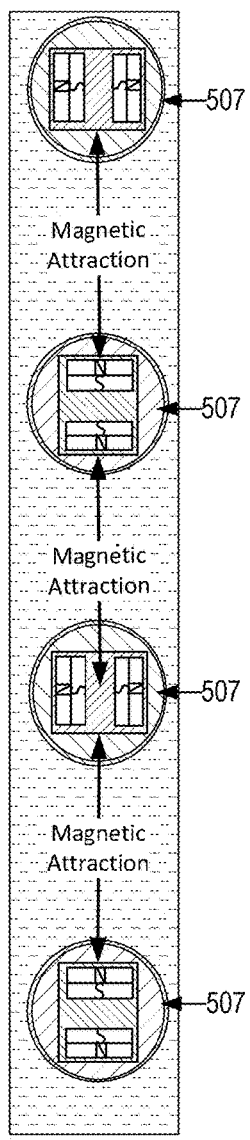
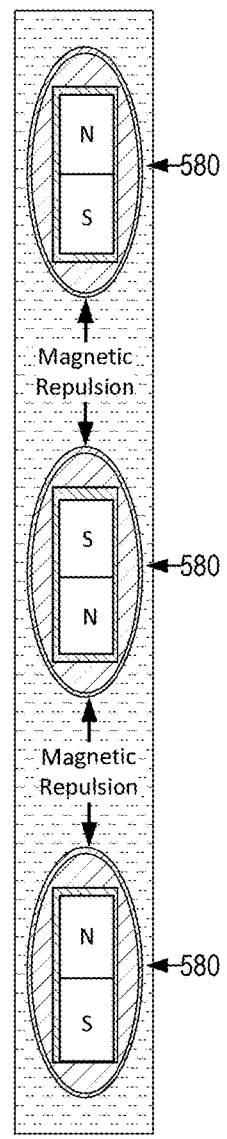
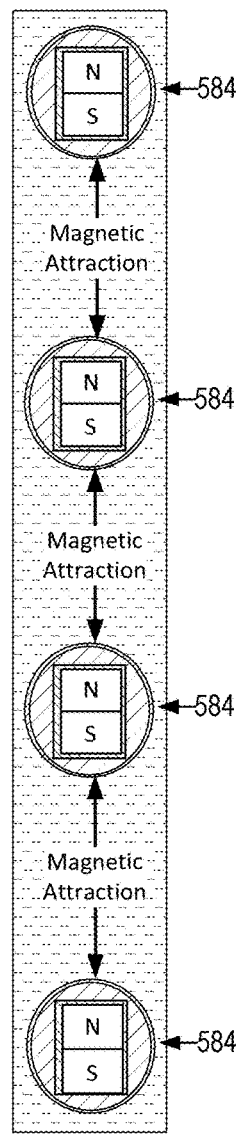
FIG. 13B    FIG. 13C    FIG. 13D    FIG. 13E

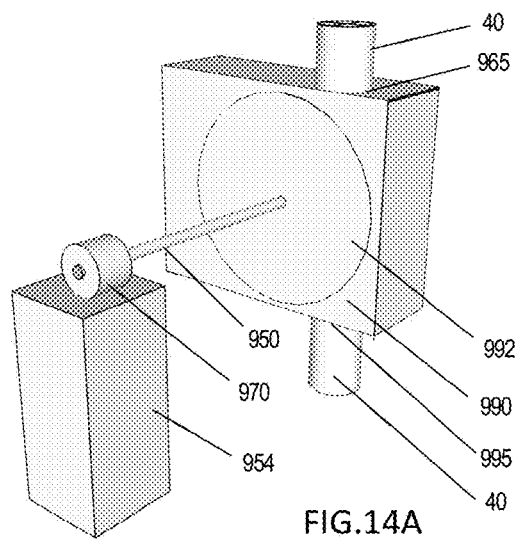
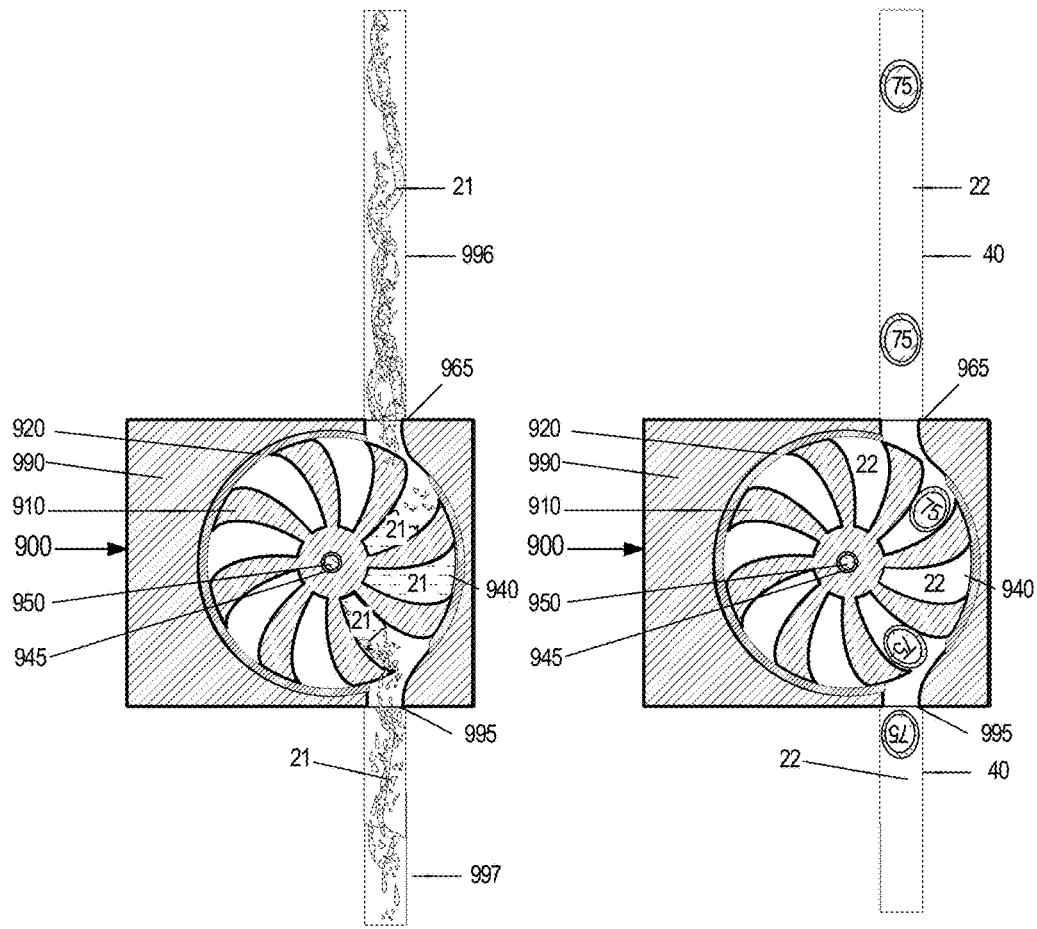
FIG. 14A
FIG. 14B
FIG. 14C

MASS LEVITATOR WITH ENERGY CONVERSION

RELATED APPLICATIONS

This application is a divisional of U.S. application Ser. No. 14/151,923, filed Jan. 10, 2014, which claims the benefit of U.S. Provisional Application No. 61/751,336, filed on Jan. 11, 2013. The entire teachings of the above applications are incorporated herein by reference.

BACKGROUND OF THE INVENTION

Conventional Energy Generation

Of some relevance to the various embodiments and processes disclosed herein are the current state of art and concepts associated with energy generation, fluid flow, buoyancy, the properties of fluids, gravity, gravitational potential energy, conservation of energy, and in particular the direct conversion of potential energy into electrical power. These topics will be briefly discussed to provide sufficient background to support theoretical implication, and practical explanations of the embodiments and processes disclosed herein.

Large scale energy generation can arguably be considered the most important accomplishment of mankind, and in particular, the introduction of practical electrical generators by Tesla at the turn of the late 19th to early 20th century marked a significant milestone in history characterized by the wild expansion of ideas that change the world and the life experience of the average human being. Now at the beginning of the 21st century we face a number of problems that may threaten the human race and the ecosystems on the planet. Chief among those problems are environmental pollution caused by the burning of fossil fuels, a growing need for energy, and the exponential growth of the planet's population.

On the planet today the great bulk of power generated is based on the burning of fossil fuel, with a much lower fraction of the total planetary power coming from nuclear fission, and hydroelectric power sources as shown below in FIG. 1A.

Fossil fuel power generation facilities, while in wide spread use, generate various pollutants such as $CO_2$ (greenhouse gases), fly ash, nitrogen oxides, sulfur oxides, and the waste heat pollution that can affect lakes, rivers, and streams. Fossil fuel generation also has drawbacks associated with limited availability and the cost of extracting and transporting the natural resources (i.e. coal, oil, gas) to the power plant location. Lastly fossil fuel generating plants contribute to an overall increase in $CO_2$ in the atmosphere with the resulting increase in the planet's mean temperature (global warming). Nuclear power reactors on the other hand produce long and short life nuclear waste products which must be stored and managed (long term) after the original fuel rods have become depleted. Finally there is the ever present danger that a nuclear reactor could become unstable or damaged, as was the case with Chernobyl Russian reactors, Three Mile Island in the US, and the Fukushima-Daiichi reactors in Japan. Solar energy, while renewable and clean, is subject to lack of availability during night time hours. Similarly, energy from wind generation is not constantly available since it is subject to the unpredictability of weather patterns. Both solar and wind generators require substantial areas of the earth's surface to generate power levels equivalent to state of the art fossil and nuclear plants. For these reasons, many industrial experts do not considered solar and wind generation as truly viable replacements for fossil and nuclear generation plants. Lastly geothermal and hydroelectric, while both clean and able to produce abundant power, are generally limited geographically to a few commercially feasible sites that can be made commercially productive. Hence there is an urgent need on the planet for an efficient, cheap, reliable, pollution free, energy dense, renewable energy source that can be built at any location, that is scalable to meet any size power requirement, and that is available at all times.

Buoyancy Engines, Gravity Engines

A buoyancy engine, for the purposes of this application can be defined as a device that attempts to utilize the forces of buoyancy (but not the gravitational forces) to generate motive force and power. A survey of applicable literature turns up a number of buoyancy engines that strive to utilize dense fluids such as water and properties of buoyant-objects, and air bubbles in particular, to displace the dense fluid so as to generate the upward force of buoyancy. The field of buoyance engines will be addressed in general terms, and specific references addressed when appropriate, in the next paragraphs.

Generally speaking prior art searches show that most buoyance devices utilize compressed air in some form to function. Very commonly compressed air is injected at the bottom of a fluid tank, where air bubbles impinge on, and collect under, a series of linked and connected mechanical surfaces, such as an inverted bucket. The mechanical surfaces are generally arranged in a circular fashion, and often in the form of one or more large wheels, so as to force the mechanical surface attached to the moving wheel upward under the force of buoyancy. The air bubbles are then dumped at the top of the fluid tank by an inversion of the mechanical surfaces, which are then propelled back down through the same tank of fluid as the wheel continues to turn. In nearly all cases the working fluid is generally water, but mercury is occasionally mentioned. In most of these patents the buoyancy of the mechanical surface is modified by the air bubbles that collect under its surface such that the composite surface plus air bubbles become buoyant with the addition of the air bubbles. The downward force of gravity does not make a significant contribution to the energy output since the wheels and other mechanical connections to the wheel are generally balanced and do not move under the influence of gravity when no compressed air is being generated. Buoyancy engines of this type include an early reference by Cook in 1883, patent no. 271,040, followed by more recent entries including: Bokel U.S. Pat. No. 4,326,132, Jackson U.S. Pat. No. 4,407,130, Simpson U.S. Pat. No. 4,981,015, Murata U.S. Pat. No. 6,269,638, Kittle U.S. Pat. No. 6,447,243, and Brumfield pub. no. 2010/0095666. In each of these cases the motive force driving the mechanical device is the force of buoyancy generated by the air bubbles that are injected into the device. An important note is that a considerable amount of energy is required by such devices to generate the pressurized air, and this energy debit must be subtracted from any net energy that may or may not be produced by these devices.

Two devices by Dennis De Shon are worthy of consideration, they include U.S. Pat. No. 4,713,937 (Dec. 22, 1987) and U.S. Pat. No. 4,742,242 (May 3, 1988). According to both patents De Shon uses buoyant capsules instead of air to activate the forces of buoyancy. In his first patent: U.S. Pat. No. 4,713,937, the capsules are injected into the bottom of a tank of fluid (mercury) via an air lock (which implies it uses compressed air to displace the mercury in the airlock), imping on a series of mechanical surfaces and geared wheels, not unlike the patents mentioned above, and then removes the capsules at the top. There is however no explanation as to how the buoyant capsules are injected into the fluid, or how said capsules are taken from the top of the fluid tank to be replaced at the bottom of the tank (i.e. no fluid interface mechanism). In his second patent: U.S. Pat. No. 4,742,242 De Shon provides a mechanism to inject a series of "gas-filled linked lifting bodies" into the bottom of a fluid tank, but requires the use of computer controlled compressed air injection to make the crossing of the fluid interface possible. Again this requires considerable energy to create the continuous stream of compressed air. Both devices utilize buoyancy as the motive force, and do not make significant use of gravity.

In a recent patent application by James Kwok, patent application publication number US2010/0307149, Dec. 9, 2010, the embodiments disclosed use compressed air to inflate or deflate a flexible membrane based "buoyant means" within a tank of fluid, (typically water), which displaces the fluid when inflated, so as to change the overall buoyancy of the "buoyant means" as a function of time. Kwok uses a number of somewhat complicated mechanical connections, gears, pulleys and weights to provide mechanical motion from the "buoyant means" that in turn drives a shaft, which drives an electrical generator. One of the significant limitations of this device is that the embodiments again utilize compressed air to change the buoyancy of the "inflatable capsule" and hence require significant energy to generate the compressed air. In addition the "inflatable capsule" or buoyant means must be driven back to the bottom of the fluid tank resulting in additional energy loss due to the viscosity of the fluid.

Compressed air used by these embodiments displaces the working fluid (e.g. water), but at the same time is also subject to the ideal gas law to first order (PV=nRT). This law can be expressed as P2/P1=V2/V1 when the temperature T and number of molecules/atoms n of gas is known or fixed (as in a single air bubble or compressible buoyant-object). If the water pressure is increased by a factor of ten from the top of the tank/column of water to the bottom, then the new pressure at the bottom P2, divided by the original pressure at the top (P2/P1), will be equal to 10 and will, by the perfect gas law, decrease the volume at the top V1 to the new volume V2 at the bottom of the tank. Hence if V2/V1 is $1/10$th of its original volume then P2/P1 is equal to 10 (the reciprocal of the pressure gain). But water is basically an incompressible fluid, so its volume does not substantially change when compressed, however the air bubble/volume, as just described, compresses considerably. Hence when an air bubble's volume is compressed when at the bottom of a tank of water by the height of the water overhead by a factor of 10×, then the volume of the air bubble shrinks by a factor of 10. This means that the water displaced by the smaller air bubble is decreased by a factor of 10. Practically speaking this means that the resultant buoyancy force acting on the air bubble at the bottom of the tank is 10 times less than it is at the top of the tank/column. Similarly a 100 fold increase in pressure on the air bubble due to increased tank depth implies that only 1% of the fluid volume is displaced by the same bubble at the bottom of this deeper tank, and therefore only 1% of the buoyancy power and force can be generated by this much smaller air bubble near the bottom of the tank.

Water, which is the typical dense fluid used in these devices, is compressed by gravity such that the pressure increases by 1 psi for every 2.31 feet of increased depth (head). Therefore it takes only 23 feet of water to decrease the volume of an air bubble to $1/10$ of its surface size, and one tenth of its effective buoyancy. The utility and efficiency of compressed air for use as water displacement to generate buoyancy continues to decrease with depth as shown in FIG. 1B. The conclusion is that buoyancy embodiments which directly utilize compressed air, such as those illustrated by prior art discussed above, quickly become less effective and less efficient as the tank fluid depth/water column height is increased (i.e. the power generated by compressed air does not scale well with water depth). Hence, according FIG. 1B, such embodiments are practically limited to water depths on the order of about twenty feet or less, where the force of buoyance at the bottom of the water tank/column is still at least $1/10$th of what it would be at the surface.

A major conceptual and practical draw back exists for any buoyancy embodiments that require compressed air (or must generate compress air) to function. The compressed air that is injected or transferred within the system consumes energy, and the amount of energy expended increases with water pressure and water height. Generally speaking the energy cost of compressing and or transferring the air must be subtracted from the overall energy equation associated with the device. Hence the effect is that the net energy gain from the embodiment (if any) is greatly reduced by the energy required to generate the compressed air.

A further limitation of buoyancy devices, besides that fact that they do not scale well with water depth, and the fact that they require relatively large expenditures of energy to operate (e.g. to compress air), is that they only take advantage of the forces of buoyancy and generally do not take advantage of the forces of gravity, as is done by a water wheel, or a generalized gravity wheel. In a water wheel, which has been around for thousands of years, elevated water impinges upon the peripheral surfaces, or buckets of a central wheel that is attached to a central axis. The turning central axis can be used directly to generate mechanical energy, as in a flower mill, or as is commonly done today, the central axis can be attached to an electrical generator such as those deployed by Tesla at the turn of the century at Niagara Falls, near Buffalo N.Y. (e.g. U.S. Pat. No. 447,921). In a generalized gravity wheel the principles are typically the same, except that the impinging water can be replaced by any fluid type (air, water, oil, etc.), or any solid object that impinges upon the central wheel (e.g. a series of heavy falling spheres, or a stream of pebbles that impinge upon the central wheel's surfaces and turn the central axis), not just water.

Finally an examination of US patent application publication no. 2012/0198833, by Francis, published Aug. 9, 2012, attempts to combine a buoyancy engine with a gravity engine. Francis relies on alleged surplus energy supplied by an elevated buoyant "ball" that is lifted by the force of buoyancy to "insert" said "ball" into the bottom of a buoyant column of fluid, and to allegedly perform the "ball reset" function of the device with no external energy input. A simple energy analysis of this patent shows that the proposed device is non-functional. It is however instructional to review an energy analysis of the Francis device, as such an analysis can enable an understanding of the inventive concepts disclosed herein, and in particular an important principle of this application, namely that the heart of an energy generation device may be a fluid interface device, as disclosed herein. Such a fluid interface device is particularly energy efficient, non-obvious, governed by the laws of conservation of energy, and enables buoyancy and gravity to do work and liberate surplus energy under very select conditions.

While it may be possible to use buoyancy to lift a ball, and gravity to convert the height gained to energy via a gravity wheel, it must be done such that there is a net energy gained, otherwise there is no possible energy that can be extracted from the system. It is fairly easy to show that US 2012/0198833 will never generate an energy surplus as described, that there is insufficient energy to run and move the embodiment as shown in US 2012/0198833 FIG. 2 ("Francis FIG. 2"), and that the embodiment cannot mechanically function as described. Consider the following:

In paragraph [0031] Francis states "the piston 216 can insert the buoyant balls 202 into the buoyant column", without any further explanation and without out further mechanical means. Given only a piston to insert the ball into the fluid column, it is necessary for the geared gravity wheel in this case to pull the piston rod and piston out sufficiently such that the ball can drop into an exposed opening in the piston's housing or enclosure. The exposed opening in the piston housing must be in fluid communication with the bottom of the fluid column if the ball is to be inserted, and therefore without other mitigating mechanical means, the pressure from the standing column of fluid will immediately begin a pressurized flow of fluid from the piston enclosure's opening. The rate of fluid flow will be in proportion to the pressure at the bottom of the fluid column, the diameter of the ball opening, and the height of the fluid column. The ball having dropped from a small height, having used most of its kinetic energy to turn the "drive wheel", and being buoyant will not completely submerge by itself, especially with pressurized fluid leaking from the housing. That is, since the ball is buoyant, part of the ball's surface will be above the water line represented in this case by the fluid level in the opening of the piston housing. Hence it will be difficult if not impossible for the piston to close with the ball above the water line even if there is no water leaking form the piston housing. With the piston housing leaking enormous amounts of water under pressure, the ball will be pushed out of the enclosure opening by the pressurized fluid flow, hence there is no way to force the ball into the piston without further mechanical means, which has not been disclosed by Francis.

Additionally this leaked water must be replaced, and to replace it will require pumping the fluid to the top of the holding tank (pump no defined). The elevation of this leaked fluid requires an enormous amount of energy which must be subtracted from the energy balance of the system. The fluid that has leaked, if not replaced, will cause the buoyant fluid column to collapse and the fluid pressure at the bottom of the fluid column to diminish. There can be no working embodiment with a collapsed fluid column, no ball to enter the fluid column, and no driving force of buoyancy without the pressure difference between the top and bottom of the fluid column.

When the buoyant fluid is water, the pressure at the bottom of the fluid column will be 1 pound per square inch (PSI) for every 2.3 feet of water in the column. This water pressure acts on the surface area of the piston even when the enclosure's housing is not leaking, so as to always force the piston backward with a force proportional to this pressure. This initial force pushing back on the piston must be overcome by the force generated by a "dropped ball", if the "drive wheel 208" is ever to move and rotate (see Francis FIG. 2). As a concrete example, consider the case of the embodiment per US 2012/0198833 which has been configured to be 20 ft tall 4 inch in diameter fluid column with a 4 inch buoyant ball. The 20 ft of water generate 20 ft/2.31 psi/ft=8.66 PSI. A 4 inch ball and 4 inch piston has a cross sectional surface area of PI*diameter=12.6 inches squared. Therefore the ball or piston will have a force pushing on it of 12.6*8.66=108.8 pounds. This is 108 pounds of force that will attempt to be forced into the piston enclosure's open at all times and it is 108 pounds of force that must be overcome by the "ball" when being dropped into the piston. On the other hand a 4 inch ball will displace 1.2 pounds of water, and to be buoyant it must weigh less than 1.2 pounds. Given that force of gravity produces in this case less than 1.2 pounds of force for each ball, even with the combined force from several ball drops, there is no possibility that the downward force of gravity can overcome the force of the flowing water coming out of the piston enclosure opening so as to insert the ball into the piston, nor is it possible for the "drive wheel" to begin to turn without addition 108 pounds of external applied force and other associated mechanical means. Increasing the size of the ball only increase the amount of water leaking from the piston and therefore the force on the ball or the piston will increase as will the amount of water leakage. Decreasing the height of the water column only reduces the height and potential energy that the ball can obtain. A more general analysis could be under taken to show that there is no combination of fluid height or ball size which would permit US 2012/0198833 to function as written.

In paragraph [0032] Francis states, "one skilled in the art will appreciate that there are other methods of inserting a buoyant ball 202 into buoyant column 212 are contemplated herein. For example, the bottom portion of the buoyant column 212 can be isolated, using a horizontal divider or some other method. The buoyant fluid 214 can be removed from the bottom portion of the buoyant column 212 and the ball can be inserted." First of all this description of the proposed apparatus is incredible vague and it is not apparent how a "horizontal divider or other method actually is assembled and made to function. More importantly this method, if the applicant utilizes sufficient imagination, describes a process that requires more energy to remove the water from the isolated bottom, drained fluid column, than will be gained by the ball being elevated. The means by which it is drained and how the separation would occur is a complete mystery. First consider that the water removed must be replaced by pumping an equal quality to the top of the fluid column if more than one ball is to use the column repeatedly. The energy required to lift and removed the water from a section of the bottom can be calculated from the gravitational potential energy MGH increase of the water required to be replaced, where M is the mass or weight of the water column that must be replaced, G is the gravitational constant and H is the height of the fluid column. On the other hand the energy gained by the ball is also given by MGH, but this time the M is the mass of the ball. For energy to be gained by the ball over that of the water removed the ratio of these two terms (the energy gained by ball/energy required to water replacement) must be greater than one—which is a measure of the energy efficiency of the process. That is after removing the common G and H from the ratio we get $Mass_{ball}/Mass_{removed-water-from-column}>1$. But the density and mass of the ball to float must always be less than the density of the water that surrounds it and therefore the mass of surrounding water is always greater than the ball if the ball is going to float. Hence there must always be a greater volume of water removed to insert the ball into the column in the first place, therefore this ratio is always greater than 1 no matter how high the fluid column and no matter what the size ball utilized. This means the process as described always losses energy. Again consider the same example where the water column is a cylinder of height 20 ft of diameter 4 inches and where the ball is 4 inch in diameter. The proposed process of isolating and removing the water volume of a cylinder of 4 inch diameter and 4 inch height involves water volume=PI*(D/2)2*H=50.26 in3 which weighs 1.82 lbs. The energy required to lift and replacement the water is therefore (1.8)*G*H. Energy gained by lifting the 4 inch ball to height H given it weighs 1.2 lbs if filled with water and if 75% loaded (loading to be explained in later sections of this application) we have for the energy gained=(0.75*1.2)*G*H=0.9*G*H. The energy gained in the process is therefore the energy gained from the ball elevation minus the cost of replacing the water= (0.9-1.8)*G*H=−0.9*G*H. Hence the overall process described in [0032] losses energy with each ball by an amount of −0.9*G*H, since the above number is negative. The ratio for the cylindrical fluid column of 4 inches with 4 inch ball is then 0.9/1.8 or 50%, and this is related to the overall efficiency of the process which can be said to take 50% more energy than is gained by the elevation of the ball. Clearly the process of paragraph [0032] can never be used to generate power.

Similarly it can be shown that the process described in [0033] which consists of lifting the entire weight of the fluid column by way of a vacuum to insert the ball will "cost" even more energy than process described by [0033] (removing a portion of the fluid column and replacing it). Hence its efficiency is worse than that of [0033] which is already producing a loss of 50% of the power generated by the ball when fully elevated.

It is also clear from the above analysis that 2012/0198833 will never generate a surplus of power given any of the injection means described therein, and clearly the device depicted and described in Francis FIG. 2 cannot function since it will be unable to insert said buoyant ball, nor turn "energy wheel" 208b. Given the embodiment described cannot move or function without an external source of power, and given that the described means cannot be used to generate power the entire objective of the patent 2012/0198833 is in question.

Other limitations of 2012/0198833 include:

1. The ability to work, as far as it does, applies only to a "ball" or spherical shaped buoyant-object that can roll down the various ramps, but fall vertically downward.

2. The device shown in Francis FIG. 2 is mechanically complicated which makes it subject to reliability problems and significant frictional losses due to the described gears and connections.

3. The energy wheel 208a only captures half of the energy gained by the ball, which we have shown takes a loss with each cycle of the device. That is, there is no means shown to convert the full potential energy gained by the buoyant ball's elevation into energy. As shown in Francis FIG. 2 only about half of the energy gained can be utilized since 208a is located half way up the device, and the other half (208b) must be used to drive the piston or implement some other means which has also been shown not to be workable. The overall efficiency of the device of Francis FIG. 2 (if it really operated) goes down to 25% or less if the best process given by paragraph [0032] is used to inject said ball. This means that in the best case, if Francis FIG. 2 could be made to work, 75% more energy must be supplied into the system for every ball cycled through the device. Since there is no external source of power the embodiment will not function.

Contrast Between Rotational and Linear Power Generation

Most commercial electrical energy generations facilities in use today capitalize on the rotational motion of magnetics or magnetic fields generated by magnet wire to create time changing magnetic flux that is coupled into the induction coils so as to produce an electrical waveform (electrical power). For example Nikola Tesla Alternating-Electric-Current Generator patent no. 447,921 dated Mar. 10, 1891, is an example of one of the first commercially successful rotational generators that couples a rotating shaft to generate electricity power. The linear induction generator was first described by Faraday in the 1830's, and is documented in U.S. Pat. No. 3,537,192 as a mechanism to teach and demonstrate Faraday's law of induction to students in a classroom or laboratory environment. Such linear generators are characterized by a magnet approaching, moving through, and exiting an induction coil.

In a linear generator the time rate of change of magnetic flux is related to the speed at which the magnetic assembly approaches and passes through the induction coil (in addition to other factors such as the strength and physical orientation of the magnetic arrays). The rate of change of the magnetic flux is responsible for the magnitude of the voltage that is generated in the induction coil, and which in the case of a simple magnet and a single induction coil, generate electrical waveforms when measured at the output of the coil. Prior art searches show that the concept of dropping a magnet through an induction coil is used today in practice to sense or count objects as they fall, or to generate small amounts of power (e.g. US 2012/0235510 Francis FIG. 2) but no prior art reference has been located by the Applicant of the present application that can generate significant power (Kilowatts or Megawatts) for industrial and consumer use. Hence many of the concepts required for large scale power generation described herein are unknown, never utilized, undocumented or otherwise not manifested into various embodiments by science and industry today. This is due at least in part to the brilliance and success of Nicola Tesla whose original concept for rotational power generation is in use universally and remains virtually unchanged after more than 100 years of use.

In the linear generator the flux increases in magnitude as the magnet (associated magnet field) approaches the coil and decreases while exiting the coil. The situation while the magnet exists in, and falls through the coil, is more complex and the power generated depends on the internal structure of the coil itself (e.g. how long the coil is), the orientation of the magnets, its velocity and rotational kinetic energy. If multiple magnets are falling through the same coil at the same time, then there can be undesirable constructive and destructive interference of the electrical waveforms occurring with respect to the induction process. In addition if the magnet (or magnetic array) is rotating and falling at the same time through an induction coil, then the rate of change of flux can be increased if the internal configurations of the magnetic arrays are optimized. Hence the design of a linear generator is not necessarily obvious and straight forward, and the principles concerning linear inductive power generation described herein are then arguably patentable.

SUMMARY OF THE INVENTION

The various embodiments and processes disclosed herein provide a generalized system/methodology for extracting gravitational energy from the planet and provide for a general, pollution free, mass lifting and/or energy conversion system in which the laws of fluid flow, hydrodynamics, and in particular buoyancy and gravity, are utilized to lift an arbitrary mass to a higher gravitational potential energy, where upon the increased potential energy can be converted to other forms of energy. Specific novel and non-obvious features of the apparatus are utilized to insure that the energy input required to lift the arbitrary object to its desired height is less than the potential energy gained by the object. The net increase in potential energy can be converted to other forms of energy such as electrical power or mechanical energy. It is recognized by, and shown in this patent application that energy can be effectively extracted from the gravitational field of the planet and utilized to do useful work when the principles described herein are understood and incorporated into suitable embodiments, such as the ones described in this patent's associated figures and descriptive text.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A—Table of the main power sources on the planet, percentage usage, issues, and notes.

FIG. 1B—Graph of the fractional decrease in compressed gas versus water depth in feet. Illustrates that gas significantly compresses as a function of water depth and is hence less effective at displacing water, which implies that it is less buoyant, with less buoyant force generated the deeper the air pocket or air bubble is within the fluid body.

FIG. 4A—3-Dimensional view of swing check valve exterior view.

FIG. 4B—3-Dimensional view of swing check valve cross-section view.

FIG. 4C—2-Dimensional view of swing check valve cross-section view, flapper open, and filled with dense-fluid.

FIG. 4D—2-Dimensional view of swing check valve cross-section view, flapper closed, and filled with light-fluid (or empty).

FIG. 4E—2-Dimensional cross-section view of swing check valve, flapper closed, holding up a standing-column of dense fluid with buoyant-object below flapper.

FIG. 4F—2-Dimensional cross-section view of a dense-fluid filled compression-decompression-chamber, showing placement of internal swing check valves, internal electronic fluid valves, high and low pressure equalization pipes.

FIG. 5A—2-Dimensional cross-section view of check valve style Fluid Interface devices, showing a buoyant-object waiting to enter the compression-decompression-chamber, and a second buoyant-object that has just exited and is proceeding upward in uptube. compression-decompression-chamber is in a high pressure state (lower flapper not ready to open).

FIG. 5B—2-Dimensional cross-section view of check valve style Fluid Interface devices, showing a buoyant-object entering the compression-decompression-chamber by pushing upward on the check valve flapper and rising upward to rest under top check valve flapper when the compression-decompression-chamber equalized to lower-transition fluid pressures (decompression state).

FIG. 5C—2-Dimensional cross-section view of check valve style Fluid Interface devices, showing a buoyant-object entering the compression-decompression-chamber by pushing upward on the check valve flapper and rising upward to rest under top check valve flapper.

FIG. 5D—2-Dimensional cross-section view of check valve style Fluid Interface devices, showing a buoyant-object leaving the compression-decompression-chamber by pushing upward on the upper check valve flapper and rising upward within the uptube. The compression-decompression-chamber is again in a high pressure state—upper flapper open.

FIG. 6—2-Dimensional cross-section view of check valve style Fluid Interface devices, showing a buoyant-objects stacked in lower transition and above the fluid interface line. Weight of buoyant-objects above the fluid interface line force buoyant-objects downward so as to require timing regulation.

FIG. 7A—2-Dimensional view of electronic solenoid actuated swing check valve cross-section view, flapper closed, and filled with dense-fluid.

FIG. 7B—2-Dimensional view of electronic solenoid actuated swing check valve cross-section view, flapper open, and filled with dense-fluid.

FIG. 7C—2-Dimensional cross-section view of a dense-fluid filled electronic solenoid actuated compression-decompression-chamber, showing placement of internal swing check valves, internal electronic fluid valves, high and low pressure equalization pipes.

FIG. 7D—2-Dimensional cross-section view of electronic solenoid actuated check valve and compression decompression chamber and lower transition.

FIG. 7E—2-Dimensional cross-section view of electronic check valve style Fluid Interface devices, showing a buoyant-objects stacked in lower transition and above the fluid interface line. Weight of buoyant-objects above the fluid interface line force buoyant-objects downward so as to require timing regulation.

FIGS. 11A-19C—Buoyant-objects with internal water chamber and swing check valves. 11A is a top down view, 11B is a cross section when buoyant-object is flipped upside down, 19C is a cross section view when buoyant-object is right side up.

FIGS. 12A-12J,13A—Buoyant-objects containing magnets and magnetic arrays.

FIGS. 13B-13E—Buoyant-objects containing magnets and magnetic arrays stacked in uptubes showing the magnetic forces of attraction and repulsion established by various shapes of buoyant-object and with various enclosed magnetic arrays.

FIG. 14A—3-D view of gravity wheel exterior.

FIG. 14B—2-D cross sectional view of gravity wheel interior acting as a water wheel.

FIG. 14C—2-D cross sectional view of gravity wheel interior acting as a generalized gravity wheel with buoyant-objects impinging on interior wheel so as to turn central axis.

FIG. 19C—close up view of bottom section of FIG. 19A.

FIGURE ITEMS NUMBERS AND PART DESIGNATORS

Figure 1C:
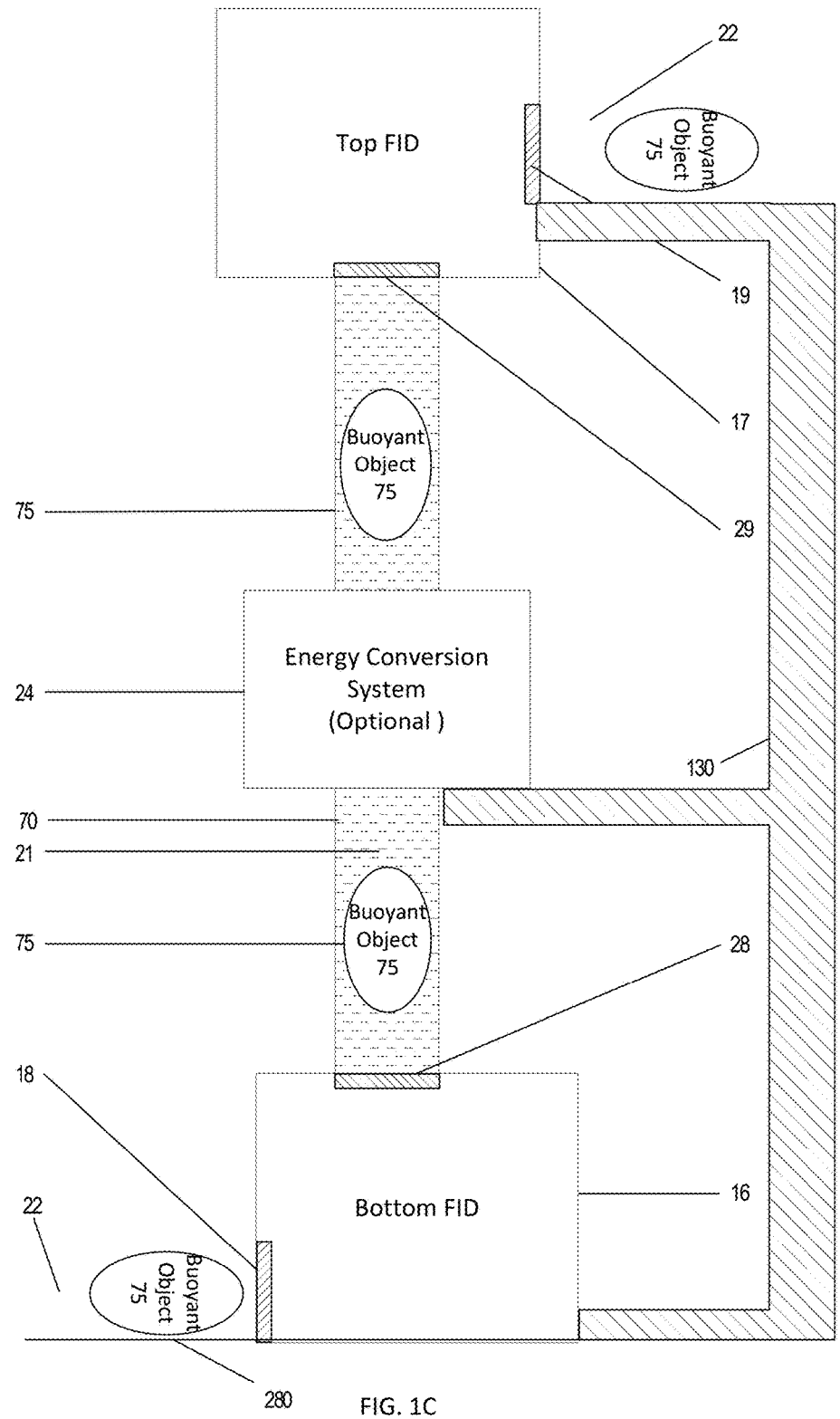
FIG. 1C—Basic open loop mass-levitator with block-diagram style Fluid Interface Devices (FIDs) and Fluid regions.

| Item number | FIG.(s) | Item or part designator | Description/Notes |
|---|---|---|---|
| 16 | 1C, 2, 3 | bottom-FID | Generalized Fluid Interface Device located at the bottom of an embodiment. |
| 17 | 1C, 2, 3 | top-FID | Generalized Fluid Interface Device located at the top of an embodiment. |
| 18 | 1C, 2 | bottom-FID-door-to-light-fluid | entrance/exit door to the light fluid 22 contained in the bottom Fluid Interface Device |

| Item number | FIG.(s) | Item or part designator | Description/Notes |
|---|---|---|---|
| 19 | 1C, 2 | top-FID-door-to-light-fluid | entrance/exit door to the light fluid 22 contained in the top Fluid Interface Device |
| 20 | 4F, 5A-5D, 6 | lower-swing-check-valve | lower swing check valve—part of the compression decompression chamber or fluid-interface-mechanism. |
| 21 | 1C, 2, 3 | dense-fluid | the dense fluid, in which the buoyant-object is buoyant, usually water |
| 22 | 1C, 2, 3 | light-fluid or less-dense-fluid | the light fluid, in which the buoyant-object will sink, usually gaseous, and commonly air; can be pressurized in some embodiments |
| 24 | 1C, 2, 3 | energy-conversion-system | the embodiment's energy conversion system, these are often optional, and are used to convert the motion (kinetic energy) of the buoyant-object to mechanical or electrical energy (power) |
| 25 | 4F, 5A-5D, 6 | upper-swing-check-valve | top most swing check valve |
| 28 | 1C, 2 | bottom-FID-door-to-dense-fluid | In the bottom Fluid Interface Device, the door in the FID leading to the dense fluid |
| 29 | 1C, 2 | top-FID-door-to-dense-fluid | In the top Fluid Interface Device, the door in the FID leading to the dense fluid |
| 30 | 4F, 5A-5D, 6, 15A, 16A | compression-decompression-tube | Tube that connects the upper and lower swing check valves (20, 25) and forms the inner walls of the compression-decompression-chamber 105 |
| 35 | 6, 7E, 17A17C, 18A, 18C, 19A, 19C, 20, 21A | downtube-dense-fluid-level or light-fluid-to-dense-fluid-interface if the dense-fluid is water, and light-fluid is air: downtube-water-level or air-to-water-interface | Water level in the downtube at the dense-fluid to less-dense-fluid interface also known as the lower-fluid-interface |
| 40 | 2, 6, 7E, 8, 17A, 18A, 19A, 20, 21A | downtube | Region between upper and lower transitions. Filled with the less-dense-fluid (e.g. air), in which the buoyant-object sinks and falls rapidly with an acceleration close to g (32 ft/sec$^2$). Downtube can act as the guided-means for the buoyant-objects decent and may guide the buoyant-object 75 into the lower transition and across the lower-fluid-interface. |
| 45 | 4F, 5A-5D, 6, 7C, 7D, 7E, 17A, 17C, 18A, 18C, 19A, 19C | electronic-low-pressure-fluid-valve | Used to equalize pressure to that of the lower transition |
| 50 | 4F, 5A-5D, 6, 7C, 7D, 7E, 17A, 17C, 18A, 18C, 19A, 19C | electronic-high-pressure-fluid-valve | Used to equalize pressure to that of the uptube |
| 55 | 4F, 5A-5D, 6, 7C, 7D, 7E, 17A, 17C, 18A, 18C, 19A, 19C | lower-pressure-equalization-tube | Used to connect compression chamber to the downtube for decompression |
| 60 | 4F, 5A-5D, 6, 17A-17H | high-pressure-equalization-tube | Used to connect compression-decompression chamber to the uptube for compression of the chamber |
| 65 | 17A, 18A, | uptube-secondary-flow-pipe | Used to provide for a continuous path for fluid flow from the upper levels of the uptube 70 to its connection again at the bottom of uptube 70 |

-continued

| Item number | FIG.(s) | Item or part designator | Description/Notes |
|---|---|---|---|
| 70 | 1C, 2, 15A-15H, 16A-16M, 17A-17C, 18A-18C | uptube | a tubular pipe of sufficient diameter to enclose, contain, and permit passage of a multiplicity of buoyant-objects 75. Uptube 70 also contains and encloses the dense working fluid in which buoyant-objects 75 are buoyant. often filled with water or water with a solvent such as salt. |
| 75 | 1C, 2, 4E, 5A-D, 6, 7E, 8, 10A-E, 15A, 15D, 15E, 16A, 16C, 16D, 16F, 16H, 16J, 16L, 16M 17A, 18A, 19A, 20, 21A, 22A | buoyant-object | Object that is levitated by apparatus which is buoyant or partially buoyant in at least one dense fluid, and may sink in the less dense fluid if there is a less dense fluid. Can encapsulate arbitrary matter such as one or more magnetic arrays that are fixed in the buoyant-object. May include one or more closures or doors which can accommodate other arbitrary objects/matter such as cars, water, water with ships, water with fish, etc. Usually made to be somewhat streamlined so as to reduce fluid drag and to follow internal guided-means when such guided-means are present. |
| 80 | 9, 17A, 18A, 21A | induction-coil | One or more Induction coils usually circumferentially surrounding the downtube, but which may also be present on the uptube. Used to induce electrical pulses from magnetic arrays in buoyant-object. |
| 85 | 9, 17A, 18A, 21A | pulse-conversion-subsystem | Converts induction coil pulses to continuous single, 3 phase or dc current as required. |
| 90 | 9, 17A, 18A, 21A | electrical-output | pulse conversion output |
| 100 | 8, 15A, 16A, 17A, 18A, 19A, 20, 21A | uptube-dense-fluid-level or dense-fluid-to-light-fluid-interface if the dense-fluid is water, and light-fluid is air: uptube-water-level or water-to-air-interface | The point at the top of the uptube 70 where the water ends and the air (less dense fluid) begins. Water level in uptube fluctuates slightly as a function of time. |
| 105 | 4F, 5A-5D, 6 | compression-decompression-chamber | Compression/Decompression Chamber consisting of check valves 20, 25, tube 30, and associated fluid valves 45 and 50 |
| 106 | 7C, 7D, 23A, 24A | electronic-compression-decompression-chamber | Electronically actuated Compression/Decompression Chamber consisting of check valves 20, 25, tube 30, and associated fluid valves 45 and 50 |
| 107 | 36 | compression-decompression-chamber-pressure-sensor | Senses pressure in the compression-decompression chamber and reports to electronic control equipment 120 |
| 110 | 17A, 18A | lower-transition-expansion-tank | Stores water and water pressure generated by falling buoyant-object. Recovers some portion of the buoyant-objects kinetic energy acquired during its decent |
| 117 | 6, 17A, 17C, 18A, 18C, 19A, 19C, 20, 22 | solenoid-timing-motion-control-rod | Provides timing and guided means control to regulate timing and in some cases direct buoyant-object 75 motion. |
| 120 | 15A-15H, 16A-16M, 17A-17H | electronic-control-equipment | Computer Control, timing, positions of buoyant-objects, and generic measurement and recording system. Measures fluid levels, temperatures, pressures, electrical output and state of external controls such as emergency stop buttons. |

-continued

| Item number | FIG.(s) | Item or part designator | Description/Notes |
|---|---|---|---|
| 125 | 15A-15H, 16A-16M, 17A, 18A, 19A, 20A, 21A, 22, 23A, 24A | control-cables | Control system wiring to all control points and sensors in system; also supplies electric power when required. |
| 130 | 1C, 2, 15A-15H, 16A-16M, 17A-17C 18A-18C 19A, 20A, 21A, 22A, 23A, 24A | structural-supports | Various structural supports for apparatus |
| 135 | 15A-15H, 17A-17C 18A-18C 19A-19C, 20, 21A, 21C, 22 | elevated-fluid-reservoir | Storage for water at top of apparatus which is used when refilling uptube during operation, used as necessary |
| 137 | 16A | dam-structural-wall | |
| 140 | 15A-15H, 17A-17C 18A-18C 19A-19C, 20, 21A, 21C, 22 | reservoir-electronic-control-valve | Electronic water control valve to control water flow from system elevated reservoir which is actuated via computer control electronics 120 |
| 145 | 15A-15H, 17A-17C 18A-18C 19A-19C, 20, 21A, 21C, 22 | reservoir-fill-pipe | Fill pipe connecting system reservoir to top of apparatus |
| 150 | 15A-15H, 17A-17C 18A-18C 19A-19C, 20, 21A, 21C, 22 | upper-access-hatch | Permits entry and exit into upper transition. |
| 160 | 15A-15H, 16A-16M | electronic-water-drain-valve | Electronic system drain valve |
| 162 | 18A | high-pressure-electronic-water-drain-valve | |
| 165 | 17A, 18A | downtube-water-level-sensor | Water level sensor in downtube |
| 170 | 23A-23H | uptube-water-level-sensor | Water level sensor in uptube |
| 175 | 15A-15H, 17A, 18A, 19, 20, 21, 22 | water-pump | Optional water pump to lift water to reservoir; Computer controlled pump |
| 180 | 15A-15H, 17A, 18A, 19, 20, 21, 22 | water-pump-pipe | Pipe from water pump to reservoir |
| 182 | 19A | water-pump-suction-pipe | |
| 185 | 15A-15H, 17A, 18A, 19, 20, 21, 22 | pump-shutoff-valve | Optional water pump shutoff valve Computer controlled |
| 187 | 15A-15H, 17A, 18A, 19, 20, 21, 22 | water-pump-to-public-source-pipe | |
| 190 | 19A | low-elevation-water-source | |
| 195 | 19A | elevated-water | |
| 200 | 17A, 18A | lower-expansion-tank-check-valve | Lower check valve to ensure one way water flow into lower transition expansion tank |
| 215 | 15A-15H, 17A-17C 18A-18C 19A-19C, 20, 21A, 21C, 22 | upper-transition | guided-means to transition buoyant-object 75 from uptube to downtube; may contain the dense fluid to less dense fluid interface. If this fluid interface is from water to air it may not be pressurize (e.g. water and air meet at atmospheric pressure levels in FIG. 8). |

-continued

| Item number | FIG.(s) | Item or part designator | Description/Notes |
|---|---|---|---|
| 216 | 19A | optional-fluid-filtration-system | an optional fluid filtration system such as reverse osmosis to purify water. May be useful to eliminate salt from ocean or sea water for use in cities and farm irrigation |
| 220 | 17A, 18A | lower-access-hatch | Entry into apparatus located in the lower-transition. Used to repair and replace system parts when necessary. |
| 230 | 17A, 18A | expansion-tank-output-control-valve | |
| 240 | 17A, 18A | external-water-supply | water supply for apparatus either from a public water municipality or from other external water supply such as a near-by lake or stream |
| 245 | 5A-5D, 6, 17A, 18A | lower-transition | region in apparatus containing unpressurized dense fluid, it extends from the air-water interface in the downtube to the flapper of lower-swing-check valve 20 |
| 255 | 17A, 18A | expansion-in-pipe | Pipe connecting expansion pipe to lower transition |
| 265 | 15A-15H | public-private-fluid-disposal | Public/private fluid disposal (e.g. sewer storm drain for water) |
| 270 | 15A-15H 16A-16M | bottom-landing-pad | Landing pad which stops buoyant-object's decent at bottom of Compression-Decompression chamber, also serves as stabilized base when loading objects into buoyant-objects, at same height as entry ramp |
| 275 | 15A-15H 16A-16M | uptube-ceiling | Top of Uptube forming a Ceiling which stops further elevation of the buoyant-object |
| 280 | 1C, 2, 15A-15H | ground-level | reference point elevation from which buoyant-object increase in elevation is measured; generally the mean local elevation of the surrounding landscape |
| 285 | 15A-15H | water-tight entry-door | Sealable water tight door into elevator Compression-Decompression Chamber 325 |
| 290 | 17A | emergency-stop-means | Emergency stop solenoid rods to stop buoyant-object dropping and to adjust drop timing |
| 295 | 15A | emergency-stop-switch | FIG. 17A: cuts power to electrical output circuits, inserts rods into downtube to prevent next buoyant-object drop, regulates timing of buoyant-objects |
| 305 | 15A-15H | water-dump-pipe | Pipe to public sewer or water sink 265 from apparatus |
| 310 | 15A-15H | exit-ramp | Downward sloping ramp from water elevator exit 335 to elevated landmass/structure, permitting contents of buoyant-object to be removed from buoyant-object 70 |
| 315 | 15A-15H | elevated-landmass-structure | an elevated landmass or the top of a building structure that the buoyant-object will be levitated to. |
| 320 | 15A-15H, | elevated-water-fill-pipe | pipe from elevated water to uptube 70. Used to refill uptube and entry chamber |
| 325 | 15A-15H, 16A-M | elevator-compression-decompression-chamber | Primary fluid interface device for water elevator embodiment; chamber where water is filled to lift buoyant-object after arbitrary mass has been placed inside buoyant-object; interfaces water in uptube to air environment where buoyant-object can be loaded 365; composed of swing check valve 370, compression-decompression-tube 365, high-pressure-equalization-tube 60, and attached electronic control valves 50 and 160. |

-continued

Figure 10A:
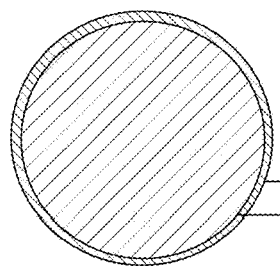
FIG. 10A—Spherical generic buoyant-objects with hard outer shell.
Figure 10B:
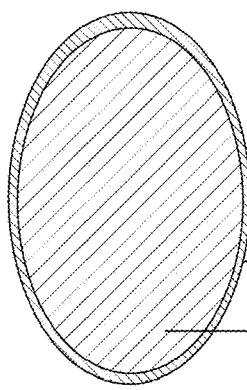
FIG. 10B—Elliptical generic buoyant-objects with hard outer shell.
Figure 10C:
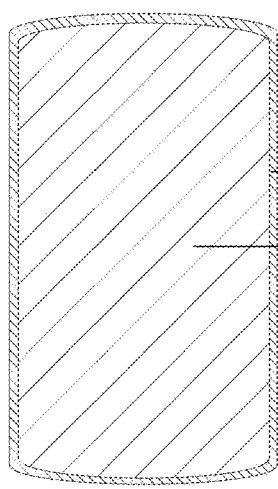
FIG. 10C—Cylindrical generic buoyant-objects.
Figure 10D:
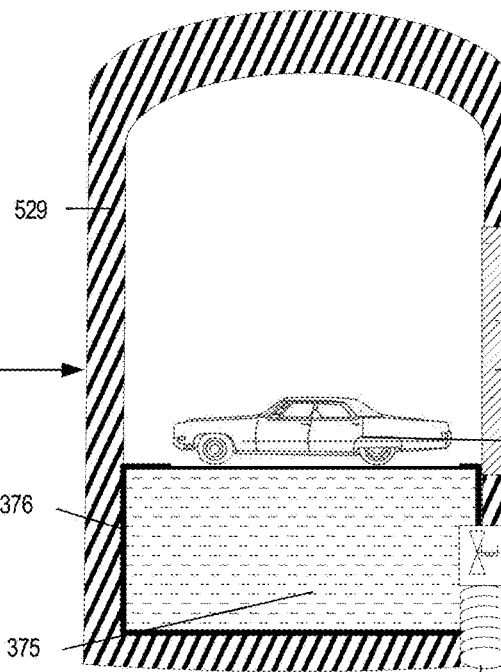
FIG. 10D—Encapsulating buoyant-object showing ballast tank, arbitrary mass shown as a car, electronically actuated fluid valve for ballast, and induction coils to open/close fluid valve.
Figure 10E:
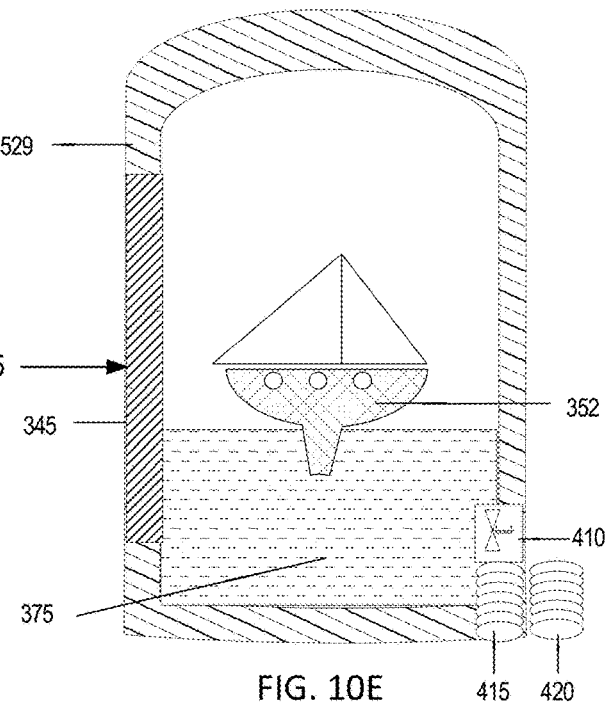
FIG. 10E—Encapsulating buoyant-object showing internal fluid tank, arbitrary mass shown as a ship and surrounding water, electronically actuated fluid valve, and induction coils to open/close fluid valve.

| Item number | FIG.(s) | Item or part designator | Description/Notes |
|---|---|---|---|
| 330 | 4E, 15A-15H 16A-16M | standing-column-of-water or standing-column-of-dense-fluid | Standing Column of Water |
| 335 | 15A-15H | top-exit-door | Top exit from water elevator |
| 340 | 15A-15H, 16A-16M | top-landing-pad | Landing pad which stops buoyant-object's 75 ascent at top of uptube 70, also serves as shock absorbing cushion, designed to make buoyant-object door align with height as top exit ramp 310 |
| 345 | 15A-15H, 16A-16M | buoyant-object-door | Door of buoyant-object 75 |
| 350 | 15A-15H | car-embodiment-of-an-arbitrary-mass | Arbitrary mass represented by car, that is encapsulated in buoyant-object of FIG. 10D, 10E |
| 352 | 10E 16A-16M | ship-embodiment-of-an-arbitrary-mass | Arbitrary mass represented by ship, that is encapsulated in buoyant-object of FIG. 10E |
| 355 | 15A-15H 16A-16M | lower-water-level-sensor | Water level sensor in compression-decompression chamber 325 |
| 360 | 15A-15H 16A-16M | swing-check-valve-flapper | flapper of a swing check valve |
| 365 | 15A-15H 16A-16M | compression-decompression-tube | water tube connecting the swing check valve to the bottom-landing-pad 270 |
| 370 | 15A-15H 16A-16M | electronic-elevator-swing-check-valve | swing check valve at top of elevator embodiment compression decompression chamber 325 |
| 375 | 15A-15H 16A-16M | buoyant-object-ballast | Buoyant-object ballast used to modify the buoyancy (buoyance force vector) of the buoyant-object 75, ballast can be any heavy mass like water. Use of water for ballast permits changes in object buoyancy when the water level in the ballast tanks are changed. This item becomes a ballast tank with a variable amount of water when water or other fluid is used as the ballast |
| 376 | 15A-15H | buoyant-object-ballast-tank | Buoyant-object ballast tank used to modify the buoyancy (buoyance force vector) of the buoyant-object 75, ballast can be any heavy mass like water. Use of water for ballast permits changes in object buoyancy when the water level in the ballast tanks are changed. This item becomes a ballast tank with a variable amount of water when water or other is used as the ballast |
| 380 | 15A-15H | car-at-ground-level | car at ground level before it is lifted to the elevated-landmass-structure 315 |
| 385 | 15A-15H | elevated-car | car on elevated-landmass-structure 315 after exit from apparatus |
| 390 | 15A-15H 16A-16M 17A, 18A | system-operator | operator of the apparatus, who commands the apparatus to change states |
| 395 | 15A-15H 16A-16M 17A, 18A | system-display-gui | system display and graphic user interface that provides touch panel, keyboard, and mouse interfaces to electronic control equipment 120 via controls cables 125 and is utilized and controlled by system operator 390 |
| 400 | 15A-15H 16A-16M | swing-check-actuator | an electronically activated check valve flapper opening and closing mechanism, shown here as an electronic solenoid whose rod works with a sliding mechanism to open or close the check valve as needed. |

-continued

| Item number | FIG.(s) | Item or part designator | Description/Notes |
|---|---|---|---|
| 405 | 15A-15H | moderately-elevated-water-source | a moderately-elevated-water-source used to refill elevator-compression-decompression-chamber 325 instead of using the water source at the top of the water elevator |
| 410 | 15A-15H, 16A-16M, 10D, 10E | ballast-tank-water-valve | Valve to increase or decrease water ballast in buoyant-object 75' |
| 415 | 10D, 10E, 15A-15H 16A-16M | buoyant-object-power-induction-coil | Induction coil in buoyant-object 75; inductively transfers power and control signal to buoyant-object control valve to open valve which increases or decreases the water ballast |
| 420 | 15A-15H 16A-16M | lower-power-induction-coil | Lower power Induction coil; transfers power and control signal into buoyant-object induction coil, which in turn controls valve in buoyant-object to open valve which increases or decreases the water ballast. Power & control signal issued by electronic-control-equipment through control cable 125 |
| 425 | 15A-15H 16A-16M | upper-power-induction-coil | Upper power Induction coil; transfers power and control signal to buoyant-object induction coil, which in turn controls valve in buoyant-object to open valve which increases or decreases the water ballast. Power & control signal issued by electronic-control-equipment through control cable 125 |
| 430 | 15A, 15B 15D, 15F15G, 16A, 16B, 16D, 16G, 16F, 16H, 16I | mechanical-stop | used to prevent buoyant-object 75 from prematurely descending when taking on additional water in the ballast tank 375 |
| 435 | 17A-17H | moderately-elevated-water-source-pipe | pipe connecting the moderately elevated water source to the elevator compress-decompression chamber 325 via water valve 440. |
| 440 | 17A-17H | moderately-elevated-water-source-valve | moderately-elevated-water-source-valve |
| 445 | 17A-17H | water-pump-intake-pipe | pipe attaching to water pump and other end connecting to the water source |
| 455 | 16A, 16B, 16G, 16F, 16H, 16I, 16J, 16L | unelevated-ship | ship before it has been elevated by water elevator. |
| 460 | 16A-16M | wall-of-dam | wall of dam which holds back water |
| 465 | 16A-16M | uptube-water-fill-valve | electronic water fill valve, that when open, permits water to enter the uptube from water at the top of the dam. |
| 470 | 16A-16M | dam-wall-extension-overhang | an elevated water extension and overhang to the dam wall to permit the ship to exit the water elevator into an elevated water channel that is in fluid communication with the water of the dam |
| 475 | 16A-16M | upper-ship-channel | an elevated water channel that ship exits to when elevator is opened, water channel is in fluid communication with the rest of the dam water |
| 480 | 16A-16M | upper-power-induction-coil-dam | Upper power Induction coil; inductively transfers power and control signal to buoyant-object induction coil, which in turn controls valve in buoyant-object to open valve which increases or decreases the water ballast. Power & control signal issued by electronic-control- |

| Item number | FIG.(s) | Item or part designator | Description/Notes |
|---|---|---|---|
| | | | equipment through control cable 125. The dam embodiment upper power induction coil opens valve only until buoyant-object sinks to the elevation of the mechanical stop. The mechanical stop ensures that the valve is closed before complete emersion of the capsule. |
| 485 | 16A-16M | top-lock-gate | lock gate at top of ship elevator |
| 490 | 16A-16M | elevated-ship | ship embodiment of arbitrary mass that has been elevated to the top of dam |
| 495 | 16A-16M | ship-embodiment-of-an-arbitrary-mass | |
| 500 | 16A-16M | lower-ship-channel | consists of the lower ship channel that is in fluid communication with the interior of elevator-compression-decompression-chamber 325 when lock-gate-to-compression-decompression-chamber is open |
| 505 | 16A-16M | lock-gate-to-compression-decompression-chamber | lock-gate-to-compression-decompression-chamber |
| 506 | 12B, 13B, 18A-18C | buoyant-object-ellipsoid-dual-magnetic-array | buoyant-object which is shaped as a ellipse with an internal magnetic array |
| 507 | 13A, 13C | buoyant-object-sphere-magnetic-array | buoyant-object which is shaped as a ellipse with an internal magnetic array |
| 521 | 11A-11C | buoyant-object-flapper | swing check valve flapper in a buoyant object designed to lift and contain water in an internal chamber |
| 522 | 11A-11C | buoyant-object-flapper-pivot | swing check valve flapper pivot in a buoyant object designed to lift and contain water in an internal chamber |
| 523 | 11A-11C | buoyant-object-flapper-weight | swing check valve flapper weight in a buoyant object designed to lift and contain water in an internal chamber, optional weighted for flapper ensures prompt closure and opening of internal swing check valve so as to quickly permit exit and entrance of dense fluid |
| 524 | 11A-11C | buoyant-object-flapper-ledge | swing check valve flapper ledge in a buoyant object designed to lift and contain water in an internal chamber |
| 525 | 11A-11C | buoyant-object-ellipse-water-chamber | buoyant-object which is shaped as a ellipse with an internal water chamber and gravity lid closures |
| 526 | 11A-11C | buoyant-object-light-fluid-entry-exit | entry-exit point for light fluid into swing check valve in a buoyant object designed to lift and contain water in an internal chamber |
| 527 | 11A-11C | buoyant-object-dense-fluid-entry-exit | exit-entry point for dense fluid into swing check valve in a buoyant object designed to lift and contain water in an internal chamber |
| 528 | 10A-10C, 11A-11C | buoyant-object-light-inner-core | inner core of buoyant object being less dense than water |
| 529 | 10A-10C, 11A-11C | buoyant-object-dense-shell | buoyant object hard outer core |
| 530 | 7A-7E | solenoid-rod | the rod that moves in and out of a solenoid coil to actuate movement |
| 535 | 7A-7E | solenoid-coil | the coil of wire that when energized by an electric current draws the solenoid into the coil so as to cause a movement of the solenoid rod |
| 540 | 4A-4F, 5A-5D, 7A-7E | check-valve-flapper-pivot | pivot point for swing check valve flapper |
| 545 | 4A-4F, 5A-5D, 7A-7E | check-valve-body | body of swing check valve usually often composed of metal or plastic |
| 550 | 4A-4F, 5A-5D, 7A-7E | check-valve-flapper | flapper of swing check valve used to stop water flowing through swing check valve, rests against ledge and used in combination with seal 560 |

-continued

| Item number | FIG.(s) | Item or part designator | Description/Notes |
|---|---|---|---|
| 555 | 4A-4F, | manual-swing-check-valve | A manual swing check valve consisting of the swing check-valve-body 545, check-valve-flapper 550, check-valve-flapper-pivot 540, the check-valve-seal 560, and the check-valve-ledge 565. A three dimensional (3-D) front view of single swing check valve 555 is shown in FIG. 4A, its corresponding 3-D sectional view is shown in FIG. 4B, and its two dimensional cross section is shown in FIG. 4C, and FIG. 4D. |
| 556 | 17A, 18A | swing-check-valve-with-float or emergency-fluid-stop | The manual swing check valve 555 where the flapper is buoyant and when installed in an inverted position will close shut when water or other dense fluid in which said flapper is buoyant begins to fill said swing check valve. This device is used to prevent fluid from rising beyond the buoyant flapper and in particular is often used in this application to as an emergency stop mechanism to prevent fluid from filling the normally empty downtube 70. |
| 557 | 7A-7D, 18A, 18C | electronic-swing-check-valve | The manual swing check valve 555 where the flapper can be opened or closed via electronic means, such as a solenoid. |
| 560 | 4A-4F, 5A-5D, 7A-7E, | check-valve-flapper-seal | Sealing means to substantially limit fluid leakage from the attached check valve. Especially useful when the check valve is holding up a significant quantity of water and is subject to a large pressure differential between the top of the flapper and the bottom of the check valve flapper. |
| 565 | 4A-4F, 5A-5D, 7A-7E, | check-valve-flapper-ledge | Ledge built into check valve body 545 that the check valve flapper rests on when closed, and which the check valve flapper seal rests on when sealing out the fluid and pressure above the flapper. |
| 570 | 7A-7E, | check-valve-sliding-means | sliding means attached to the check valve flapper used by in the example electronic 557 check valve for the solenoid rod to open and close the flapper |
| 576 | 12A-12J | buoyant-object-inner-magnet-tube | |
| 577 | 12A-12J | buoyant-object-inner-magnet | buoyant object with an inner magnet |
| 580 | 12A, 13D, | buoyant-object-ellipsoid-one-magnet | elliptical buoyant object with one internal magnet |
| 582 | 12C | buoyant-object-ellipsoid-multi-magnet-array | elliptical buoyant object with multi magnet array |
| 583 | 12F, 17A-17C | buoyant-object-spheroid-three-magnets-array | elliptical buoyant object with three magnets in the internal array |
| 584 | 12E, 13E | buoyant-object-spherical-one-magnet | spherical buoyant object with one internal magnet |
| 585 | 12D, 12G, 12H | buoyant-object-with-water-chamber-two opposing-magnet | buoyant object with internal water chamber, swing check valve flapper closure, and two opposing magnets |
| 590 | 20I, 20J | buoyant-object-cylindrical-one-diametrically-opposed-magnet | cylindrical buoyant object with one diametrically opposed magnet |
| 900 | 14A-14C, 22 | gravity-wheel | gravity wheel couples the downward force of gravity as in a water wheel |
| 910 | 14A-14C, 22 | gravity-wheel's-internal-wheel | Internal wheel within the gravity wheel 900 that pivots about a central axis that is mounted on sealed bearings. The Wheel peripheral spokes/blades extend to the edge of the mechanical housing where they encounter a flexible sealing mean, which deters fluid leakage between |

| Item number | FIG.(s) | Item or part designator | Description/Notes |
|---|---|---|---|
| | | | the liquid and the gaseous fluid sides of the device. As the wheel rotates, enclosed buoyant-objects are moved from the top of the device to the bottom while at the same time forcing internal wheel 910 downward so as to turn central axis 950. |
| 920 | 14A-14C, 22 | gravity-wheel-seal | optional liquid tight seal to make gravity wheel perform better when handling dense typically liquid fluids |
| 940 | 14A-14C, 22 | gravity-wheel-pocket | |
| 945 | 14A-14C, 22 | gravity-wheel-sealed-bearings | |
| 950 | 14A-14C, 22 | gravity-wheel-central-axis | |
| 954 | 14A-14C, 22 | gravity-wheel-generator-support | |
| 965 | 14A-14C, 22 | gravity-wheel-upper-downtube-connection | |
| 970 | 14A-14C, 22 | gravity-wheel-external-generator | |
| 990 | 14A-14C, 22 | gravity-wheel-housing | exterior housing of a wheel embodiment fluid interface device |
| 992 | 14A-14C, 22 | gravity-wheel-cover | |
| 995 | 14A-14C, 22 | gravity-wheel-lower-downtube-connection | |
| 996 | 14A-14C, 22 | gravity-wheel-fluid-entrance-tube | |
| 997 | 14A-14C, 22 | gravity-wheel-fluid-exit-tube | |
| 1000 | 23A-23C 24A-24C | lower-body-of-water-containing-fish | the lower fluid region in which the fish are leaving for the elevated fluid region |
| 1001 | 23A-23C 24A-24C | upper-body-of-water-containing-fish | an elevated fluid region in which the fish are migrating to |
| 1005 | 23A-23C 24A-24C | fish | fish—in addition to being a living object is represent a buoyant or partially buoyant-object, that is variably buoyant under the fish's control. The fish also has its own motive power—that is it can swim. |
| 1010 | 23A-23C 24A-24C | lower-concentrating-fish-pond | |
| 1015 | 23A-23C 24A-24C | fish-counter-sensor | sensor to count fish which reports to electronic control equipment |
| 1020 | 23A-23C 24A-24C | upper-fish-entrance-to-dam | entrance to upper part of dam for fish |
| 1025 | 23A-23C 24A-24C | lower-fish-entrance-to-dam | entrance to lower part of dam for fish |
| 1030 | 23A-23C 24A-24C | standing-column-of-water-pipe | pipe connecting upper dam to lower fluid interface device, filled with water |
| 1035 | 23A-23C 24A-24C | lower-fish-entrance-pipe | lower entrance to dam which fish can use to enter bottom of dam |
| 1040 | 23A-23C 24A-24C | concentrating-fish-bottle | upper water chamber or fluid bottle near dam to congregate fish |
| 1045 | 23A-23C 24A-24C | lower-fish-bottle-swing-check-valve | lower swing check valve that can be closed to seal concentrating fish bottle and so as to permit fish to swim into the upper part of the dam |
| 1050 | 23A-23C 24A-24C | fish-bottle-leak-valve | valve from which water leaks so as to form the upward current into the concentrating fish bottle |
| 1055 | 23A-23C 24A-24C | leaking-water | water leaking form the concentrating fish bottle |
| 1060 | 23A-23C 24A-24C | upper-fish-bottle-swing-check-valve | upper swing check valve that can be closed to permit fluid leakage form concentrating fish bottle, or can be open to permit fish to swim into the upper part of the dam |

| Item number | FIG.(s) | Item or part designator | Description/Notes |
| --- | --- | --- | --- |
| 1065 | 23A-23C 24A-24C | fish-bottle-leak-valve-grate | grate to prevent fish from being drawn through the fish-bottle-leak-valve |
| 1070 | 23A-23C 24A-24C | fish-bottle-leak-valve-pipe | pipe from which water leaks so as to form the upward current into the concentrating fish bottle |

DETAILED DESCRIPTION OF THE INVENTION

A description of example embodiments of the invention follows.

Lack of Scientific Credibility and Conservation of Energy

Possibly the greatest obstacle to any new energy generation system, is that they often lack scientific credibility and scientific feasibility. Patents describing such systems often claim or imply that they can generate energy or provide greater than 100% power efficiency (e.g. DeShon U.S. Pat. No. 4,742,242, Bokel U.S. Pat. No. 4,326,132, Kwok 2010/0307149 A1, and Francis 2012/0198833 A1). If they can indeed generate more electricity than they consume, then the root problem remains that a fundamental and basic question has not been adequately dealt with in the prior art—that is: where does the energy come from since scientific law states that energy cannot be created or destroyed (only exchanged)? When the origin of the energy generated and exchanged by the patent's embodiments is unknown and unexplained the result is that a knowledgeable scientist cannot and will not believe that the embodiment described is capable of creating energy out of thin air, and therefore must be based on fraudulent principles. The corollary is that no investor, once briefed by an educated scientist/engineer is likely to fund a venture based on such scientifically unsubstantiated claims and premises. For this reason, the rational and scientific application of the laws of thermodynamics to the energy generation embodiment which describes how the embodiment is capable of power generation, and how that device is scientifically feasible, is as important as the mechanical details of the embodiments. Hence an explanation showing how the first law of thermodynamics is not violated by this patent application in particular is necessary, and results in a more detailed explanation than might otherwise be warranted. In particular, the applicant of the present application believes that a discussion confirming that no laws of thermodynamics and physics need be broken by the application of the principles used by this application's embodiments is critical. Conceptual details of the various methods and concepts are also important so as to teach how to facilitate tapping these sources. Additionally the conceptual description will provide further illumination as to why the prior art embodiments already available in the patent literature may succeed to some degree, or possibly fail completely, and why the prior art embodiments are clearly inferior to the present application's technology.

Physics of Generating Energy from the Gravitational Field

The principles associated with buoyancy are said to have been first described by Archimedes of Syracuse in 212 BC, which can be roughly translated as "Any floating object displaces its own weight of fluid." In more general terms the principles of buoyancy are known to apply to liquids, gases, or other fluids. While the subject matter surrounding buoyancy involves the broader subject areas of fluid flow and fluid dynamics in general, only the more relevant facts and simplified formulation affecting the embodiments of this patent and existing prior art will be described herein.

Consider that the molecules of water in a column of water are accelerated downward by the force of gravity, and the accumulated weight of those molecules creates a pressure as a function of depth from the surface. In a real sense the pressure associated with fluid bodies such as water tanks, water columns, lakes, oceans, and seas represents energy stored by the gravitational field of the planet. Gravity compresses water to the extent of 1 additional pound per square inch (psi) for every 2.31 feet of water depth (head). The oceans, for example, are thus vast sources of stored energy generated by gravity in the form of water pressure. Molecules, atoms, and material bodies that are suspended in and part of the fluid volume are independently subject to the gravitational force, with the heaviest molecules/atoms experiencing a greater downward force. The net result is a separation of atoms, molecules, and objects based on relative density, with atom, molecules, and material objects that are less dense than the surrounding medium experiencing a net upward force. We know this density separating force as the force of buoyancy. For this reason, an object whose density is greater than that of the fluid in which it is submerged tends to sink. Likewise an object that is less dense than that of the fluid in which it is submerged will float upward with the net upward force (buoyancy) that is equal to the magnitude of the weight of fluid displaced by the body minus its true dry weight.

The molecules of any region, tank, or standing fluid column on the planet are compressed by gravity such that there is a greater net pressure at the bottom of the fluid column as compared to the pressure at the top. Every day common experience show us that any buoyant-object (i.e. an object that weighs less than the fluid it displaces) that is injected or pushed to the bottom of a fluid tank/region/column will effectively "float" with an upward force (buoyance) to the top of that fluid container. When that buoyant-object has been lifted above the local mean elevation represented by the bottom of the fluid tank, it has also increased its stored gravitational energy over and above what it had when it was at the bottom of the same column/tank/region—but increased by how much?

The buoyant-object of mass M, having increased its elevation to a new height H above the local mean elevation, is said to have increased its gravitational Potential Energy by an amount equal to PE=MGH, where G is the near earth gravitational constant for this planet (9.8 m/sec^2), and PE stands for potential energy in Joules, M is the mass in Kilograms, and H is height in meters). The object's buoyance is a force, which like any force will accelerate the object, in this case upward so as to decrease the pressure it is experiencing, and in so doing, its motional or kinetic energy (KE=½mv^2) will increase, and its gravitational potential energy will also increase. Hence, the force associated with buoyancy can do useful work against the force of gravity, and since it is a force acting over a distance, the upward floatation of the object generates power in its own right (force times distance=work), and the rate at which work is performed is defined as power.

Utilizing the force of buoyance to raise an object from the bottom of a fluid pool to the surface is normally not going to generate net surplus of energy since one must somehow get the object back to the bottom of the pool before the cyclic process can be repeated. The force needed to push the object to the bottom of the pool is normally the same or more than the amount of energy that is released when it floats to the surface. This is because the gravitational force and the buoyancy force of an object in a submerged fluid are known to be "conservative forces" or "conservative fields"; that is, the work done by gravity or buoyance in moving the object from one position to another is path-independent. Again, this means that forcing the object directly under the water in the inverse direction on the path it followed during its upward course, or even via a different path taken to the bottom of the pool, requires an equal or greater amount of energy/force to be applied to the object before it reaches the bottom again. Using this simple example there is no net gain in energy provided by the object's buoyancy when the normal and conventional processes are utilized. This is an example of how the conservative buoyant field works, therefore the process just described (i.e. pushing the buoyant-object through the water directly to the bottom of the tank), even if it could be made 100% efficient, will never liberate a net surplus of energy that can be made to do real work.

It is known from the laws of Thermodynamics that if a process or embodiment can do real work or generate power, then the energy acquired by the embodiment must be taken from some existing energy source. The law of conservation of energy, states that the total amount of energy in an isolated system remains constant over time, and that total system energy is conserved. What is known is that the total energy in the system can be transformed into other forms of energy such as heat, kinetic energy, electrical energy, or other forms of potential energy, but it cannot be created or destroyed. For example, since the gravitational field is conservative, the law of conservation of energy states that the energy gained by levitating an object to a height H in a gravitational field (PE=MGH), can be converted to motion (kinetic energy) or to electrical energy, for example by rolling the object down a hill (increasing its kinetic energy).

What we do know by common observation is that if we can get an buoyant-object of mass (weight) M to the bottom of a pressurized column/body of fluid (e.g. water) of height H, where the gravity has compressed the fluid at 1 psi for every foot of water above the object, then the forces of gravity will effectively force the fluid molecules down around the object in such a way as to create an upward force we call buoyancy. The buoyancy force acting on the object is proportional to the weight of the fluid displaced by its volume minus its normal weight when not in the fluid. This buoyant force vector can do work against the gravitational field with a consequential increase in kinetic energy (its moving upward so it has kinetic energy) and its gain in gravitational potential energy is PE=MGH when it reaches the top. The object's energy increase can then be converted to other forms of energy such as kinetic or electric energy if desired. In addition we know that the energy in the form of pressurized fluids on the planets is vast, generated naturally by the force of gravity, and is presently untapable. Yet in theory it might be available as a source for conversion to other forms of energy by the law of conservation of energy given the proper embodiment and the proper understanding of a suitable process.

The physics of conservative fields tell us that if we just force the object back down through the fluid directly or indirectly to the bottom of the column, we know that it will consume all the energy we have just gained (or more). Therefore we conclude that it is impossible to have the object follow the same path through the standing column in reverse if we plan to extract energy in a cyclic continuous fashion. But we also know that there is energy stored by gravity in the standing column of fluid (e.g. water) in the form of the compressed fluid molecules that result in the pressure difference between the top and the bottom of the column of water. Conservation of energy tells us that the energy in a system (the pressurized water) can be conserved and converted to other forms of energy, and therefore we know that if our "system" is considered to include the energy of the compressed molecules in the column of fluid, then this energy is theoretically available to do work. Lastly we conclude that if it is possible to extract the energy from fluid pressure, it must be achieved through a novel and unique method and/or embodiment that can be employed to find a different path to the bottom of the fluid column that "breaks the symmetry" of the two conservative fields (buoyancy and gravity). Several methods employed by embodiments in this application will be described to break the symmetry of the conservative fields, and hence provide a practical means to extract and convert power from the gravitational field into useable power that can be accessed on a daily, continuous basis.

One observation that makes the mass levitator possible and practical is the simple understanding that the forces of gravity and buoyancy act "as if" there is a more fundamental physical law at work which they both share, namely: that both gravity and buoyance are a result of differences in density, with the more dense substance "sinking" to the bottom, and the lighter substance "floating" to the top. They both act "as if" there is really only one force which is a density separating force. In this context gravity in air might be explained as matter falling through the more dense "aether". Hence when a hot air balloon rises its net density might be described as being actually less than the hypothetical surrounding "aether", and the composite object float upward against the force of gravity under such circumstances. The point here is not to debate the existence of the "aether", but to note that gravity could be explained "as if" there is one. The relevance to this patent is that the forces of buoyance and gravitation act "as if" they are linked by this density separation pseudo-equivalency principle. The key is that this more fundamental law is not governed by the rules of a conservative field. The new more generalized density separating force is not path independent, i.e. there are now at least two ways to transverse the same path within the generalized density separating field: up via buoyancy and down via gravity. Using this new apparently more fundamental density separation law the limitations of the conservative gravitation field can be broken, and energy can be extracted from the gravitational field of the planet.

To understand the impact and implications of what is written above, consider for a moment the possibility that the gravitational field strength (i.e. G in PE=MGH) could be varied by some process or suitable mechanism (like an anti-gravity embodiment) so as to make the constant G negative such that any given object or mass M, of any size, shape, volume, or density floated upward (levitated) to an arbitrary height H. Once the object had gained the desired increase in potential energy (PE=MGH), G is changed to be positive again, the object falls, and the energy gained in the upward elevating path is then converted to kinetic energy (e.g. by dropping it), or changed to mechanical energy (e.g. by let the object/mass be a quantity of falling water and use a water wheel), or by converting the kinetic energy to electrical power (e.g. by dropping a magnet through an induction coil). While there is no anti-gravity device to be found in this patent, the applicant shows how nearly the same results can be obtained through the concepts, processes and various embodiments outlined in this application. In particular, the newly described density separating force or law, tell us that a buoyant-object floating upwards is equivalent to having a negative gravitational constant G' during its upward motion, although G' due to buoyancy is generally of a lesser magnitude as compared to the G associated with normal gravity. Hence, G becomes effectively negative the moment a buoyant-object is completely inserted into a fluid medium that is denser than the density of the composite object. Likewise G is positive again when it is falling from its newly acquired height. One of the goals of this patent is to effectively switch the generalized constant of gravity from positive to negative at will via the embodiments of this patent, utilizing both forces of buoyance and gravity in the same embodiment, and to then convert the gain in potential energy to the form of energy that is desired. Consider the following game changing processes and methods to utilize the generalized density separation law to break the symmetry of the conservative laws of gravitation and buoyancy:

1. Changing the buoyance of an object as a function of time, such that the object is buoyant when "floating to the top", and sinks by decreasing the surface area, or weight of said object after it arrives at the top of the tank. The ability to repeatable gain energy using this rule depends on how much energy it takes to change the object's overall density.

2. Using two different paths of travel for the object in the two different but related conservative fields (the buoyancy field followed by the gravitational field), such that the object "rises" by way of buoyancy in a tank of dense fluid, is removed from the dense fluid, and then "falls" generating kinetic energy by way of the force of gravity. The process can repeat when the object reaches the entry point to the bottom of the tank. The ability to repeatable gain energy using this rule depends on how much energy is required to inject the object into the bottom of the dense fluid column where upon it begins to rise to the top of the fluid column.

3. Some combination of 1 & 2 above.

As will soon become apparent an additional non-obvious key to such a process/embodiment lies in efficiently transitioning the object/mass through the fluid interface formed at the junction of the two fluids (dense to light fluid or vice versa) and by effectively dealing with any fluid pressure differences that exist between at fluid interface boundaries. As will be shown there can be two fluid interfaces (possibly more), one at the top (e.g. water to air) and one at the bottom of the device (e.g. air to water), and at least one pressure differential that represent a source of stored energy. Forces must be supplied to move the object/mass across the fluid interfaces, and a suitable embodiment (consisting of at least one Fluid Interface Device abbreviated as "FID") must be engineered to equalize, or otherwise deal with, the pressure differentials on the object/mass so that the object can enter the new fluid with the required fluid pressure. These Fluid Interface Devices (FIDs) should be engineered for minimal use of external power, for example by utilizing the already existing forces of gravity and buoyancy if and when possible. It will also become apparent that if the FID requires more energy to insert and transition the object into the bottom of the standing dense fluid column that will be gained in potential energy upon its eventual buoyant elevation to new height H, than the FID (and the embodiment it is installed in) will be a failure with respect to facilitating the generation of energy. This lack of energy efficiency is one of the primary reasons that US 2012/0198833 is completely non-functional as depicted and described by Francis, where it has been shown that there is not enough energy supplied through the gain in potential energy to even move his "ball" through one closed loop cycle, even if no energy is extracted by his energy conversion device.

As previously stated the embodiments of this patent deal with the objects/mass as if the gravitational constant can be changed from positive to negative, hence the conservative nature of the gravitational field no longer applies. Therefore energy can be gained in the upward floatation of the buoyant-object and possibly coupled to do work, and it can also be extracted and coupled to do work when the object is again subject to the full gravitational potential in the downward stroke of the process.

Some of the implications of this new technology are listed below:

1. Energy generated can be increased by increasing the height that the object/mass is levitated.

2. Energy generated can be increased by increasing the weight of the object/mass that is levitated.

3. The greater the object's buoyance the faster the object will rise to the surface and the greater will be the kinetic energy of the object when it reaches the top.

4. The more objects/mass that can be elevated per second the greater the potential power generated (power is energy per second) by the gravitational field.

5. Any object of any size can be made to float by enclosing said object in a suitably shape buoyant capsule or object.

6. Existing bodies of water on the planet can be used as the dense fluid, some of which are already elevated and this elevated fluid represents additional energy above and beyond the energy available due to the pressure developed by the fluid height (head).

7. The existing atmosphere of the planet (i.e. air) can be utilized as the light less dense fluid.

Some corollaries which will be manifested as embodiments are shown below:

1. An embodiment can be designed to act as a water elevator to lift an object without necessarily generating power, and the buoyancy of the object can be changed so to send the same or different object back down the water elevator (see FIG. 16A).

2. If the buoyant-object contains a magnet or magnetic array and is moving through an induction coil the magnetic fields will generated electric power (see embodiment FIG. 9, FIG. 17A, FIG. 18A).

3. If the object/mass contains internal induction coils and passed by or through a suitably directed magnetic field, (in the upward or downward part of the cycle) then the buoyant-object can obtain a source of internal power than can be utilized or transferred as needed within the object/mass.

4. If the buoyant-object is design to pick up and contain a fluid (e.g. water) in its upward stroke than the embodiment can act as a pump (see FIG. 19).

Methods of Mass Levitation and Energy Conversion from the Gravitational Field

One of the important concepts associated with the embodiments disclosed herein is the ability to increase an object's potential energy by capitalizing on the difference in fluids density; to effectively "float" a buoyant-object to a higher elevation using the dense fluid, and then to "sink" the same object in the lighter fluid so as to generate kinetic energy that can be converted into power. To continuously generate power the embodiment must also be able to cyclically accomplish this methodology in a systematic, practical, and repeatable manner that permits energy to be recovered during each cycle. While the increase in potential energy upon floating a balloon upward is well known, and the ability of an object at the bottom of a fluid to float to the surface with an increase in elevation and potential energy is well known, the ability to define a process and mechanism that can effectively extract energy from the gravitation field using the generalized density separating force is novel and important. In particular, the ability to lift an arbitrary object of any given mass, size, and shape to an arbitrary height above the surrounding average ground level is a novel and important contribution to the current state of art.

Gravitation and the gravitationally compressed energy in the form of fluid pressure, which is found naturally in every body of water on the planet is utilized by embodiments of this patent to increase a buoyant-object's potential energy, where the buoyant-object is buoyant, partially buoyant, or variably buoyant in at least one dense fluid, and "sinks" in at least one light fluid. This stored energy represented by the compressed molecules of the fluid is effectively tapped by the embodiment of this device to generate energy. Hence, it is possible to say that the embodiments of this patent extract energy from the earth's gravitational field. The energy so extracted is continually re-established by the gravitational field of the planet on a moment by moment basis, hence the energy source that drives the apparatuses associated with this patent is essential unlimited and continuously replenished. Therefore the "closed system" that needs to be considered with respect to conservation of energy principles must include the entire earth, its mass, and its consequential gravitational field. There is no effective way to reduce the energy associated with the earth's gravitational field no matter how much energy is extracted from the planets gravitational field. This is true because the force of gravity come from the mass of the atoms and molecules on the planet. Hence the embodiments of this patent can be considered a form of free, clean, and abundant energy. The device is not a perpetual motion machine since the source of the energy is well known, having been identified above, as being supplied by and extracted from, the gravitation field of the planet. Its exact method of extraction and useful embodiments that provide examples of such extraction methodology are contained in the following paragraphs.

The embodiments associated with this patent work with the generalized density separating force described above, which can be broken down into two force vectors that can do work and generate power independently of each other—the force of buoyance, and the general force of gravity. As previously described fluid pressure differences are the reason that the forces associated with buoyance exist, and these pressure differentials are instantly established whenever there is a standing body of water of any height by the force of gravity. It is a goal of this patent to point out how this source of energy can be tapped to do work/produce energy and to outline various novel embodiments that can practically make use of this novel means of extracting energy from the gravitational field.

The buoyant-object to be lifted can be of any size, shape, weight, or density as long as it will float in the more dense fluid (e.g. water). For an arbitrary mass M that does not float or cannot be subjected to the lifting fluid directly, it is still possible to enclose the arbitrary mass M in an air/water/fluid proof capsule that has a sufficient lift and buoyancy to float the composite object in the working medium (see for example FIG. 15A). Hence, given a big enough capsule, and a suitably dense fluid lift medium, virtually any object can be floated from a lower to a higher elevation. The only requirement is that the combined object and capsule when joined and encapsulated together provide a net buoyancy and upward lift force in the working dense fluid. The potential energy gained upon reaching the new elevation can then be converted to other forms of energy as desired. The next step is to get this buoyant, possibly encapsulated object to the bottom of the fluid column in an energy efficient manner.

The various embodiments of this application include several means of engineering and maintaining a standing column of fluid which extends to an arbitrary height H, while passing and transitioning buoyant-objects through to said standing column of water using only the motive force of gravity and buoyancy. The standing column is created or maintained above the surrounding average elevation through the use of a Fluid Interface Device (FID), composed of a set of swing check valves that act as a compression-decompression chamber (e.g. see FIG. 4F-8D). In each instance one of the major purposes of the FID is to hold the entire weight of the standing fluid column and mitigate the associated pressure at the bottom of the fluid body, while still permitting and facilitating the passage of the desired object (buoyant-object) through the mechanism.

FIG. 1C—Basic Open Loop Mass-Levitator

The various levitator embodiments in this application can exist typically as a closed or open system. In a simple open system embodiment, such as the generalized and simplified embodiment of FIG. 1C, the buoyant-object and/or the contents encapsulated by the buoyant-object can enter and leave the embodiment as required, usually entering at the bottom and leaving at the "top" after being levitated, or vice versa when they are returned to ground level.

The generalized open system embodiment of FIG. 1C consists of a bottom-Fluid-Interface-Device 16 (bottom-FID), top-Fluid-Interface-Device 17 (top-FID), dense fluid filled uptube 70, structural-supports 130, an optional energy-conversion-system 24, and one or more buoyant-objects 75—which are buoyant in the dense fluid 21 but sink in the light fluid 22, where light fluid 22 is shown in FIG. 1C as atmospheric air that surround the embodiment of FIG. 1C. Buoyant-objects 75 or material to be encapsulated into a buoyant-object 75 are moved from the light fluid environment (e.g. air) into the interior of the bottom-FID 16 via bottom-FID-door-to-light-fluid 18. It is the responsibility of bottom-FID 16 to facilitate transport of the buoyant-object 75 and any encapsulated material within buoyant-object 75 into the dense fluid environment via suitable internal guiding means, to equalize any pressure difference between the bottom-FID 16 and the connecting dense fluid in uptube 70, and to maintain the standing column of dense fluid as buoyant-object 75 is moved from the light fluid to the dense fluid or vice versa. Note that if the standing column of dense fluid is maintained, and does not collapse or leak out of bottom-FID-exit-entrance 18, then it is also permissible to state that one of the chief roles played by bottom-FID 16, is to also maintain the associated pressure difference between the top and bottom of uptube 70 (i.e., the water pressure difference between top-Fid-door-to-dense-fluid 29 and bottom-FID-door-to-dense-fluid 28). The maintenance of at least one fluid pressure differential is common to all mass-levitator systems, and is therefore the responsibility of at least one FID in the system.

Bottom-FID 16 is attached to uptube 70 via bottom-FID-door-to-dense-fluid 28. Uptube 70 is filled with the dense-fluid 21 (usually water) in which the one for more buoyant-object(s) 75 are buoyant in said dense fluid. Uptube 70 may be optionally attached to an energy conversion system 24 to convert buoyant-object 75's motion into other forms of energy such as mechanical or electrical energy. If energy-conversion-system 24 is not present uptube 70 continues upward and generally attaches directly to the top-Fluid-Interface-Device (top-FID) 17 via top-FID-door-to-dense-fluid 29. Top-FID 17 is connected to top-FID-door-to-light-fluid 19 to permit extraction or insertion of buoyant-objects 75 out of/into top-FID 17.

The generalized open system embodiment of FIG. 1C functions by way of bottom-FID 16 transferring and guiding buoyant-objects 75 that enter the bottom-FID 16 through bottom-FID-door-to-light-fluid 18 from the less dense fluid environment (e.g. air) at ground level 280 and transferring them into the dense-fluid environment 21 (e.g. water) while simultaneously maintaining the standing column of dense fluid in uptube 70 and the pressure differences between the top-FID, the bottom-FID and exterior light fluid (e.g. air). The buoyant-object 75 once having entered the standing column of fluid formed by uptube 75 and the dense-fluid 21, is propelled upward since its net density is less than the dense of the surrounding dense fluid 21. Buoyant-object 75 continues to move upward under the influence of the forces of buoyancy until it enters top-FID 17 via top-FID-door-to-dense-fluid 29. Next top-FID 17 transfers and guides buoyant-object 75 again into the light fluid environment via top-FID-door-to-light-fluid 19. At this point buoyant-object 75 has been raised in a new elevation level against the force of gravity. Assuming that water is used for dense-fluid 21, and atmospheric air is used as the light-fluid 22, the buoyant-object is taken from normal atmospheric conditions, placed in the bottom-FID 16, levitated via buoyancy, and is effectively transported and deposited on the top of the embodiment with a consequential increase in elevation and potential energy. This newly acquired potential energy can then be converted to other forms of energy if desired. Optional energy conversion system 24 may or may not be present and if present may be utilized to couple the upward/downward motion of buoyant-object 75 into mechanical energy. If buoyant-object 75 carries one or more magnets and energy-conversion-system 24 consists of coiled wire, then the motion of buoyant-object 75 will induce electrical pulses into the coil wire via the Faraday Effect, hence providing one method of generating direct electrical power. Alternatively the exterior uptube could be surrounded in part with magnets that can induce power into coils within the moving buoyant-object, thus furnishing the buoyant-object with a potential source of power.

The generalized open system embodiment of FIG. 1C as described so far provides a one-way trip upward due to buoyancy, and is a form of mass-elevator or mass-levitator. To reverse the process, that is to permit the mass-levitator's buoyant-objects 75 to descend back to ground level, buoyant-object 75 must change its overall net density (i.e. it must be variably and controllably buoyant). This can be accomplished by taking on some form of ballast (e.g. water) or by changing the surface area of the object (e.g. by deflating the buoyant-object). Specific examples of this type of mass levitator will be provided by embodiments FIG. 15A, 16A. In addition several variations of the simple mass-levitator will be provided (e.g. FIG. 23, FIG. 24) which provide very practical applications that solve slightly different real world problems.

Figure 2:
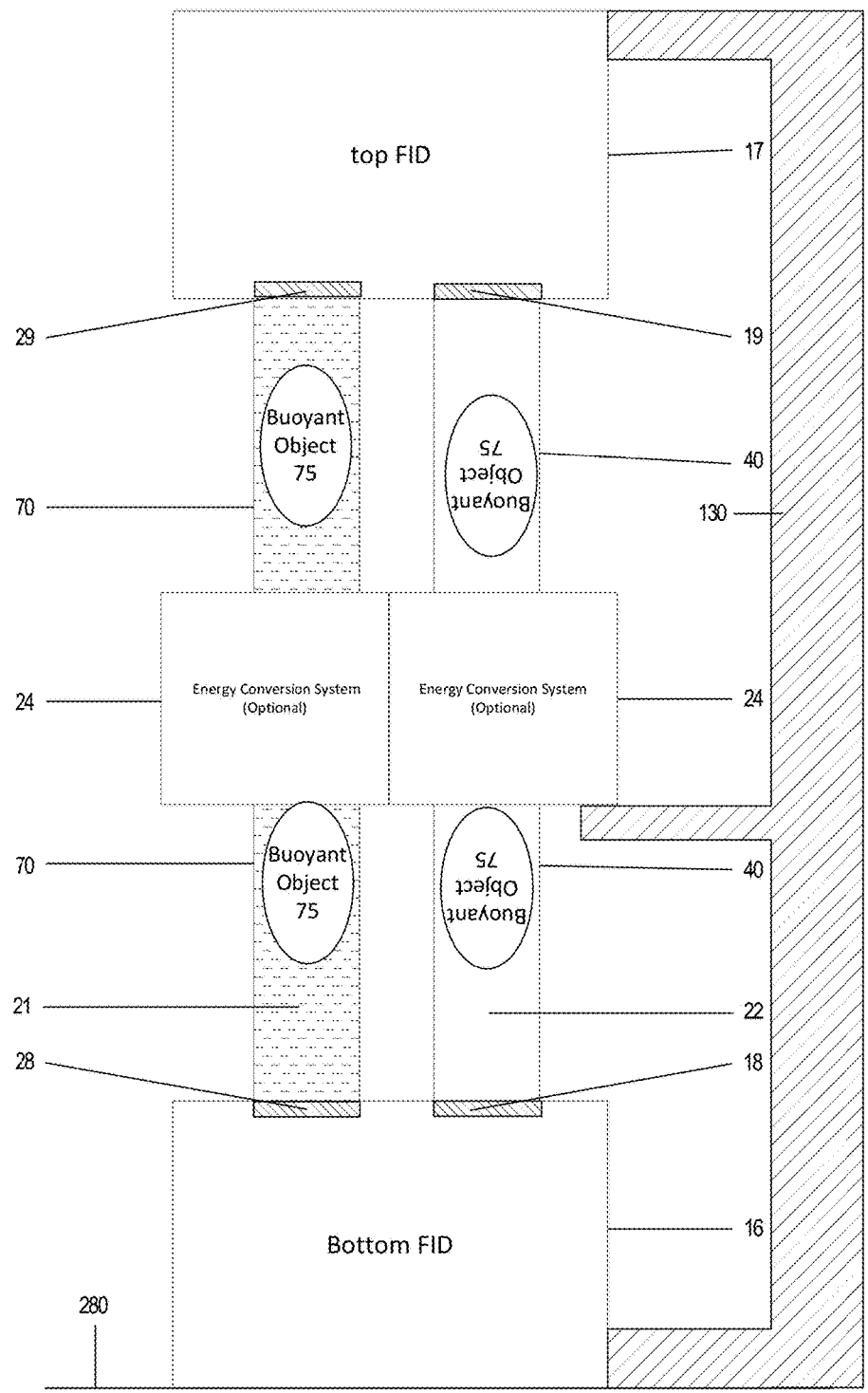
FIG. 2—Basic closed loop mass-levitator with block-diagram style Fluid Interface Devices (FIDs) and Fluid regions.

FIG. 2—Basic Closed Loop Mass-Levitator

Additional functionality can be provided to the embodiment of FIG. 1C if an explicit return path is provided for the buoyant-object. Such an embodiment configuration is shown in FIG. 2, and since all the components are self-contained and do not leave the embodiment, it is considered for the purposes of this application to be a generalized "closed" system embodiment. In a closed system of FIG. 2, the buoyant-objects and all components are self-contained and are generally not entering and leaving the embodiment, except if repair is necessary. Various closed system embodiments can be devised to provide additional functionality over the mass-levitator concept, by for example, permitting continuous generation of electrical power.

The closed system embodiment of FIG. 2, consists of the same internal parts as the generalized open system embodiment of FIG. 1C (bottom-FID 16, top-FID-17, bottom-FID-door-to-light-fluid 18, top-FID-door-to-light-fluid 19, dense-fluid 21, energy-conversion-system 24, uptube 70, buoyant-object 75, and structural supports 130) but in addition it contains light-fluid 22 filled downtube 40 that acts as an explicit return path for the buoyant-object 75, and an additional but optional energy conversion system 24 on this downward return path. Buoyant-Object 75 no longer is moved into or out of the system as a whole, but instead continuously circulates within the closed circular loop that is formed by the bottom-FID 16, bottom-FID-door-to-dense-fluid 28, uptube 70, top-FID-door-to-dense-fluid 29, top-FID 17, top-FID-door-to-light-fluid 19, and downtube 30 which again connects to bottom-FID 16 via bottom-FID-door-to-light-fluid 18. To be explicit, buoyant-objects 75 that enter bottom-FID 16 via bottom-FID-door-to-light-fluid 18 are transported and guided from the light-fluid 22 environment by bottom-FID 16 into the dense-fluid 21 environment by exiting bottom-FID-door-to-dense fluid 28. Buoyant-objects 75 having entered uptube 75, which contains dense-fluid 21, become buoyant and "float" upward through energy-conversion-system 24 until they reach the top of uptube 75. Buoyant-object 75 will be floated to the top of uptube 70 with a transit time that is related inversely to the working fluid's viscosity and directly proportional to its net upward force defined by its buoyancy in the fluid media. The buoyant-object 75, having reached the top of uptube 70 then enter top-FID-door-to-dense-fluid 29 while still being propelled upward by the force of buoyancy. Top-FID 17 then transfers and provides guiding mean for buoyant-object 75 to move from the dense-fluid 21 to the light-fluid 22. When buoyant-object 75 enters downtube 30 it is no longer buoyant, and if light-fluid 22 is sufficient light (e.g. gaseous like air) then buoyant-object 75 drops, sinks, and accelerates downward under the full force of gravity. Some fraction of the developed kinetic energy can then be converted to other forms of energy such as mechanical, electrical, or heat by energy-conversion-system 24. The cyclical process repeats when buoyant-object 75 again enters bottom-FID 16 through bottom-FID-door-to-light-fluid 18. Given that the embodiment shown in FIG. 2 can be made to extend to any height H, it can likewise host a very large number of buoyant-objects that are in continuous motion with in the embodiment. Also consider that buoyant-object 75 can be engineered in virtually limitless shapes and sizes. In fact extremely large buoyant-objects are possible and are only subject to the constraints that they fit smoothly within enclosing uptube 70 and downtube 30. Given that the uptube 70 and downtube 40 can be engineered to be as large as current technology will permit, potentially enormous buoyant-objects are possible. The bottom line implication is that embodiment 2 can be scaled to generate very significant amounts of power given suitably energy efficient fluid interface devices (FIDs). The topic of creating practical energy efficient FIDs will be taken up shortly.

An estimate of the power that can be generated by embodiment 2 when the buoyant-object 75 is dropped from height H can be obtained by noting that a given buoyant-object has increased its potential energy upon reaching its new elevation above ground-level 280. Some fraction of the potential energy can be converted to kinetic, electrical or mechanical energy where the percent conversion is a function of how efficient the generalized energy conversion system 24 is at converting kinetic energy to the new form of power. The estimated increase in Potential Energy (PE) is calculated via common laws of physics to be given by the quantity PE=MGH (where M=object mass, G is the constant of gravitation—nominally 32 ft/sec^2, and where H is the height gained by buoyant-object 75). Since power is energy per second, the estimated power generation capability is directly related to the number of buoyant-objects 75 that enter the downtube per second, the mass or weight of the buoyant-object 75, and the height H. To provide some concrete numbers, suppose the buoyant-object is a twenty inch diameter (10 inch radius) sphere weighing about 100 lbs. Its 4188 cubic inches of volume will displace about 151 lbs of water, and have an upward buoyancy force equivalent to 51 lbs directed upward. The same twenty inch diameter sphere will have gained 15.4 kJ of potential energy when it has been elevated to a height 100 ft about its starting elevation. If one such buoyant-object per second is converted to electrical power at 90% efficiency, the mass-levitator system will generate 13.86 kW of sustained power. This is the power that is release due to the down stroke only. There is also the surplus 51 lbs of force that is used to move the buoyant-object upward to height H—this power is not included in the above estimate. Given that a sphere's volume increases as the cube of the radius (volume$_{sphere}$=4/3?r3 where r is the radius), the power of the mass-levitator will also scale as the cube of a spherical buoyant-object's radius, hence a 10 times increase in the radius will yield a 1000 times increase in the power generated.

These above numbers are predicated on the premise that the energy to inset the buoyant-object into the bottom of the uptube 70 by a suitable FID can be done using some small fraction of the total energy that is generated by gravity and buoyancy. If not then, like Francis's 2012/0198833 the proposition of a working energy generating embodiment will not be possible. Such efficient FID will be described in association with the detailed description for FIG. 4A through FIG. 8.

Hence a close system embodiments such as the simplified embodiment of FIG. 2, provides novel and non-obvious methods, processes, and mechanisms that can facilitate the direct conversion of the acquired potential energy to useable power. To be even more specific various electrical generation embodiments utilizing the general closed loop system of FIG. 2, but with specific types of FIDs and energy conversion devices described in detail, will be described in later sections of this patent (see for example the text associated with FIG. 17A).

Figure 3:
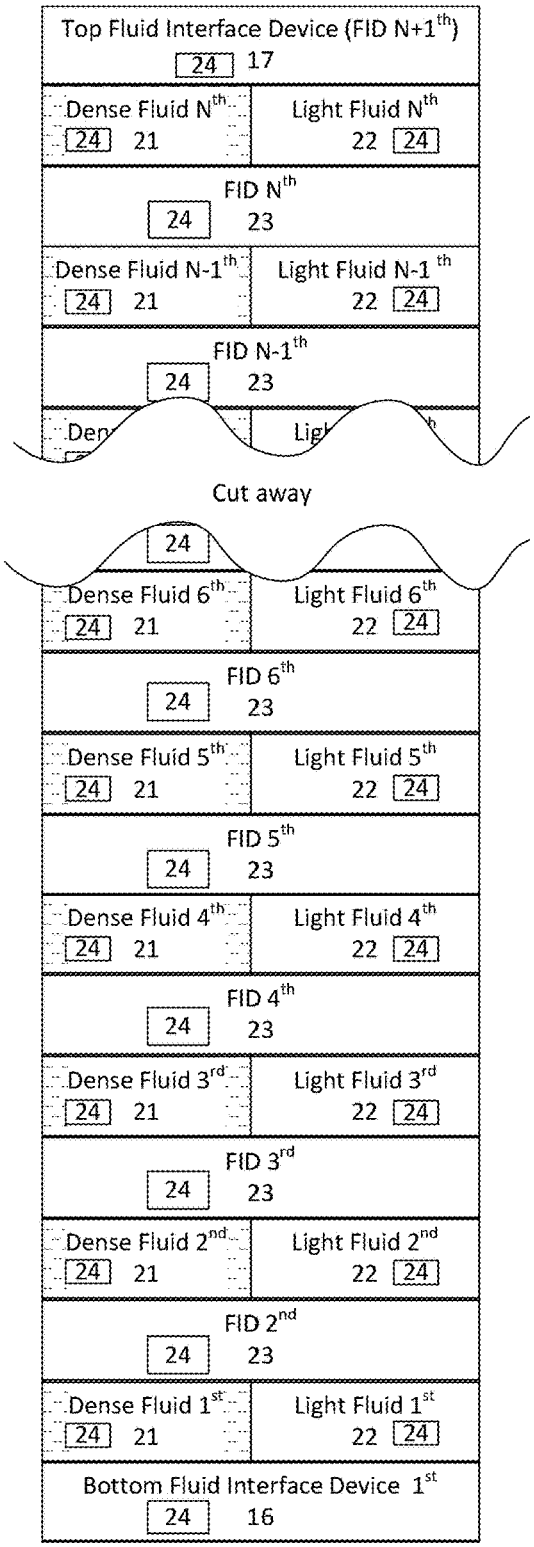
FIG. 3—Generalized closed loop mass-levitator with block-diagram style Fluid Interface Devices (FIDs) and Fluid regions.

FIG. 3—Generalized Mass-Levitator

The more abstract closed system block diagram of FIG. 3, is a logical extension of FIG. 2 in which FIG. 2's bottom fluid interface devices 16 and top fluid interface device 17 are generalized to N+1 fluid interface devices, where N is some arbitrary integer N greater than or equal to 2 (i.e. there can be 3, 4, 5, 6 . . . N+1 FIDS in FIG. 3). The bottom and top fluid interface devices still exist in FIG. 3 as items 16 and 17 respectively; however N−2 additional middle fluid interface devices 23 have been added. Similarly FIG. 2's one dense-fluid 21 occupying uptube 70 and one light fluid 22 occupying downtube 40 become FIG. 3's N generalized dense fluids regions 21, and N generalized light fluids regions 22 that are not necessarily constrained within uniform pipes or tubes. Given that any fluid body or container could be utilized to host buoyant-objects, the dense and light fluids are represented by rectangles of FIG. 3 are used to represent the more general case. FIG. 3 shows a cut-away section between FID 6th and FID N−1 to symbolize the variable nature of N. Buoyant-objects 75 have not been included in FIG. 3 so as to simplify the drawing, however each of the FIDs in the system work in an analogous manner to their FIG. 2 counterpart. Buoyant-objects 75 arriving within bottom FID 16 are transported and guided upward into the 1st dense-fluid 21, and then subsequently guided and transported upward through N successive FIDs and fluid regions until they enter top-FID 17. Top-FID 17 then transports and guides the buoyant-object into the Nth light-fluid 22, where the buoyant-object falls through to the next FID (FID N−1), and so on until the buoyant-object again arrives at the bottom-FID 16. The close system cycle of rising and falling buoyant-object can then continue with a new cycle. An optional energy-conversion system box 24 has been added to every Fluid and every FID to denote the possibility that the motion through the FID or the motion through the fluid region could be converted to electrical or mechanical power if so desired.

To be more specific the generalized embodiment of FIGS. 1C, 2, and 3 are meant to represent simplified templates for the embodiments that will be detailed in this application. It is also possible to couple templates together through multiple FIDs which connect multiple fluid regions together as in FIG. 18A, and FIG. 24A.

Figure 17A:
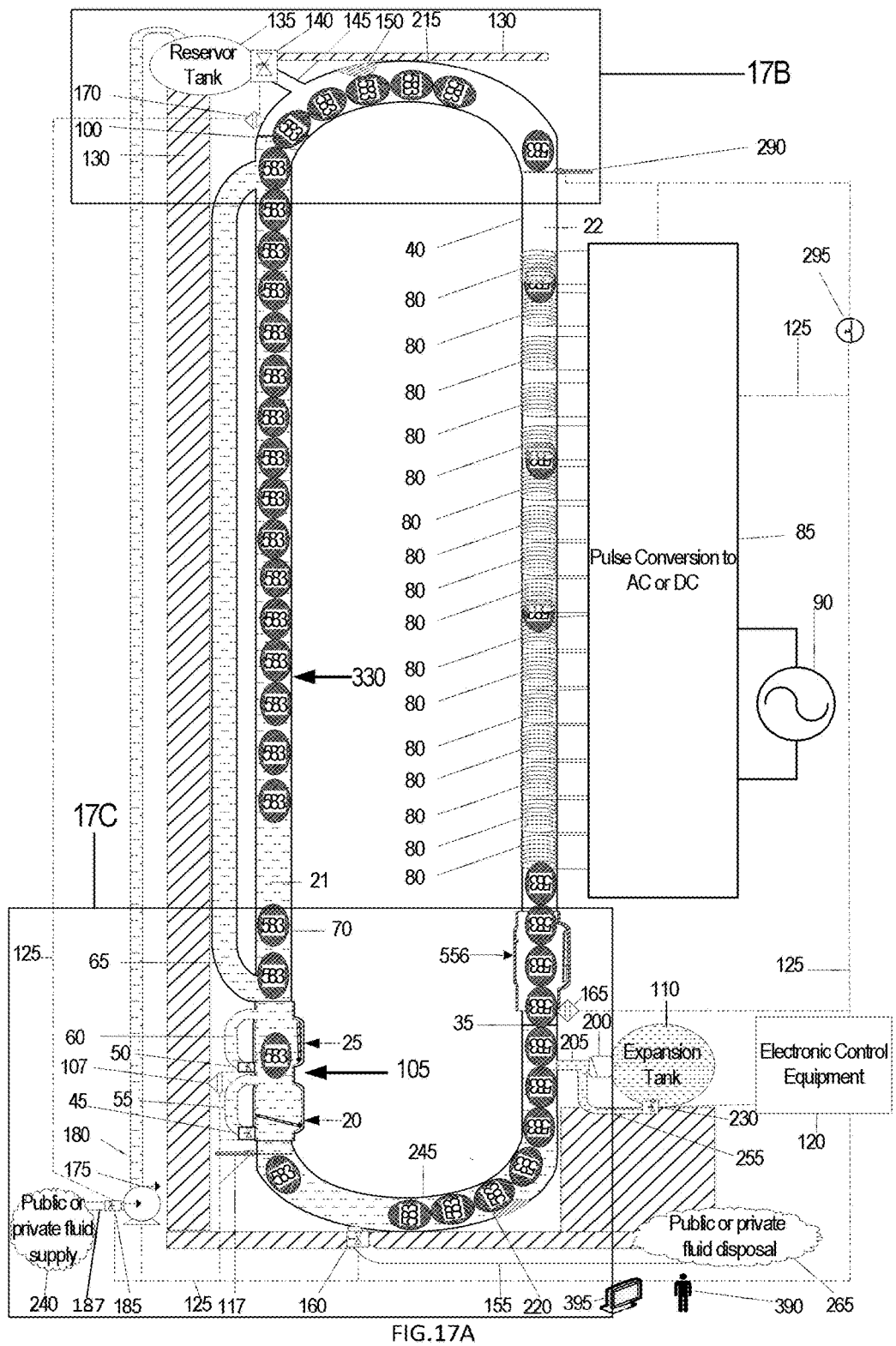
FIG. 17A—Mass levitator single uptube single downtube with linear induction energy conversion.
Figure 22:
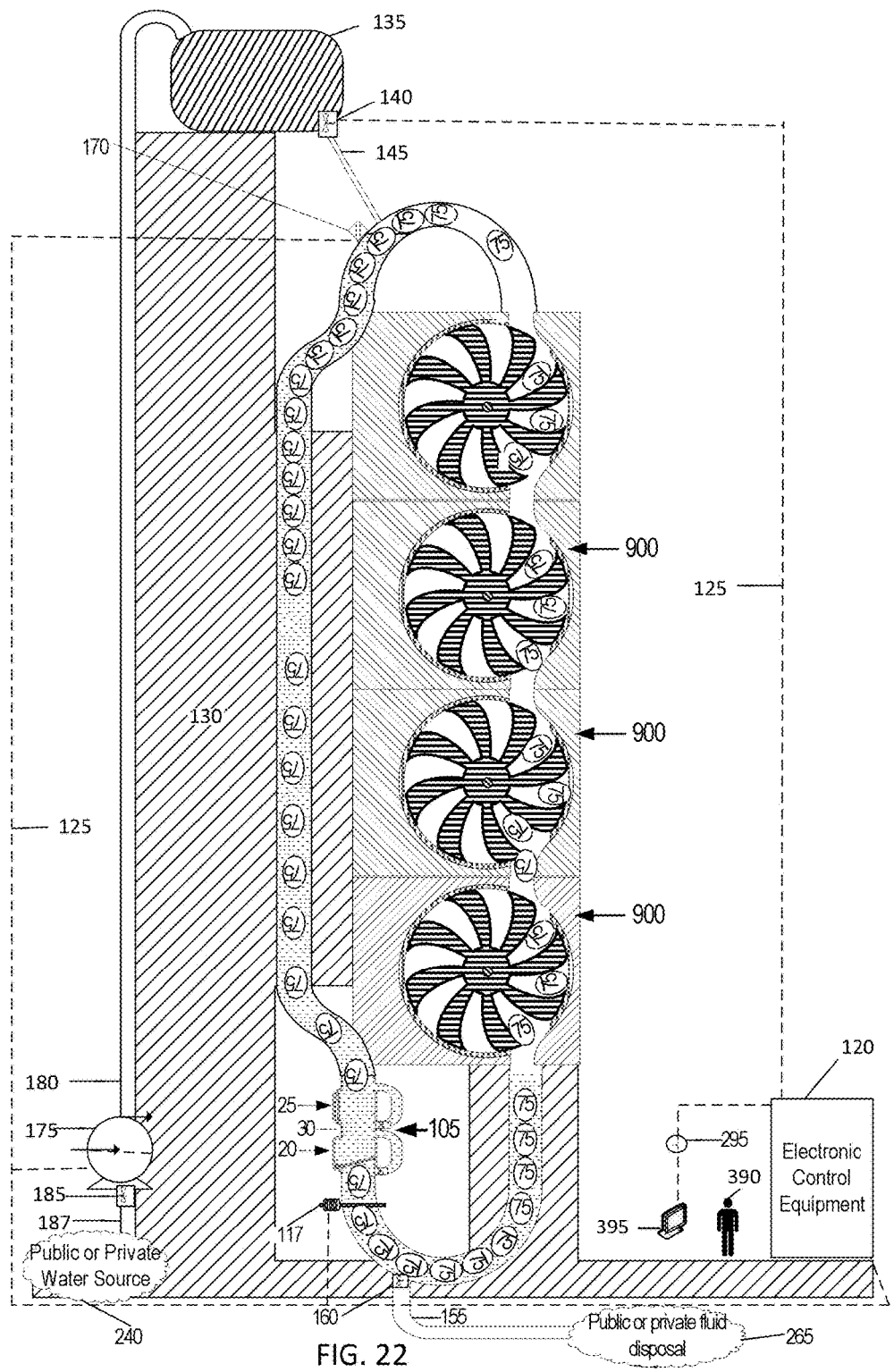
FIG. 22—top FID, bottom FID, and multiple gravity wheels.

The embodiments of this application can generally be described, organized, and categorized using one or more of the following criteria:

a. consisting of two or more continuously connected fluid regions/columns attaching to or contained within said apparatus and where
   i. differing fluid region/columns:
      1. are defined by fluid regions/columns contain differing fluid types or densities, or (e.g. see FIG. 17A),
      2. by the same fluid on both sides of said fluid interface but with differing fluid pressure levels between the said fluids as measured at said fluid interfaces spanning said fluid regions/columns, (e.g. see FIG. 24A), b. containing one or more buoyant-objects in one or more said regions (for more details of buoyant-object types see description associated with FIG. 10A-FIG. 13D, for example of embodiment containing many buoyant object see FIG. 17A, —22), c. consisting of one or more Fluid Interface Devices (FIDs) located at the interfaces of adjoining regions, that are in fluid communication with, and continuously connect, said fluid regions (see FIG. 17A, —22), with
   i. means to connect and substantially maintain relative fluid separation and associated pressure differential between adjacent fluid regions,
   ii. guided and motive transport means to transit and urge arbitrarily shaped buoyant-objects out of the initial fluid region, through the fluid interface device, into the adjacent fluid region, iii. means to facilitate any fluid type changes, transitions, and mixtures that occur during said buoyant-object's transition between said fluid regions,
iv. means for buoyant-object upon exit from the interface mechanism into one or more buoyant fluid regions for buoyant-objects to rise in the buoyant fluid region according to the principals and laws associated with buoyancy so as to do work against the gravitational field, possibly giving up energy to mechanical device in the course of the buoyant-object's accent, and ultimately increasing the buoyant-object's potential energy which is increased when the buoyant object reaches a more elevated level within the buoyant fluid region,
v. and where one or more said fluid interface devices:
  1. maintain fluid communication between said regions
  2. maintain the relative pressure differential between said regions, and may optionally:
  3. maintain relative height and volume of the said regions,
  4. prevent fluid flow from one region to the next,
  5. mitigate fluid flow or leakage from one region to the next,
  6. monitor fluid leakage and flow between adjacent regions and through said interface mechanism,
  7. monitor pressure difference between adjacent regions,
  8. maintain fluid separation between said regions when the regions consist of differing fluid types,
  9. accept commands and control various computer controlled devices with said interface mechanism from an internal control system,
  10. monitor pressure within various chambers within the interface mechanism and report to status to an internal control system,
  11. adjust pressure within various chamber in the interface mechanism optionally from an internal control system,
  12. monitor the presence of buoyant-objects within the interface mechanism and report to status to an internal control system,
  13. control the progress, speed, and position of buoyant-objects within the interface mechanism optionally from an internal control system,
  14. monitor fluid levels within various chamber within the interface mechanism and report to and provide status to an internal control system,
  15. adjust fluid levels within various chambers within the interface mechanism optionally from an internal control system,
  16. monitor fluid temperature within various chambers of the interface mechanism,
  17. adjust fluid temperature within various chambers of the interface mechanism optionally from an internal control system,
  18. convert buoyant-object motion into other forms of energy such as mechanical, electrical, or heat,
d. consisting of an optional automatic control system with one or more components to:
  i. monitor, report, control system sensors, switches, valves, and other controllable devices within said apparatus,
  ii. provide user interfaces into said automatic control system,
  iii. optionally control system timing including:
    1. flow of buoyant-objects through interfaces mechanisms,
    2. flow of buoyant-objects to energy conversion systems, if any,
  iv. optionally control system state which may including but is not limited to:
    1. stop system,
    2. start system,
    3. emergency stop,
    4. initial system fluid fill,
    5. place in maintenance state,
  v. monitor, control, report on the energy conversion systems which may include but are not limited to:
    1. voltage,
    2. current,
    3. total power out,
    4. phase of waveform,
    5. frequency of waveform out,
    6. position of buoyant-object in conversion system,
e. consisting of guided means within said fluid regions to direct buoyant-objects by way of the walls, internal surfaces, internal contours, structures, chambers, and mechanisms within said apparatus such that when said buoyant-object is in motion under the motive forces of gravity and buoyance, the guided means provide sufficient motional control and direction to said buoyant-object to ensure the transit of said buoyant-object between and through fluid regions, interface mechanisms, and optional energy conversion systems.
f. An energy conversion system where:
  i. one or more material object's having acquired an increase in potential energy, can optionally convert said potential energy to other forms of energy such as kinetic, electrical, mechanical, or heat energy,
  ii. the upward motion from buoyant-objects and fluid motion generated said buoyant-object by the force of buoyance is mechanically coupled,
g. where one or more said buoyant-objects are optionally provided a closed system return path by said guided means for the buoyant-object to make a circular path through said apparatus and re-enter in succession each interface mechanisms and each fluid regions in a cyclic fashion so as to permit a continuous cyclic process of mass elevation, possibly followed by energy conversion of the potential energy gain through said process,
h. where said material objects are typically unlinked and otherwise unconnected to each other such that they do not directly drive mechanical mechanisms such as gears, chains, pulley, generators, etc. by way of such connections,
i. where said material object can be rigid uncompressible objects and are not required to change their internal buoyance in the said one or more dense fluids in which the said material object is buoyant,
j. where said apparatus does not require compressed gases to provide the power for the fluid interface mechanisms,
k. a linear induction energy converter consisting of:
  i. one or more induction coils consisting of N turns of conductive wire,
  ii. a multiplicity of encapsulated objects of varying possible shape, and each containing one or more magnetic arrays, or a single purposely oriented magnet,
    1. where said magnetic arrays consist of one or more pieces of magnetizable material, 2. that physically orients and arranges the composite magnetic fields of said magnetic arrays so as to increase the rate of change of magnetic flux and induced voltage, that is generate, when said encapsulated objects are dropped or rolled through said one or more induction coils,
iii. guided means for encapsulated objects to roll or drop through induction coils,
iv. induction coils oriented such that encapsulated object approaches, pass through and exit said coils by means of said guided means,
v. electronic pulse conversion system, that
1. electrically adds said induction coil waveforms from one or more said induction coils constructively and converts said electrical pulses into electrical waveforms of known phase, frequency, and voltage,
vi. induction coils that are in electrical communication with said electronic pulse conversion system so as to transfer induced electric power to said electronic pulse conversion system,
vii. encapsulated objects containing magnetic arrays which have been elevated in height and potential energy sufficiently such that said encapsulated objects can exchange their acquired potential energy for electrical energy by way of the their exchange of potential energy, for linear and rotational kinetic energy generated by the gravitation field of the planet upon dropping or roiling said encapsulated objects through said one or more said induction coils via said guided means,
viii. optional elevating-means to systematically, repeatedly, and cyclically elevate said buoyant-objects, or encapsulated objects containing magnetic arrays via additional guided means to the required elevation and potential energy and drop them through said guided means and said induction coils,
ix. optional collection-means to systematically, repeatedly and cyclically collect encapsulated objects and transition said encapsulated objects to said elevating-means,
x. Optional control-system-means to control, monitor, and record electronic pulse conversion system's parameters, states, and encapsulated objects positions and timing through induction pulses.

FIG. 4A-24C provide many explicit descriptions, explanations, specific embodiments, and examples of the above summary description and its many optional parts.

The fluid interface device of this application also make use of the following principles:

1. It is possible to create a standing column or region of dense fluid of arbitrary height H, through the use of a fluid interface device, where:
a. the bottom of the dense fluid region exists at a higher pressure relative to the top of the fluid column due to the force of gravity which have compressed the molecules of the dense fluid; and
b. the fluid can be any dense fluid such as water, salt water, water with antifreeze, oil, mercury etc.

2. It is possible to create various types of fluid interface devices that:
a. use significantly less energy to insert and transition the buoyant-object into the dense fluid region that it gains in gravitational potential energy when it float to the top of the dense fluid region.
b. can lift and transition the buoyant-object out of dense fluid when it reaches the top of the dense fluid.
c. use significantly less energy to lift and transition the buoyant-object of out of dense fluid, than the energy it gains in gravitational potential energy when it float to the top of the dense region of fluid.
d. can utilize the forces of buoyancy and gravitation as the motive power required to drive the fluid interface device.

Fluid Interface Devices

FIG. 4A-4F The Role of Swing Check Valves

One type of Fluid Interface Device (FID) that can be used to efficiently insert buoyant-objects into the bottom of a standing column/region of water may be comprised of swing check valves as shown in FIG. 4A through FIG. 4F. It should be appreciated that many other types of gates can be used as the FIDs. The manual swing-check-valve designated as number 555 in various views depicted in FIG. 4A through FIG. 4F consist of the swing check-valve-body 545, check-valve-flapper 550, check-valve-flapper-pivot 540, the check-valve-seal 560, and the check-valve-ledge 565. A three dimensional (3-D) front view of single swing check valve 555 is shown in FIG. 4A, its corresponding 3-D sectional view is shown in FIG. 4B, and its two dimensional cross section is shown in FIG. 4C and FIG. 4D. FIG. 4C shows swing-check-valve 555 with check-valve-flapper 550 open and indicated as filled with dense-fluid 21 through the use of the ANSI graphical symbol for liquid, since liquid, and water in particular, is the most common dense-fluid 21 envisaged for this application, while FIG. 4D shows the same swing-check-valve 555 with check-valve-flapper 550 shut and shown against a blank white background to represent an empty check-valve that is filled with the light but invisible light-fluid 22 such as air at atmospheric pressure. Swing-check-valves 555 are generally used to permit one-way passage of fluids, that is, liquid can flow in the direction that permits the check valve flapper 550 to swings open. They are typically used in plumbing applications and fluid engineering to prevent liquid back flow since check-valve-flapper 550 will swing shut due to a liquid flow in the reverse direction. When the flow of liquid reverses the negative fluid pressure closes check-valve-flapper 550 and a liquid tight seal is made between check-valve-flapper-ledge 565 and check-valve-flapper-seal 560. If liquid is flowing upward due to sufficiently high liquid fluid pressure, then swing-check-valve 555 will open and the flowing liquid will fill the pipe above the check-valve 555 to some height H above the swing-check-valve 555's flapper. If the water flow is shutoff, the check-valve flapper 550 will shut closed against check-valve-flapper-ledge 565 and check-valve-flapper-seal 560 will prevent the standing column of liquid 330 above check-valve-flapper 550 from collapsing (FIG. 4E).

If swing-check-valve 555 contains water, as in illustrated by FIG. 4E, the weight of the standing-column-of-water 330 (1 cubic foot=62.4 pounds) is held up entirely by check-valve-flapper 550 and its check-valve-seal 560. There is also a considerable fluid pressure differential from the top of this column equivalent to 1 pound per square inch (psi) for every 2.31 feet of water (head) above check-valve-flapper 550. For a very large standing-column-of-water 330, as shown in FIG. 4E, there may be very large associated liquid pressures and force (in the form of downward fluid weight) upon check-valve-flapper 550, and some degree of leakage is possible but the water flow is substantially mitigated through the swing check valve. FIG. 4E shows the same check valve as in FIG. 4D, but with its check-valve 555 filled with water and with an additional tube of water that will be noted as the uptube 70 on top of swing-check-valve 555. In addition FIG. 4E shows a single buoyant-object 75 below the flapper of swing-check-valve 555, that is floating upward toward check-valve-flapper 550. Since buoyant-object 75 is buoyant in dense-fluid 21, buoyant-object 75 will float upward until it reached the bottom of check-valve-flapper 550 where its upward buoyancy force vector will be applied to check-valve-flapper 550. Under normal circumstances the weight of standing-column-of-water 330 would be applied to the top of check-valve-flapper 550, and the relatively smaller upward force from one buoyant-object would not be sufficient to open check-valve-flapper 550. However, consider the condition where the pressure differential between the fluid on the top versus the pressure at the bottom of check-valve flapper 550 are equal. Then under this condition, and given a sufficiently buoyant buoyant-object 75, the upward force vector applied to the underside of check-valve-flapper 550 would open check-valve-flapper 550 and buoyant-object 75 would rise within uptube 70 to the top of standing-column-of-water 330. The only apparent difficulty with having only one check valve acting as a fluid interface device is that the standing column of water 330 will collapse when the buoyant-object 75 opens the flapper, that is unless the pressure under the flapper is equalized, or unless there is another closed check valve below the first to prevent the possibility of the fluid column from collapsing.

To make a working Fluid Interface Device (FID) that prevents the collapse of standing-column-of-water 330, consider FIG. 4F which consists of two swing-check-valves 555, and the chamber that is formed between the flappers when both check-valve-flappers 550 are closed. In a working FID the pressure on either side of check-valve-flapper 550 pressure needs to be controlled via suitable mechanisms so that buoyant-object 75 can move through the swing-check-valve 555 to the top of standing-column-of-water 330 without spilling the dense-fluid 21. The novel mechanism to accomplish such an end consists of the dual swing-check-valve structure shown in FIG. 4F, which in this application is designated as compression-decompression-chamber 105. To be specific compression-decompression-chamber 105 includes upper-swing-check-valve 25 and lower-swing-check-valve 20 which are exact copies of the swing-check-valve 555 as shown in FIG. 4A through FIG. 4D. Lower-swing-check-valve 20 and upper-swing-check-valve 25 are connected together in the middle by a tube or pipe (or other conduit) designated as compression-decompression-tube 30. In addition, high-pressure-equalization-tube 60 connects the top of upper-swing-check-valve 25 to a connection point below upper-swing-check-valve 25 but above lower-swing-check-valve 25's flapper 550. Similarly low-pressure-equalization-tube 55 connects the top of lower-swing-check-valve 20 to a connection point below lower-swing-check-valve 20's flapper 550. Water can be directed and controlled through high-pressure-equalization-tube 55 and 60 by way of a fluid control valves which can be either mechanically actuated (opened/closed) or electronically actuated. In FIG. 4F there are two fluid valves (45,50) both of which are electronically controlled so as to take advantage of computer control technology, but which could be open by hand, or via mechanical leverage in other system designs. Hence electronic-high-pressure-fluid-valve 50 and 45 can be opened or closed via a suitable electrical voltage being applied to the valve solenoids to equalize the pressure on either side of the corresponding check-valve-flapper 550.

FIG. 5A-5D Time Progression of Buoyant-Object Through Swing Check Valve FID

To more fully understand how the swing-check-valve embodiment of a FID works, consider the time order sequence of diagrams shown as FIG. 5A through FIG. 5D. FIG. 5A through 5D consist of two swing-check-valves 555 configured as a compression-decompression-chamber 105 exactly the same as in FIG. 4F, however in addition there is a hooked-shaped tube or pipe attached that is designated as the lower-transition 245, which is also filled with dense-fluid 21, and which is capable of smoothly passing and guiding buoyant-object 75 through its interior spaces. The addition of lower-transition 245 to compression-decompression-chamber 105 results in a simple swing-check-valve FID, that is capable of maintaining a standing-column-of-water 330 as in FIG. 4E and is capable of guiding and transitioning a buoyant-object through the FID in an efficient manner.

Buoyant-objects 75 are shown in time phased snapshots within FIG. 5A through FIG. 5D to note the time progression of buoyant-object through the FID. The time sequence starts in FIG. 5A where buoyant-object 75 is applying its upward force provided by it buoyancy against lower-swing-check-valve 20's flapper 550. The pressure on either side of lower-swing-check-valve 20's flapper 550 is equalized (made the same) by momentarily opening electronic-low-pressure-fluid-valve 45, in which case a very small amount of fluid is transferred (usually measured in drops if the fluid is nearly incompressible like water)—but the exact amount of fluid that will flow depends on the pressure differential, the exact type of fluid, and the size of the chamber that exists between the two check valve flappers 550. When the pressure is equalized between the top and bottom of lower-swing-check-valve 20's flapper buoyant-object 75, which is buoyant in dense-fluid 21 will lift check-valve-flapper 550 and buoyant-object 75 will rise upward until it rests under upper-swing-check-valve 25's flapper as shown in FIG. 5B. At this point the lower-swing-check-valve 20's flapper 550 will close due to gravity as shown in FIG. 5C. Once lower-swing-check-valve 20's flapper 550 is closed electronic-high-pressure-fluid-valve 50 is opened and a small amount of fluid will flow through high-pressure-equalization-tube 60 so as to compress the fluid between the flappers of upper-swing-check-valve 25 and lower-swing-check-valve 20. At this point buoyant-object 75 will push open the flapper of upper-swing-check-valve 25 and it will rise to the top of standing-column-of-water 330 if a dense-fluid 21 filled uptube 70 exist above it as in FIG. 4E. Therefore FIG. 5A through 5D show a compression-decompression process/cycle, whereby buoyant-objects 75 enters compression-decompression chamber 105 by forcing open swing-check-valve-flapper 550, the flapper closes, the chamber is pressurized to the upper fluid level pressure. Then buoyant-object 75 opens the top swing-check-valve-flapper 550, and floats to the top of the fluid column above compression-decompression chamber 105. The compression-decompression chamber 105 is then decompressed to be equalized to the fluid pressure level on the underside of lower-swing-check-valve 20's flapper and the process is then ready to repeat.

Figure 6:
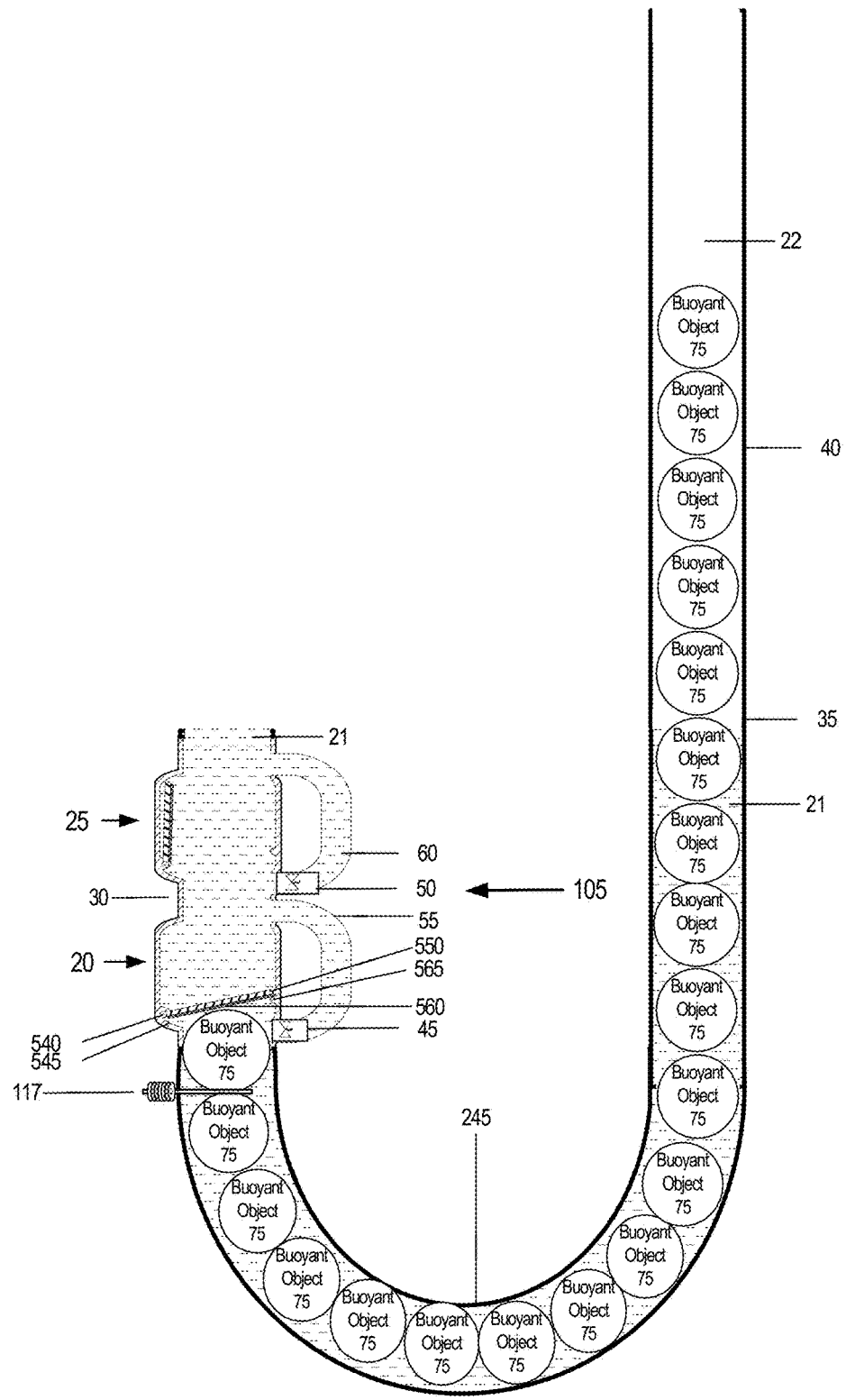

FIG. 6—Gravitational Motive Force Transitioning Buoyant-Object Through Swing-Check-Valve FID FIG. 6 shows the contents of FIG. 5D (compression-decompression-chamber 105, lower-transition 245) plus the addition of downtube 40 (i.e. additional tubing/pipe connected above lower-transition 245 containing light fluid 22), several buoyant-objects 75 which have been added to lower-transition 245, plus solenoid-timing-control 117. FIG. 6 also depicts dense-fluid 21 filling lower-transition 245 up to light-fluid-to-dense-fluid-interface 35, while downtube 40 is filled with light-fluid 22. In general, if the overall density of buoyant-object 75 is 75% of the surrounding dense-fluid 21, then 25% of buoyant-object 75's total weight will be directed upward as if gravity has been reversed, that is when buoyant-object 75 has been completely immersed in dense-fluid 21. Suppose that under the 75% loading condition buoyant-object 75 weights 0.75 pound, and displaces 1 pound of water, then each buoyant-object 75 generates 0.25 pounds of upward force due to buoyancy and therefore four such 1 pound buoyant-object will generate an upward force of 1 pound. Said another way, 4 or more buoyant-objects can lift 1 other buoyant-object above the water line, likewise 3 buoyant objects can be pushed under the fluid line by only one buoyant object. In FIG. 6 there are 5 buoyant-objects above the fluid line 35, and approximately 9 buoyant-objects below the waterline pushing upward on the right of lower transition 245. Above the light-fluid-to-dense-fluid-interface 35 five buoyant objects 75 collectively weigh 3.75 pounds, and exert 3.75 pounds of downward force due to gravity on the buoyant objects below light-fluid-to-dense-fluid-interface 35. The 9 buoyant-objects below the light-fluid-to-dense-fluid-interface 35 exert an upward force of 2.25 lbs due to their 0.25 pounds each of upward buoyancy, such that there is a net downward force of 1.25 lbs resulting in the entire column of buoyant objects moving downward under the motive force of gravity. Therefore, under the 75% loading condition it takes 1 buoyant-object 75 above the light-fluid-to-dense-fluid-interface 35 to push 3 other buoyant-objects 75 below the light-fluid-to-dense-fluid-interface 35. In the same manner the 6 buoyant-objects to the left of the center of lower-transition 245 are directing an accumulated force upward toward lower-swing-check-valve 20's flapper 550 of 1.5 pounds.

Hence under the 75% loading condition it will take only 3 buoyant buoyant-objects 75 above light-fluid-to-dense-fluid-interface 35 to push the 9 buoyant-objects in the right half of lower-transition 245 below the light-fluid-to-dense-fluid-interface 35 when they are each uniformly loaded to 75% of the dense-fluid 21's density. Other loading conditions (e.g. 60% or 80% loading) will require more or less buoyant-objects to push the submerged buoyant-objects below the fluid level, however it is clear from this discussion and FIG. 6 that it is possible for gravity alone to push stacked buoyant-objects downward to the point where they begin to float upward again due to their own internal buoyancy.

As FIG. 6 illustrates buoyant-objects 75 can form a continuous string from the top of the stack, where the buoyant-objects 75 are experiencing the full force of gravity above the light-fluid-to-dense-fluid-interface 35 to the bottom of lower-swing-check-valve 20's flapper 550. The buoyant-object 75 directly below lower-swing-check-valve 20 is being forced upward due to the buoyancy of all the buoyant-objects 75 below it, and due to the buoyant-objects that are being forced downward and to the left by the buoyant-objects above light-fluid-to-dense-fluid-interface 35. The end result is that several buoyant-objects 75 can be forced upward into the compress-decompression-chamber 105 at the same time, which can prevent the flapper 550 of lower-swing-check-valve 20 from closing. While many options to regulate the number of upward buoyant-object moving into the compress-decompression-chamber 105 are possible, including purely mechanical devices that use no power, the FID embodiment of FIG. 6 utilizes solenoid-timing-control-rod 117 to regulate the upward movement and timing of the buoyant-object motion. Solenoid-timing-control-rod 117 provides for computer control and regulation of the buoyant-object motion by extending its solenoid actuated rod to stop the upward progression of buoyant-objects below it, and it retracts said rod so as to allow the proper number of buoyant-objects (one in this case) into the compress-decompression-chamber 105. Note that if compress-decompression-chamber 105 is larger, or the buoyant-objects 75 are smaller several buoyant-objects 75 may be permitted to enter 105 without blocking the closure of lower-swing-check-valve 20's flapper 550.

The swing check valves and all connecting tubes/pipes within the compression-decompression-chamber 105 and lower-transition 245 must be sized to permit the buoyant-object to completely pass through the internal surfaces, internal contours, structures, and chambers of the completed embodiment. In addition the buoyancy force of the buoyant-object 75 must be sufficient to open the swing-check-valve-flapper 550. Given that swing-check-valve-flapper 550 can be made of suitably light weight mater such that it is nearly buoyant, it will always be possible to engineer a flapper that can be open by the net upward force of a suitably loaded buoyant-object 75.

FIG. 7A-7D Electronically Actuated Swing-Check-Valves and FIDs

Figure 7A:
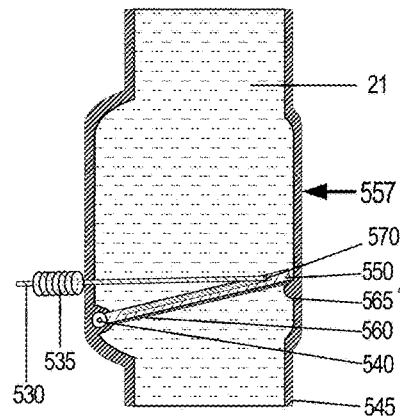
Figure 7B:
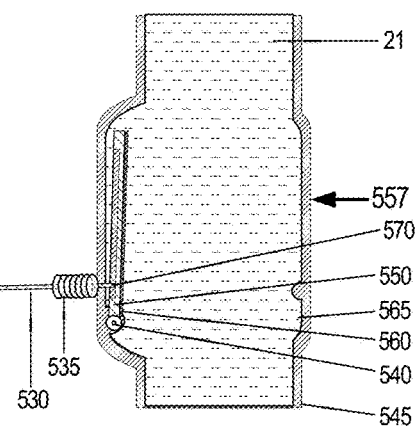
Figure 7C:
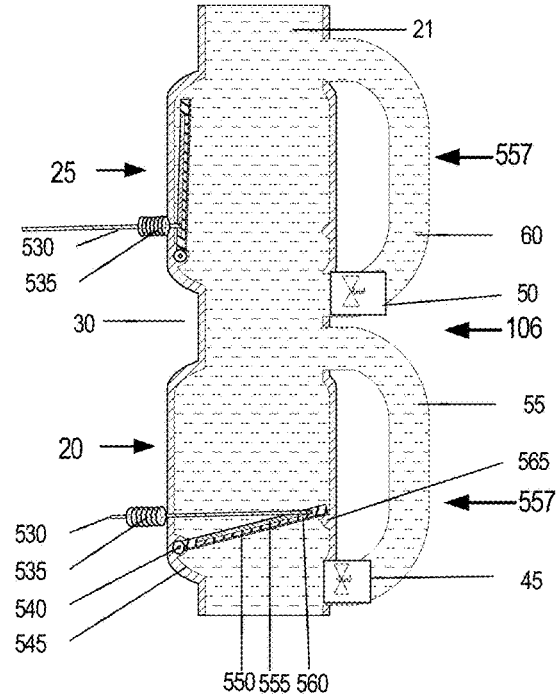
Figure 7D:
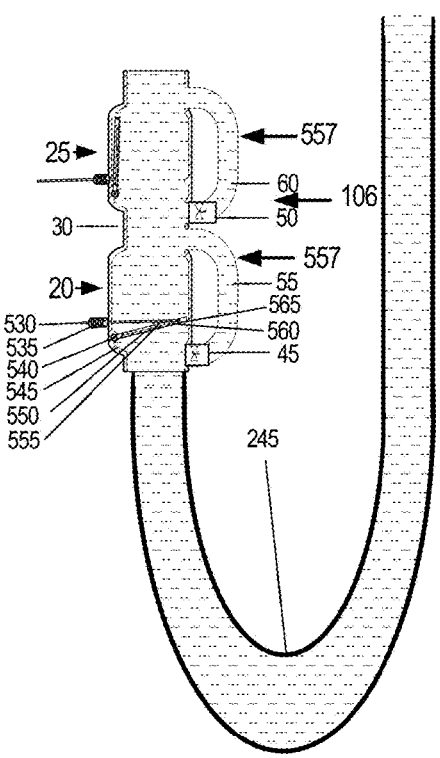

An alternative to the manually actuated check-valve-flappers 550 of FIG. 4A-4F is to provide electronic actuation as in electronic-swing-check-valve 557 which opens and closes check-valve-flappers 550 via an electronic signal as shown in FIG. 7A through FIG. 7D. FIG. 7A represents the exact same swing-check-valve shown in FIG. 4C, but with an electronic solenoid-rod 530 that extends to open the check-valve-flapper 550. When solenoid-coil 535 is energized the solenoid retracts to open check-valve-flapper 550, and will close check-valve-flapper 550 when solenoid-coil 535 is de-energized. Movement of check-valve-flapper 550 is facilitated by the addition of check-valve-sliding-means 570, which works in coordination with solenoid-rod 530. Solenoid-rod 530 is attached to check-valve-flapper 550 via check-valve-sliding-means 570 such that the motion of extending solenoid-rod 530 causes check-valve-sliding-means 570 to slide and so change the angle of solenoid-rod 530 to check-valve-flapper 550 and thereby facilitate the closure or opening of check-valve-flapper 550. FIG. 7A shows electronic-swing-check-valve 557 with check-valve-flapper 550 closed, while FIG. 7B shows electronic-swing-check-valve 557 with check-valve-flapper 550 open. FIG. 7C is the same as FIG. 4F except that electronic-swing-check-valve 557 is replaces swing-check-valve 555 so as to make electronic-compression-decompression-chamber 106. FIG. 7D is the solenoid flapper actuated version of FIG. 5D with electronic-compression-decompression-chamber 106 replacing compression-decompression-chamber 105. Finally FIG. 7E is analog to FIG. 6, when electronic-swing-check-valve 557 is replaces swing-check-valve 555, and when solenoid-timing-motion-control-rod 117 has been removed, since it is no longer required.

Figure 7E:
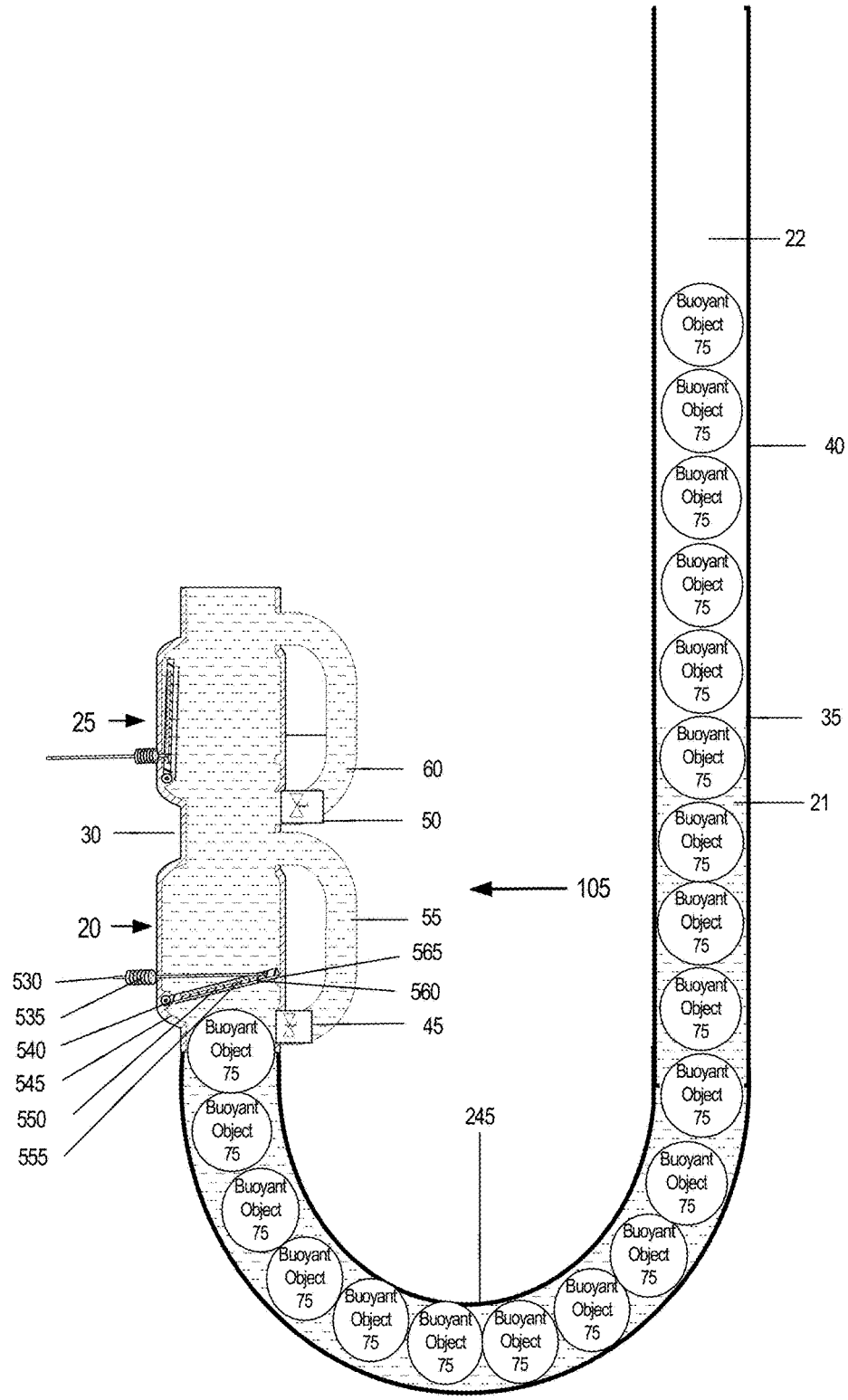

At this point it is possible to identify the contents of FIG. 6, and FIG. 7E as an example of a complete Fluid Interface Device (FID) for use in a closed loop mass levitator of FIG. 2 or FIG. 3, which is capable of handling multiple buoyant-objects in an energy efficient manner, since all example criteria of an example FID have been met:

1. it can interfaces two or more continuously connected fluid regions/columns, which in this case is represented as the light-fluid-to-dense-fluid-interface 35 where the light-fluid 22 and dense-fluid 21 meet.

2. provides motive force in the form of only gravity and buoyancy to move and inject/transit the buoyant-objects 75 through the FID from the light-fluid environment 22 to the dense fluid environment 21.

3. where no external power is required by the fluid interface device if a mechanical means is used to regulate timing, and to open and close valves. For example, if solenoid rods are used to regulate timing via timing-control-rod 117 and to effect the momentary opening and closing of fluid valves 45 and 50 then a few 10s-100's of watts will be required to be used out of kilowatts or megawatts that can be generated (see above discussion of estimated power associated with FIG. 3.

4. provides a guide through the FID so as to guide buoyant-objects from the light-fluid 22 where buoyant-objects 75 fall under the influence of gravity to the dense fluid 21 where the buoyant-object 75 are buoyant, and:

a. maintains fluid communication between said regions
  b. maintains the relative pressure differential between said regions
  c. maintains relative height and volume of the said regions
  d. substantially prevents or mitigates fluid flow from one region to the next
  e. substantially maintains fluid separation between said regions when the regions consist of differing fluid types
  f. controls the timing and flow of buoyant-objects 75 through the FID.

Figure 8:
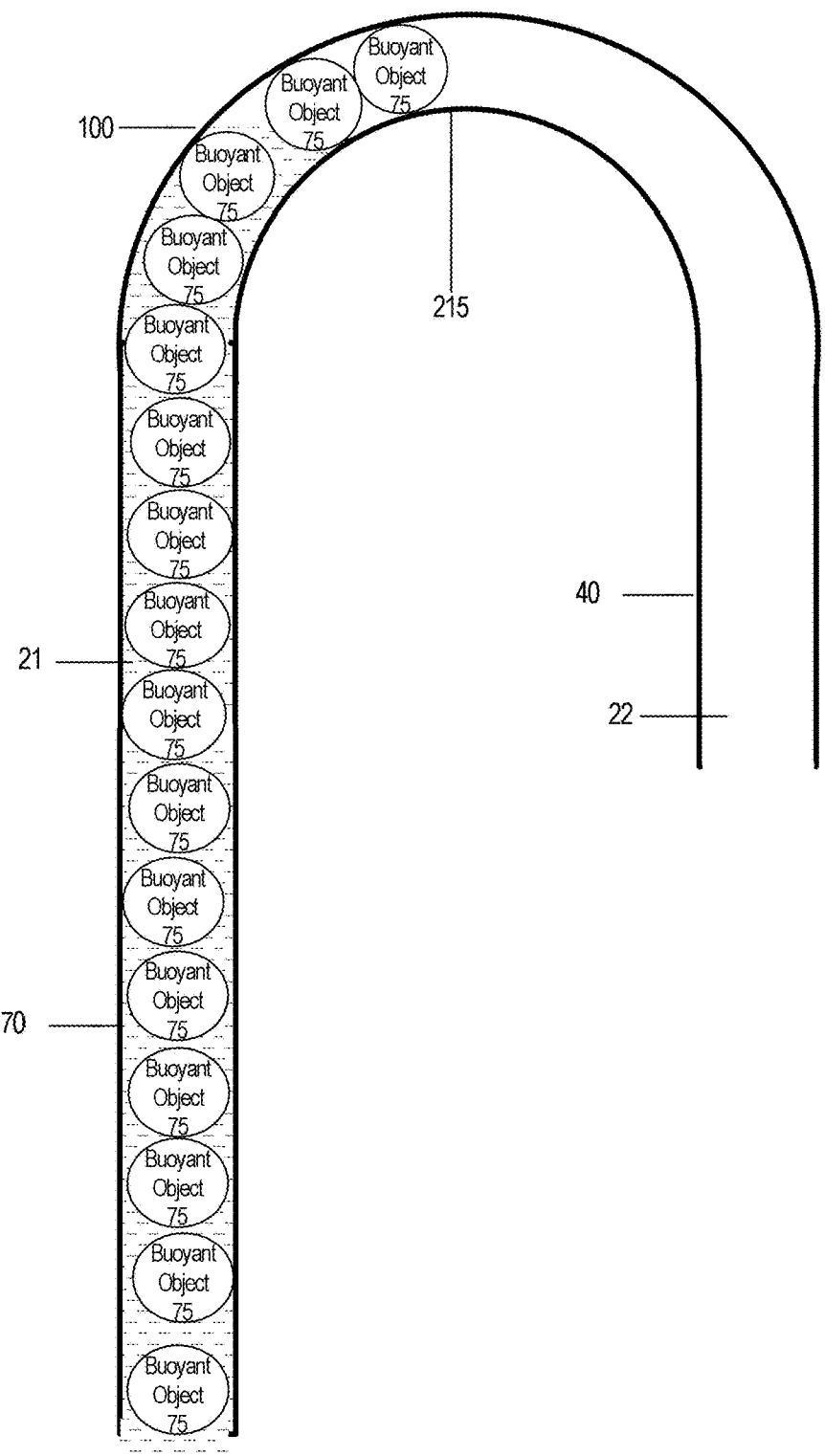
FIG. 8—bent pipe version of upper Fluid Interface Device comprised of upper transition connected to uptube on left and downtube on right. Stacked buoyant-objects in uptube provide sufficient buoyant force to lift top most buoyant-objects over the fluid interface and into the downtube.

FIG. 8 Bent Pipe Top FID

A complementary yet simple top Fluid Interface Device (FID) that can be utilized to transport buoyant-object 75 from the dense-fluid 21 environment back to the light-fluid 22 environment is shown in FIG. 8. FIG. 8 consists of continuously connected uptube 70 filled with dense-fluid 21, upper-transition 215 which is a bend U-shaped tube or pipe, downtube 40 filled with light-fluid 22, and several buoyant-objects 75 which are buoyant in dense-fluid 21, but which "sink" or "fall" in the light-fluid 22. Under the condition that buoyant-objects 75 are 75% loaded (net density is 0.75 of the dense fluid) as previously described it will take 4 buoyant-objects to lift the buoyant-object at the dense-fluid-to-light-fluid-interface 100 out of dense fluid 21. Since there are two buoyant-objects shown in FIG. 8 above dense-fluid-to-light-fluid-interface 100 it will take approximately 8 submerged buoyant-objects 75 to completely levitate them above dense-fluid-to-light-fluid-interface 100. Any additional buoyant-objects (beyond the necessary 8) below the dense-fluid-to-light-fluid-interface 100 will add additional force to drive the top buoyant-objects 100 across upper-transition 215 into the downtube where they will begin to fall through light-fluid 22. It is now possible to identify u-shaped upper-transition 215 and the upper part of uptube 70 as a FID since it provides guided mean from dense to light fluid, provides motive power of buoyancy, connects two adjacent fluid regions, maintains fluid and pressure separation, and in this case uses no external power at all.

FIG. 9,12A-12J, 13A-D Energy Conversion Due to Linear Induction Coils

Faraday's law of induction states that the magnitude of the voltage/power generated depends on the rate of change of the magnetic flux, not necessarily just the strength of the magnets field. Hence as a general rule, the faster the magnetic array falls and rotates as it approaches, enters, and exits the coil the greater the induced voltage. If possible it would be beneficial, from a power generation stand point, to have buoyant-objects dropping continuously through the induction coils and for multiple buoyant-objects to occupy a least one induction coil at all times. If the magnets obtain a high velocity through the coil, then the magnetic field change is correspondingly fast, and therefore the power generated by the coil increases as a function of increasing speed. Again the induced voltage is due to the translational and rotation motion of the magnetic array enclosed within the buoyant-object as it passes through the induction coil.

Figure 9:
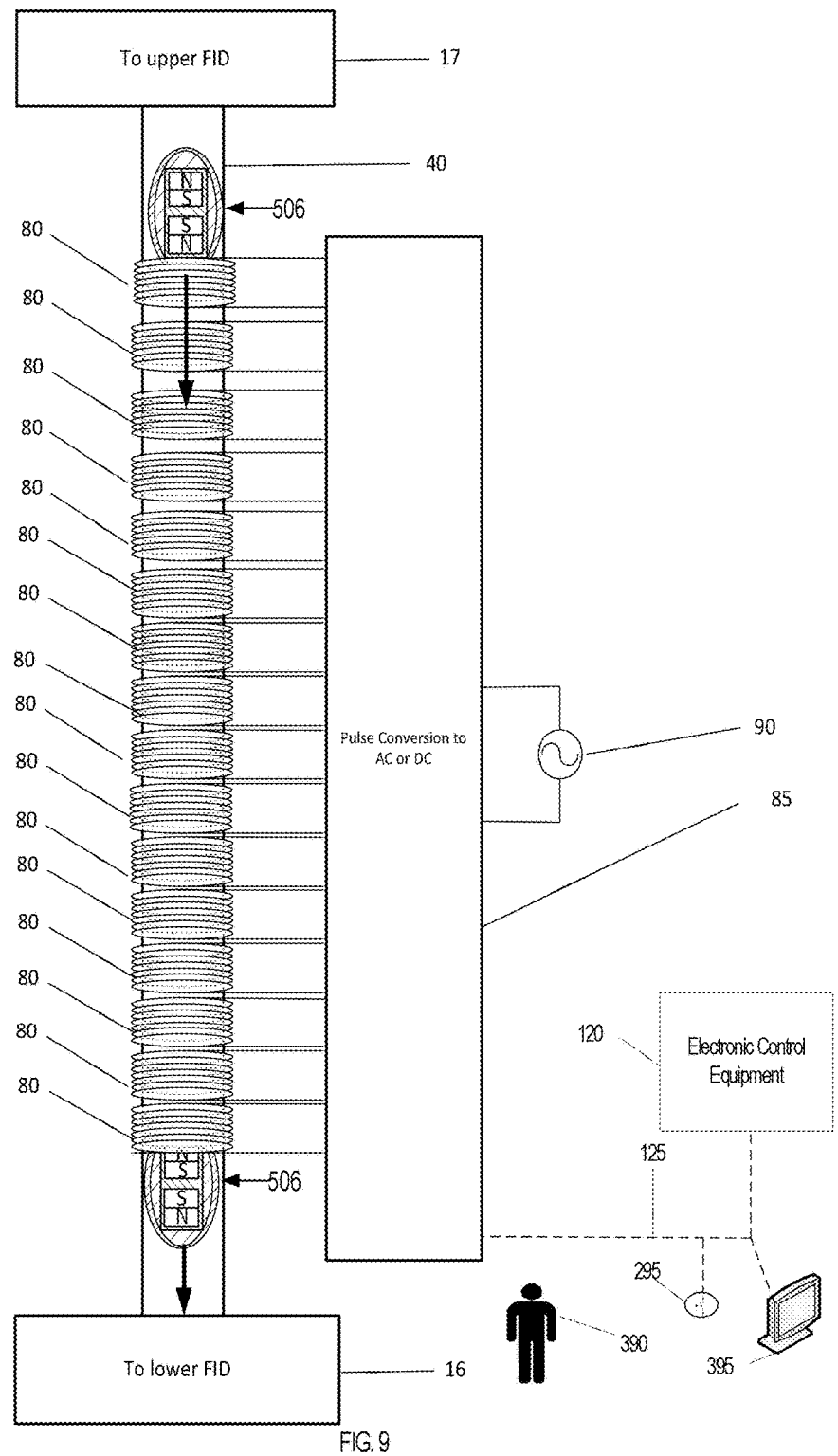
FIG. 9—linear induction power conversion showing buoyant-object with enclosed magnetic array, pulse conversion subsystem, and electronic control equipment.

In FIG. 9 buoyant-objects 75 fall down in a more or less straight line or via linear (in-line) motion downward, hence this type of electrical induction device is called in this application a linear induction generator as opposed to a Tesla style motor generator that utilizes purely rotational motion about a central axis. When the buoyant-object 75 containing magnets or magnetic arrays, as in FIG. 12A-FIG. 12J gathers speed in its downward journey through downtube 40 as in FIG. 9 it enters the circumferential wire coils (induction-coils 80) and will experiences a force induced by Faraday's law of induction which tends to oppose the downward motion, and at the same time generates electrical voltage and current waveform in the induction-coils 80. The opposing force that occurs when a magnet is dropped through a coil of wire is known as Lenz's law. It is generated from an induced magnetic field that tends to counter the field of the buoyant-object, which generally opposes the motion of the object. An equilibrium between gravity and the counter magnetic field is eventual established with the buoyant-object 75 proceeding downward at a reduced rate of acceleration as compared to its uninhibited free fall rate (i.e. 32 ft/sec$^2$). The actual speed acquired by the buoyant-object 75 in its decent is dependent on a wide range of factors including how much of a current load is placed on the induction coils (how much voltage and current is pulled from electrical-output 90), the speed and mass of the buoyant-object, the distance traveled, the resistance of the wire used, and number of turns in the circumferential coil in addition to numerous other concerns such as friction on the buoyant-object (if any) as it fall through downtube 40.

By Faraday's law the time rate of change of the magnetic flux is the physical mechanism that couples power into the induction coils. The faster the magnetic flux can be made to change the more power can be generated by the same coil of wire for a given strength magnet. The change in magnetic flux can be increased in several ways, including the following:

1. Increase the strength of the magnet that is dropped through the coil.
2. Increase the speed at which the magnet drops through the coil.
3. Rotate the magnet as it drops (adding rotational kinetic energy to the linear drop).
4. Varying the direction of the magnet field within the buoyant-object as a function of width or length (this is achieved via magnetic arrays with in the buoyant-object for example 12B, 12C, 12F) such that the wire coil "sees" a faster changing magnetic field from its stationary point of view as the buoyant object move through the coil.
5. Some combination of the above.

Hence, the magnetic field strength and field distribution within buoyant-objects affect the amount of power that can be generated via Faraday's law from a mass-levitator; therefore FIG. 12A through FIG. 12J will be discussed again from the magnetic field point of view. FIG. 12E represents a perfect sphere which can be considered to be the simplest and most compact magnetic form that can be used in a buoyant-object. It is simple to manufacture but when NdFeB magnets (the strongest presently know magnetic material) are used within a minimally sized buoyant-object shell that is 75% loaded, the external magnetic field strength is great enough to cause adjacent buoyant-objects in uptube 70 (see FIG. 13C) to "stick" together such that when they rise to the top of the upper-, they will not necessarily drop into the downtube 40 (FIG. 6) unless forced to do so via a form of magnetic shears that will clip them apart (not shown). This is easily remedied by providing the magnetic shears which can be created via a form of pulsed coil of wire, or alternatively the magnetic field within the FIG. 12E sphere can be lessened by choosing a different magnetic material that is less powerful, or by increasing the diameter of the enclosing sphere so that the external magnetic field is lessened. Reducing the magnetic flux density by choosing a less powerful magnetic material contradicts point 1) above, where we desire maximum magnetic power to maximize inducted power in the electrical coil. In addition providing magnetic shears are a possibility but not necessarily the first choice since power that would otherwise be delivered to the load is being utilized for an internal use.

To overcome some of the issues just described consider FIG. 12B. When the elliptical spheroid containing the opposing magnetic array of FIG. 12B populates uptube 70 (as in FIG. 13B) the opposing magnetics 506 contained by enclosing magnet tube 576 always present a north pole to the buoyant-object directly above or below it (note: opposing S facing magnetic poles can be used equally well). Given that the same poles of a magnet repel each other, the buoyant-objects 506 will be mutually repelled from each other, however there will also be a tendency to rotate away from each other. Given the oblong nature of FIG. 12B the rotation of the spheroid will be constrained by the interior walls of uptube 70 or downtube 40 such that rotation is minimal. This mutual repulsion will ensure that spheroidal buoyant-object 506 will not magnetically stick together. If the same opposing N facing magnetic array were contained by a sphere as shown in FIGS. 13A and 13C, the sphere would rotate 90 degrees and would again magnetically clump together but with less relative force as compare to the configuration shown by FIG. 13B.

When buoyant-object 506 (FIG. 20B), 582 (FIG. 12C), or 590 (FIG. 12F) fall through downtube 40 and begin to approach their stacked counterpart buoyant-objects near the water interface 35 in FIG. 6, the opposing north poles will begin to repel each other and will tend to reduce the impact of buoyant-object hard shell 529 against hard shell 529, and thus act as a form of shock absorber. A similar repulsive effect can also be obtained (perhaps more economically) when ellipsoidal or cylindrical buoyant-objects containing a single magnet such 580 in FIG. 12A are loaded into, and stacked upon each other with opposing magnetic fields as shown by FIG. 13D.

The opposing magnetic field structure of FIGS. 12B, 12C, and 12F also manifest another quality that is important and useful to the overall efficiency of the mass-levitator and to the linear inductive generator. In particular as the buoyant-object drops, and the magnetic array's field enters the induction coil (as in FIG. 9), the induction coil begins to see the first magnet's field and then, as the buoyant-object enters further into the coil, the field reverses as the next magnet in the array enters the coil. From the point of view of the induction coil there is a quick reversal of the magnetic field due to the field orientation in the magnetic array as the buoyant-object fall through the coil, and this represents an increased rate of change of the magnetic flux, which in turn induces significantly greater power into the induction coil. The magnetic strength and field arrangement within a magnetic array contained by a buoyant-object can therefore make a sizeable difference to the amount of electrical power that is induced. In FIG. 12C there are more opposing magnetics within the array as compared to FIG. 12B, hence there is the potential for additional increases in induced voltage/current over FIG. 12 B given an equivalent amount of magnetic material.

The more cylindrical shape of FIG. 12C provides advantages in that the cylindrical shape allows the buoyant-object to carry proportionally more magnetic material given that a cylinder has more volume and will displace more dense fluid as compared to a ellipsoid of same length. In addition, the magnetic field can be larger at the top and bottom of the cylinder since the magnetics 577 themselves can be designed to be closer to the ends, which makes the magnetic fields greater near the ends as compared to FIG. 12B. The higher field strength near the ends makes for more repulsion between other similar buoyant-objects which will in turn increase the shock absorber effects.

The cross section shown in 12F represents a spheroidal buoyant-object with three magnets 577 in the array enclosed by magnet tube 576. The virtue of this arrangement is that the middle magnet oriented 90 degrees to the other two will reduce the internal repulsion between magnets within the magnet tube and will stabilize the internal forces within the magnetic assembly. Magnet arrays such as those shown in FIG. 12B, and FIG. 12C can, when realized by very strong magnets such as neodymium (NdFeB), can be somewhat unstable in the sense that attractive and repulsive forces are hard to control and can be dangerous unless handled with extreme care. Even after assembly there is the possibility that if the magnetic tube is damaged that the compressed opposing and repelling magnets will fly apart and hurt personnel or other surrounding equipment. By layering the magnetics at 90 degree angles as in FIG. 12F, the magnets that abut against each other will tend to attract internally (reducing compressed magnetic energy) while still providing the advantages of a quickly changing flux from the point of view of the induction coil.

The induced electrical voltage/current pulses can be converted by pulse-conversion-subsystem 85 in FIG. 9 through standard electrical engineering techniques which will assemble pulses and build DC or AC waveforms 90 from the electrical pulses induced in induction-coils 80. Pulse-conversion-subsystem 85 can be made quite sophisticated and may be electronically controlled, by suitable electronic control equipment 120 (FIG. 9) so as to be capable of displaying internal states of the conversion subsystem 85 and/or external voltage and current loads on a monitor such as 395. Another potentially important element that can optionally be provided is an emergency stop button 295, that can be triggered by operator 390, which can then signal electronic control equipment 120 to command the system to such down the mass-levitator's moving parts and to break electrical power connections to the external load 90 (FIG. 9).

The induction coils depicted in FIG. 9 are roughly the length of a single buoyant-object for a specific reason, which is to reduce the deconstructive superposition of voltage and current waveforms that can occur when multiple buoyant-objects containing magnetic arrays are falling through the same long coil at the same time. Under suboptimal conditions one buoyant-object can be creating a positive voltage while a second or a third buoyant-object is inducing a positive or out of phase waveform in the induction coil such that the waveforms tend to destructively subtract from each other. Such destructive interference can be minimized by providing a coil no longer than an individual buoyant-object as shown in FIG. 9. Alternatively the timing of buoyant-objects can be carefully adjusted such that buoyant-objects that fall from top-FID 17 through to bottom-FID 15 (see FIG. 2) generate waveforms are always in-phase and hence add constructively.

For a closed system mass-levitator as shown in FIG. 2 and FIG. 3, where the energy conversion subsystem 24 is the linear induction generator of FIG. 9, the goal of the designer is for the linear induction generator to have at least one buoyant-object containing its associated magnetic array passing through the induction coils at all times. This is true because power is only generated when a magnet passes through the induction coils, and any functional power generator will need to generate a continuous electrical waveform. Therefore a mass-levitator with a linear-induction system as shown in FIG. 9 will attempt to maximize the number of buoyant-objects per second, which move through downtube 40 and through induction-coils 80. In the closed system of FIG. 2, and FIG. 3 all buoyant-objects are in continuous circulation within the embodiment and where each is incrementally contributing to the overall power generation equation. By similar reasoning, it is beneficial to design the embodiment with sufficient height such that the length of time for the buoyant-object to fall the entire length of the downtube is the same or greater than the time it takes for the next buoyant-object to begin its fall. If the height of the downtube can be increased such that the multiple buoyant-objects are passing through the tube at regular intervals, than the power increase will be proportional to the number of buoyant-object that are transiting the induction coils at any given moment. In addition, the increased height of the uptube 70 equates to a larger amount of potential energy that can be converted to power. Given that the force of gravity accelerates the buoyant-object, and that the power induced in the coil is proportional to the speed of the magnetic object (rate of change of flux increases), the increased height to fall through also corresponds to more power that can be extracted from the induction coils.

It is also true that the upward motion of the buoyant-object and its magnetic array will induce a current in a circumferential induction coil which can be tapped to generate electrical power directly (for example using an embodiment as shown in FIG. 2). In practice the amount of power generated (where power is energy per second) via the downward motion of the buoyant-object through the less dense medium is significantly greater than that generated by the upward motion induce by buoyancy. The significantly greater speeds that the buoyant-object acquires due to the downward acceleration of gravity far exceed the speed of the buoyant-object through the dense and at least somewhat viscous fluid. For this reason, the cost of providing induction coils on the upward ascent of the buoyant-object through the uptube may not be cost effective. The choice to generate power due to the upward motion of the buoyant-object is a design choice which may not always be acceptable due to the substantially increased investment in low resistance (heavy gauge) wire. Due to this much greater cost efficiency of induction coil on the downtube, embodiments containing induction coils, as shown in FIG. 9, will typically be illustrated in this application as only encompassing the downtube(s) 40. As a final note on this topic the ultimate power generated by the induction coils is directly related to the total resistance of the N turns of wire, where having the heaviest gage wire with the lowest resistance is very desirable since a corresponding greater current can be induced, which directly corresponds to a higher power.

Any rotation of the buoyant-object as it drops linearly through downtube 40 will also induce an increased rate of change of the magnetic field. Hence electrical production can be enhanced when the downtube 40 and the associated linear generation array of FIG. 9 has been put on an incline as in FIG. 21 so as to permit a suitable buoyant-object to roll down the incline. Suitable choices for buoyant-objects include perfect sphere 584 containing one magnet (FIG. 12E), perfect sphere 507 (FIG. 13A) containing an opposing magnet array, the rolling cylinder 590 shown in top view in FIG. 12I, and in cross section in FIG. 12J. When the buoyant-object 590 is used the downtube can consist of square tubing so as to permit the cylindrical shape to roll along its central axis. In addition cylindrical buoyant-object 590 has a diametrically opposed internal magnet that is magnetized across its cylindrical axis so as to maximize the rolling rate of change of the flux through the circumferentially surrounding square induction coil. The choice to have the buoyant-object rotate has consequences, namely that the speed of decent through the coils will decrease which will also decrease the speed of the linear motion. The loss in speed will tend to decrease the change in flux due to linear motion, while at the same time increasing the rotational motion which will tend to increase the rate of change in flux. Whether this is a beneficial feature of the engineered embodiment depends on the overall goals of the engineering project, however the electrical waveforms provided are more sinusoidal in nature instead of simple pulses making it easier for the pulse-conversion-subsystem 85 of FIG. 9 to generate a continuous well shaped output. In addition the longer length of time spend spent by the rolling buoyant object in each induction coil also means that each buoyant object will generate power for a longer length of time.

Buoyant-Objects

Buoyant-objects 75 generally conform to the following descriptions and definitions:

i. buoyant-objects are buoyant, neutrally buoyant, or variably buoyant in at least one fluid region and optionally not buoyant in at least one other fluid region.

ii. where the overall shape, size, and design ensures ease of passage through the various regions, surfaces, pipes, tubes, chambers, and interior structures of said mass-levitation apparatus by suitably streamlining, smoothing, and shaping said buoyant-object/capsule iii. where said buoyant-object may be composed of a buoyant capsule and optionally one or more encapsulated objects which can be composed of any arbitrary material, shape, weight and volume as long as the overall buoyant capsule plus the its encapsulated objects are still buoyant in at least one of the fluid regions
 1. where said buoyant capsule is designed so as to reshape, surround, protect, and otherwise encapsulate said encapsulated objects
 2. where said encapsulated object may be fixed or removable from said buoyant capsule
 3. where said buoyant capsule, when encapsulated object is removable, provides suitable interior volume to house said one or more encapsulated objects, and provides mean for entry and removal of the said encapsulated objects through a suitable opening and closure means iv. where said buoyant-objects force vectors generated by buoyancy and gravitation can be designed with the following criteria and notes:
 1. The buoyancy force vector and the energy generated by said buoyant-object acting on, or in, the mass-levitation apparatus against the gravitation field of the planet when in buoyant fluid regions is increased when fluid displacement increases, dry weight decreases, and capsule is suitably shaped to reduce drag and otherwise facilitate movement of the capsule in the buoyant dense fluid region
 2. The gravitational force vector and the energy generated by said buoyant-object acting on or in the apparatus in non-buoyant fluid regions is increased by increasing the dry weight of said buoyant-object
3. The buoyant-object should be relatively incompressible so as to displace the greatest volume of fluid, so as to generate the greatest possible force of buoyancy when compressed to the greatest degree near the bottom of a buoyant region, and so as to be scalable with height of the uptube/downtube.
4. The designer should consider using part of the motive force provided by the forces of buoyancy and gravity to facilitate motion of the buoyant-object between adjacent fluid regions
5. Buoyant-objects can encapsulate and elevate any type of mater including: other fluids, living objects such as fish and people, entire mechanical assemblies such as ships or automobiles, and can include electrically charged and/or magnetic substances.

FIG. 10A-10C Various Types of Buoyant-Objects

Examples of buoyant-objects conforming to the above descriptions and definitions can be seen in FIG. 10A to FIG. 10E, FIG. 11A to FIG. 11C, and FIG. 12A to FIG. 12J. Buoyant-objects 75 in each of these figures are typically designed with a hard outer shell (buoyant-object-dense-shell 529) to withstand impact of a fall and to support the buoyant inner structure (buoyant-object-light-inner-core 528). While the overall shape of a buoyant-object can be of any configuration, it should be designed to conform to the interior of the tubes, pipes, chambers, and vessels that it passes through, hence the more common configurations are the sphere FIG. 10A, the spheroid FIG. 10B, and the smoothed cylinder FIG. 10C since standard pipes and tubing can readily be purchased. Each shape has advantages and disadvantages which are not necessarily apparent at first glance. The perfect sphere (FIG. 10A) will navigate curves within pipes with a minimal bend radius and will reduce frictional pressures associated with similarly stacked buoyant-objects as they navigate bends under the influence of buoyance or gravity, while the cylinder (FIG. 10B) will displace more fluid per unit length of tubing and can therefore float a proportionally greater total weight, but requires wider tubes and pipes when negotiating turns and bends. The spheroid in FIG. 10C is somewhat of a compromise between the perfect sphere and the cylinder sharing some of both properties and is therefore a frequent choice in the various embodiments found within this application.

FIG. 10D-10E, Encapsulated Arbitrary Mass in Buoyant-Objects

FIG. 10D and FIG. 10E represent the case where the buoyant-object encloses a secondary arbitrary mass, and where the buoyant-object is of variable density. The arbitrary mass enclosed by FIG. 10 is a car 350 (car-embodiment-of-an-arbitrary-mass), and in FIG. 10E it is a ship (ship-embodiment-of-an-arbitrary-mass 352). In both figures the buoyant-objects 75 are enclosed by a hard outer shell 529, which contains a fluid proof gateway or door into the interior (buoyant-object-door 345). In FIG. 10D the car is carried on top of a ballast tank 376, and dense fluid ballast is added or removed to adjust the buoyancy of the overall buoyant-object 75. Additional dense fluid (typically water) is added to ballast tank 376 so as to increase the overall weight of the capsule and thereby permit buoyant-object 75 to sink. Signals and power to command fluid valve 410, and door 345 to open or close are provided by internal inductive coil 415 and external inductive coil 420 in this example. Other means to power and control the various valves, doors, and possible sensors internal to buoyant-object 75 are also possible, such as providing an internal battery for power and via the use of manual control or optional internal computer control. The buoyant-object 75 in FIG. 10 E functions the same as FIG. 10D except the there is no discrete ballast tank, instead the entire inner fluid chamber within the buoyant-object acts as a ballast tank that can take on or purge water such that ship 352 can float into the buoyant-object's internal chamber when water tight doors 345 are opened. Complete details and operational descriptions of each of these embodiments will be provided when this application discusses FIG. 15A and FIG. 16A.

Figure 11A:
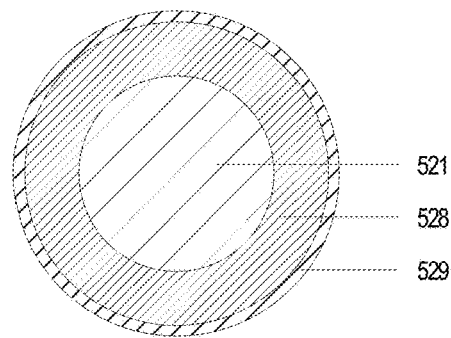
Figure 11B:
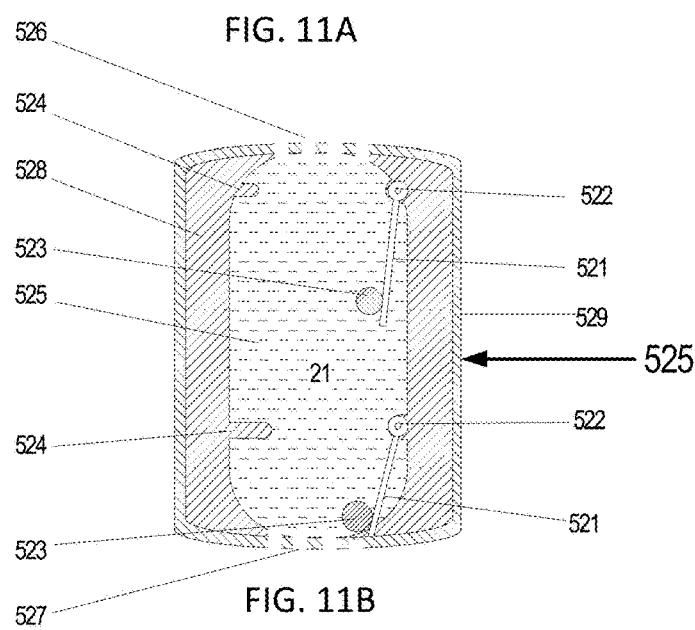
Figure 11C:
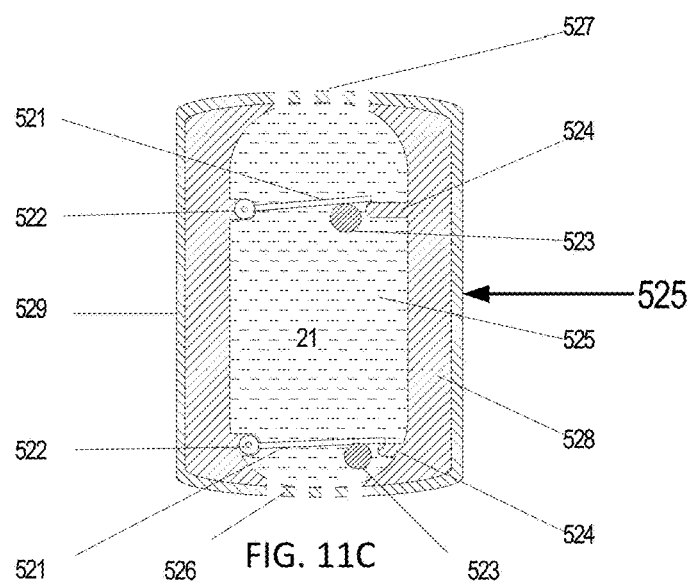

FIG. 11A-11C Fluid Lifting Buoyant-Objects

In FIG. 11A through FIG. 11C is a cross section of a specialized buoyant-object 75 to be used with version of the closed loop mass-levitator shown in FIG. 2. Buoyant-object 525 is designed to encapsulate and lift the dense fluid 21 (e.g. water) to the top of a mass-levitator where it will be flipped over and the dense-fluid 21 dumped out. Using buoyant-objects designed to contain and dump water provides a method for mass-levitator embodiments to act as a water pump, whereby they can be utilized to elevate significant quantities of water to an arbitrary height. FIG. 11A to FIG. 11C are designed with a form of dual internal swing check valves that when in an upright position as in FIG. 11C have their check valve flappers (521) closed and resting against internal ledge 524 so as to contain dense fluid 21. When buoyant-object 525 is flipped over, as in FIG. 11B the swing check valve flappers swing open via pivot 522 so as to release dense fluid 21 via dense fluid exit 527, and so as to permit the light fluid to enter via light fluid entrance 526. A top view of buoyant-object 525 is shown in FIG. 11A from the point of view of having the internal check valve's flapper 21 closed as in FIG. 11C. Each flapper has been provided with an optional weight 523 to assure that the internal swing check valve flappers open and close promptly under the motive force of gravity. Use of internal swing check valves is only one simple method of capturing and releasing the dense fluid by a buoyant-object, other means are also possible. Complete details and operational descriptions of each of the water pump embodiments will be provided when this application discusses FIG. 19A and FIG. 20A.

FIG. 12A-12J Buoyant-Objects Containing Magnetics and Magnetic Arrays

The buoyant-objects of FIG. 12A to FIG. 12J are examples of buoyant-objects with enclosed magnets or magnetic arrays. The simplest examples are FIG. 12A, FIG. 12D, FIG. 12I and FIG. 12J which represent buoyant-objects enclosing a single magnet 577, which are identical to FIG. 10B, 10A, 10C respectively with the addition of an optional inner magnet tube 576 (buoyant-object-inner-magnet-tube) to contain the magnet and to permit possible easy removal at some future date, and the magnetic itself 577 (buoyant-object-inner-magnet). FIG. 12D, FIG. 12G, FIG. 12H are a variation on the swing-check-valve embodiment just discussed in FIG. 11A, FIG. 11B, FIG. 11C however a set of internal hollow cylindrical magnets 577 have been included in their own magnetic tube 576, thus allowing the buoyant object to pump water and to generate electricity through induction.

When multiple magnets are included in, and contained by magnetic tube 576 within a single buoyant-object, they are known as a magnetic-array in this application. When magnetic-arrays are present the importance of having the magnetic tube 576 is of greater importance, since the tube fixes the internal position of the magnets in the array, constrains internal movement and rotation, and greatly facilitates loading of the magnets into the buoyant object's tube when first assembled. More complex magnetic array examples are provided by FIG. 12C and FIG. 12F, each of which are composed of the same internal components namely: buoyant-object-dense-shell 529, buoyant-object-light-inner-core 528, buoyant-object-inner-magnet-tube 576, and magnets 577. Additional details within FIG. 12A-FIG. 12J will be provided with respect to the arrangements of the magnetic fields and the use of magnetics and magnetic array configurations when this application discusses linear inductive generators in the next section.

Surplus Kinetic Energy from Buoyant-Object Fall

When a buoyant-object is dropped down through downtube 40 (FIG. 9), a substantial part of this downward kinetic energy may still exists when the buoyant-object encounters the interface between the light fluid and the dense fluid working mediums (e.g. the air to water interface) or when it encounter an existing buoyant-object which is already present in the downtube. This surplus kinetic energy can be used to propel the buoyant-object below the surface of the heaver fluid layer, effectively injecting the buoyant-object into the lower transition via the momentum generated by its fall. The extent to which the buoyant-object penetrates the dense fluid surface and how deep it travels into the lower transition 220 dependents upon a number of factors related to principally to amount of its available surplus kinetic energy, and how the impact energy is dissipated, that is:

1) where the dense fluid is permitted by flow to upon the buoyant-object's initial impact, this is related to fluid impact wave that is formed to dissipate this excess energy.

2) how much the buoyant-object weighs.

3) and how fast the buoyant-object is moving upon impact.

If the buoyant-object strikes the water interface in a confined space such as a pipe when the buoyant-object's dimensions have been designed to be a rather snugly fit to the interior of the downtube (usually a desirable feature so as to increase the displaced fluid which increase the buoyancy force), then the buoyant-object will tend to act like a hydraulic ram which will push the water at the surface downward. The result is that the buoyant-object will experience a "belly flop" effect in which the depth of penetration is greatly reduced. Hence the surplus kinetic energy under these circumstances tends to be converted to pressure and turbulence, unless there is some place for this energy dissipating fluid wave to go. Various embodiment can be devised to handle this pressure/turbulence successfully including (but not limited to) the use of expansion tanks as shown in FIG. 17A (single uptube down tube), increasing the fluid interface tank cross sectional area (which permits a more ideal slash to occur and provides a large area for surface waves to be establish), and by lastly by providing a means for the water to circulate (i.e. provide a means and path for the fluid to flow) as in FIG. 18A (dual uptube single downtube). While the later description is rather heuristic, it captures the essence of the problems encountered at the interface if the buoyant-object is permitted to fall freely.

FIG. 14A-14B Gravity Wheel with Electric Generator

FIG. 14A represents a 3-D model of a gravity wheel 900. Gravity-wheel 900 as shown in in the cross sectional view of FIG. 14B, is comprised of an exterior housing or shell 990 (gravity-wheel-housing), an internal fan like internal wheel 910 (gravity-wheel's-internal-wheel) that is connected to central axis 950 (gravity-wheel-central-axis) and which turns on sealed bearings 945 (gravity-wheel-sealed-bearings), an optional internal seal 920 (gravity-wheel-seal) used to create a liquid seal between gravity-wheel-housing 990 and gravity-wheels-internal-wheel 910.

FIG. 14A displays the exterior 3-D view of the gravity wheel 900, and exposes central axis 950 protruding from gravity-wheel-housing 990, where it connects to the external electrical generator 970 (gravity-wheel-external-generator), which sits on structural generator support 954 (gravity-wheel-generator-support). Connections to downtube 40 are also shown in FIG. 14A at the top 965 (gravity-wheel-upper-downtube-connection) and bottom 995 (gravity-wheel-lower-downtube-connection). In addition gravity-wheel 900 has a central access cover 992 (gravity-wheel-cover) which can be opened for repair and is also utilized for initial assembly.

In FIG. 14C gravity wheel 900 is shown connected to downtube 40 at the top via gravity-wheel-upper-downtube-connection 965 and on the bottom via gravity-wheel-lower-downtube-connection 995, whereas in FIG. 14B it connects to gravity-wheel-fluid-entrance-tube 996 on the top and gravity-wheel-fluid-exit-tube 997 on the bottom. These connection points reflect gravity-wheel 900's context in the bigger picture provided by embodiments of FIG. 19A and FIG. 20A, which will be described in more depth in later sections of this application.

While a water wheel represents old technology, the purpose here is to use it in association with the mass-levitator, in a more generalized fashion, and thereby put it to use in new ways. The generalized gravity wheel can act as a simple water wheel as shown in FIG. 14B, whereby an elevated water source directs falling water onto the exterior surfaces of the water wheel, which in turn forces the mechanical surfaces of gravity-wheel's-internal-wheel 910 downward by virtue of the force of gravity accelerating the water molecules so as to turn and spin gravity-wheel-central-axis 950 whose motion can then be used as a source of mechanical energy. The more generalized use of the same mechanical embodiment is shown in FIG. 14C, where the apparatus is functioning so as to handle any type of falling material such as buoyant-objects 75. Buoyant-objects 75 enter the gravity-wheel 900 from downtube 40 through gravity-wheel-upper-downtube-connection 965, and enter into pocket voids 940 (gravity-wheel-pocket) between gravity-wheel's-internal-wheel 910 fan like blades. The downward momentum of buoyant-object 75 and the weight of buoyant-object 75 acting on the internal surfaces of gravity-wheel's-internal-wheel 910 causes gravity-wheel's-internal-wheel 910 to spin, and turn gravity-wheel-external-generator 970. Eventually buoyant-object 75 is transported via the motive power of gravity through the right-hand side of gravity-wheel 900, turning gravity-wheel's-internal-wheel 910, generating electricity via gravity-wheel-external-generator 970 and finally exiting from gravity-wheel 900 via gravity-wheel-lower-downtube-connection 995 to downtube 40.

To summarize gravity-wheel 900:

1. consists of a circular wheel that pivots on a central axis.

2. accepts material/buoyant-objects into a pocket in the top of wheel's outer periphery from a guided means that directs said material object into said wheels outer periphery's said pocket.

3. holds material/buoyant-objects in the wheel's outer periphery during wheels downward motion from top to bottom of wheels motion.

4. releases said material/buoyant-objects into a connected guided means near bottom of wheel.

5. directs the material/buoyant-object's force due to gravity and any falling kinetic energy of said material object into torque that is directed onto a central shaft in said gravity wheel.

6. converts said torque into mechanical work or other form of energy such as electrical energy.

7. provides one or more guiding means to connect said gravity wheel to one or more fluid interface devices.

FIG. 15A-15I—Water Elevator—Car Lift Embodiment 1

A generalized water elevator embodiment, based on the basic open loop system of FIG. 1C, is shown in FIG. 15A-15H. The apparatus contains a standing-column-of-water 330 that extends from the top of electronic-elevator-swing-check-valve 370 to a height slightly above the top of the elevated-landmass-structure 315, which can represent either an elevated landmass or a manmade structure. The standing-column-of-water 330 is formed from the sides of uptube 70 and bounded on the bottom by the swing-check-valve-flapper 360 of electronic-elevator-swing-check-valve 370 (FIG. 15C) and on the top by the top-landing-pad 340 which abuts to uptube-ceiling 270 (FIG. 15B), which is the top most physical structure of the apparatus. Standing-column-of-water 330 is filled with water when in its working state, and is filled and controlled to an approximate water level given by uptube-water-level 100 but can be as high as top-landing-pad 340 when desired. Standing-column-of-water 330 is refilled as necessary from elevated-fluid-reservoir 135 via reservoir-electronic-control-valve 140, and connecting water reservoir-fill-pipe 145 (see FIG. 15B). The uptube-water-level 100 is monitored by uptube-water-level-sensor 170 and controlled via reservoir-electronic-control-valve 140 which is actuated by electronic signals emanating from the electronic-control-equipment 120. Electronic-control-equipment 120 also controls/actuates electronic-high-pressure-fluid-valve 50 and electronic-water-drain-valve 160 and monitors/records uptube-water-level-sensor 170 and lower-water-level-sensor 355, via control-cables 125.

Figure 15A:
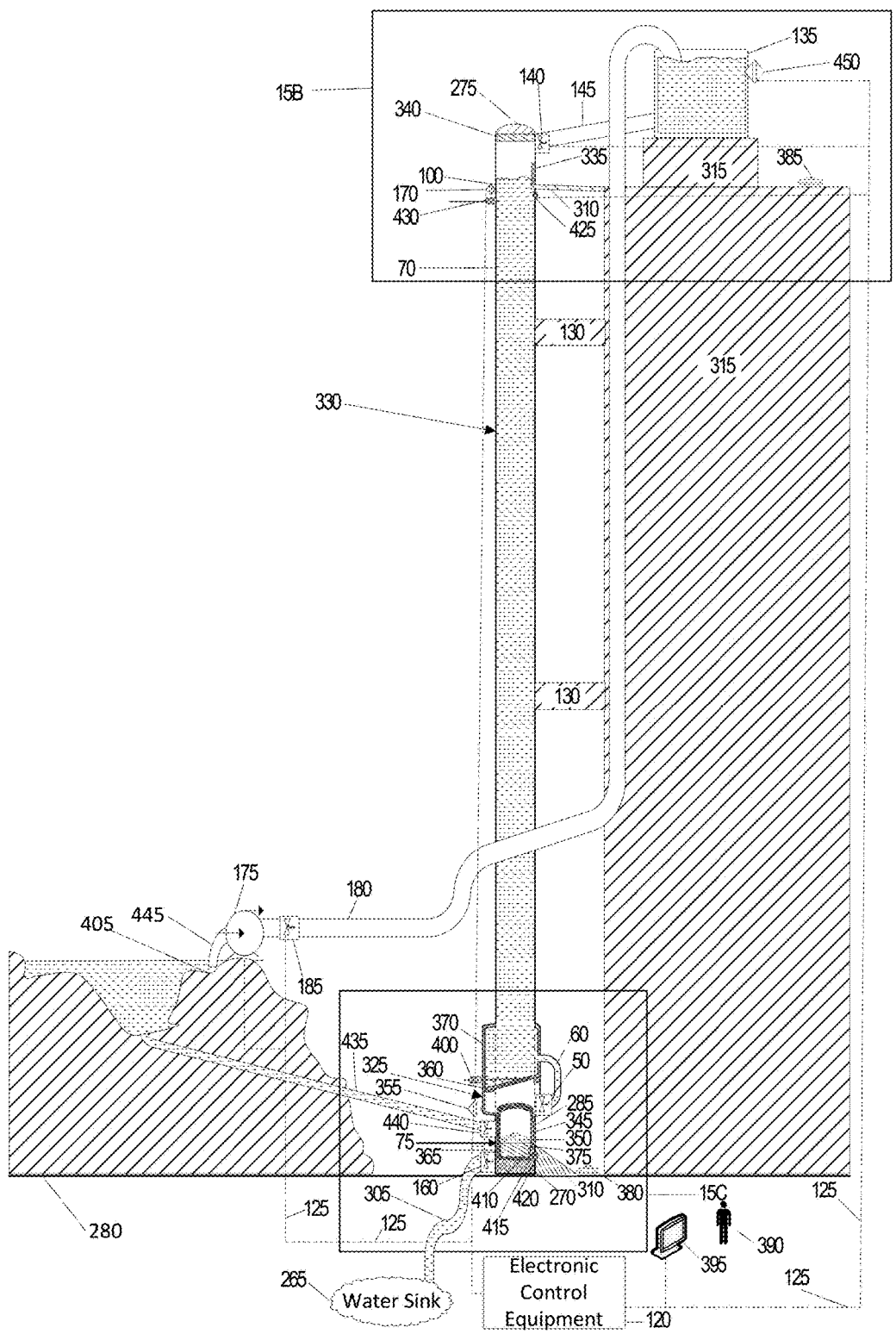
FIG. 15A—water elevator mass-levitator in fill stage where car is being loaded into buoyant-object and when water has already been purged from the compression-decompression chamber.
Figure 15B:
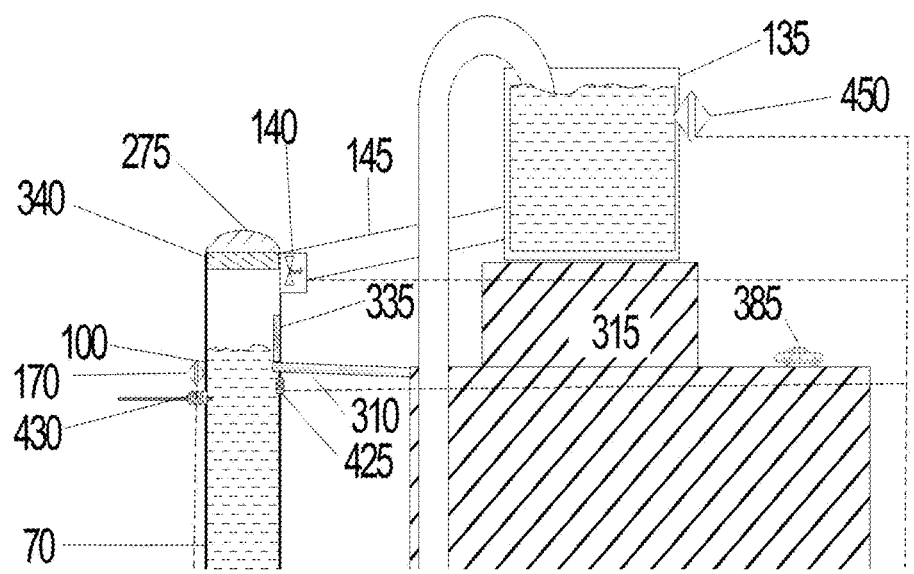
FIG. 15B—close up view of top section of FIG. 15A.
Figure 15C:
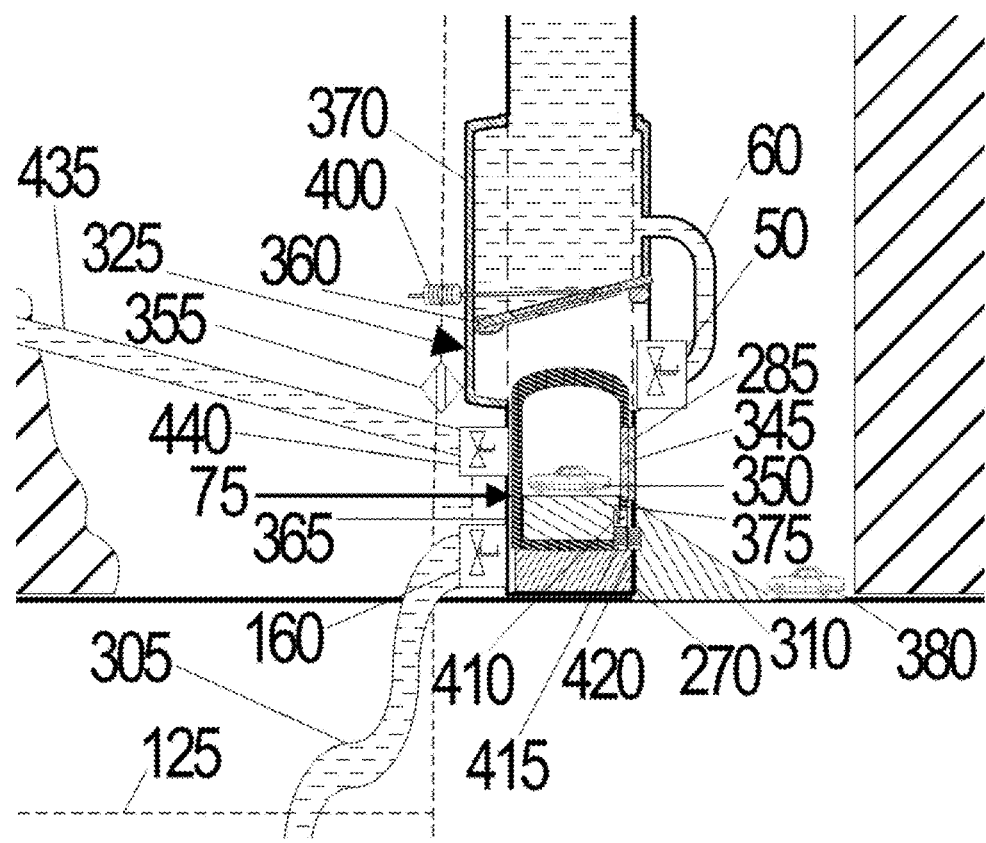
FIG. 15C—close up view of bottom section of FIG. 15A.

In FIG. 15C high-pressure-equalization-tube 60 connects uptube 70 to the elevator-compression-decompression-chamber 325 via electronic-high-pressure-fluid-valve 50, while electronic-water-drain-valve 160 connects to, and drains compression-decompression chamber 325 via water-dump-pipe 305 to water-sink 265 (FIG. 15A). The elevator-compression-decompression-chamber 325 is formed from the walls of swing check valve 370, compression-decompression-tube 365, high-pressure-equalization-tube 60, and attached electronic control valves 50 (electronic-high-pressure-fluid-valve) and electronic-water-drain-valve 160.

Buoyant-Object 75 resides in the apparatus and is the primary lift vehicle to levitate car-embodiment-of-an-arbitrary-mass 350, (represented in FIG. 15C as a car), which is enclosed in, and encapsulated by, buoyant-object 75 as in the close up view given by FIG. 10B. Loading of car-embodiment-of-an-arbitrary-mass 350 (see detail FIG. 15C) into buoyant-object 75 is achieved via entry-ramp 310 that abuts to elevator-compression-decompression-chamber 325 where said car-embodiment-of-an-arbitrary-mass 350 enters the elevator-compression-decompression-chamber 325 by way of water-tight entry-door 285, and then further enters the buoyant-object via buoyant-object-door 345 using its own motive force (i.e. Car having an internal combustion engine in this embodiment).

Figure 15D:
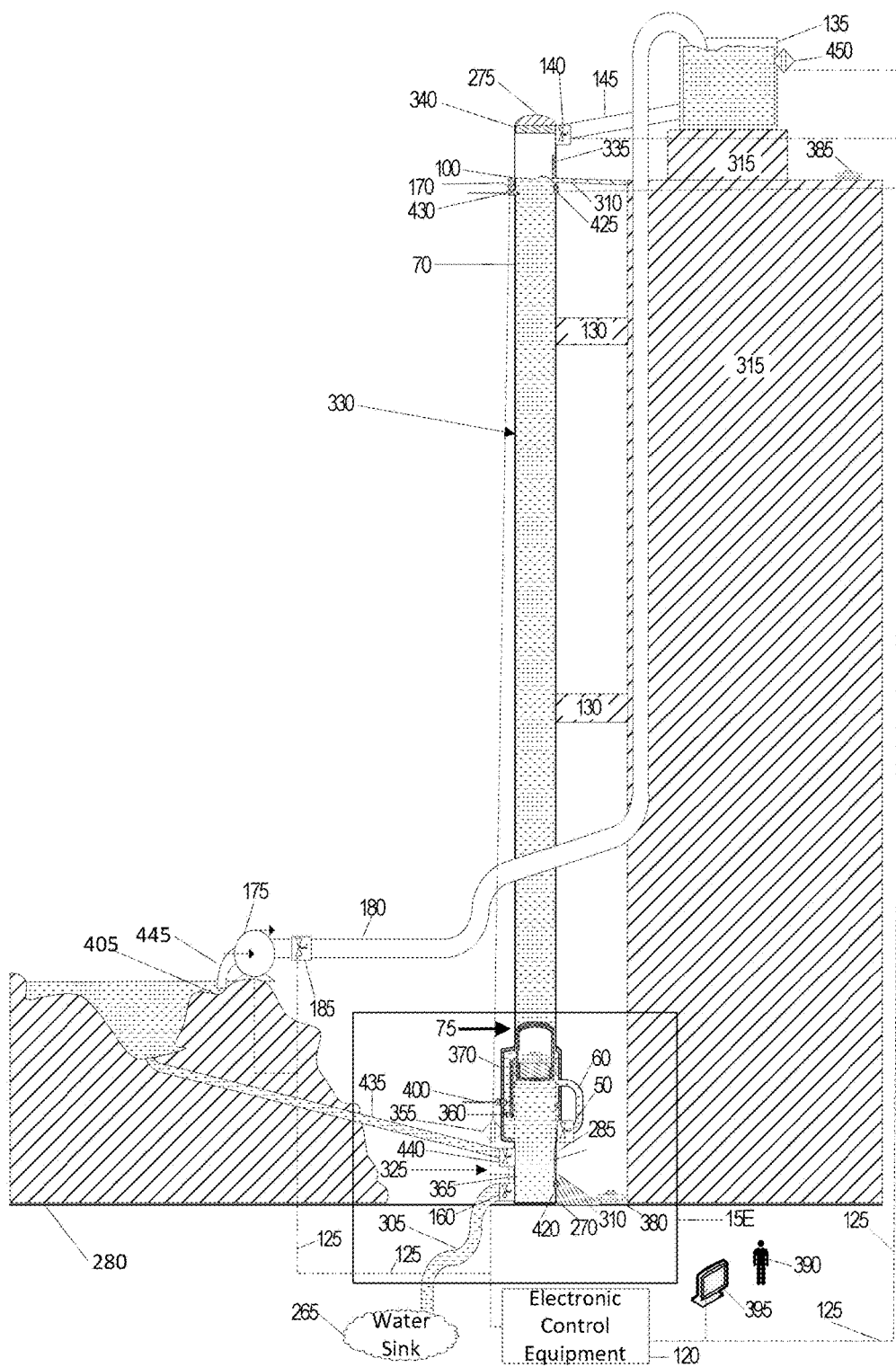
FIG. 15D—water elevator mass-levitator in rise stage where car is being levitated upward by encapsulating buoyant-object and when water has already filled the compression-decompression chamber.
Figure 15E:
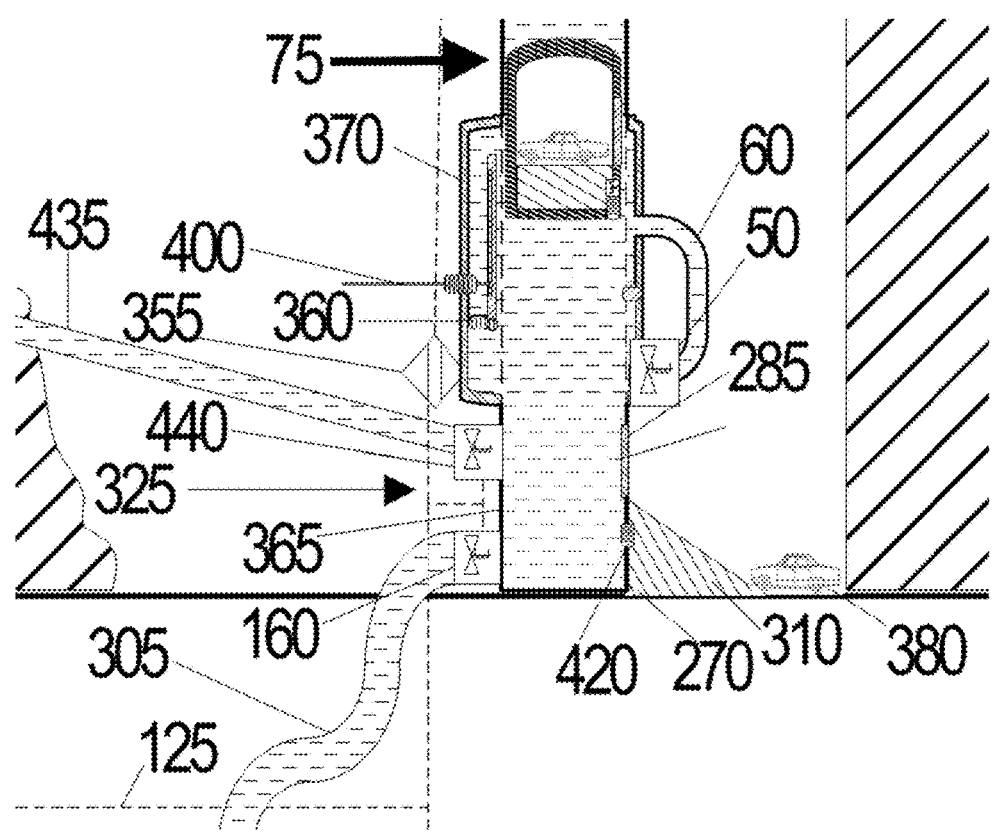
FIG. 15E—close up view of bottom section of FIG. 15D.
Figure 15F:
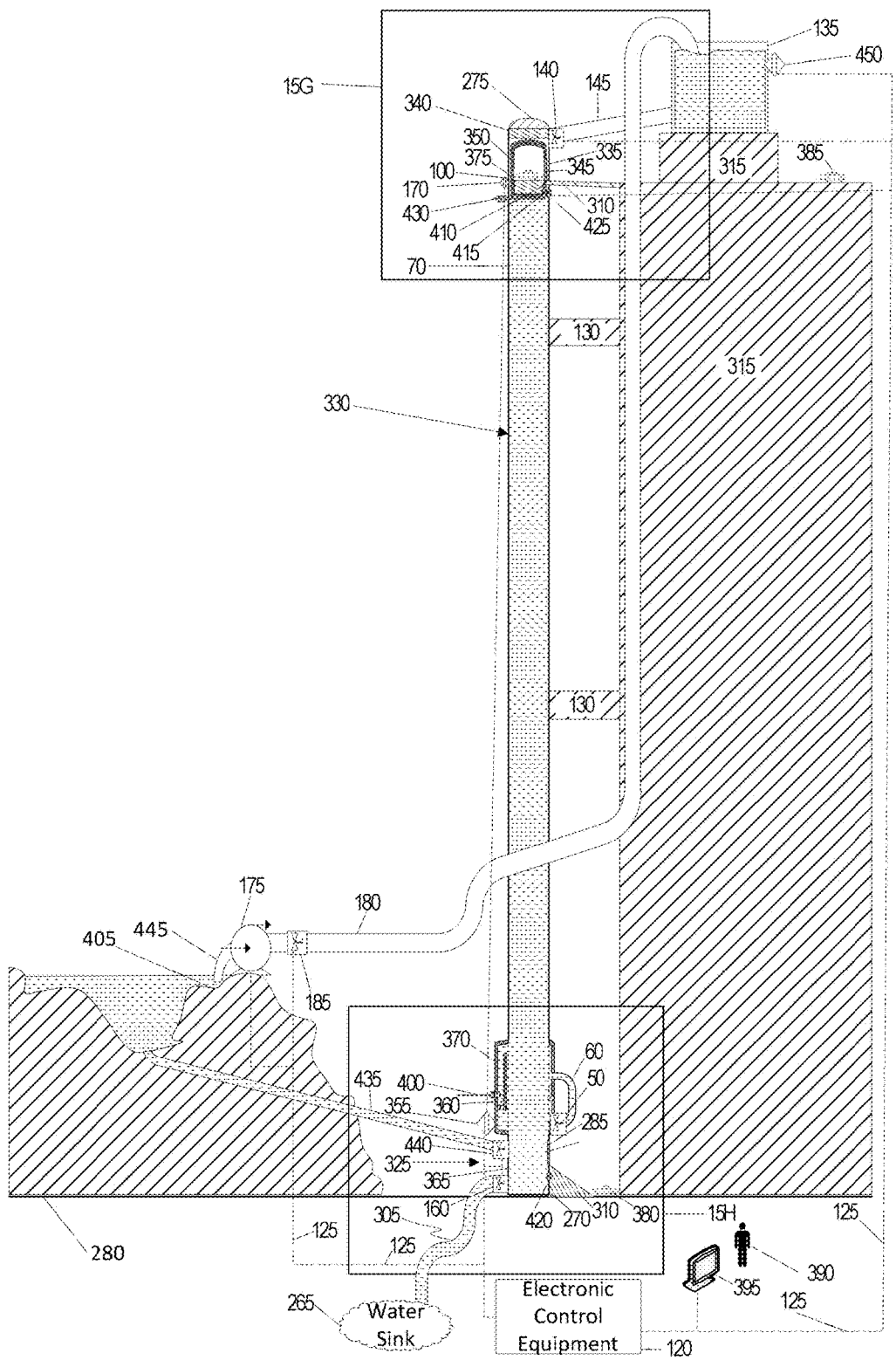
FIG. 15F—water elevator mass-levitator after rising to the top of the fluid column—ready to open doors to buoyant-object and top doors to water elevator so as to be driven from the apparatus.

When elevator-compression-decompression-chamber 325 is filled via moderately-elevated-water-source-pipe 435 and the opening of moderately-elevated-water-source-valve 440, then buoyant-object 75 becomes buoyant, swing-check-valve-flapper 360 is opened, and buoyant-object 75 moves through swing-check-valve 370, and floats upward in uptube 70 as shown in FIG. 15D and detail FIG. 15E. Buoyant-object 75's progress is eventually stopped by top landing pad 340, which abuts to uptube-ceiling 275 and the upper walls of uptube 70 as in FIG. 15F and detail FIG. 15G. Buoyant-object's car embodiment of arbitrary mass 350 is removed from the apparatus by opening top-exit-door 335 and buoyant-object-door 345, where upon car embodiment of arbitrary mass 350 utilizes exit ramp 310 to reach elevated-landmass-structure 315 under its own motive force (the car's engine).

Embodiment 1—Water Elevator Explanation of Design and Operational Details

The goal of embodiment 1 shown in FIG. 15A-15H, is to lift car-embodiment-of-an-arbitrary-mass 350 encapsulated in a buoyant-object 75 to a specific height so as to reach elevated-landmass-structure 315. With a properly engineered buoyant-object 75 the water elevator embodiment 1 can lift buoyant-object 75 with its enclosed arbitrary mass 350 through the single elevator-compression-decompression-chamber 325 to the top of the elevated-land-structure 315, where upon the buoyant-object 75 is opened via water tight buoyant-object-door 345 and car-embodiment-of-an-arbitrary-mass 350 is removed by way of top-exit-door 335. The general objective of this embodiment type is to lift a relatively large amount of weight (in tons) up a considerable height (e.g. hundreds of feet) using as much of the earth's energy (gravitational energy) as possible, and with as little electrical energy or input as possible. Since the embodiment of FIG. 15A-15H is very general, in that it can lift any shape (example encapsulated car shown), of any relative size/weight, to virtually any desired height (short of the edge of space), it is helpful to see how such a buoyant-object 75 and other associated components within the embodiment are sized and designed before the operational details of the embodiment are undertaken. This is done in the next paragraph by making the very general mass levitator embodiment take on practical dimensions and by applying the embodiment to a practical application.

With the goal of embodiment specificity and simplification in mind, the design goal for this embodiment consists of a floatable reusable buoyant-object 75, sized to enclose and accommodate the entry/exist of a variety of small vehicles (i.e. the car-embodiment-of-an-arbitrary-mass 350 is a car/trucks that will be levitated), and to provide a lift force (buoyancy) sufficient to float the highest imagined weight of these various vehicles types to the top of the elevated-landmass-structure 315. To be even more concrete, suppose the engineering goal is to elevate various vehicles to the top of a landmass structure 1000 feet tall using the water elevator embodiment shown in FIG. 15A-15H. In this case the car/truck is the arbitrary object to be lifted to a specific destination, which is at the specific elevation of 1000 ft above the ground-level 280. The designer generally needs to understand the volume and weight constraints of the objects to be lifted in order to be sure that the embodiment will generate sufficient buoyancy. Hence a specific volume and weight upper limit (design target) will need to be estimated and then used in the design of the embodiment. By way of example, an average car is roughly 10 ft long, 5 feet wide, about 4 feet tall, and weighs about 4,000 pounds. To give the elevator sufficient space to accommodate the dimensions of the vehicle, a space on the order of a two car garage could be utilized for the size of the buoyant-object that will encapsulate the car, say 20 ft×20 ft×20 ft. This volume target should be more than sufficient for most vehicles to enter and park inside the buoyant-object 75 with some room to spare, or to accommodate oversized/bigger vehicles if they still conform to the upper weight limits of the design (which are about to be calculated). This buoyant-object 75 of twenty cubic feet displaces 8000 cubic feet of water, and where each cubic foot of water weighs about 62.4 pounds. By Archimedes law of buoyancy, if the car plus encapsulating buoyant-object 75 weight less than water displacement of about 8000 ft3×62.4 lbs/ft3=499,200 lbs (about 250 tons), then the buoyant-object will float to the top. Since the car only weighs about 4,000 pounds (2 tons) the composition of the enclosing buoyant capsule can be quite heavy and still lift the load.

If 75% of the displaced water volume by weight is used (75% load factor) in the engineering calculation for an estimate of the useable and available force of buoyancy (to move the capsule upward with acceptable acceleration and speed), then the buoyant-object 75 must weigh less than 374,000 pounds (about 187 tons). If the buoyant-object 75 is composed of, and fabricated from, ½ inch ship grade steel plate, (the six sided cube has about 120 ft2 of surface area) and given that 20 ft2 of steel plate weighs about 8200 pounds each, the total weight of the buoyant capsule will be about 50,000 pounds (25 tons). This leaves over 300,000 pounds (150 tons) of surplus force available. From these simple calculations we conclude that there is no issue lifting the weight of almost any imaginable vehicle that will fit in the enclosed space. Because there is so much surplus power available it may become necessary to take on ballast (buoyant-object-ballast 375 in FIGS. 10D, and 15C) to reduce the speed and force with which the buoyant-object 75 moves upward. From the dimensions of the buoyant-object just designed (a cube 20 feet in each dimension) we know that the square cross section of the lifting tube structure needs to be slightly bigger than the 20 ft by 20 ft to accommodate the cross section of the cubic buoyant-object, and from the lift design elevation goal of 1000 feet, the overall embodiment structure is slightly over 1000 feet high. At this point the major design parameters of for embodiment 1 are known (assuming we do not have to worry about how much water is used by the apparatus).

The energy price for levitating vehicle 380 to the top of elevated-landmass-structure 315 is the energy cost of the acquiring the water required to fill the elevator-compression-decompression-chamber 325. If the water resource is a naturally renewable quantity, for example, provided by mountain run off or other natural phenomena, then the major "costs" associated with operating the system principally consist of the energy required to run associated computers (e.g. electronic-control-equipment 120), open the valves associated with the water flow, which in turn run the compression/decompression cycles of the apparatus. It is clear that the energy input required to run the apparatus as a whole is arguably much smaller than the energy required to lift the mass of the various vehicle to the elevation H, some 1000 feet above ground level.

Embodiment 1 is generally controlled and monitored by, and new running states are activated by, an experienced system-operator 390, who utilizes the touch sensitive system display and graphic user interface 395 to provide touch panel commands to electronic-control-equipment 120 via controls-cables 125. Water temperature, buoyant-object 75 position, water flow, water pressure, and water height to name a few, can also be monitored, recorded, and possibly controlled via electronic-control-equipment 120 using various industrial sensors (e.g. proximity, temperature, pressure sensors) heating coils, and mechanical actuators (not shown in FIGS. 15A-15H) and used as part of the feedback process directed by the computer and computer control software contained in electronic-control-equipment 120 and/or by the initiative of system-operator 390 via system-display-gui 395.

The "initialization state" (FIG. 15A,15B,15C) of the embodiment begins when buoyant-object 75 is empty (contains no arbitrary mass), is seated at the bottom of the apparatus on bottom-landing-pad 270, and the elevator-compression-decompression-chamber 325, formed by walls of compression-decompression-swing-check-valve 370, compression-decompression-tube 365, bottom-landing-pad 270, high-pressure-equalization-tube 60, and attached electronic control valves 50 and 160 is empty and contains only air (i.e. the less-dense fluid). In addition the standing-column-of-water 330 must exist, by filling the water chamber formed from the sides of uptube 70 and bounded on the bottom by of swing-check-valve-flapper 360 and on the top by the top-landing-pad 340 which abuts to uptube-ceiling 275, which is the top most physical structure of the apparatus. Filling of the water column proceeds by opening reservoir-electronic-control-valve 140 so that water from elevated-fluid-reservoir 135 can flow through reservoir-fill-pipe 145, into the uptube 70. This is accomplished via the electronic-control-equipment 120 which monitors the uptube-water-level 100 via uptube-water-level-sensor 170, and actuates reservoir-electronic-control-valve 140. At this point the standing-column-of-water 330 exists but the bottom portion of the device (elevator-compression-decompression-chamber 325) is still empty. To load the car by driving it into elevator-compression-decompression-chamber 325 the water tight door 285 are opened, and buoyant-object 75's water tight doors 345 are opened. Note that the apparatus requires several structural members to support the weight of standing-column-of-water 330, these structural members are shown as structural-supports 130 in FIG. 15A.

At this point the embodiment's "initialization state" ends and the system "load state" begins by driving the vehicle 380, shown as a car in FIG. 15C, up entry-ramp 310 through elevator-compression-decompression-chamber 325's opened water-tight entry-doors 285, and then driving through the buoyant-object 75's open buoyant-object-door 345. Car 380 then parks in buoyant-object 75 where it becomes car-embodiment-of-an-arbitrary-mass 350. Next buoyant-object 75 closes buoyant-object-door 345, after which the elevator-compression-decompression-chamber's water-tight doors 285 are closed. During the "load stage" standing-column-of-water 330 exerts a downward force on swing-check-valve-flapper 360 when the elevator-compression-decompression-chamber 325 is empty of water. Hence electronic-elevator-swing-check-valve 370 must be capable of holding back the full pressure of standing-column-of-water 330 (e.g. 1000 feet of water generates a pressure equal to 2310 pounds per square inch) within some acceptable standard of leakage from swing-check-valve-flapper 360. If the desired elevation is great, and the engineering effort and associated costs of creating a suitably leak free electronic-elevator-swing-check-valve 370 is large, the pressure differential from standing-column-of-water 330 can be handled via multiple compression-decompression chambers and multiple swing check valves so as to share the pressure load (this configuration is not shown). The acceptable level of leakage while in the "load stage" will depend on the relative abundance of water in elevated-fluid-reservoir 135, where the more scarce the water reserves, the less leakage will be acceptable, and the better the seal will be required from swing-check-valve-flapper 360. For this embodiment it is assumed that the water in 135 is replenishable via an up-hill stream, via water-pump 175, from rain fall, or via other means such that sufficient water is always available to run the levitator.

The "levitate state" begins when buoyant-object 75, contains the car-embodiment-of-an-arbitrary-mass 350, when we have an empty elevator-compression-decompression-chamber 325, when all water tight doors (285, 325) are closed an sealed, and when standing-column-of-water 330 exists and is awaiting its first use. Next electronic-high-pressure-fluid-valve 50 is commanded to be open by electronic-control-equipment 120, and elevator-compression-decompression-chamber 325 is flooded and completely filled with water that flows from uptube 70 through high-pressure-equalization-tube 60 and into elevator-compression-decompression-chamber 325. At the same time water is released by electronic command signals propagating along control-cables 125 from electronic-control-equipment 125 to actuate and open reservoir-electronic-control-valve 140. Reservoir-electronic-control-valve 140 releases water from elevated-fluid-reservoir 135 along associated reservoir-fill-pipe 145, so as to maintained uptube-water-level 100 slightly above the desired height H (i.e. H approximately 1000 ft in this example). Elevated-fluid-reservoir 135 is required to be at a slightly higher elevation than height H, so as to permit water flow via gravity to refill the uptube 70 as needed in order to maintain water at the desired height. Water levels are automatically maintained and controlled by electronic-control-equipment 125 which monitors and records uptube-water-level-sensor 170, and electronically actuates reservoir-electronic-control-valve 140 when water levels are low. Water temperature, buoyant-object 75 position, water flow, water pressure, and water height to name a few, can also be monitored, recorded, and possibly controlled via electronic-control-equipment 120 using various industrial sensors (e.g. proximity, temperature, pressure sensors) heating coils, and mechanical actuators (not shown in FIG. 15A) and used as part of the feedback process directed by the computer and computer control software contained in electronic-control-equipment 120 and/or by system-operator 390 via system-display-gui 395. Electronic-control-equipment 120 such as the widely available Programmable Logic Controller (PLC) are in common use by industry today, as are the above described sensors, and controlling PLC software that is designed to monitor the sensor, actuate fluid valves, make decisions based on internal sensor set points, and actuate various mechanical devices when needed.

Once elevator-compression-decompression-chamber 325 is filled with water and the pressure within elevator-compression-decompression-chamber 325 is equalized (placing elevator-compression-decompression-chamber 325 is in a high pressure compressed fluid state) due to fluid communication occurring through electronic-high-pressure-fluid-valve 50 and high-pressure-equalization-tube 60 with the uptube 70. The buoyancy of buoyant-object 70 must now be sufficient to lift the submerged weight of swing-check-valve-flapper 360. This is achieved by knowing the submerged weight and buoyancy of swing-check-valve-flapper 360 which in turn determines the amount of upward force required to open swing-check-valve-flapper 360 when in the decompressed state. The weight and required upward force on open swing-check-valve-flapper 360 is not generally a significant design issue since the buoyancy of open swing-check-valve-flapper 360 can be increased or even made to float. Alternatively swing-check-valve-flapper 360 can be electronically actuated such that the flapper opening/closing can be facilitated by swing-check-actuator 400 via its solenoid rod and coil as shown in FIG. 15C, which uses the same basic component parts of electronic-swing-check-valve 557 in FIGS. 7A and 7B. The more detail view provided by FIG. 7A shows that electronic-elevator-swing-check-valve 370 is an example of electronic-swing-check-valve 557 which is attached to the elevator-compression-decompression-chamber 325. Also from FIG. 7A it can be seen that swing-check-actuator 400 and swing-check-valve-flapper 360 have many subcomponents that can be identified from FIG. 7A as solenoid-rod 530, solenoid-coil 535, check-valve-flapper-pivot 540, check-valve-flapper 550, check-valve-flapper-seal 560, check-valve-flapper-ledge 565, and check-valve-sliding-means 570.

Upon equalization and compression of elevator-compression-decompression-chamber 325, the buoyant-object 75 will become buoyant and move under the motive force of buoyancy so as to open swing-check-valve-flapper 360, whereupon the entire buoyant-object 75 containing car-embodiment-of-an-arbitrary-mass 350 of mass M (equal to about 4000 pounds in this example embodiment) will float upward to the uptube-water-level 100, which also corresponds to height H (equal to slightly more than 1000 feet in this embodiment), where its progress will be halted by contact with top-landing-pad 340 (see FIG. 15D-15H). Top-landing-pad 340, and the uptube-ceiling 275 are designed to stop the buoyant-object such that when buoyant-object-doors 345 are opened, the top of 345 is aligned with the top of top-exit-door 335 and the bottom is aligned with the top of the exit-ramp 310. In addition Top-landing-pad 340 can be designed to be deformable and compressive so as to absorb surplus inertial motion of buoyant-object 75, and thus act as a shock absorber when buoyant-object 75 is abruptly stopped.

The shape of the buoyant-object 75 as shown in FIG. 15C has been intentionally altered in this embodiment from a simple cube in that:

1. the top has been rounded to be more bullet like so as to reduce fluid drag, and hence increase motional speed and reduce turbulence.

2. the square sides have been maintained so as to match the internal sides and contours of the uptube 70, and elevator-compression-decompression-chamber 325 which also act as guided-means for buoyant-object 75 to remain upright and stable in its accent to top-landing-pad 340.

At this point in time (FIG. 15G) the embodiment has enter the "unload/reload" state where the car-embodiment-of-an-arbitrary-mass 350 can be extracted at the top of the standing-column-of-water 330 by opening the apparatus water proof top-exit-door 335, and water tight buoyant-object-door 345. Elevated-car 385 is driven out through buoyant-object-door 345 and top-exit-door 335 down exit-ramp 310 on to elevated-landmass-structure 315. The Elevated-car 385 has now gained Potential Energy PE=MGH where M is the mass, G is the constant of gravitation, and H is the height of the elevated-landmass-structure 315 and PE is the gain in potential energy. A new vehicle (a different elevated-car 385) already present on elevated-landmass-structure 315 can now take the reverse course just describe and be loaded back into the buoyant-object 75, by way of exit-ramp 310 and top-exit-door 335, buoyant-object-door 345. Doors 335 and 345 are then closed, sealed and readied for the "decent stage".

In this simple embodiment there is no energy conversion subsystem, so there is no corresponding "energy conversion" system state. However, conversion of the potential energy gained by elevated-car 385 to other forms of energy can still be achieved by other means (not shown), such as by rolling/coasting the car downward on a sloping incline so as to increase its speed and acceleration, thereby converting the increased potential energy to kinetic (motional) energy. Alternatively, if the car is a new hybrid model which is equipped with an electric generator attached to the wheel's braking mechanisms, then the car can convert some of this motional kinetic energy directly to electricity. The electrical power from the braking generators is transferred to, and stored in, the hybrid car's enclosed battery, which can be consumed later by the vehicle's enclosed electric motor (again not shown).

The system can enter a "descent" state in two ways, first by slowly purging water from the entire embodiment (not the buoyant-object 75) whereby buoyant-object 75 descends back to the ground level 280 where it again rests upon bottom-landing-pad 270. Or, secondly by changing the buoyancy of buoyant-object 75 so that less water is consumed.

Using this first method, when there is an abundance of elevated water, water release occurs when uptube 70 is still in fluid communication with the elevator-compression-decompression-chamber 325 by way of high-pressure-equalization-tube 60 when electronic-high-pressure-fluid-valve 50 and electronic-water-drain-valve 160 is opened by electronic-control-equipment 120 so as to purge water via water-dump-pipe 305 to water-sink 265 which can be a public sewer connection or a gravity feed to a body of water at a lower elevation. During the decent stage it is possible for swing-check-valve-flapper 360 to close prematurely as water level decrease, thereby preventing buoyant-object 75 from passing into elevator-compression-decompression-chamber 325. To prevent such an unwanted event, swing-check-valve-flapper 360 is temporarily locked in place by electronically actuated swing-check-actuator 400 which is controlled via electronic-control-equipment 120. To complete the "descent" state swing-check-valve-actuator 400 is released which permits gravity to close swing-check-valve-flapper 360, at which point the standing-column-of-water 330 can be re-established by electronically opening reservoir-electronic-control-valve 140. This permits water to flow from elevated-fluid-reservoir 135 into uptube 70 via reservoir-fill-pipe 145. Note that using the first method the entire column of standing water 330 must be refilled, which is not an issue in some cases, for example if you are at the foot of a Dam. The system now enters the "initialization" state after the fluid levels in uptube 70 have been re-established. The entire cycle comprising "initialization", "load", "levitate", "unload/reload", "energy conversion", and "decent" state can be repeated indefinitely as long as water reserves in elevated-fluid-reservoir 135 are sufficient and replenished when the next cycle is initiated.

When water reserves at elevated-landmass-structure 315 are not sufficiently abundant, or when an elevated water source is not available at the top of elevated-landmass-structure 315 in FIG. 15A, then the second method to make the buoyant-object 75 descend can be used, which consists of making several slight modifications to the first descent stage, namely:

1. do not purge water from the entire embodiment, instead make buoyant-object 75 variably buoyant by taking on ballast so that the buoyant-object 75 can be made to sink during the embodiment's decent state.

2. then purge the water at ground level from the ballast tank such that buoyant-object 75 is again buoyant when the "levitate" state is active.

3. empty and refill only the elevator-compression-decompression-chamber 325 from a less elevated, less pressurized water source such as moderately-elevated-water-source 405.

Figure 15G:
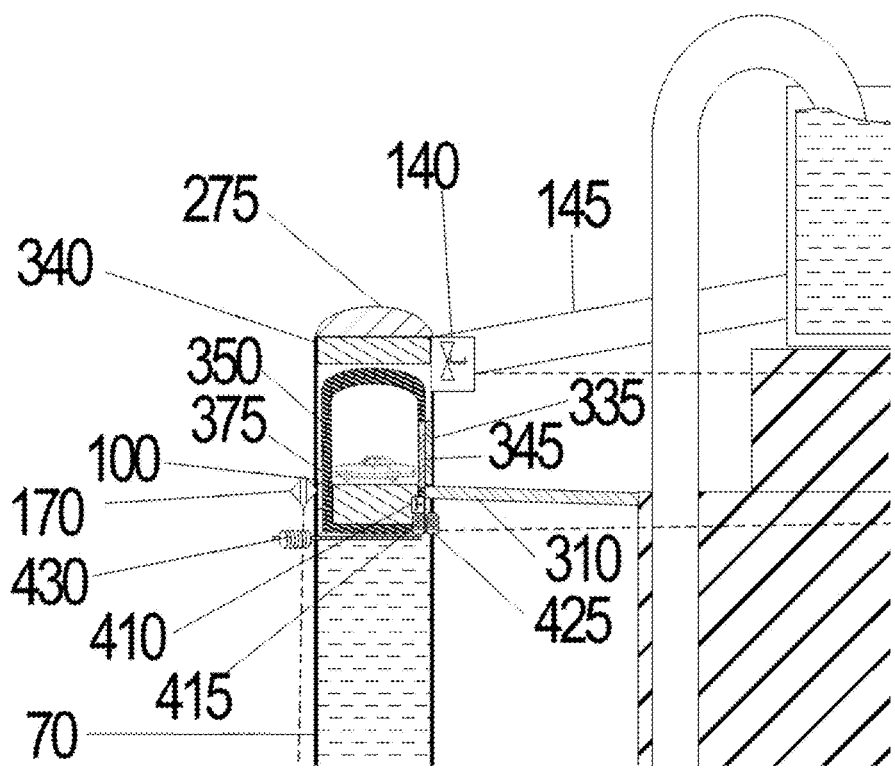
FIG. 15G—close up view of top section of FIG. 15E.
Figure 15H:
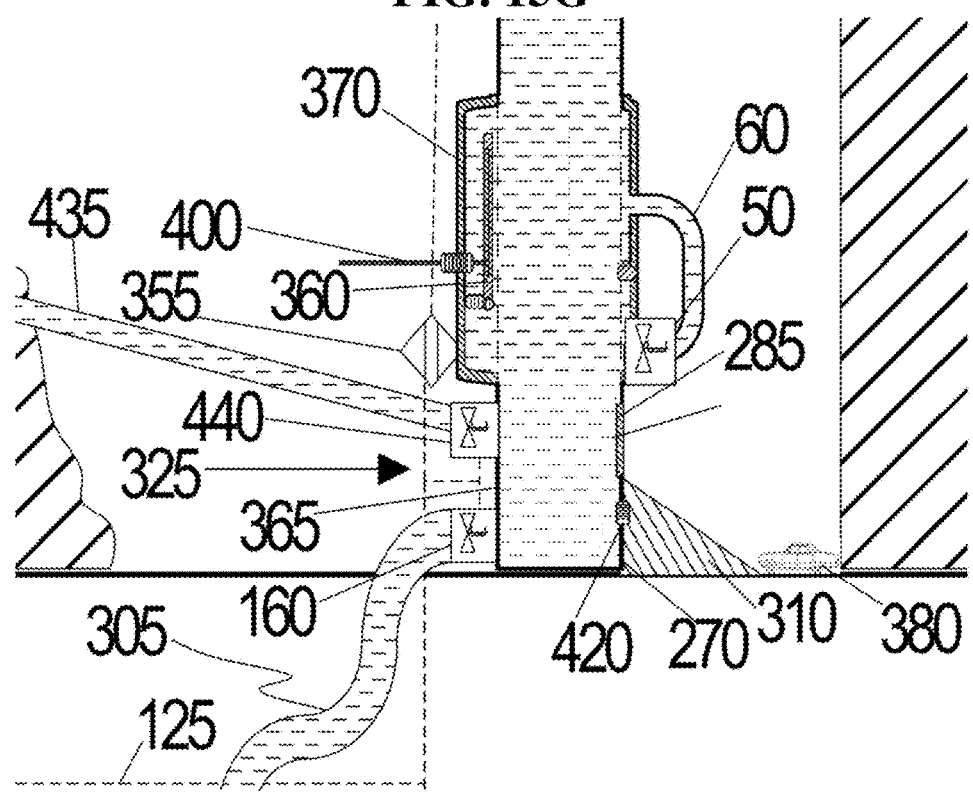
FIG. 15H—close up view of bottom section of FIG. 15E.

This alleviates the requirement to completely purge standing-column-of-water 330 when buoyant-object 75 is in the "descent" state of operation, thereby saving an enormous amount of water. To accomplish this water saving goal buoyant-object 75's buoyant-object-ballast 375 is identified as really being a ballast tank with a variable quantity of water in the tank as shown in FIG. 10D item 376. Buoyant-object-ballast 375 can take on, or remove water from its ballast tank by opening ballast-tank-water-valve 410 (FIG. 10D, FIG. 15G). The command to open the valve is received from electronic-control-equipment 120 through control-cables 125. When commanding ballast-tank-water-valve 410 open, control-cable 125 electromagnetically couples power inductively to buoyant-object 75 through lower-power-induction-coil 420, when buoyant-object is docked on bottom-landing-pad 270, or couples power inductively through upper-power-induction-coil 425 when buoyant-object 75 is docked to top-landing-pad 340. Power is received in buoyant-object 75 via buoyant-object-power-induction-coil 415 which is adjacent to, upper or lower power-induction-coils 420, 425 so as to receive external power. When power is present on buoyant-object-power-induction-coil 415 ballast-tank-water-valve 410 is drive open. When power is removed from buoyant-object-power-induction-coil 415, ballast-tank-water-valve 410 closes. In both instances water flows in or out of buoyant-object 75 under the force of gravity only when the ballast-tank-water-valve 410 is open (note other methods such as pumping water out of ballast-tank-water-valve 410 are also possible, but not shown in this embodiment).

When buoyant-object 75 is docked at the top of the apparatus (FIG. 15G) and touching top-landing-pad 340, and when electronic-control-equipment 120 is ready to initiate the descent state, electronic-control-equipment 120 provides power through control-cables 125 to upper-power-induction-coil 425, and supplies coupled power to ballast-tank-water-valve 410. In addition mechanical-stop 430 is actuated by electronic-control-equipment 120 forcing solenoid rod into uptube 70 so as to prevent movement of buoyant-object 75 when ballast is being added to the capsule. At this point buoyant-object-ballast 375 takes on water until it is full (or until the electronic-control-equipment 120 turns power off) causing buoyant-object 75 to no longer be buoyant, hence it sinks under the force of gravity as soon as mechanical-stop 430 is deactivated and retracted. The rest of the decent state operational description is unchanged from that which has been already described.

When buoyant-object 75 is docked at the bottom of the apparatus and touching bottom-landing-pad 340, and when electronic-control-equipment 120 is ready to initiate the "levitate" state, electronic-control-equipment 120 provides power through control-cables 125 to lower-power-induction-coil 420, and supplies coupled power to ballast-tank-water-valve 410. At this point elevator-compression-decompression-chamber 325 has been purged of water and is empty, therefore buoyant-object-ballast 375 purges water under the force of gravity until buoyant-object-ballast 375 is empty (or until the electronic-control-equipment 120 turns power off) causing buoyant-object 75 to be buoyant when surrounded by water. The rest of the "levitate" state operational description is unchanged.

Connections to a moderately-elevated-water-source 405 are optionally provided as a water reduction mechanism. Given that buoyant-object 75 has been provided with the means to be variably buoyant, it is no longer necessary to purge the water from standing-column-of-water 330 in order to make buoyant-object 75 descend. The only chamber that needs to be cyclically refilled is the elevator-compression-decompression-chamber 325, which can be refilled by any water source with an elevation only slightly greater than the top of swing-check-valve-flapper 360. Optionally this could also be supplied by a public/municipal water supply that provides adequate water pressure to fill elevator-compression-decompression-chamber 325. To effect this change, moderately-elevated-water-source 405, along with moderately-elevated-water-source-pipe 435 that connects moderately-elevated-water-source 405 to elevator-compression-decompression-chamber 325 by way of moderately-elevated-water-source-valve 440 is utilized. Using the more water conservative "levitate" state, moderately-elevated-water-source-valve 440 is opened by electronic-control-equipment 120 sending control and power signals through control-cables 125 whereby water from moderately-elevated-water-source 405 flows through moderately-elevated-water-source-pipe so as to fill elevator-compression-decompression-chamber 325. The rest of the "levitate" operational steps remain unchanged.

Water-pump 175 and associated pipes can also be utilized to reduce water consumption such that the elevated-fluid-reservoir 135 can be filled by water-pump 175, eliminating the need to find an elevated water source on the elevated-landmass-structure 315. Water-pump 175 is connected to elevated-fluid-reservoir 135 via water-pump-pipe 180 and pump-shutoff-valve 185, and is connected to moderately-elevated-water-source 405 via water-pump-intake-pipe 445. Electronic-control-equipment 120 commands and powers water-pump 175 to pump water in an upward direction and opens pump-shutoff-valve 185 to initiate water flow from moderately-elevated-water-source 405 to the top of elevated-fluid-reservoir 135, when elevated-fluid-reservoir-sensor 450 relays a fluid-low signal to electronic-control-equipment 120. The operationally elevated-fluid-reservoir 135, when used in conjunction with the variably buoyant buoyant-object 75, no longer needs to fully replace standing-column-of-water 330 on each use of the water elevator, instead elevated-fluid-reservoir 135 is used to initially fill standing-column-of-water 330, and thereafter will only replace water due to system leakage.

FIG. 16A-16I Embodiment 2, Ship Lift Mass Levitator at Dam

Embodiment 2, is a derivation and evolution of embodiments 1, in that the mass levitator is being used in FIG. 16A-16M as a ship/marine lift, which levitates a ship or other floating body to the top of a dam instead of car. Embodiment 2 FIG. 16A-16M is similar to Embodiment 1 FIG. 15A-15M in that if retains the basic structure of the Embodiment 1's water elevator (i.e. the structure of FIG. 15A), but it now requires a water entry point and exist point to and from the apparatus such that a ship or boat can enter, as opposed to the ramp entrance/exit of Embodiment 1 which was designed for cars or trucks.

Major changes in the physical structure from FIG. 15A-15M to support ship levitation include:

1. Addition of dam-wall-extension-overhang 470 that supports elevated-water-channel 475.

2. Elevated-landmass-structure 315 becomes wall-of-dam 460 which represents the physical mass of the dam that holds back the dam's waters.

3. All references to elevated-fluid-reservoir 135 and its associated pipes, valves, and sensors (140,145,135,170, 450), have been removed since the elevated water level at the top of the dam serves the purposes of the elevated-fluid-reservoir 135.

4. Uptube-water-fill-valve 465 now assumes the functionality of refilling standing-column-of-water 330 instead of reservoir-fill-pipe 145.

5. Lower sealable water tight entry-door 285 used in embodiments FIG. 15A-FIG. 15I to gain entrance into elevator-compression-decompression-chamber 325 and which opened to air in FIG. 15A-15I, now become in FIG. 16A-16I a lock-gate-to-compression-decompression-chamber 505 which opens to water filled lower-ship-channel 500, and where lower-ship-channel 500 is in fluid communication with the elevator-compression-decompression-chamber 325 when the top-lock-gate 485 are open.

6. Similarly at the top of the apparatus sealable water tight top-exit-door 335 used in FIG. 15A-15I to exit at the top of the apparatus and which previously opened to air, becomes a top-lock-gate 485 which now opens to water filled upper-ship-channel 475 which is in fluid communication with standing-column-of-water 330 when top-lock-gate 485 is open.

7. Compression-decompression-chamber 6 now drains to lower-ship-channel 500 when electronic-water-drain-valve is opened via electronic-control-equipment 120 by signals traveling along control-cables 125.

8. The water level and pressure in compression-decompression-chamber 325 equalizes to that of lower-ship-channel 500 when open.

9. car-embodiment-of-an-arbitrary-mass 350 becomes ship-embodiment-of-an-arbitrary-mass 495, while elevated-car 385 becomes elevated-ship 490, and car-at-ground-level becomes unelevated-ship 455.

FIG. 16A-16I Ship Mass-Levitator Detailed Description

From a simplistic view point the open loop system embodiments (FIG. 1A, 15A-25H, 16A-16M) described herein are analogous to a more sophisticated water lock system that utilizes the mass-levitator principles of operation. Consider that a conventional water lock is intended to transfer a boat or other floating object from a region of lower water level to a region of higher water level or vice versa. When a boat owner wants to raise his vessel's elevation, the boat is first moved into the lock system chamber. Once the boat enters the lock chamber, the lock's doors are closed, and the water level in the lock chamber is increased by flooding the chamber with the water that already exists at the higher elevation. The water exists at the higher elevation level because of the planetary process of water evaporation and rain fall, and this is in a sense a form of free energy supplied by the planet on a perpetual basis (another form of stored energy created by gravity and the sun). Since sufficient water already exists at the higher elevation in this case, the water simply flows downhill to fill the lock chamber, and no physical pumping action is require (but could be used). As the water level rises, the boat rises and consequentially increases its potential energy, until the water levels at the higher elevation are equalized with the lock water level. At this point the lock gates can be opened and the boat proceeds onward with its journey. Note that the potential energy gained by the boat is greater than the energy that was supplied by the lock operator and his equipment (the lock infrastructure), since the main lifting agent is buoyancy generated by the water that need only flow downhill into the ingenious device. The lock operator simply needed to assure that the lock doors are opened and closed when required, and then let the water do the real work. Given a suitable lock mechanism like that employed at the Panama Canal, the amount of energy required to close the lock doors and run the lock system can be minimal compare to the energy expended by the water to lift the boat. T\he Panama Canal lock system accomplishes this energy minimization and optimization by partially floating the lock doors and creating extremely well balanced pivots for the doors to move on. Hence the planet in the form of elevated-water-reserves ultimately supplies the majority of energy used to raise the ship in the lock. The source and origin of energy utilized by the canal system is well understood as are the forces of buoyancy, and the role of gravity that act on the boat and water in this application.

Figure 16A:
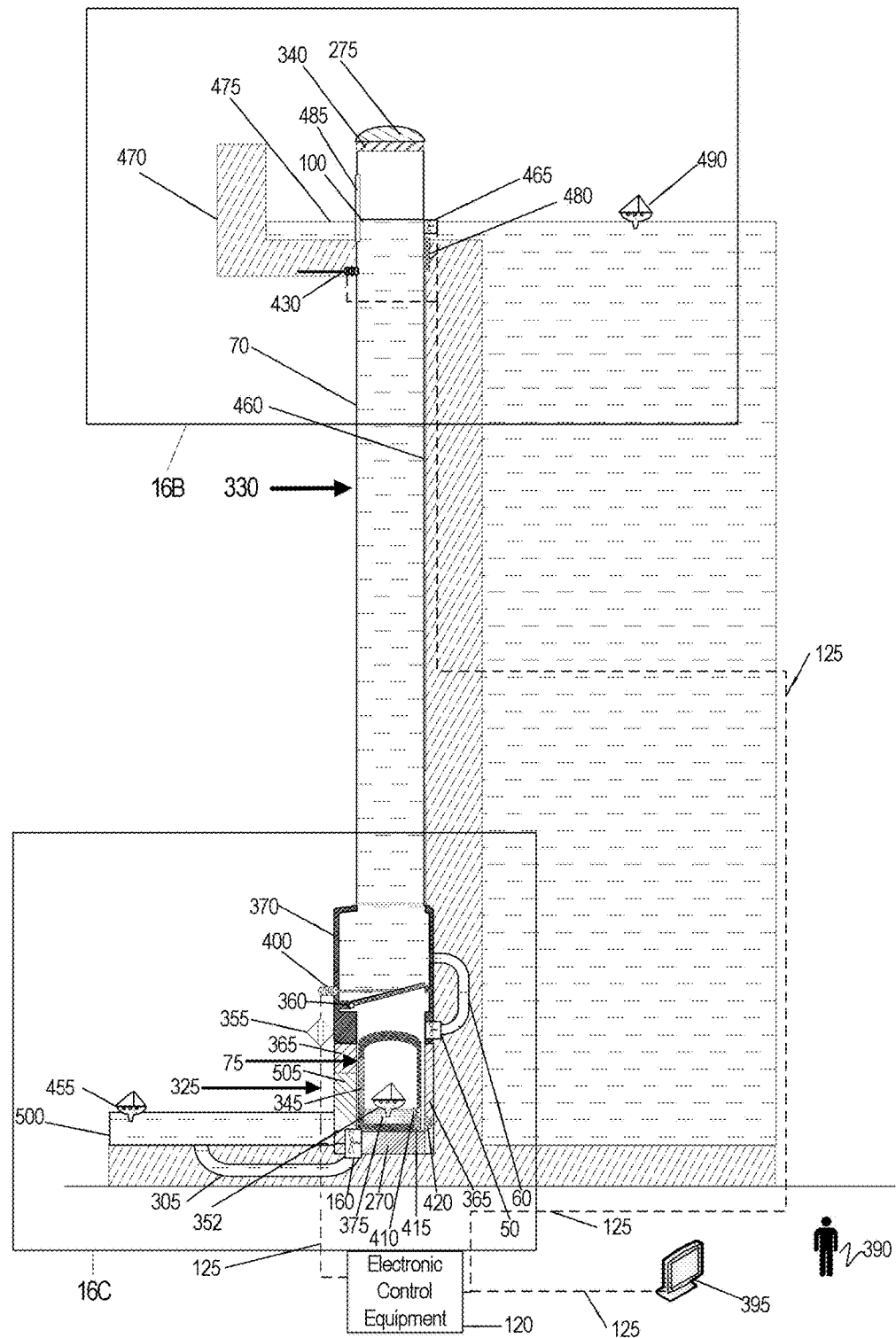
FIG. 16A—ship lift mass-levitator in fill stage after ship has been loaded into buoyant-object and when water has already been purged from the compression-decompression chamber.
Figure 16B:
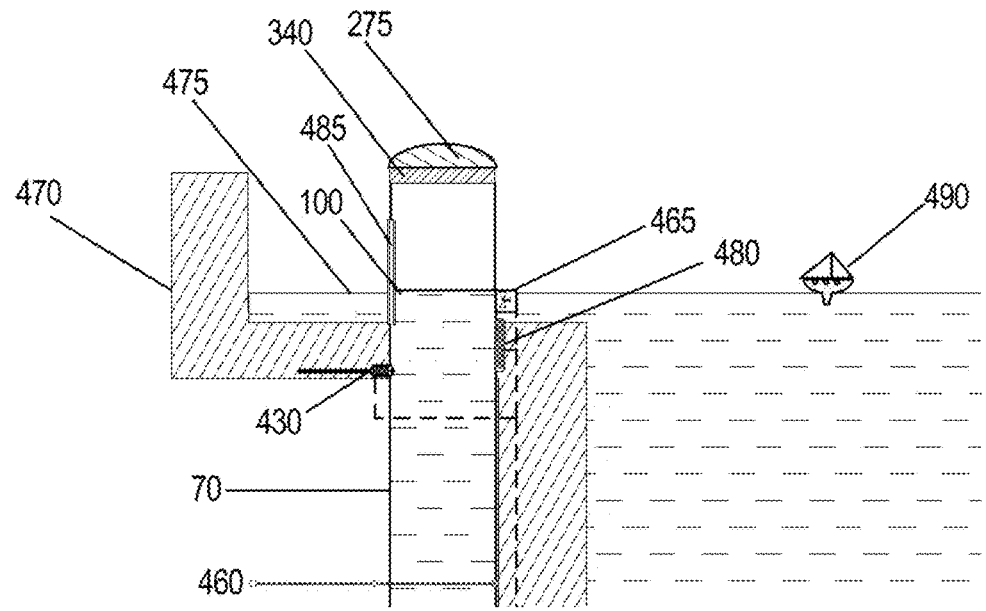
FIG. 16B—close up view of top section of FIG. 16A.
Figure 16C:
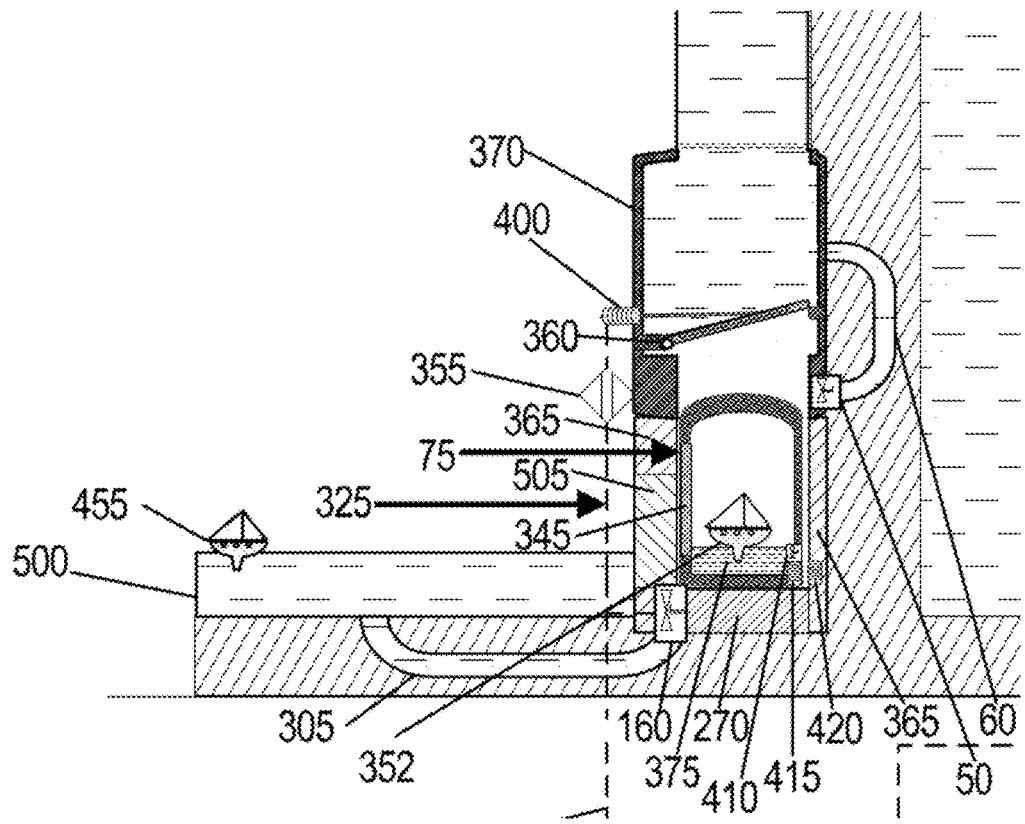
FIG. 16C—close up view of bottom section of FIG. 16A.

The ship levitator embodiment 2 of FIG. 16A-FIG. 16M, does not require the large continuous water flows of a lock system, yet retains some similarities and analogies to the hypothetical lock system, while removing some of its limitations: primarily the height to which a ship can practically be levitated. As will be shown the mass-levitator methods and embodiments are much more efficient with respect to water use, yet can be made to accomplish a similar goal. In FIG. 16A buoyant-object 75 no longer contains buoyant-object-ballast tank 375, instead the entire hollow interior of buoyant-object 75 acts as a ballast tank (see FIG. 10E). Buoyant-object 75 takes in water and the unelevated-ship 455 during the "load" state when unelevated-ship 455 moves under its own motive force into the interior space of buoyant-object 75 through open lock-gate-to-compression-decompression-chamber 505 and then through buoyant-object-door 345 (FIG. 16A, FIG. 16C). The entire cycle comprising "initialization" (FIG. 16A, detail FIG. 16B, detail FIG. 16C), "load", "levitate" (FIG. 16D, detail FIG. 16E), "unload/reload" (FIG. 16F, FIG. 16G), "energy conversion", and "descent" state (FIG. 16I, FIG. 16K) described via the text of FIG. 15A-H are still valid with a few minor changes described below.

When buoyant-object 75 is docked to top-landing-pad 340 (FIG. 16H, detail FIG. 16I) it is able to enter the "descent" state, that is when ballast-tank-water-valve 410 opens the buoyant-object 75 descends until it reaches mechanical-stop 430. By the time buoyant-object 75 reaches the level of mechanical-stop 430 it is no longer buoyant, that is after buoyant-object 75's internal water levels and pressures are equalized to levels imposed by mechanical stop 430 due to the in rush of water that occurs when open ballast-tank-water-valve 410 is open. To keep open ballast-tank-water-valve 410 in an open state, upper-power-induction-coil 425 must be extended in length to support downward movement of buoyant-object 75, since additional water is added during its descent to mechanical stop 430. An alternative solution that does not require the extension of upper power-induction coil 425 would be to include sufficient internal electrical power, sensors, and controls such that buoyant-object 75 is self-sufficient and able to determine (through internal computer analysis of system sensors and/or by other means) when enough water ballast has been taken on to make buoyant-object 75 descend with the proper speed.

When buoyant-object 75 is docked to bottom-landing-pad 270 after its descent state is complete (FIG. 16L, detail FIG. 16M), and after elevator-compression-decompression-chamber 325 has purged water and equalized its water level via water-dump-pipe 305, the internal water level in buoyant-object 75 is higher than the level of water in lower-ship-channel 500. At this time electronic-control-equipment 120 opens ballast-tank-water-valve 410 by way of buoyant-object-power-induction-coil 415 which couples power from lower-power-induction-coil 420. This action places the fluid interior of buoyant-object 75 in fluid communication with lower-ship-channel 500 so as to equalize the water levels and water pressure between both fluid bodies. When Equalization is completed lock-gate-to-compression-decompression-chamber 505 and buoyant-object-door 345 can be opened so as to permit any enclosed ship (acting as the enclosed arbitrary mass) to exit the apparatus under its own motive force.

Time-Sequence Through the Embodiment's States

To be complete the states of embodiment 2 are reviewed in time sequence order. In FIG. 16A compression elevator-compression-decompression-chamber 325 has swing-check-valve-flapper 360 closed, water has been purged following the last "descent" state by opening electronic-water-drain-valve 160 so as to equalize water to lower-ship-channel 500 by the fluid connection water-dump-pipe 305 which is controlled by electronic-water-drain-valve 160. Water levels within the buoyant object 75 have also reached the level of lower-ship-channel 500 when ballast-tank-water-valve 410 has been opened so as to remove excess ballast fluid so as to make buoyant object 75 once more buoyant. Buoyant-object 75 sits on bottom-landing-pad 270.

FIG. 16A also shows unelevated-ship 455 already present inside buoyant-object 75 so as to become ship-embodiment-of-an-arbitrary-mass 352. Unelevated-ship 455 has already entered buoyant-object 75 during the "load" state, when lock-gate-to-compression-decompression-chamber 505 is open along with buoyant-object-door 345. Ship-embodiment-of-an-arbitrary-mass 352 having entered into buoyant object 75, now floats on the internal water ballast 375, contained in buoyant-object 75.

Figure 16D:
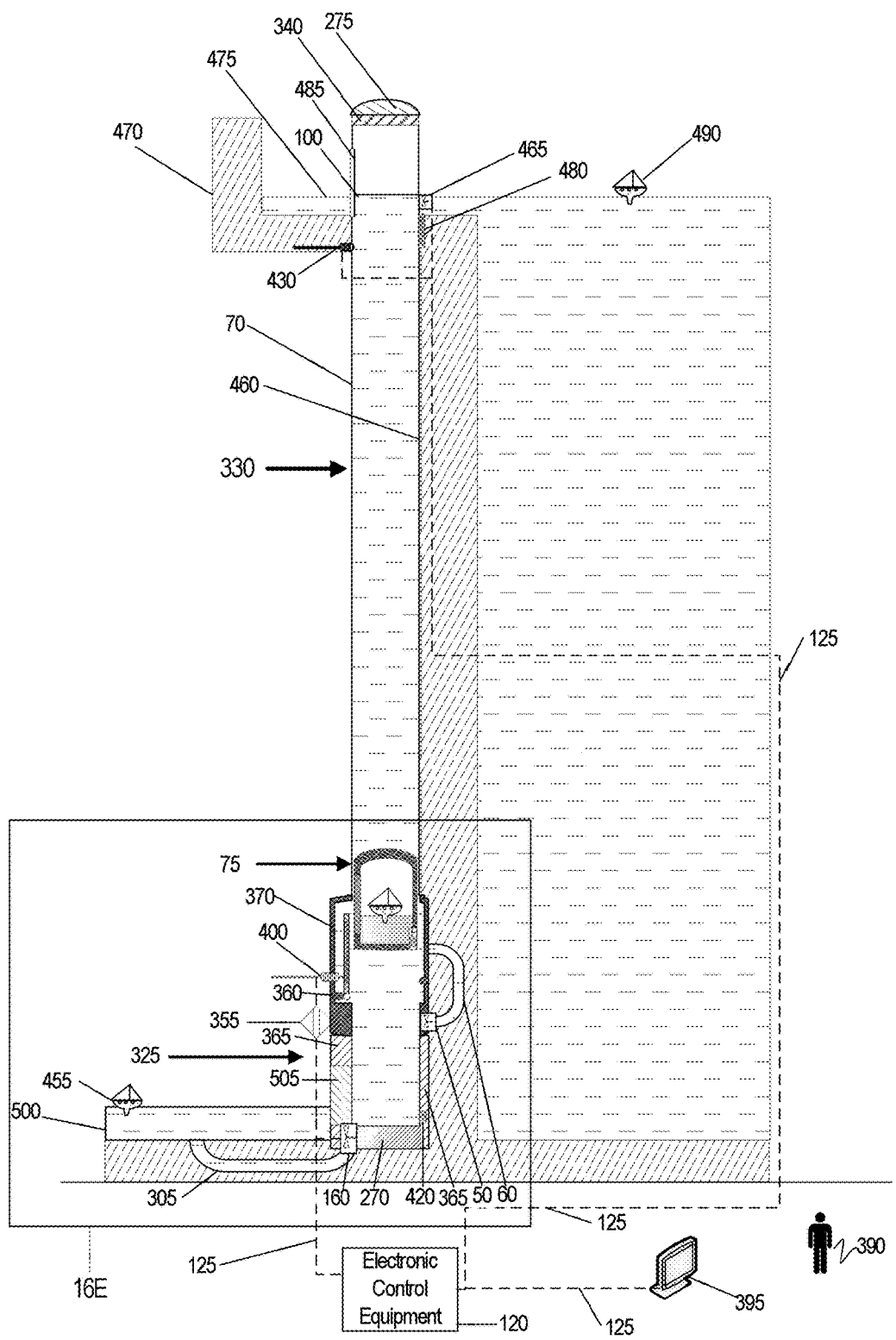
FIG. 16D—ship lift mass-levitator in rise stage where ship with enclosed water is being levitated upward by encapsulating buoyant-object and when water has already filled the compression-decompression chamber.
Figure 16E:
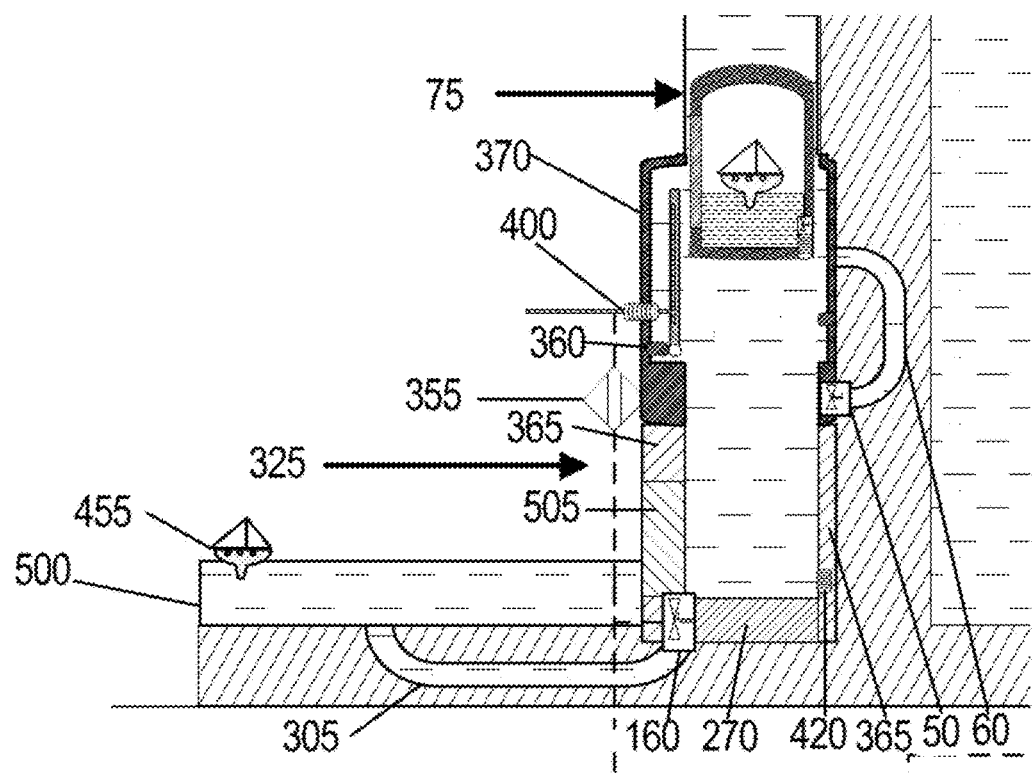
FIG. 16E—close up view of bottom section of FIG. 16D.

In preparation for the "levitate" state these same fluid tight doors are closed, and water floods elevator-compression-decompression-chamber 325, lifting buoyant-object 75 off of bottom-landing-pad 270 to the level of swing-check-valve-flapper 360. Control signals 125 from electronic-control-equipment 120 to swing-check-actuator 400 open swing-check-valve-flapper 360 and buoyant-object 75 rises through electronic-elevator-swing-check-valve 370 as shown in FIG. 16D and detail FIG. 16E.

Figure 16F:
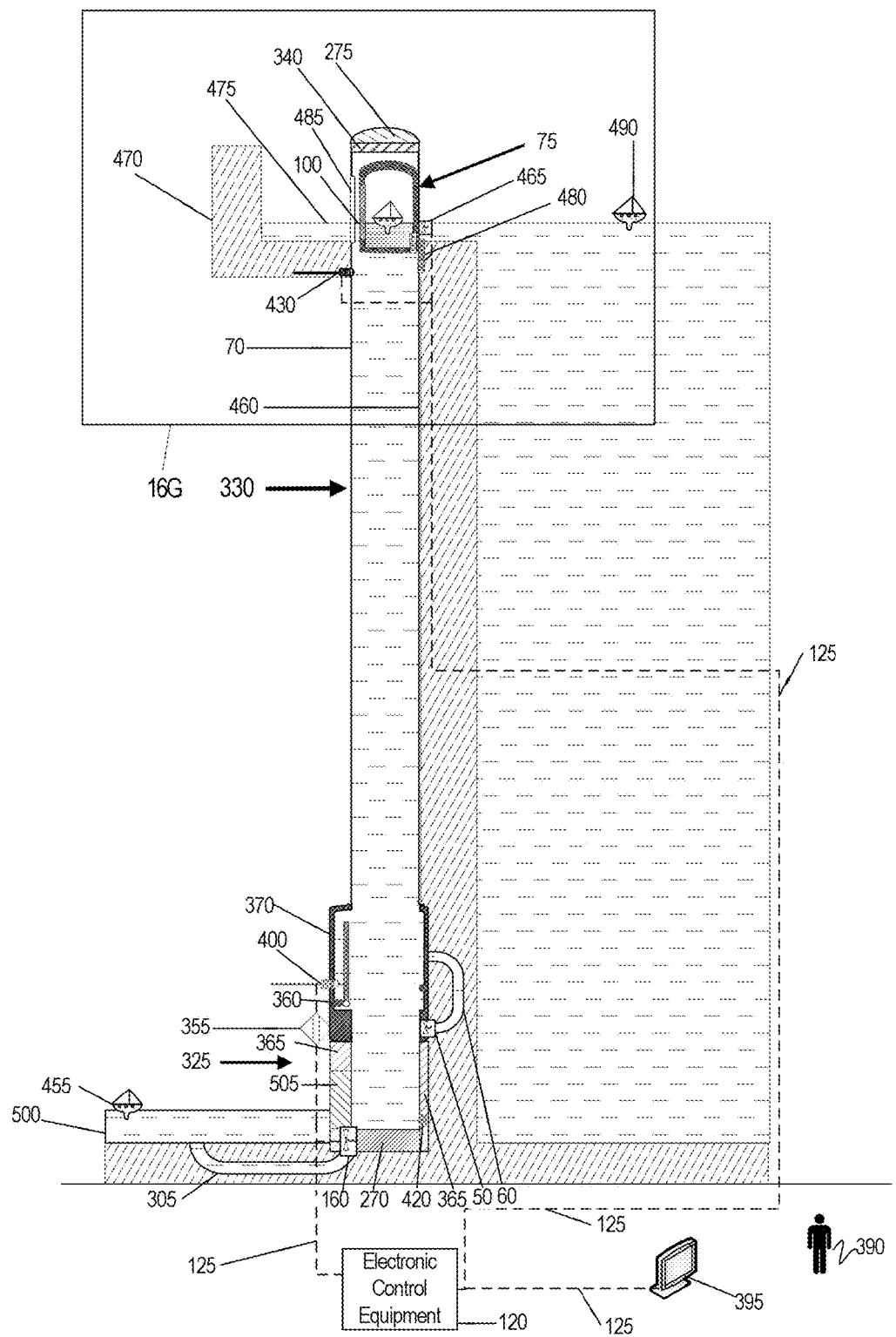
FIG. 16F—ship lift mass-levitator after rising to the top of the fluid column—ready to open doors to buoyant-object and top doors to water elevator so as to be float ship from the apparatus into the top water channel.
Figure 16G:
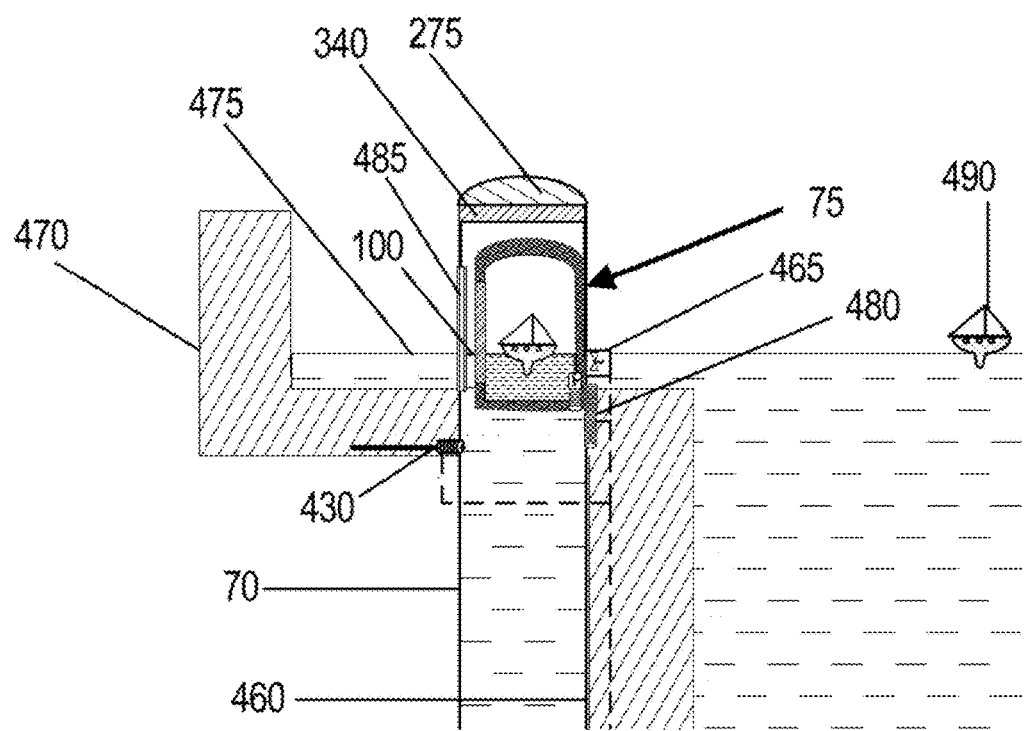
FIG. 16G—close up view of top section of 16F.

Buoyant object 75 continues its journey upward until it rises to the top of the embodiment as in FIG. 16F, where it is stopped by top-landing-pad 340 and uptube-ceiling 275. Having reached the top of the embodiment, buoyant-object 75 enters the "unload/reload" state, where upon buoyant-object 75 opens top-lock-gate 485 and buoyant-object-door 345, so that ship-embodiment-of-an-arbitrary-mass 352 can exit out to upper-ship-channel 475, which is supported by dam-wall-extension-overhang 470. The ship having exited the water elevator can now enter upper levels of the dam, shown as elevated-ship 490. In a similar manner new elevated-ship 490 can navigate to the entrance of the water elevator (top-lock-gate) and can so as reload the water elevator with a new ship-embodiment-of-an-arbitrary-mass 352.

Figure 16H:
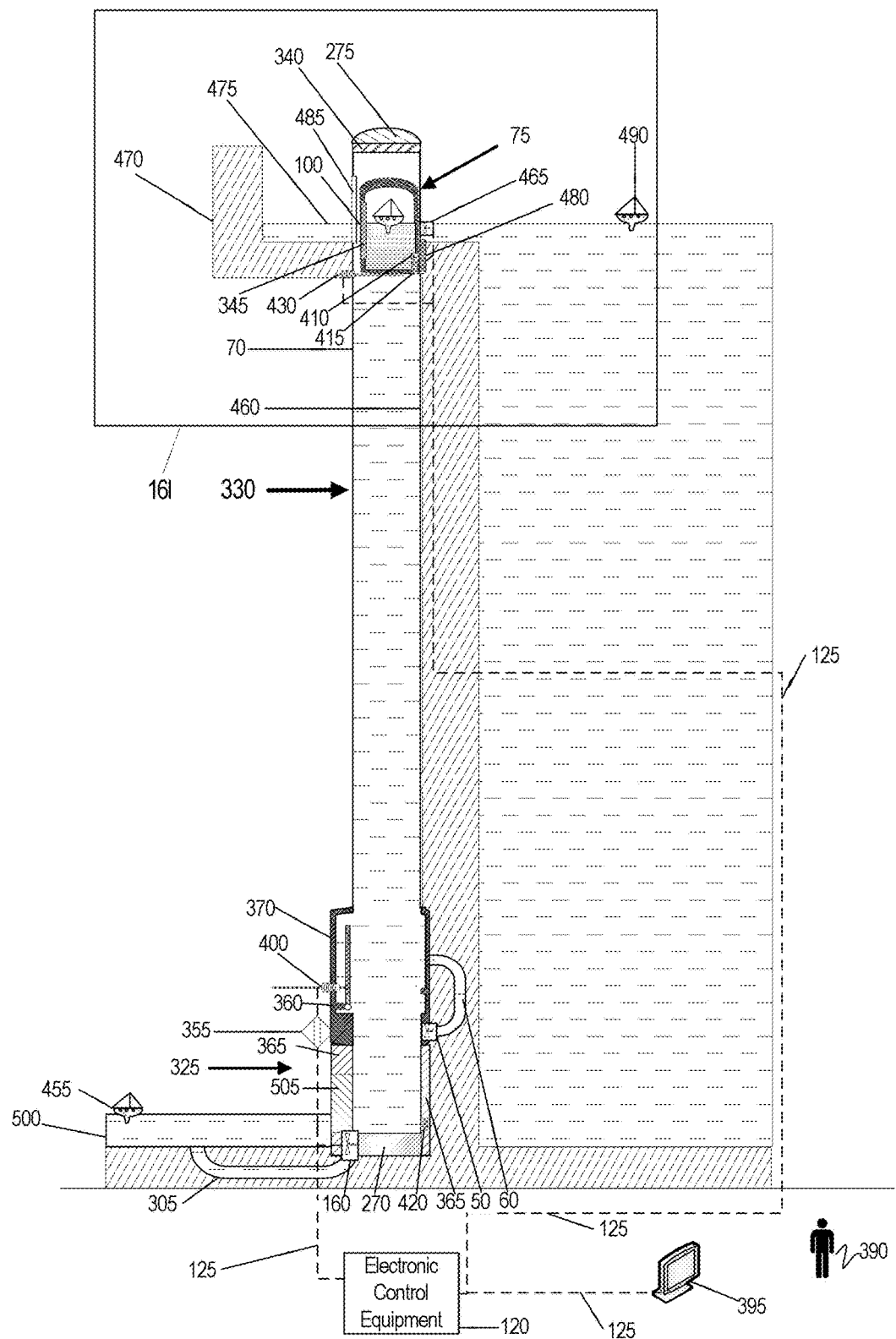
FIG. 16H—ship lift mass-levitator after rising to the top of the fluid column—adding fluid to water chamber so as to sink buoyant-object in descent. Induction coil open fluid valve and buoyant-object begins to descent until meeting electronically actuated mechanical stop. Mechanical stop opens when water fill is complete, and buoyant-object begins descent to bottom.
Figure 16I:
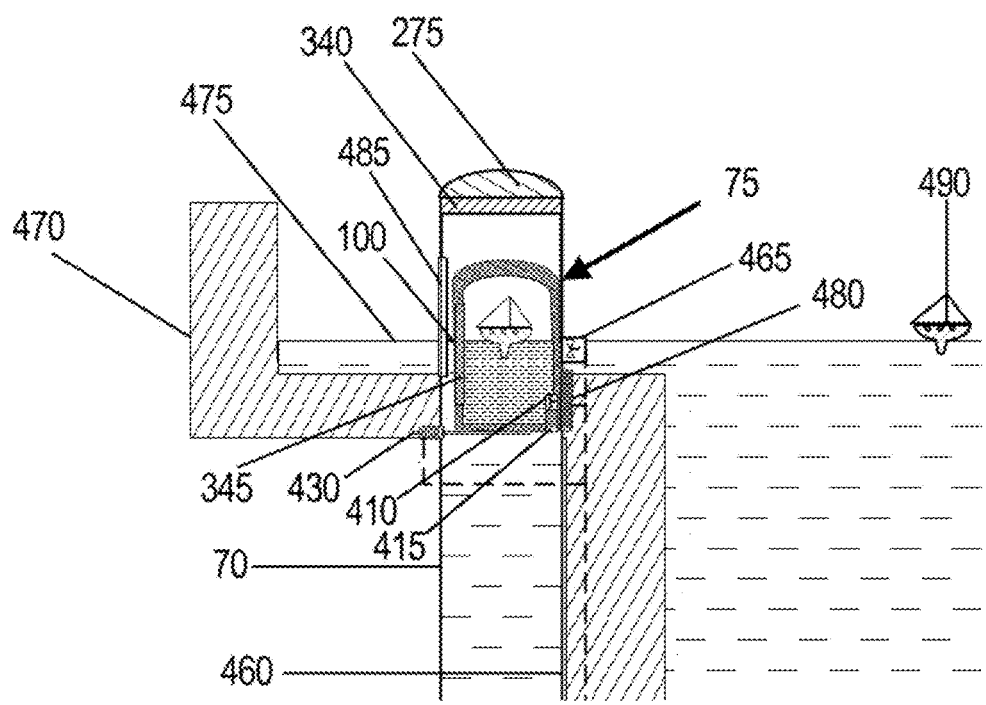
FIG. 16I—close up view of top section of FIG. 16H.

The "descent" state begins in FIG. 16H (and top detail FIG. 16I) by computer-control-equipment 120 energizing upper-power-induction-coil-dam 480, which induces power inside buoyant-object 75 by way of buoyant-object-power-induction-coil 415, so as to open ballast-tank-water-valve 410. As more water ballast is taken on by buoyant-object 75 it begins to sink until it reaches mechanical-stop 430 which has been extended to ensure that the proper water depth has been added and to ensure that all valves have been properly closed before buoyant-object's 75 further descent to the bottom of the embodiment.

Figure 16J:
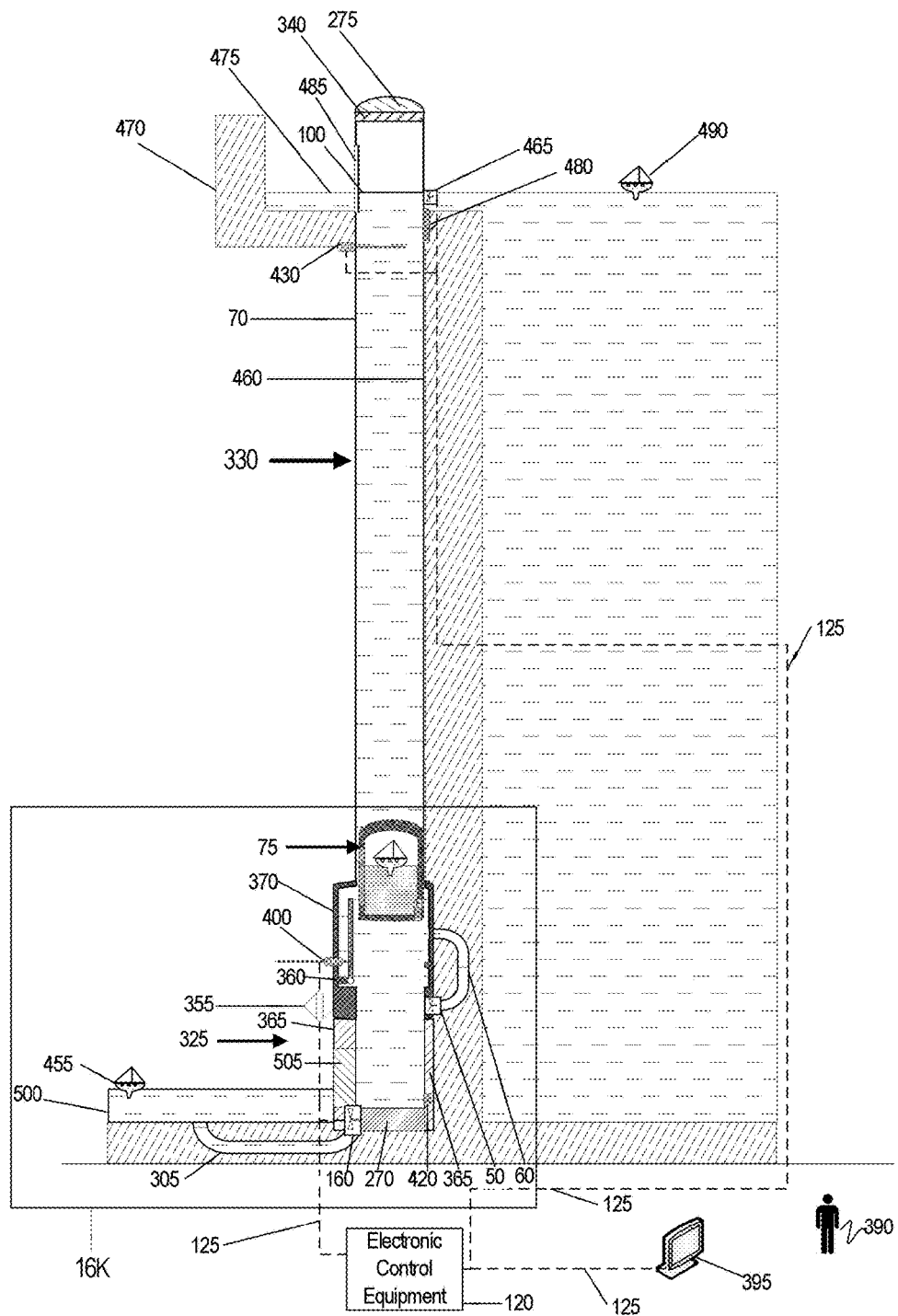
FIG. 16J—ship lift mass-levitator descending to bottom after taking on water. Differs from FIG. 16A in that there is more water in the encapsulating buoyant-object such that the buoyant-object now floats.
Figure 16K:
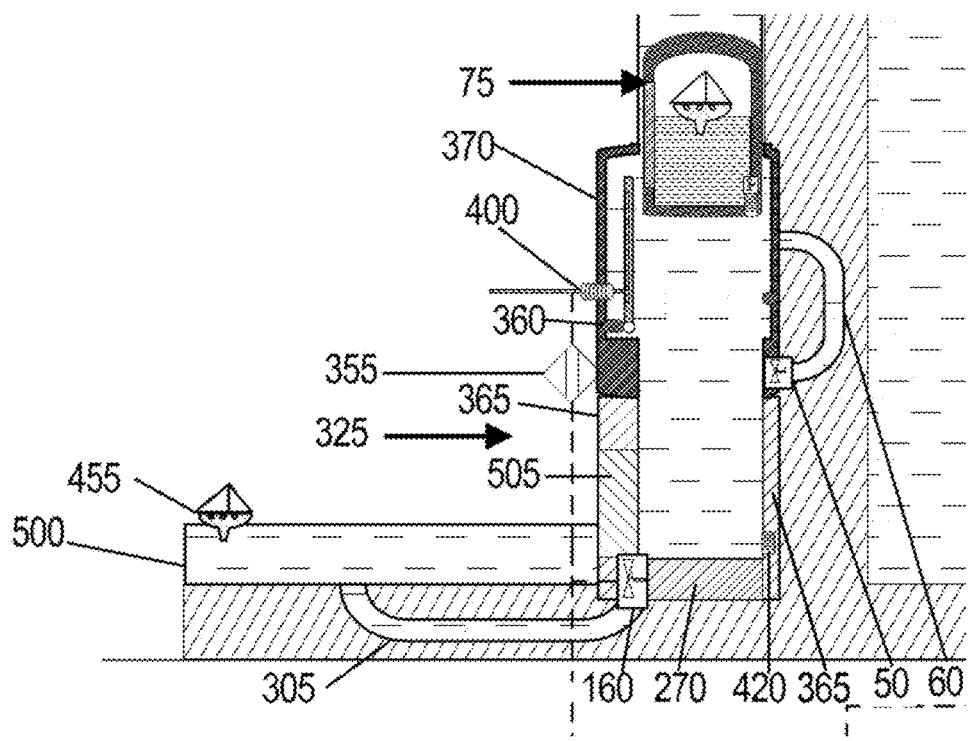
FIG. 16K—close up view of top section of FIG. 16J.

FIG. 16J (and bottom detail 16K) shows buoyant-object 75 in the "descent" state with the extra acquired water ballast represented by high levels of water in the buoyant-object.

This increased ballast is responsible for making the buoyant-object sink, and it is therefore an example of a variably buoyant buoyant-object.

Figure 16L:
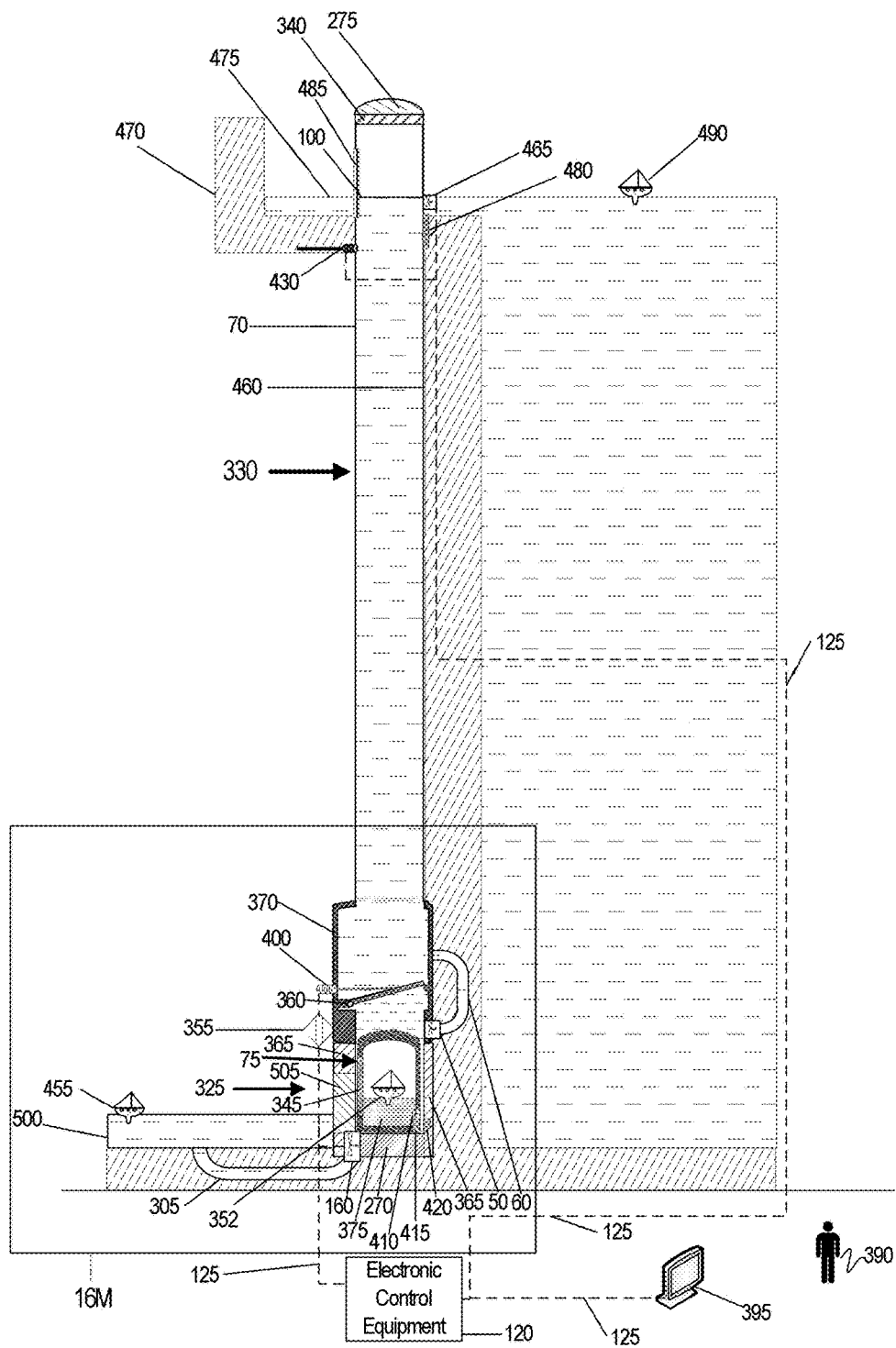
FIG. 16L—ship lift mass-levitator at bottom ready to purge water to level of exterior channel. Differs from FIG. 16A in that there is more water in the encapsulating buoyant-object. Water valve in buoyant-object and water valve in bottom compression decompression chamber is now to be opened so that water flows down connecting pipe to equalize water level to exterior channel.
Figure 16M:
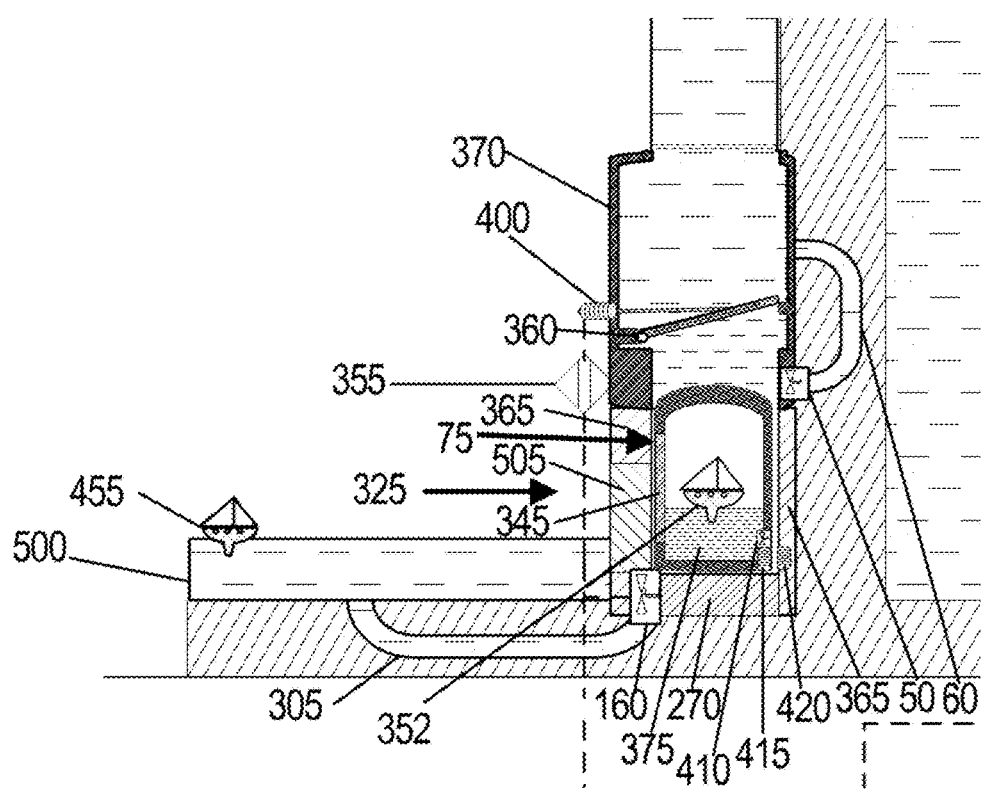
FIG. 16M—close up view of top section of FIG. 16L.

In FIG. 16L (and bottom detail 16M) buoyant-object 75 is shown at the bottom of the elevator-compression-decompression-chamber 325 immediately after its descent where it again rests on bottom-landing-pad 270. To bring FIG. 16L back to the initialization state of FIG. 16A, water is purged from elevator-compression-decompression-chamber 325 and buoyant object 75 by opening electronic-water-drain-valve 160 and ballast-tank-water-valve 410 so as to equalize water pressures and water levels to that of lower-ship-channel 500. At this point lock-gate-to-compression-decompression-chamber 505 can be opened along with buoyant-object-door 345 so as to permit ship-embodiment-of-an-arbitrary-mass 352 to be removed from buoyant-object 75.

Figure 17B:
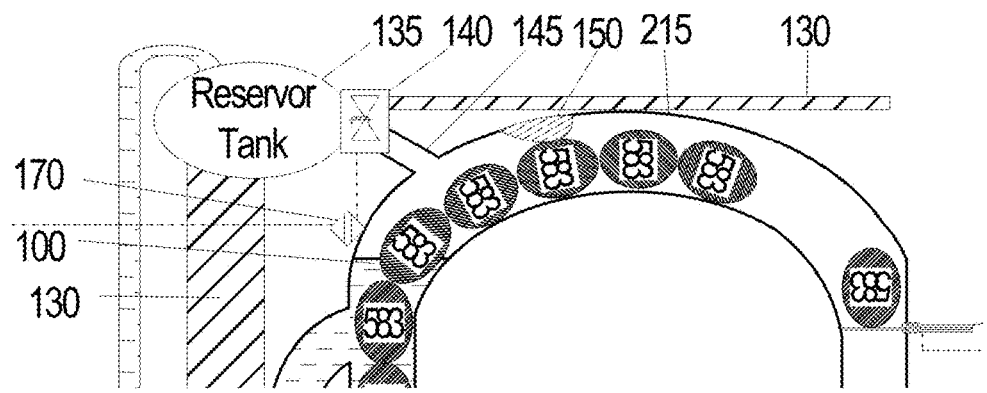
FIG. 17B—close up view of top section of FIG. 17A.
Figure 17C:
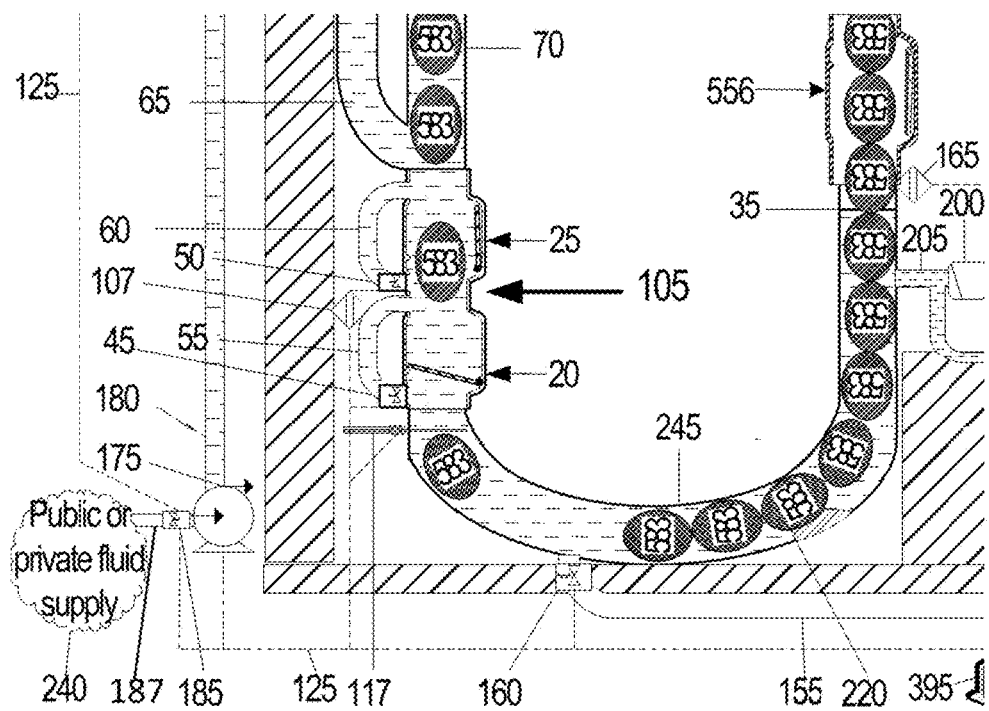
FIG. 17C—close up view of bottom section of FIG. 17A.

FIG. 17A-17C—Embodiment 3 Continuously Looping Single Uptube/Downtube Mass-Levitator with Energy Conversion Embodiment 3 in FIG. 17A is a continuously looping mass levitator containing a multiplicity of buoyant-objects with a linear energy conversion subsystem. FIG. 17B is a close up of the top of FIG. 17A, while FIG. 17C is a close up of the bottom of FIG. 17A. As can be seen the entire embodiment is of tubular design consisting of fluid connected tubing/pipes of adequate diameter to pass and guide buoyant-object 75 around and through the stretched circular structure. Major structural components of Embodiment 3 will be described in a clockwise order starting with the uptube 70, followed by the more minor and often optional components. Uptube 70 is a tubular pipe of sufficient diameter to enclose, contain, and permit passage of a multiplicity of buoyant-objects 75. Uptube 70 also contains and encloses the dense working fluid 21 in which buoyant-objects 75 are buoyant, and in this embodiment that dense fluid will be water. The choice for the dense fluid being water in this embodiment is done due to water's many advantages including being relatively dense, abundant, cheap to acquire, generally incompressible, and environmentally friendly. As stated earlier the dense fluid 21 can be any dense fluid such as mercury, saltwater, or oil, however very viscous fluids are generally not as desirable for some applications since the rate of upward travel of a buoyant-object in such fluids is generally slower. Uptube 70 is connected to, and in fluid communication with upper-transition 215, which is a u-shaped tube of similar diameter tubing or pipe as uptube 70. Uptube 70 and upper-transition 215 are nominally joined together at the water-to-air-interface 100 so as to make a near seamless and continuous pipe/tube. Uptube-water-level 100 changes slightly as a function of time, but nominally the water level set point is maintained and controlled to be somewhere near the intersection of uptube 70 and the upper-transition 215. The water set point is monitored using water sensor 170 and electronic-control-equipment 120. When water levels are low, reservoir-electronic-control-valve 140 is open and water flows down reservoir-fill-pipe 145 from elevated-fluid-reservoir 135 into upper-transition 215. The connection of reservoir-fill-pipe 145 to upper-transition 215 is located above uptube-water-level 100 and should be on the uptube 70 side of upper-transition 215 so that the water from elevated-fluid-reservoir 135 does not enter connected downtube 40. Uptube 70 is in many specific embodiments engineered to be quit long/tall, so as to permit the embodiment to reach a substantial height. As will be pointed out in the operations section, the height and diameter of uptube 70 are directly correlated to the amount of energy that can be obtained from the embodiment, with the higher the uptube the more potential energy will be gain per pound of buoyant-object 75 levitated. Uptube 70, being filled with water of possibly substantial height, should be engineered to withstand the pressure generated by gravity at the bottom of this standing-column-of-water 330 (1 pound of pressure for every 2.31 feet of water), hence some engineering considerations should go into ensuring adequate thickness for pipes and the sufficient structural bracing within the total system design. In FIG. 17A structural supports are shown as structural-support items 130.

Upper-transition 215 connects to, and is in fluid communication with, downtube 40. Downtube 40 is the tubular pipe between upper and lower transitions that is filled with the light fluid 22 (i.e. air in this embodiment), in which the buoyant-object 75 sinks and falls rapidly with the near earth acceleration of gravity (i.e. 32 ft/sec2) when no energy conversion device is present. Downtube 40 is also a tubular pipe that acts as the guided-means for buoyant-objects 75 decent into the lower-transition 245 and across the lower-fluid-interface 35. Downtube 40 is circumferentially surrounded by a series of induction coils. Each induction coil consists of N turns of preferably low resistance wire. As shown in FIG. 9 and in FIG. 17A each induction coil is of the approximate length of a buoyant-object. Buoyant-objects 75 generate electrical pulses by Faradays law of induction when buoyant-object 75's enclosed magnetic arrays pass through induction coils 80. The composition of buoyant-objects containing magnetic material are as previously described and given in FIGS. 12A-12J, and 13A. Each induction coil is wired into the pulse-conversion-subsystem 85, which has electrical-output 90, and where electrical-output 90 represents the electrical load and output for the electrical pulse conversion system. Downtube 40 connects at its bottom to an optional normally open emergency-fluid-stop 556, which in this embodiment is an inverted swing check valve mounted so that its buoyant flapper will close if water levels reach the height of the emergency-fluid-stop 556's buoyant flapper. Emergency-fluid-stop 556 in turn connects to the lower-transition 245, shown in FIG. 17A as a J-shaped hollow tubular pipe filled with buoyant-objects 583 of the type shown in FIG. 12F. Lower-transition 245 connects on the left side bottom side of FIG. 17A to the compression-decompression-chamber 105 (as in FIG. 4F) which consists of two swing check valves 20 and 25 connected by compression-decompression-tube 30, electronic-low-pressure-fluid-valve 45, and electronic-high-pressure-fluid-valve 50. Compression-decompression-chamber 105 connects to the top of uptube 70 via electronic-high-pressure-fluid-valve 50 and high-pressure-equalization-tube 60. Compression-decompression-chamber 105 also connects to the lower-transition 245 via electronic-low-pressure-fluid-valve 45, lower-pressure-equalization-tube 55. When upper-swing-check-valve 25 is closed a secondary current flow path is provided for fluid to flow upward through uptube 70, down high-pressure-equalization-tube 60, and back to uptube 70 via uptube-secondary-flow-pipe 65. Compression-decompression-chamber 105 by connecting to uptube 70 completes the close loop system in the form of FIG. 2.

The embodiment of FIG. 17A is supported by electronic-control-equipment 120, connected power and control cables 125, and a multiplicity of sensors, electronic fluid valves, mechanically actuated stops, pumps and other control mechanisms. Sensors shown in FIG. 17A which report to electronic-control-equipment 120 include compression-decompression-chamber-pressure-sensor 107, downtube-water-level-sensor 165, and uptube-water-level-sensor 170.

Electronically actuated fluid valves controlled by electronic-control-equipment 120 via control-cables 125 include electronic-low-pressure-fluid-valve 45, electronic-high-pressure-fluid-valve 50, reservoir-electronic-control-valve 140, electronic-water-drain-valve 160, and expansion-tank-output-control-valve 230.

Water-pump 175 is turned by electronic-control-equipment 120 and fills elevated-fluid-reservoir 135 via water-pump-pipe 180 from external-water-supply 240 by opening water-pump-shutoff-valve 185. Alternatively lower-transition 245 can be provided with additional fluid from lower-transition-expansion-tank 110 by opening expansion-tank-output-control-valve 230 when lower-transition-expansion-tank has recovered fluid from impact pressure waves in lower-transition 245 that arise when buoyant-objects 75 imping upon and impact air-water-fluid-interface 35 after falling through downtube 40. Lower transition pressure waves are directed into expansion tank 110 via lower-expansion-tank-pipe 205 and lower-expansion-tank-check-valve 200.

Optional emergency-stop-switch 295 cuts power to, and power output from, pulse-conversion-subsystem 85 and informs electronic-control-equipment 120 to actuate optional emergency-stop-means 290 which can for example insert a solenoid rod into downtube 40 so as to prevent further buoyant-objects 75 from entering downtube 40. Similar emergency action and other commands to access system reports, view current system conditions, and other system state changes (e.g. filling system after a maintenance drain) can be issued by optional system-operator 390 though optional system-display-gui 395. System access and maintenance is facilitated by entrance into embodiment 3's internal pipes through lower-access-hatch 220 and upper-access-hatch 150, whereby buoyant-object 75 can be removed or added if desired.

FIG. 17A-17C Operational Details, Continuously Looping Single Uptube/Downtube Mass-Levitator with Energy Conversion A closed system embodiments is shown in FIG. 17A, Embodiment 3, which corresponds to the basic closed loop system of FIG. 2, with the bottom-FID 16 consisting of swing-check-valve compression-decompression-chamber 105 and lower-transition 245 as in FIG. 6, bent-pipe style upper-FID 17 of the type shown in FIG. 8, and linear inductive energy conversion system as shown in FIG. 9. FIG. 17A is a "closed" system embodiment because the buoyant-objects 75 do not leave the structure of the embodiment as they did in the water elevator. Instead the embodiment's primary function is to move and continuously circulate this set of encapsulated buoyant-objects 75 via the internal tubular structure and generate energy in the process.

The embodiment consisting of a self-contained tube or chamber 105 that can effectively contain the working fluid's associated weight and pressure. This standing column of dense fluid 330 is primarily composed of a single tube denoted as the "uptube" 70 since the buoyant-object floats upward in this portion of the embodiment. The uptube 70 contains many buoyant-objects 75 all of which are progressing upward and dragging the dense fluid toward the top of the embodiment at the same time.

Embodiment 3 contains one dense fluid region 21, where the dense fluid region is water, however the dense fluid could be any dense fluid such as mercury, salt water, or oil. Embodiment 3 also contains one light-fluid 22 region which is identified as air at normal atmospheric pressure, but as previously discussed this less dense fluid could easily be He, O2, CO2 etc.

The two interfaced fluid regions of embodiment 3, FIG. 17A are comprised of mutually connected tubular pipes, that are joined into the overall shape of an elongated ellipse or stretched circle that are all of sufficient diameter to freely contain and pass buoyant-object 75 from and through the top and bottom fluid-interface-mechanisms. The overall upward stretched shape reflects the goal of levitating buoyant-objects 75 via buoyancy in the dense fluid to a sufficient height so as to increase the buoyant-object's gravitational potential energy. Eventually this augmented energy will be extracted and converted to other forms of energy when buoyant-object 75 falls through the less dense fluid in downtube 40. The interior tubular pipe walls act as guided-means to direct a multiplicity of circular or ellipsoidal buoyant-objects 75 through the interior spaces of the embodiment in a continuously circular manner under the influence of the motive forces of gravity and/or buoyancy.

The dense fluid (water) exists in three sections of the mass levitator as follows:

1. standing-column-of-water 330 as in FIG. 4E, which consists of a tubular standing column of water created from a pipe which can be of various shapes (such as square, rectangle, or elliptical or circular) but is represented as circular tube or pipe in this apparatus. Standing-column-of-water 330 is always present when the apparatus is in a working state, that is when it not being repaired or initialized. This column of water is the dense region of fluid which will propel buoyant-object 75 upward under the force of buoyancy. Standing-column-of-water 330 is a water chamber formed from uptube 70's tubular interior walls and is bounded on the bottom by the flapper of upper-swing-check-valve 25 and on the top by the bottom of upper-transition 215 which also hosts the water-to-air interface (an unpressurized fluid interface in this embodiment) where water and air meet in the interior space of the pipe.

2. lower-transition 245 as in FIG. 6—is an unpressurized dense fluid region containing water. Lower-transition 245 is a tubular j-shaped pipe in FIG. 6 that makes a 180 degree bend so as to connect the downtube 40 to lower-swing-check-valve 20, which is part of compression-decompression-chamber 105.

3. compression-decompression-chamber 105 as in FIG. 4F which is composed of lower-swing-check-valve 20, upper-swing-check-valve 25, compression-decompression-tube 30, electronic-high-pressure-fluid-valve 45, lower-pressure-equalization-tube 55, electronic-high-pressure-fluid-valve 50, and high-pressure-equalization-tube 60.

The light fluid (air) exists in two sections of the mass levitator as follows:

1. Downtube 40 as in FIG. 6—is a region in the apparatus composed of tubular connected pipe containing only the less dense fluid, (in this embodiment air).

2. upper transition 215 as in FIG. 8—is a 180 degree bent hollow tube or pipe which is in fluid communication with, and joints to downtube 40, on the left and interfaces and joins to the uptube 70 on the left. The water to air interface is contained in the upper transitions, and as the water level in uptube 70 fluctuates, the water to air interface 100 may exist temporarily near the top of the uptube 70 or may be located somewhere on the left half of upper transition 215.

The bottom fluid interface device (FID) of embodiment 3 is of the form of compression-decompression-chamber 105 as shown in detail in FIG. 6. It is formed from the interior walls of compression-decompression-tube 30, and the flappers of lower-swing-check-valve 20, upper-swing-check-valve 25, and lower-transition 245. Compression-decompression-chamber 105 changes states from a compressed and pressurized fluid state with fluid pressure equal to the pressure at the bottom of standing-column-of-water 330 to decompressed unpressurized fluid state equal to the pressure of the uncompressed-fluid-in lower transition 245 in a cyclic manner.

Pressure equalization of compression-decompression-chamber 105 to the pressure level at the bottom of standing-column-of-water 330 is achieved by connecting compression-decompression-tube 30 to the top of uptube 70 by opening electronic-high-pressure-fluid-valve 50 so that a small amount of fluid flows into fluid-interface-mechanism 105 by way of high-pressure-equalization-tube 60. It is no exaggeration to state that the amount of water required to pressurize the already existing water in fluid-interface-mechanism 105 is very small because water is a relatively incompressible fluid (bulk modulus of water is $3.12 \times 10^5$ lbs/in2). Similarly decompression of compression-decompression-chamber 105 occurs by opening electronic-low-pressure-fluid-valve 45 so as to permit fluid to flow out of lower-pressure-equalization-tube 55 into lower-transition 245. Swing check valves 20 and 25 are sized and engineered so as to permit buoyant-object 75 to pass freely through, and act as guided-means through the swing check valves interior spaces.

Fluid levels in the device are shown as downtube-water-level 35 and uptube-water-level 100, and represent fluid interfaces in the embodiment (also known as air-water-fluid-interface 35 and water-to-air-interface 100). The embodiment contains the dense fluid 21 (i.e. water) and is in fluid communication with all associated chambers and pipes between water-to-air-interface 100 in upper-transition 215, through the compression-decompression-chamber 105, and through the lower-transition 245 to air-water-fluid-interface 35. The embodiment contains the lighter, less dense fluid (e.g. air) from water-to-air-interface 100 across the upper-transition 215, through downtube 40 and optional emergency-fluid-stop 556 to the air-water-fluid-interface 35.

The column of water of arbitrary height exerts a downward force on the flapper of check valve 25 when the water pressure in the compression/decompression chamber 105 is equalized to the pressure level of the lower transition. When the compression/decompression chamber is in this low pressure condition, it is said to exist in the decompressed state. Hence check valve 25's flapper, must be capable of holding back the full pressure of the standing water column 330 within some acceptable standard of leakage. When compression-decompression chamber 105 is in the compressed state, water pressure in chamber 105 is equalized to the pressure in the uptube 70. In the compressed state the standing-column-of-water 330 is held back (prevented from collapse into the downtube 40) by lower-swing-check-valve 20's flapper. Any buoyant-object(s) in the compression-decompression-chamber 105 are then able to open the flapper on check valve 25 and begin their trip to the top of standing-column-of-water 330 (water-to-air-interface 100) via uptube 70.

As previously stated, compression-decompression-chamber 105, in conjunction with lower transition 245 and part of downtube 40, acts as the bottom fluid-interface-device which transits and guides buoyant objects between light and dense fluid regions while maintaining the pressure differential setup by standing-column of water 330. It separates the light and dense fluid regions while preventing the standing-column-of-water 330 from collapsing into downtube 70. The location of this pressure differential is either at the top or the bottom of compression-decompression-chamber 105 depending on the state within its enclosed pressure chamber.

Hence, the pressurized to unpressurized dense fluid interface in this embodiment is movable, and shifts as a result of the state of the compression-decompression-chamber 105. When compression-decompression-chamber 105 is pressurized, the transition from high pressure to low pressure is separated by the flapper of lower-swing-check-valve 20, and when compression-decompression-chamber 105 is depressurized or "decompressed" the pressurized fluid interface moves to the flapper of upper-swing-check-valve 25. The one or more buoyant-objects that are contained in fluid-compression-decompression-chamber 105 are also undergoing a state change from being in a region of low pressure, to being in a region of typically much greater pressure. Additionally the force that it takes to open swing check valves 20 and 25 changes greatly depending on the state of the fluid-interface-mechanism 105. When compression-decompression-chamber 105 is in the decompressed state the flapper of lower-swing-check-valve 20 can easily be opened so as to permit entrance of buoyant-object 75 into the compression-decompression-chamber 105. Similarly when compression-decompression-chamber 105 is in the pressurized (compressed) state the flapper of upper-swing-check-valve 25 can easily be opened so as to permit buoyant-object 75 to leave the chamber.

When a buoyant-object 75 has passed through compression-decompression-chamber 105 it naturally rises to the top of the fluid column (water-to-air-interface 100) under the force of buoyancy, with the interior walls of the uptube 70 acting as guided-means during its upward motion. This first buoyant-object 75 will rest at water-to-air-interface 100 until the next (second) buoyant-object is released from the compression-decompression-chamber 105 and makes the same trip upward toward water-to-air-interface 100, where this second buoyant-objects rests just below the first. The second buoyant-object abuts against the first/top buoyant-object 75 so as to apply its upward buoyant force to the top buoyant-object 75 such the first buoyant-object moves upward slightly. The second buoyant-object is followed by the release of a third, fourth, and on-going succession of buoyant-objects that are released from the compression-decompression-chamber 105, all of which travel upward so as to lineup below each other and apply their force of buoyancy in an upward direction, to the buoyant-object directly above. Eventually enough buoyant-objects 75 are stacked up below the first buoyant-object so as to apply their cumulated force to the top buoyant-object and by so doing levitate the top buoyant-object completely out of the dense fluid at water-to-air-interface 100 and into the upper-transition 215. The continuous stacking of buoyant-objects under water-to-air-interface 100 continuously forces the top most buoyant-object out of the dense fluid in a sequential and continuous fashion. Each buoyant-object that exists in the dense fluid forces the buoyant-objects already in the upper-transition 215 further into the upper-transition so as to provide enough motive force to push along the entire string of buoyant-object that enters the upper-transition 325 through the upper-transition 325 and into downtube 40. Once buoyant-object 75 enters the downtube it experiences the full downward force of gravity, at which time the acquired gravitational potential energy is converted to kinetic energy.

The buoyant-objects in FIG. 17A are of the form in FIG. 12F in this embodiment and are composed of an internal magnetic array and its enclosing fluid proof capsule, where the magnetic array are configured in such a way as to increase electrical induction according to Faraday's law of induction as described in the text associated with FIG. 9. Upon entering the downtube 40, the buoyant-object (buoyant in the dense fluid 21, but subject to the full gravitational attraction force G in the less dense, light fluid 22) essentially falls (or if the downtube is sloped—slides or rolls) downward through induction coils 80, with the subsequent generation of induced pulse waveforms. The series of induction pulses result in electrical output at 90. The electrical pulses are then suitably converted to AC or DC current via the pulse-conversion-subsystem 85.

Due to the fact that water is being dragged upward, a path for the water to circulate can optionally be added to reduce the splash and turbulence that would otherwise occur at the interface. An optional circulation path, when the compression/decompression chamber 105 is in the decompressed state, is shown as the closed path from the top of uptube 70 through secondary fluid tubes 60 and 65 and then back to the bottom of uptube 70 to complete the circuit. In addition to providing a circulation path, the circulation caused by water drag will influence the speed of the water in uptube 70, the speed of accent of the buoyant-object, and can potentially reduce transit time of each buoyant-object through the uptube 70. The resulting smoother circulation of fluid within the device effectively increases the overall energy efficiency of the embodiment.

The buoyant-object overall density must be less than the fluid it displaces, if the buoyant-object is to be buoyant. There is a wide range of densities that could be used for buoyant-objects, however from an engineering point of view the factional percentage of the weight of the buoyant-object's volumetric fluid displacement is a useful metric which we denote as the "load factor" in this application. For example, if the buoyant-object is loaded at 75%, it means that the buoyant object weights 75% of the water that it displaces, and has 25% of its displaced fluid weight available as the upward buoyancy force vector. Hence one such buoyant-object is capable of lifting one third of its own weight. Therefore, it will take the buoyancy of at least three other 75% loaded stacked buoyant-objects that are immersed in the dense fluid to begin to lift one other similarly loaded buoyant-object out of the dense fluid (e.g. water) into light fluid (e.g. air).

To make the discussion more concrete, suppose the weight of fluid displaced by the buoyant-object was one pound (equivalent to a sphere of about 3.75 inches in diameter), then a 75% load factor would mean that the buoyant-object weighs 75% of 1 pound or 0.75 lbs, and it therefore has a buoyancy lift force of 0.25 lbs upward. To lift one buoyant-object will require a lift force of 0.75 lbs, which can be supplied by 3 such buoyant-objects which supply an upward force of 0.25 lbs each. In FIG. 17B several more buoyant-objects will need to be stacked below the fluid interface 100 to push two of three buoyant-object over the upper transition 215 before the buoyant object can be transitioned and dropped into the downtube 40. In FIG. 17B, the upper-transition 215 contains approximately two buoyant-objects that must be lift in the upper transition before they begin their descent, hence in this case approximately six or seven buoyant-objects loaded to 75% will be required to push the top most buoyant-object located at interface 100 over the upper transition into downtube 40. More than the minimally required six or seven stacked buoyant-object will increase the total motive force, decrease the time, and increase the velocity of the buoyant-object's upward progress. For any given uptube 70 and upper transition 215 geometry the computations are similar to those just describe. The important point is that no other external forces need act on the buoyant-objects at the interface 100 in order to push that same buoyant-object into the down tube 40, given a suitable load factor, such as 75%.

If buoyant-object 75 weights 100% of the fluid weight that it displaces, the buoyant-object will be neutrally buoyant, and will not move up or down in the enveloping dense fluid. If it weighs more than the fluid it displaces, it will sink. In this embodiment the buoyant-objects must move upward with some speed, yet should carry as most weight as possible to maximize the potential energy gain that is directly related to the increase in mass (PE=MGH). Hence buoyant-object 75 in this embodiment typically (but not always) weighs approximately 60% to 85% of the dense fluid that they displace when completely submerged. Therefore, if the working fluid is water and buoyant-object displaces one pound of water, the encapsulated magnetic material plus the casing surrounding the magnetic material can be engineered to weight 0.6 to 0.85 of a pound. Hence the buoyant-object will float in the dense fluid, and is said to be loaded by 60% to 85% respectively.

Again when the target load factor is desired to be 75%, the buoyant-object generates a net force of buoyancy equal to a quarter of pound (0.25 lbs.), which acts on the buoyant-object so as to provide it with upward motive force (buoyancy) against the force of gravity. Since in a practical design there can be many more buoyant-objects in the uptube (75) at any given time (potentially hundreds or thousands depending on the design goals and the height of the uptube), there is by design more than enough accumulated upward force from stacked buoyant-objects in the uptube to push the upper most buoyant-object across the water-air interface 100 into to the downtube 40.

When the buoyant-object falls through the induction coils (80) and reaches air to water interface 35 the opposite situation arises, in which the buoyant-object needs to be forced under the dense fluid to light fluid interface 35. One can deduce using the logic just stated that one buoyant-object weighing 0.75 lbs in our example, can cancel the upward buoyancy force of three submerged 75% loaded buoyant-objects that are pushing upward with a force of 0.25 pounds each. Stated another way, 3 buoyant objects weighing 0.75 lbs each (2.25 lbs total weight) located above the fluid interface will completely submerge 8 buoyant objects that are generating a net upward force of 2.0 lbs. This means that there is also no difficulty in forcing a number of buoyant-objects below the air-water-fluid-interface 35 and across the lower transition (245) using no external power other than that supplied by gravity.

When the buoyant-objects, are submerged in lower transition 245, they then enters the left half of lower transition 245, where they begin to rise upward again. At this point in the embodiment's cycle, the buoyant-object 75 is submerged (light fluid exchanged for the dense fluid) and is floating upward, but the buoyant-object has not crossed the pressure differential which has been created by the standing column of water 330. The buoyant-object floats upward until it reaches the flapper 550 of the lower check valve 20. If there is no pressure differential between the lower most region of the lower-transition 245 and the compression-decompression chamber 105, then the buoyant object pushes open the swing check valve 20's flapper 550 (see detail in FIG. 4C) and moves into the compression-decompression-tube 30.

It is only when the fluid pressure has been equalized to that of the lower transition 215 that the swing check valve flapper 550 can be pushed open and the buoyant-object 75 can fully enters the compression-decompression chamber 105. At this point the bottom swing check valve 20's flapper closes. Next electronic-high-pressure-fluid-valve 50 is open which makes a connection via high-pressure-equalization-tube 60 between uptube 70 and the total weight of standing-column-of-water 330 and the compression-decompression chamber 105. The compression-decompression chamber 105 is pressurized by adding a very small amount of the working fluid by volume until the pressures are equalized on either side of the upper check valve 25. At the point of pressure equalization the buoyant-object 75 uses it buoyancy force vector to push open the top swing check valve (25), and the buoyant-object (75) proceeds to float to the top of standing column of water 330 and to the desired height H. To prepare for the compression-decompression-chamber 105 for the next buoyant-object, the pressure in compression-decompression-chamber 105 is equalized to the lower transition's 245 pressure level by opening fluid valve 45 and connecting pipe 55 between the compression-decompression-chamber 105 and the lower-transition 215. The next buoyant-object 75 can then proceeds into compression-decompression-chamber 105 and the cycle of compression and decompression can occur in a rhythmic cycle as the buoyant objects are moved through this fluid interface device that works on the motive force of gravity and buoyancy.

Energy is required to activate the automatic fluid control valves (45, 50), control circuitry (120), and the embodiment requires an additional small amount of water from the uptube 70, that represents a small energy drain in the system. However this energy loss due to water exchange between uptube 70 and lower-transition 245 can be made very small compared to the potential energy gained by the buoyant-object 75 upon being levitated to height H. Also consider that this small amount of the dense fluid that is removed (or leaked) from the standing column of water 330 during each cycle which must be replaced. This can be done by occasionally running a small pump, by having each buoyant-object hold a small amount of water that is dumped at the top transition 215 using for example buoyant object of the type shown in FIG. 12 G/12H, by having one buoyant-object in in some group of buoyant-object be devoted to carrying water as in FIG. 11B/11C, or by doing careful engineering in which the net upward force of all the buoyant-object together creates a pumping effect by dragging water upward.

The amount of water required to compress a few cubic feet of water in the compress-decompression chamber (105) amounts to a few drops of water due to the relatively incompressible nature of water. Again consider the same example used in the prior art section at the beginning of the application, where the standing-column-of-water 330 is a cylinder of height 20 ft of diameter 4 inches, and where the ball is 4 inch in diameter, the compression-decompression-chamber is 50.26 inch3, and the pressure at the bottom of the standing-column-of-water 330 is 8.66 psi. Given a bulk modulus of water of $3.12 \times 10^5$ lbs/in2 the 50.26 inch3 of water in the compression-decompression-chamber 105 when under 8.66 psi of additional pressure will induce a volume decrease of 0.0014 cubic inches. This is equivalent to a cube of water approximately 0.1 inches on each side or approximately one drop of water that is required to pressurize this chamber. This one drop of water will weigh $5 \times 10^{-5}$ pounds and when replaced at the top of the 20 ft standing-column-of-water 330 represents 0.001 Joules of energy. In contrast the elevated 75% loaded ball of 4 inch diameter represents 24.6 Joules of energy when elevated 20 ft. For a potential net gain in energy of approximately 24.6 Joules.

Thinking big, a 6 ft diameter sphere loaded to 75% of the displaced water will weigh 5,294 lbs, displace 7,060 lbs of water, and if elevated 250 ft will represent 1.8 Million Joules of energy. To make this possible the FIG. 17A's compression-decompression-chamber 105 may be at least 6 ft diameter, and 6 ft height, which will represent 293,148 cubic inches of water volume, at a pressure of 108 psi. Using the bulk modulus to compute the amount of water added we 102 cubic inches of water to pressurize the entire volume. This volume of water weights approximately 3.7 pounds and will cost 1,240 Joules to refill for a net energy gain of approximately 1.8 million Joules (the water replacement cost of pressurizing the chamber is insignificant). One buoyant object per second yields approximately 1.8 Megawatts per second which is equivalent to a 1.8 Megawatt power station. As stated earlier the weight of water displaced by a sphere is proportional to the volume of a sphere which scales as the cube of the radius. Therefore one 60 ft spherical buoyant-object per second (10 times the radius of the 6 ft sphere) in a closed loop mass-levitator of the Form FIG. 17A, the rising 250 ft will generate approximately 1,800 Megawatts of power.

The buoyant-objects, having fallen through the linear induction coil 80, effectively convert part of their kinetic energy to electrical pulses by Faraday's law of induction. The final velocity at which they arrive at the lower fluid interface 35 is a function of the total height of the embodiment, the strength of the magnetic material in the buoyant-object, how much power has been extracted from the total kinetic energy, and by other factors such as friction.

The excess energy in the form of kinetic energy, and the buoyant-object's weight can also contribute to pushing one or more buoyant-objects through lower transition 245 where they begin their cyclic journey upward. As previously disused a buoyant-object that is loaded by say 75 percent will be able to push three other buoyant-objects under the fluid level, therefore even if the buoyant-object arrives at the fluid interface 35 with virtually zero surplus kinetic energy the accumulated weight of several buoyant-objects will be sufficient to force other buoyant-objects through the lower transition.

Given that the design parameters of a specific embodiment generate a significant surplus kinetic energy which impinges on fluid interface 35, there are various mechanisms for partially recovering some of this energy which is otherwise wasted in the form of pressure waves, turbulence, splash, or other mechanisms. One method to recover some of this surplus energy is through the use of expansion tanks 110 which contain an internally pressurized diaphragm, and which can accept and store part of the impact pressure wave's energy. Swing check valve 200 is used to insure that the water flow due to the impact at fluid interface 35 is always into the expansion tank. In addition a path for the water to circulate within the lower transition 245 can be provided which will cut down the turbulence and pressure created when the buoyant-objects 75 strike the fluid interface 35. When the chamber is in a compressed state, the circulation path for impact pressure waves is provided through pipe 205 and one way check valve 200. Water from the expansion tank 110 can re-enter the system when automatic value 230 are in an open position by way of pipe 255.

Filling and Draining of the System

Initial filling of the system is supported by a private or public fluid source 240, which is controlled by automatic valve 185, through associated pipe 187. The system is filled from the top, and is accomplished by release of fluid from elevated-fluid-reservoir 135, through reservoir-fill-pipe 145 and reservoir-electronic-control-valve 140. Filling of elevated-fluid-reservoir 135 is accomplished by opening pump-shutoff-valve 185 and through the use of optional water-pump 175. Water-pump 175 may not be needed if the water supply source has sufficient pressure to fill elevated-fluid-reservoir 135. Draining the system for maintenance/repair is accomplished via electronic-water-drain-valve 160 through associated drain-pipe 155 into the public-private-fluid-disposal 265.

Figure 18A:
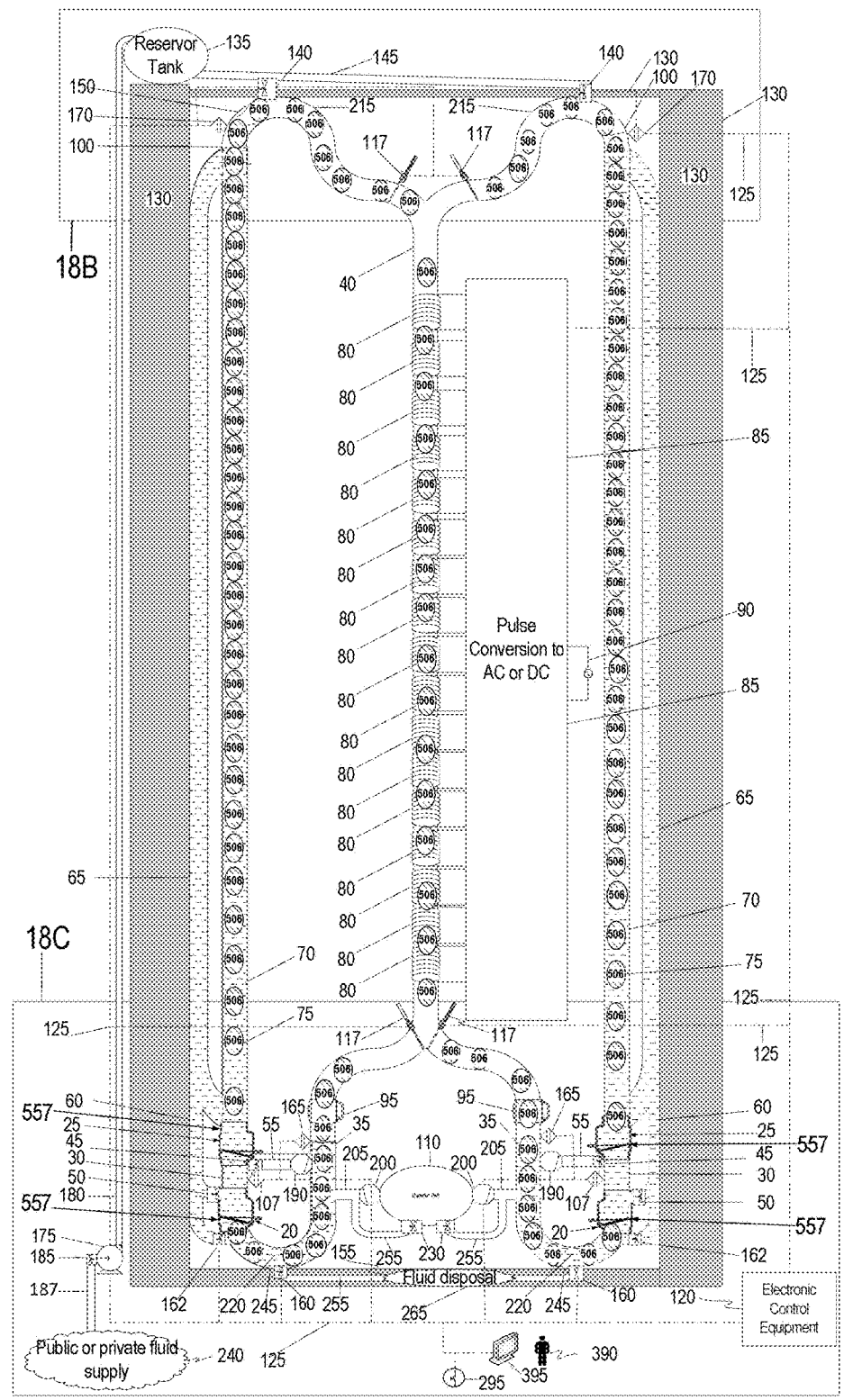
FIG. 18A—Mass levitator dual uptube single downtube with linear induction energy conversion. A modified version of FIG. 17A having two uptubes and one downtube.
Figure 18B:
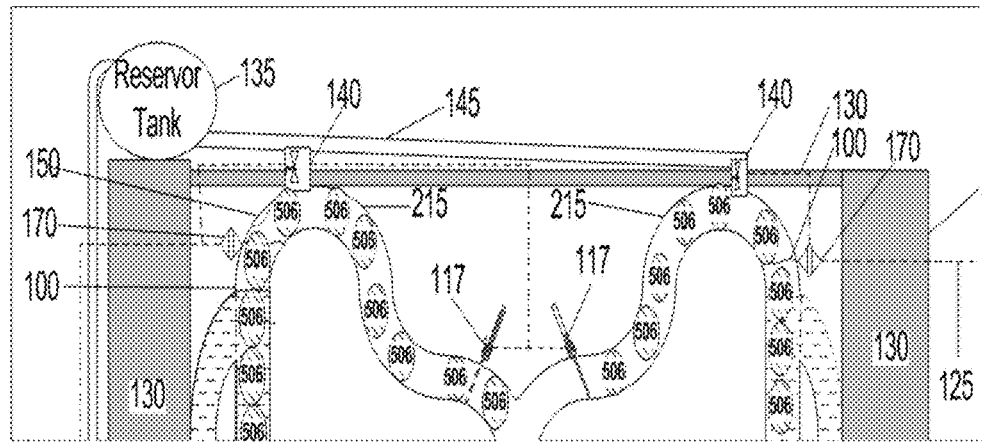
FIG. 18B—close up view of top section of FIG. 18A.
Figure 18C:
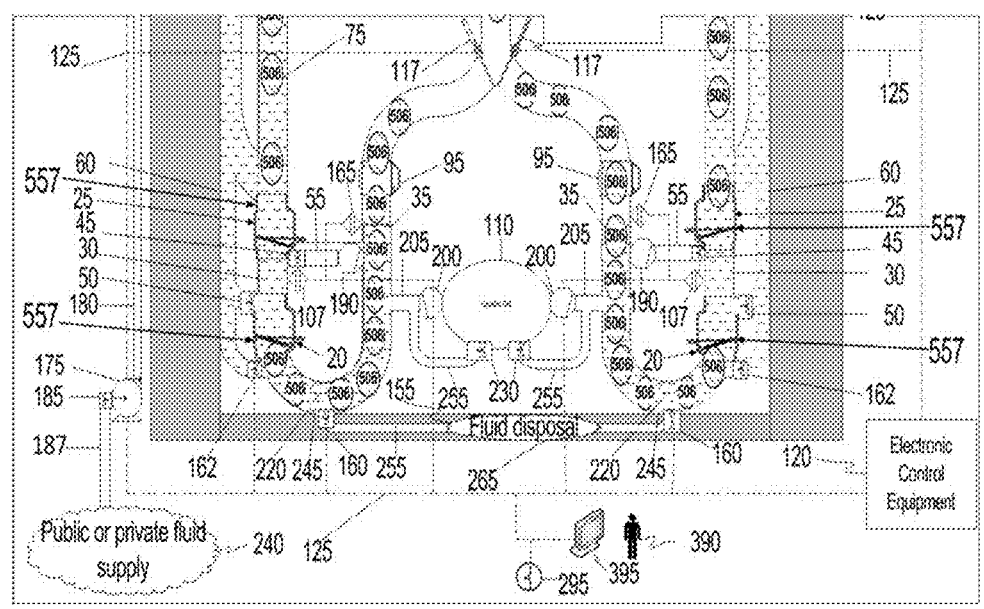
FIG. 18C—close up view of bottom section of FIG. 18A.

FIG. 18A-C—Embodiment 4 Continuously Looping Double Uptube Single Downtube Mass-Levitator with Energy Conversion FIG. 18A, embodiment 4 is nearly a copy of FIG. 17A, embodiment 3 except that embodiment 4 has two uptubes 70 with a slightly bent and deformed shape near the top so as to join the dual uptubes with the single downtube 40, which has also been bent at the bottom and forked so as to recombine and join together the two lower-transitions 245. FIG. 18B is a close up of the top of FIG. 18A, while FIG. 18C is a close up of the bottom of FIG. 18A. FIG. 18A, embodiment 4 serves to illustrate the following major points and differences over that of FIG. 17A:

1. Multiple uptubes 70 with a single downtube 40 are possible and may be desirable so as to increase the rate at which buoyant-objects 75 flow through the induction-coils 80. This feature can be desirable since the rate at which a buoyant-object 75 rises in the uptube is many times slower (due to dense-fluid 21's viscosity) than the rate of fall due to gravity in the light-fluid 22, and since the electrical power is generated only when buoyant-objects containing magnetics or magnetic arrays are moving through induction-coils 80. Due to the cost of the induction coils it makes sense to provide multiple uptubes and a single set of induction coils which represent a major capital expense.

2. Various types of buoyant-objects 75 can be sent through the embodiment. FIG. 17A utilizes buoyant-object-ellipse-magnetic-array 583 (as in FIG. 12F) whereas FIG. 18 utilizes buoyant-object-ellipsoid-dual-magnetic-array 506 (as in FIG. 12B).

3. Many shapes are possible for the uptubes 70 and downtubes 40. The simple double U shapes of FIG. 17's upper and lower transitions (215, 245) are only one possibility.

4. Provides an example of the use of electronic-swing-check-valve 557 (as in FIG. 7A), which replaces both FIG. 17A's manual swing-check-valves 555 (as in FIG. 4C) and the solenoid-timing-motion-control-rod 117.

5. Provides an example where high-pressure-equalization-tube 60 and uptube-secondary-flow-pipe 65 are more smoothly combined together, and where these combined pipes/tubes extends downward so as to combine with the lower-transition 245 just below the lower swing check valve 20. The slight change in shape provides a means to more effectively drain the system when high-pressure-electronic-water-drain-valve 162 is open along with electronic-water-drain-valve 160.

6. Provides an example of a more complex mass-levitator that does not fit the simplified structure of FIG. 2 or 3, instead FIG. 18A represents an example of the more generalized mass-levitator having multiply connected regions, and multiple fluid interface device connecting one central downtube 40.

All parts numbers and part functions are identical with those of FIG. 17A, embodiment 3 with a few additional modifications to accommodate the extra uptube, and make the flow of buoyant-objects smooth and consistent. These changes include:

1. Addition of 2 pairs of solenoid timing and motion control rods 117 at the top and bottom of each uptube and at the bottom of downtube 40. At the top of each uptube 70 solenoid-timing-motion-control-rod 117 serves the function of ensuring that only one buoyant-object 506 (as in FIG. 12B) at a time can enter the downtube 40, while at the bottom downtube 40 solenoid-timing-motion-control-rod 117 serves the function of deflecting the falling buoyant-object 506 into the left or right lower-transition 245.

2. Elevated-fluid-reservoir 135 now fills both the left and right hand upper-transition 215 from reservoir-fill-pipe 145 when the left or the right reservoir-electronic-control-valve 140 is opened. Filling of elevated-fluid-reservoir 135 is unchanged.

3. Pressure equalization of the compression-decompression-tube 30 to the lower-transition 245 pressure levels still occurs via lower-pressure-equalization-tube 55 when electronic-low-pressure-fluid-valve 45 is open, however the attachment point of lower-pressure-equalization-tube 55 into lower-transition 245 has been moved to be located directly across from U-shaped lower-transition 245. In addition top-downtube-check-valve 190 has been added to ensure that water flows away from compression-decompression-tube 30 in one direction only. This slight change in lower-transition 245 pipe/tube connections provides the possibility for fluid circulation of the dense-fluid 21 within the path formed by lower-transition 245, lower-swing-check-valve 20, compression-decompression-tube 30, lower-pressure-equalization-tube 55, top-downtube-check-valve 190 and back to lower-transition 245 when lower-swing-check-valve 20's flapper is open along with electronic-low-pressure-fluid-valve 45.

Operationally, FIG. 18A functions in almost exactly the same manner as FIG. 17A, hence the duplicated functionality, and functionality already described for FIG. 18A will not be elaborated and described again. Buoyant-objects 506 are continuously driven through a compression-decompression cycle by the forces of gravity and buoyancy as they are guided to enter and exit the compression-decompression-tube 30 bound on the bottom by electronic swing-check-valve 20 and on the top by electronic swing-check-valve 30, which now exist on both the left and right hand sides of the embodiment. Electronic-control-equipment 120 monitors and controls the motion of buoyant-objects 506 by selectively opening the electronic flapper of electronic-swing-check-valves 557 so as to permit a single buoyant-object 506 into compression-decompression-tube 30 at one time, and selectively releasing a buoyant-object 506 into the left or right uptubes 70 as needed. Downtube 40 buoyant-object flow is maximized by the two pairs of solenoid-timing-motion-control-rod 117 at the top and the bottom of the downtube 40, where the top set alternates entry of buoyant-objects from the right followed by the left into downtube 40, whereas the bottom pair of solenoid-timing-motion-control-rod 117 deflect the buoyant-objects 506 to the right or left so as to redistribute and numerically split the buoyant-objects into the left or right transitions as required.

Figure 19A:
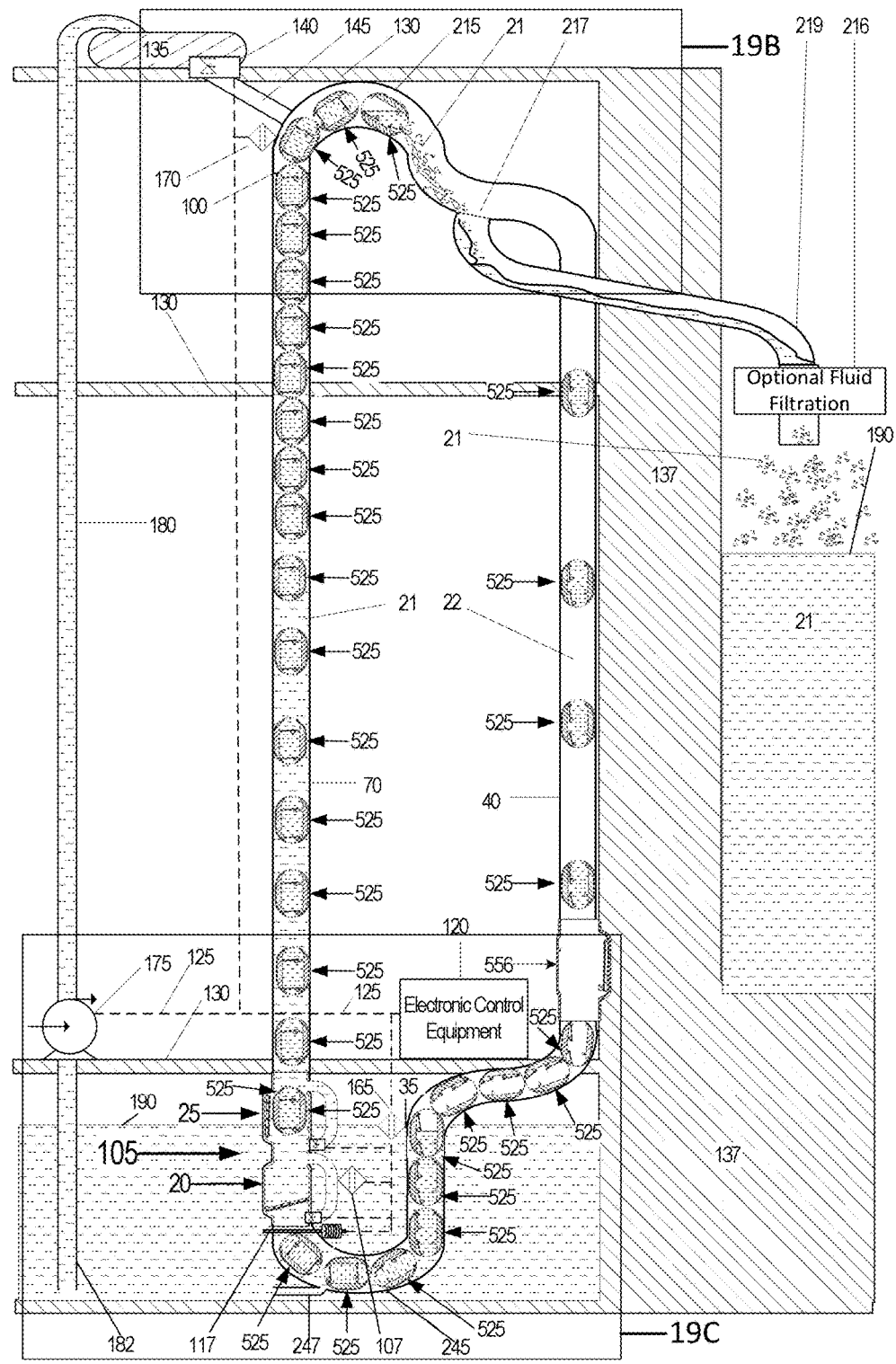
FIG. 19A—water pump at dam, showing modified FIG. 17A with buoyant-objects designed to capture water at the bottom and release it at the bottom using buoyant-objects of FIG. 11A-C. Pumped water is used to fill a dam or could be used for irrigation.
Figure 19B:
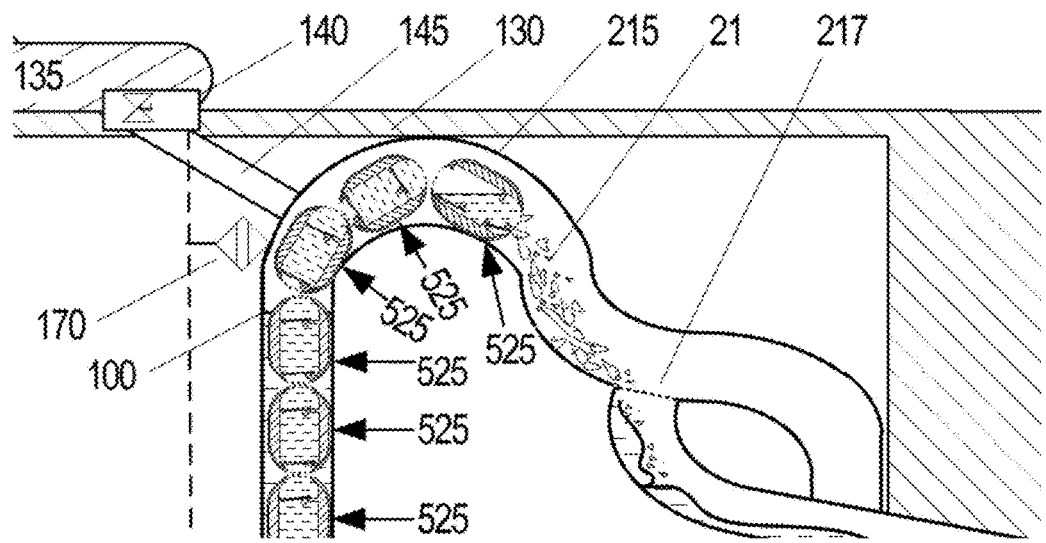
FIG. 19B—close up view of top section of FIG. 19A.
Figure 19C:
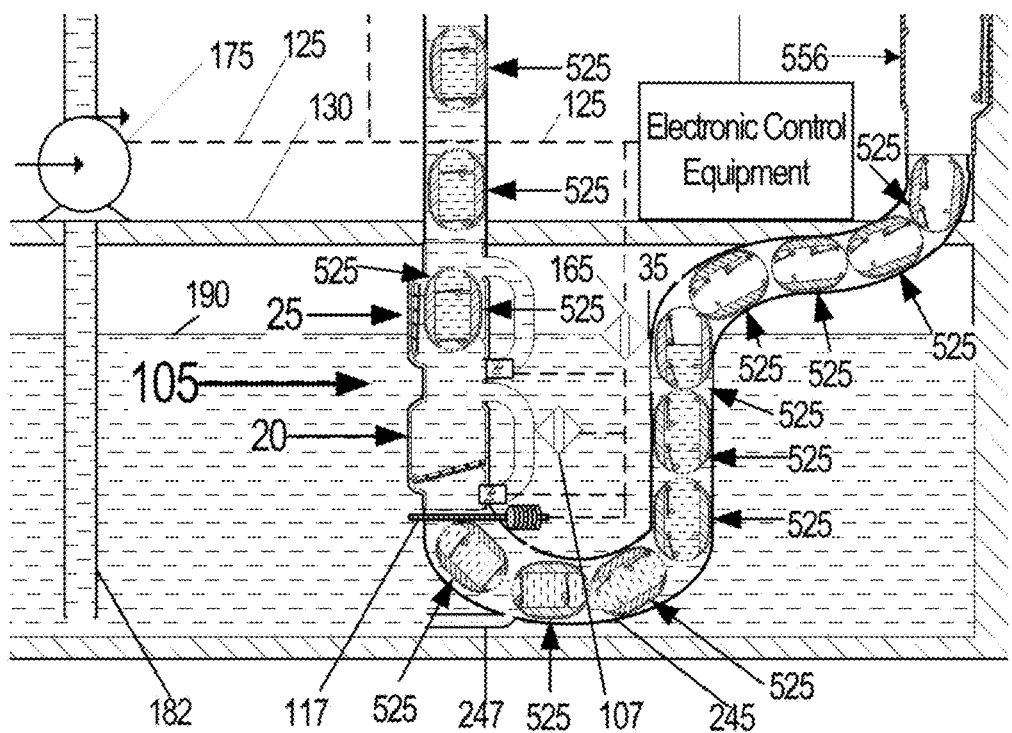

FIG. 19A-19C—Embodiment 5 Water Pump at Dam

FIG. 19A shows a Dam in the process of being filled with water by a mass-levitator. FIG. 19A with top detail 19B and bottom detail 19C provide cross sectional views of embodiment 5, which conforms to the general template of FIGS. 2 and 3, with a slight variation in that there are several connected regions of water acting as the dense fluid: low-elevation-water-source 190, elevated-water 195, and water in uptube 70 and lower transition 245. FIG. 19A retains most of the functionality and internal parts of FIG. 17A, embodiment 3 except that embodiment 5 uptube 70 and downtube 40 are shaped like the left hand side of FIG. 18A, embodiment 4 with the addition of a secondary attached drain pipe shaped as a large kitchen spigot (upper-transition-dense-fluid-drain-pipe 219) whose purpose is to drain water (the dense fluid 21) from the upper-transition 215 and to guide the waters flow to a fill point behind the dam-structural-wall 137 into elevated-water 195. Water is pumped/levitated to the top of Embodiment 5, by buoyant-objects 525 containing an internal fluid chamber and internal sealing swing check valves as shown in FIG. 11A through FIG. 11C.

FIG. 19A, embodiment 5 servers to illustrate the following major points, differences, and unique possibilities over that of 17A:

1. Water or other dense-fluids 21 can be pumped to a higher elevation by specialized buoyant-objects like 525 which are continuously circulated in the mass-levitator, represented in FIG. 19A. The arbitrary mass being elevated in this case is water, which is scooped up, elevated to the top and transported to an elevated region of water.

2. Multiple dense fluid regions can be connected and the dense fluid regions can be natural bodies of water such as rivers or lakes, or man-made fluid regions such as the water behind a dam.

3. The dam embodiment 5 can also be utilized of as a means for general irrigation of the earth, in which water is pumped upward into a vast irrigation system of potentially huge scale.

4. By the addition of an optional-water-filtration-system 216, such as a reverse osmosis system housed just beneath upper-transition-dense-fluid-drain-pipe 219, the water has the possibility of being purified. Using the optional-water-filtration-system 216 as part of a water pump embodiment mass-levitator it may be possible for sea water to be purified and elevated from the oceans or sea and transported via aqueducts for use by cities, factories, and or farmland.

Operationally, FIG. 19A functions in almost exactly the same manner as FIG. 17A, hence the duplicated functionality and reused parts/part numbers previously described will not be elaborated and described again in detail. The generalized closed loop form of FIG. 19A corresponds to the generalized closed loop system of FIG. 2 and contains FIG. 19A manual swing check valve compression-decompression-chamber 105 which is also shown in FIG. 4F. FIG. 19A serves to cyclically levitate buoyant-objects 525 using the compression-decompression method already described for compression-decompression-chamber 105 in FIG. 17A, and FIG. 6. Buoyant-objects 525 after falling through downtube 40 have been inverted, are empty of dense-fluid 21, and have their internal swing check valve flappers pulled down by gravity as shown in, and described by the text associated with FIG. 11A-FIG. 11C. When Buoyant-object 525 enters the water at air-to-water-interface 35, the buoyant-object 525 is forced under the surface of the water as described in the text associated with FIG. 6, that is the weight and momentum of buoyant-objects 525 above provide the motive force to guarantee submersion of the buoyant-objects at or below the water line. Upon entering the air-to-water-interface 35 buoyant-object 525 picks up water, and as it moves further into lower-transition 245, it begins to turn upward. In the process of turning upward the weighted internal check valves contained in 535 (see FIG. 11 A-FIG. 11 C) close since gravity is acting downward on the interior check valve flappers 521 as shown in FIG. 11C. Compression-decompression-chamber 105 is equalized to the fluid pressure level in the lower-transition 245, and solenoid-timing-motion-control-rod 117 is retracted to permit a single buoyant-object 525 to lift the check-valve-flapper 550 and float upward so as to enter into lower-swing-check-valve 20 (FIG. 19). Compression-decompression-chamber 105 is compressed with enclosed buoyant-object 525 by equalized of 105 to the fluid pressure level in uptube 70, where upon check-valve-flapper 550 (see FIG. 4F) in upper-swing-check-valve 25 is pushed open by buoyant-object 525, at which point buoyant-object 525 rises upward in uptube 70. Buoyant-objects 525 having passed through compression-decompression-chamber 105 are lifted into upper-transition 215 in the same manner as described for FIG. 8, and FIG. 17A, however as buoyant-object 525 is inverted in upper-transition 215 the internal swing check valves contained in 525 are again opened by gravity pulling downward on buoyant-object-flapper 521 (as in FIG. 11B) so as to spill the fluid contents of buoyant-object 525 into the downward sloping section of upper-transition 215, where it runs downhill and into upper-transition-dense-fluid-drain-entrance 217. The fluid then continues downhill as it travels through upper-transition-dense-fluid-drain-pipe 219, passes through and is filtered by optional-fluid-filtration-system 216, and finally emptied into the dam on the other side of dam-structural-wall 137.

There are a few part numbers that have not previously been mentioned in other figures and other portions of text within this application. They include:

1. lower-transition-inlet-pipe 247 which serves the function of always keeping lower-transition 245 filled with water as water is extracted when buoyant-objects 525 are filled and levitated out of the lower-transition.

2. water-pump-suction-pipe 182 which has been added so that water-pump 175 can reach into low-elevation-water-source 190 as shown to the left bottom of FIG. 19.

As previously described water can be added to the system via elevated-fluid-reservoir 135, reservoir-fill-pipe 145 when reservoir-electronic-control-valve 140 has been opened. Elevated-fluid-reservoir 135 is filled via water-pump 175 through water-pump-pipe 180, and water-pump-suction-pipe 182. Finally the entire system of valves, solenoids, pumps, water and pressure sensors are controlled, monitored, and actuated by electronic-control-equipment 120 through electrical control-cables 125 as in FIG. 17A.

FIG. 28—Embodiment 6 Water Pump with Water Wheel

Figure 20:
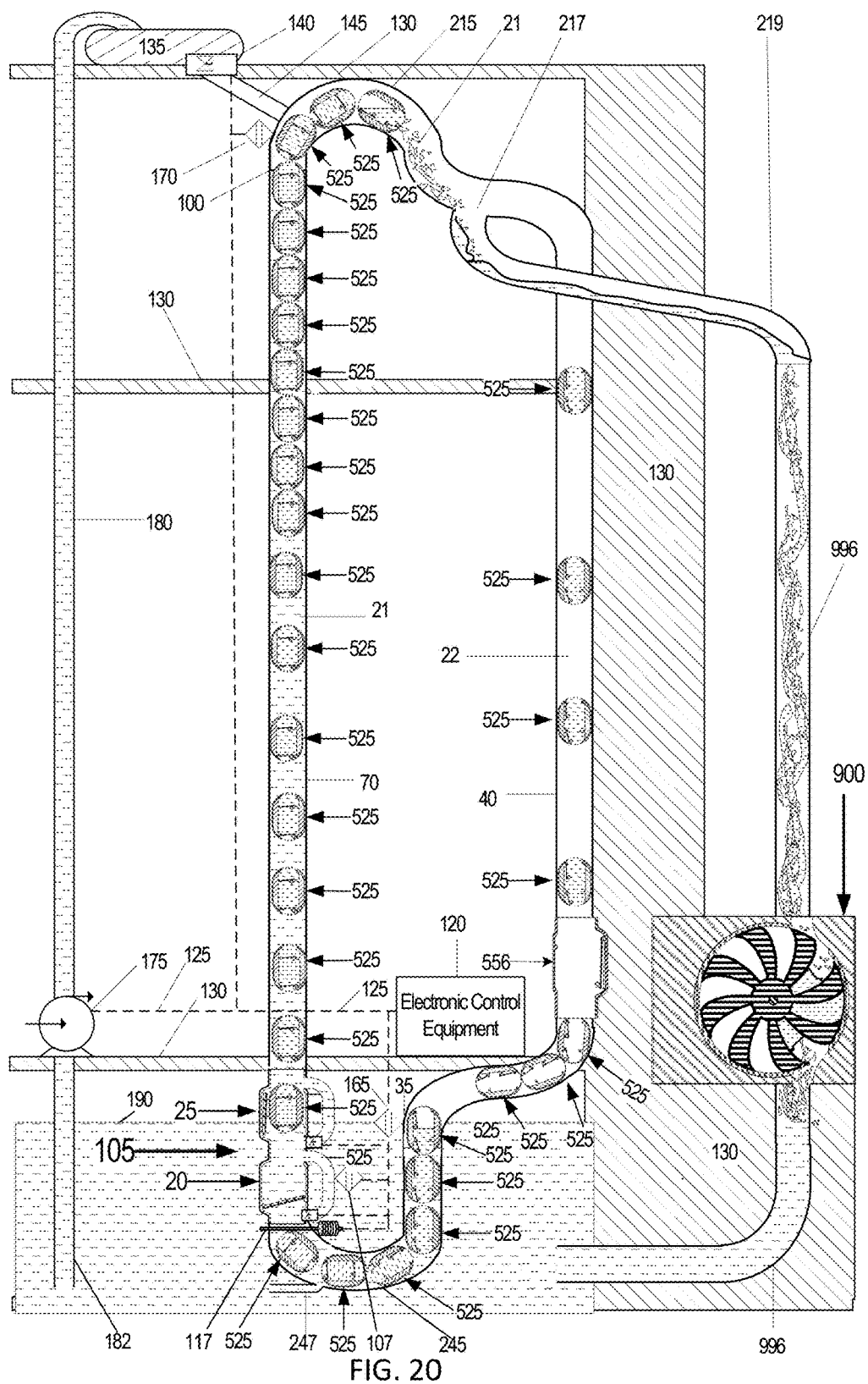
FIG. 20—water pump with gravity wheel. Modified versions of FIG. 19A where pumped water is used with gravity wheel of FIG. 14A, to generate mechanical or electrical power.

FIG. 20, embodiment 6 is the exact same diagram as FIG. 19A except that the water that is pump upward is used to turn gravity-wheel 900 instead of filling the dam. Gravity-wheel 900 is attached to an electrical generator as in FIGS. 14A and 14B. FIG. 20 has two additional parts as compared to FIG. 19A, namely gravity-wheel-fluid-entrance-tube 996 and gravity-wheel-fluid-exit-tube 997 which also exist in FIG. 14B. FIG. 20 has one less part as compared to FIG. 19, namely optional-fluid-filtration-system 216 which is not necessarily required for this application.

FIG. 20, embodiment 6 serves to illustrate one main point, that being that the gravitational potential energy represented by the elevated fluid that is pumped into the dam in FIG. 19 could equally well be extracted and converted to electrical power via the gravity-wheel 900 which is acting as a water wheel or hydro-turban that is used in this unique embodiment.

Figure 21A:
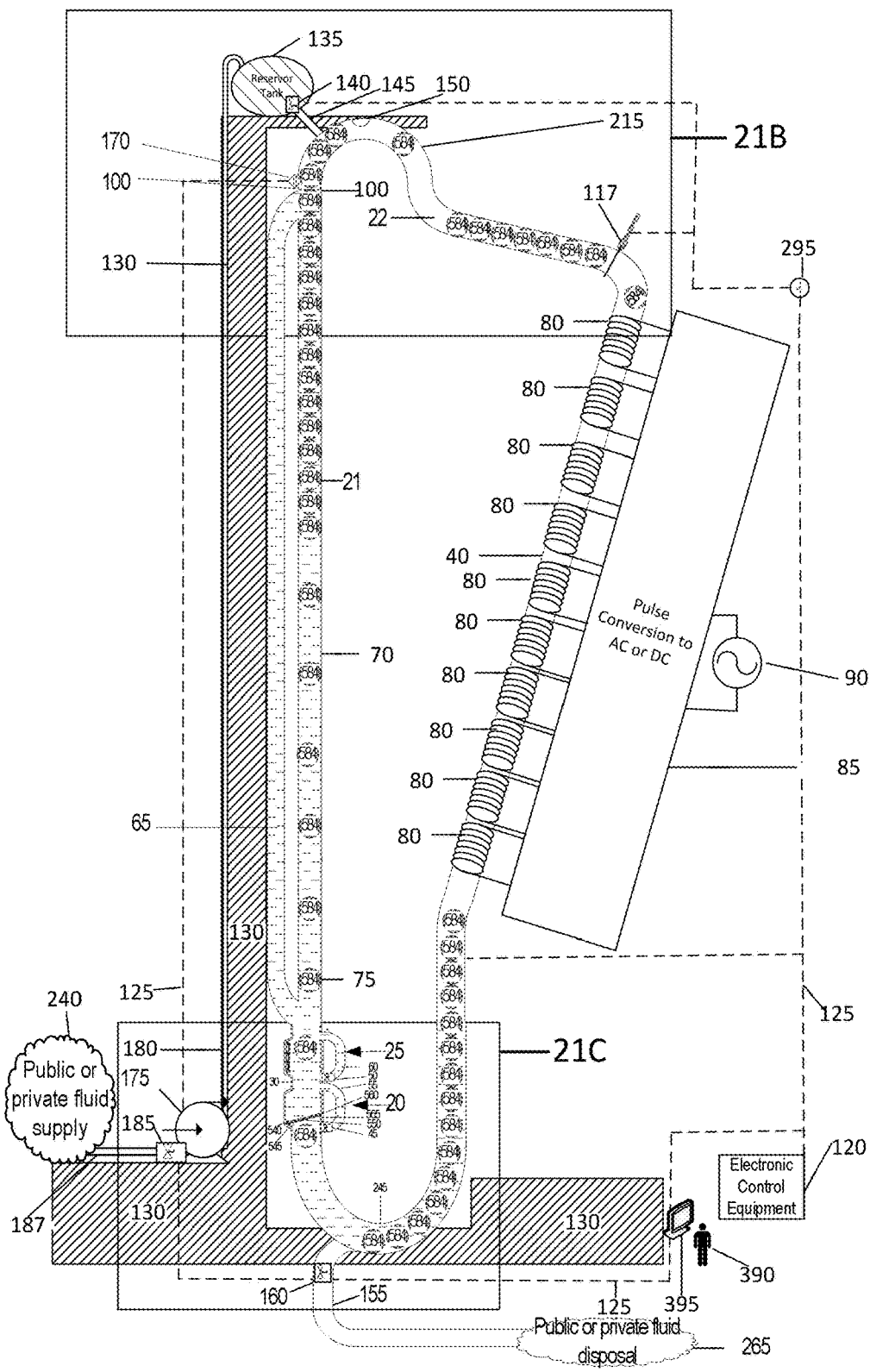
FIG. 21A—bottom wheel FID single uptube single down tube on incline with linear and rotational induction energy conversion. Modification of FIG. 29A with downtube inclined so as to roll round or cylindrical buoyant-objects down the downtube with the goal of increasing the rotational kinetic energy, the rate of change of flux, and the length of time spent in the downtube.
Figure 21B:
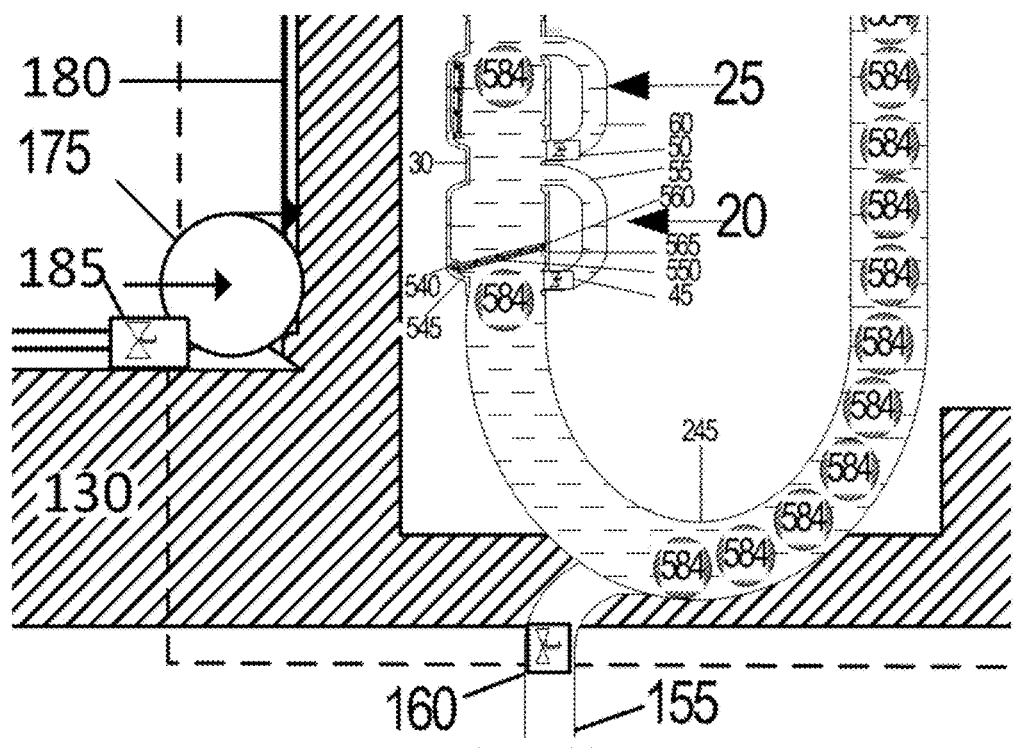
FIG. 21B—close up view of top section of FIG. 21A.
Figure 21C:
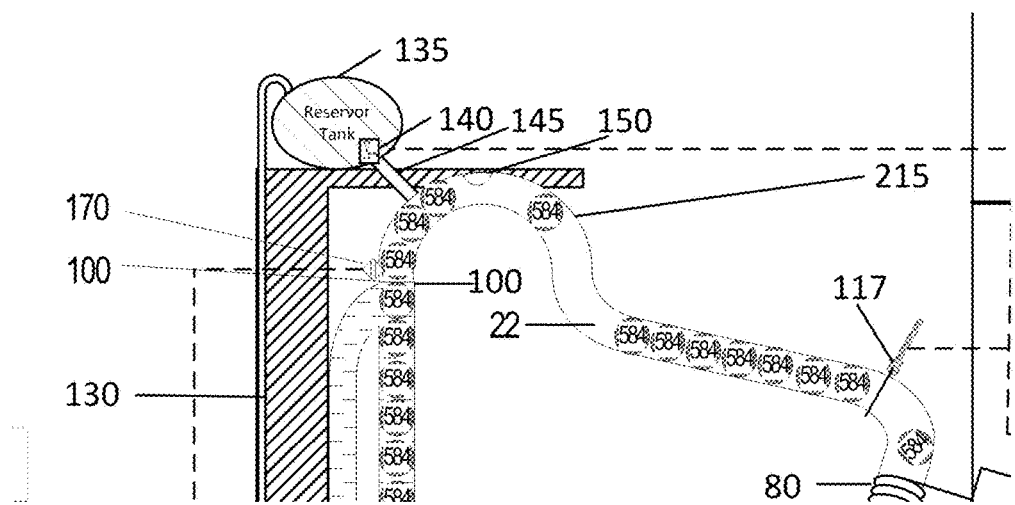
FIG. 21C—close up view of bottom section of FIG. 21A.

FIG. 21A-21C—Embodiment 7 Single Uptube, Inclined Single Downtube with Linear Inductive Power Conversion FIG. 21A, embodiment 7 is exactly the same mass-levitator, having the same part numbers and functions as shown in FIG. 17A, except that the vertical downtube 40 of FIG. 17A has been inclined to an angle so as to permit buoyant-objects 75 within the system to roll down downtube 40 instead of simply dropping or falling straight down. To incline downtube 40, upper-transition 215 has been extended and slightly reshaped as shown in FIG. 21A so as to meet-up, connect, and be in fluid communication with downtube 40. FIG. 21B provides a close up view of the top section of FIG. 21A, while FIG. 21C provides a close up view of the bottom of FIG. 21A.

The major advantage of an inclining downtube, as discussed somewhat in the text associated with FIG. 9, is that when buoyant-objects such as those pictured in 20E (584), or 20J (590) are rolled into, through, and out-of, induction-coils 80 they have additional rotational kinetic energy which increases the rate of change of the flux generated by the falling, and rotating magnets/magnetic arrays contained in the buoyant-objects. Since the rate of change of flux is directly related to the magnitude of the voltage induced by the induction coils due to Faraday's law, rotation of the buoyant-objects increases the electrical voltage output from embodiment 7. The electrical voltage/current output 90 when magnetic buoyant-objects are rolled can be much more sinusoidal and potentially easier for the pulse conversion subsystem 85 to format into desirable commercial waveforms.

A secondary advantage to this embodiment is that the rotation of the buoyant-objects in the downtube 40 will permit the buoyant-objects to spend more time in the downtube generating electrical pulses. This is true because the speed of the buoyant-object will be less than a free vertical fall and the downtube is itself longer due to the geometry of the incline and will therefore support more induction coils and has longer to travel through the induction coils.

An alternative to the simple inclined configuration in FIG. 21A is to take the downtube 40 and reform/reshape the straight downtube 40 of FIG. 17A into a helix coil which spirals and wraps downward around one or more uptube 70s. The helical shape would connect from upper-transition 215 and wind downward where it will end at the lower transition 245. The number of turns in the helix between top and bottom would be a function of the overall height, the desired incline, and the width of the induction-coils 80 that surround the downtube 40. This configuration is not shown due to the complexity of the associated drawings.

A final variation to FIG. 21A should also be examined, namely that cylindrical buoyant-objects 590 of the type shown in FIG. 12I and FIG. 12J can be used, in which the enclosed magnetic material is shaped into an internal cylinder diametrically magnetized across the axial diameter. Buoyant-objects 590 would replace buoyant-object 584 in FIG. 21A. The only material change to FIG. 21A to support buoyant object 590 is that downtube 40 would need to be a square tube so as to fit rolling the cylindrically shape buoyant-object 590 down an incline. The advantage to using buoyant-object 590 in the square downtube 40 is that the magnetic field of the rotating buoyant-object is always in a single plane perpendicular to cross-section of the downtube and more importantly perpendicular to the cross section of the induction coils 80 so as to provide a near optimal rate of change of the magnetic flux seen by the induction coil.

FIG. 22—Embodiment 8 Bottom FID, Multiple Gravity Wheels, and Top FID

FIG. 22, is a variation on FIG. 17A. Embodiment 8 exchanges induction coils and pulse conversion subsystem with a gravity wheel for energy conversion while retaining uptube 70, downtube 40, the water pumping equipment (187, 185, 175, 180, 240), the water resupply equipment (135, 140, 145), water disposal equipment (160, 155,265), computer control, timing, and user interface equipment (117, 120, 125, 295, 390. 395). Embodiment 8 utilizes the mass-levitator template of FIG. 2 with bottom-FID 16 replaced by the compression-decompression-chamber 105 and lower transition 245 of FIG. 6, with top-FID 17 replaced by upper transition 215 and energy conversion 24 replaced by gravity-wheels 900. Buoyant-objects in FIG. 22 are stacked as in FIG. 17A throughout the embodiment, rising in uptube 70, entering upper transition 215 and falling through the stacked gravity-wheels 900 until they re-enter lower transition 245.

The utility of FIG. 22, Embodiment 8 is that it provides an example of how gravity-wheel 900 can be stacked upward virtually without limit, how they can eliminate induction coils, and how a generalized gravity wheel can utilize buoyant-objects to generate electricity.

Given that gravity-wheel 900's operational details have been completely defined via the text associated with FIG. 14A-FIG. 14C, and given that there is no significant difference to the operation of top-FID and bottom-FID from that already described in FIG. 17A, no further operational description seems warranted. Buoyant-objects 75 simply travel up the left side of the apparatus via the motive force of buoyancy, and travel downward due to the force of gravity on the right while at the same time spinning the central axis of their respective gravity-wheels.

Figure 23A:
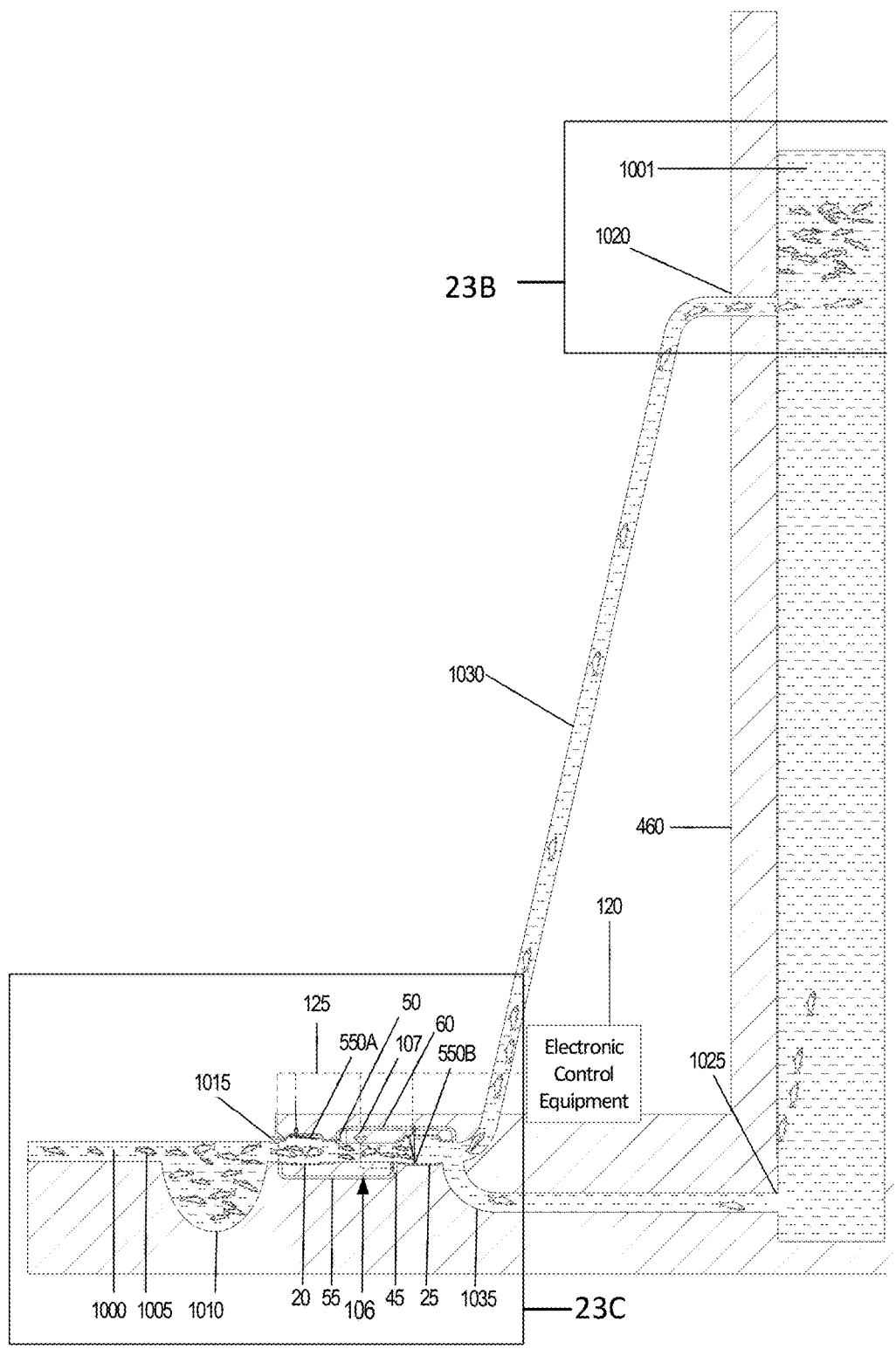
FIGS. 23A-23C—Fish Mass-Levitator for Dam. Swing check valve FIDs are used to maintain fluid separation and pressure difference, while allowing fish to cyclically enter the compression decompression chamber and swim to the top. Fish act as the self-mobile variably buoyant-object in this embodiment.
Figure 23B:
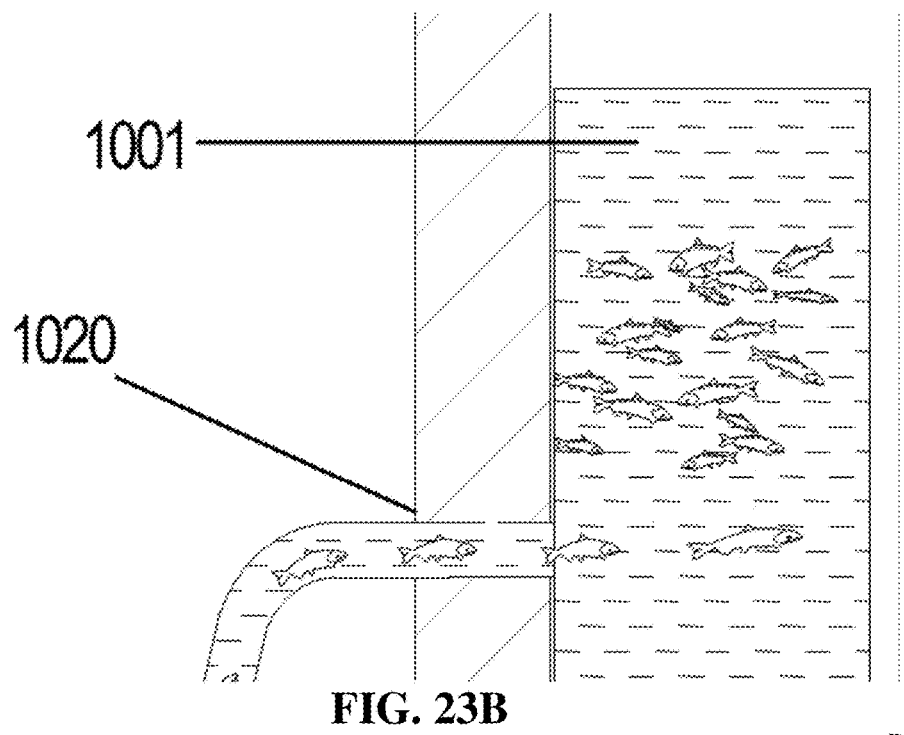
Figure 23C:
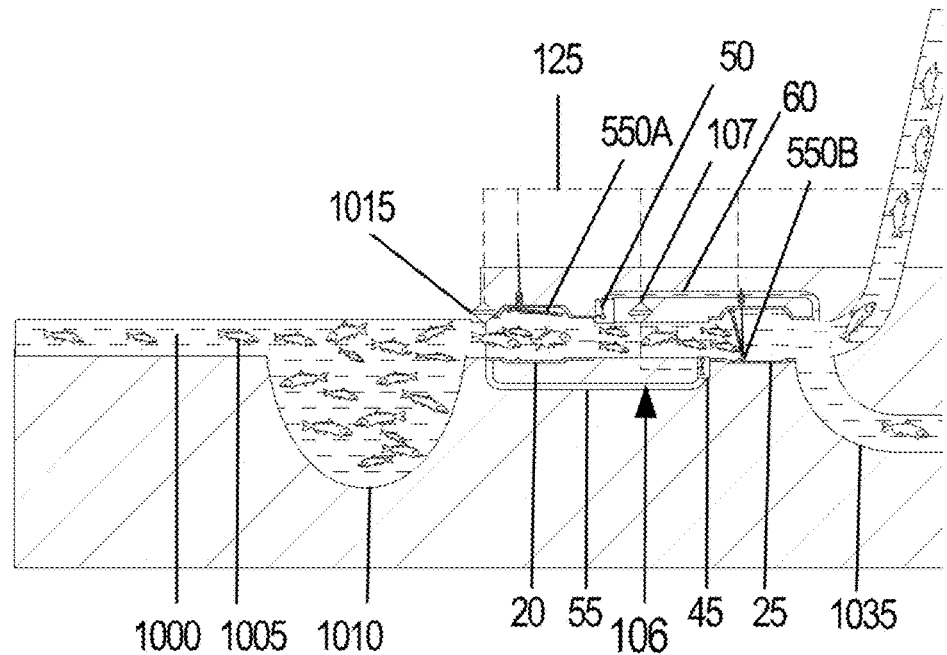

FIG. 23A-23C—Embodiment 9 Fish Mass-Levitator for Dam

FIG. 23A embodiment 9 provides a novel method of utilizing the methods and principles of this application, in particular the FID, to permit fish to migrate into an elevated body of water. One real life example is the need for salmon to migrate beyond a tall blocking dam which has not been fitted with fish ladders, perhaps because the dam is just too high. FIG. 23B provides a close up view of the top section of FIG. 23A, while FIG. 23C provides a close up view of the bottom of FIG. 23A.

In FIG. 23A fish 1005 existing in, and swimming in lower-body-of-water-containing-fish 1000, begin to congregate in lower-concentrating-fish-pond 1010 which is at the mouth of electronic-compression-decompression-chamber 106 of the type shown in FIG. 7C. To reduce clutter only one fish is explicitly called out and annotated in FIG. 23A due to the large number of fish actually shown in the diagram. It is known that salmon in particular use their sense of smell to home in on the river entrance that leads to their natal spawning ground, hence the electronic-compression-decompression-chamber 106 being connected to the top of wall-of-dam 460 via standing-column-of-water-pipe 1030, provides small quantities of water due to leakage and normal operation that attract the fish to lower-concentrating-fish-pond 1010.

Electronic-compression-decompression-chamber 106 is used in embodiment 9 as a form of Fluid Interface Device (FID) to permit variably buoyant self-propelled objects in the form of fish 1005 to migrate from lower-body-of-water-containing-fish 1000 to upper-body-of-water-containing-fish 1001. The dual electronic swing-check-valve 106 style FID holds back the water pressure of the dam. It is used to create a standing-column-of-water in standing-column-of-water-pipe 1030 that is attached on the lower end to upper-swing-check-valve 25 within electronic-compression-decompression-chamber 106 and on the top end to wall-of-dam 460 at upper-fish-entrance-to-dam 1020. A secondary optional lower entrance to the dam occurs via lower-fish-entrance-pipe 1035 which is attached to, and is in fluid communication with the dam on the right of FIG. 23A at lower-fish-entrance-to-dam 1025 and to the left to upper-swing-check-valve 25.

Fish 1005 in bottom detail FIG. 23C, congregating in lower-concentrating-fish-pond 1010, swim into electronic-compression-decompression-chamber 106 when checkvalve-flapper 550A of lower-swing-check-valve 20 is open and the water pressure within electronic-compression-decompression-chamber 106 has been equalized to the water pressure level in lower-concentrating-fish-pond 1010. Pressure equalization occurs by opening electronic-low-pressure-fluid-valve 45 so as to permit a small amount of water to flow through lower-pressure-equalization-tube 55 into lower-concentrating-fish-pond 1010. It is this slight water leakage that originates upstream from the fishes prospective, and that provides the "scent" of their origin, that attracts the fish to move into electronic-compression-decompression-chamber 106 in the first place. Fish entering electronic-compression-decompression-chamber 106 are counted by optional electronic-control-equipment 120 and fish-counter-sensor 1015. In addition electronic-control-equipment 120 starts a timer that can also cause electronic closure of check-valve-flapper 550A which is part of lower-swing-check-valve 20.

When there are sufficient fish in electronic-compression-decompression-chamber 106, or when sufficient time has elapsed since the last compression-decompression cycle within the embodiment 9, check-valve-flapper 550A and 550B of swing-check-valve 20 and 25 are both closed and electronic-compression-decompression-chamber 106 is equalized to the high pressure level at the bottom of the dam. High pressure equalization occurs when electronic-high-pressure-fluid-valve 50 is opened so as to permit a small amount of water to flow through high-pressure-equalization-tube 60. When the internal water pressure of electronic-compression-decompression-chamber 106 is equal to the pressure created by the standing-column of water at the bottom of standing-column-of-water-pipe 1030, check-valve-flapper 550B of upper-swing-check-valve 25 is open so as to permit fish 1005 to swim out of electronic-compression-decompression-chamber 106. The pressure levels inside of electronic-compression-decompression-chamber 106 are monitored by electronic-control-equipment 120 through compression-decompression-chamber-pressure-sensor 107 so as to know when to open or close check-valve-flapper 550. Once fish 1005 have exited electronic-compression-decompression-chamber 106 they have the choice to swim upward through standing-column-of-water-pipe 1030 where they enter the dam at upper-fish-entrance-to-dam 1020, or they can swim through the lower dam entrance via lower-fish-entrance-pipe 1035 where they enter the dam at lower-fish-entrance-to-dam 1025. Fish 1005 having overcome the elevated dam are then free to populate the dam or migrate further upstream.

Figure 24A:
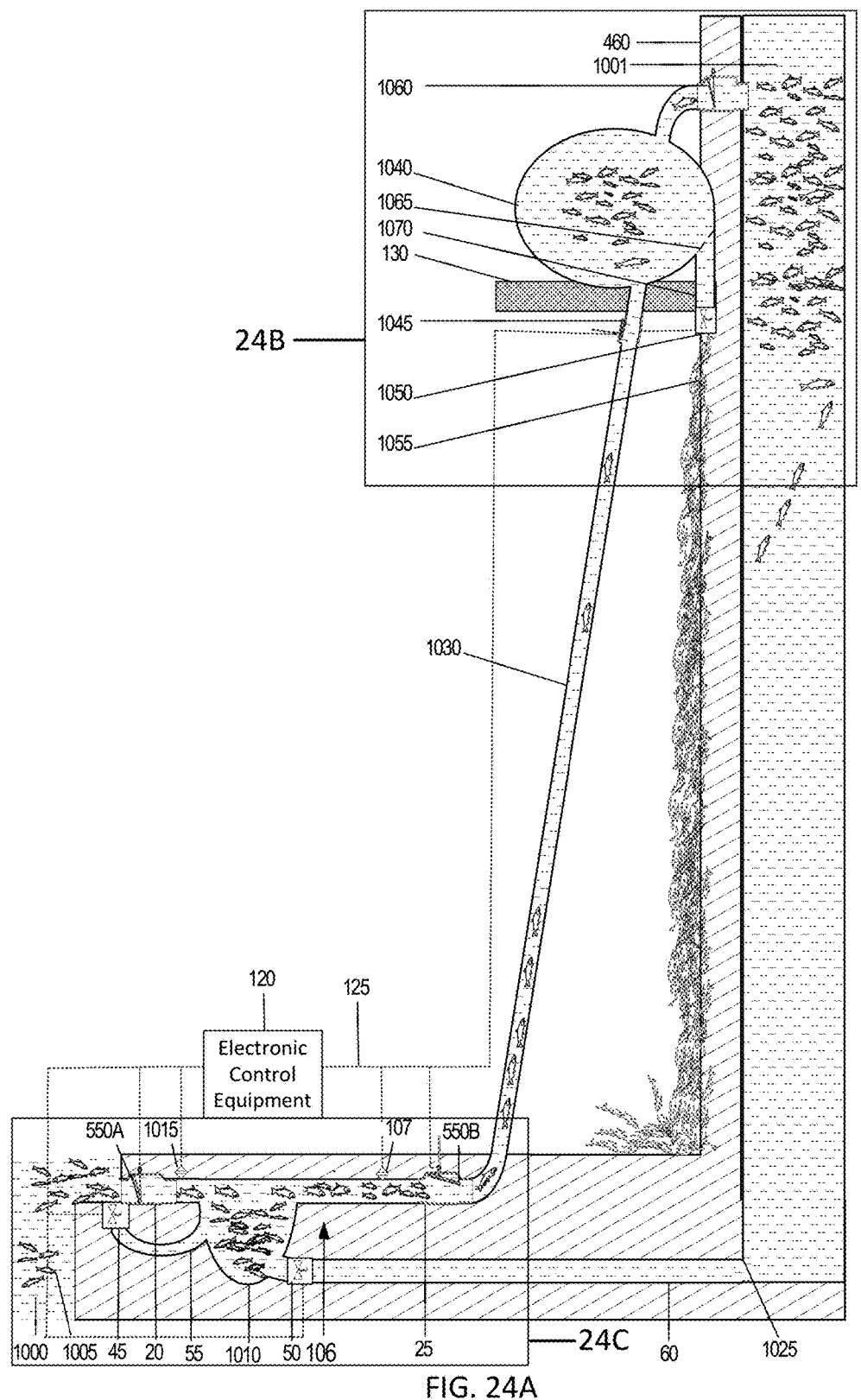
FIGS. 24A-24C—Power Fish Levitator. A variation of FIG. 23 in which the compression decompression chamber is enlarged and where water controllably released from the top of the apparatus causes a fluid current that drives the fish upward.
Figure 24B:
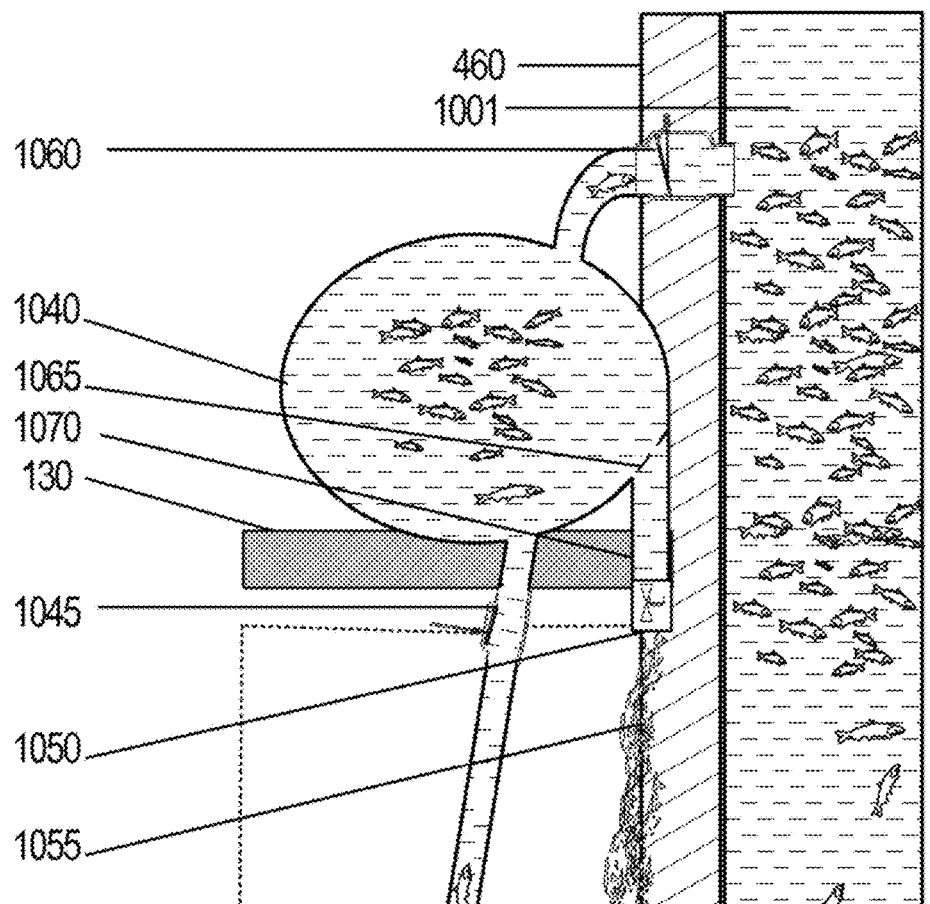
Figure 24C:
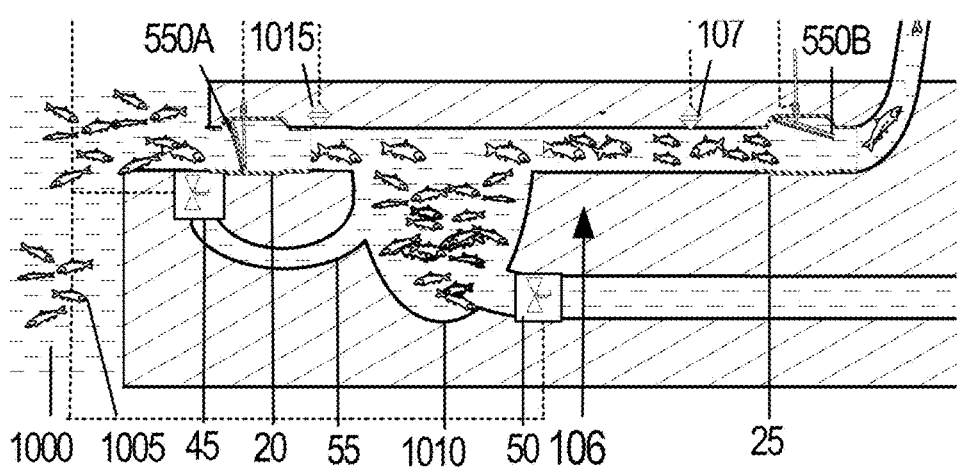

FIG. 24A-24C—Embodiment 10 Power Fish Levitator

FIG. 24A embodiment 10 is a slight variation on FIG. 23 embodiment 9 that utilizes some of the compressed energy produced by gravity in the form of water pressure to create an upward current through standing-column-of-water-pipe 1030 so as to carry the fish along with the flowing current of water to the top of the dam. FIG. 24B provides a close up view of the top section of FIG. 24A, while FIG. 24C provides a close up view of the bottom of FIG. 24A. FIG. 24A differs from FIG. 23A in that lower-concentrating-fish-pond 1010 has been moved inside of electronic-compression-decompression-chamber 106 so as to extend and expand the volume of compression-decompression-tube 30 of FIGS. 4F and 23A. Lower-pressure-equalization-tube 55 now extends into, and is in fluid communication with, lower-body-of-water-containing-fish 1000, while lower-fish-entrance-pipe 1035 still exists but is utilized as, and is relabeled as, high-pressure-equalization-tube 60. Above standing-column-of-water-pipe 1030 there is a new water-filled structure that rests on structural support 130, and which is used to contain and concentrate fish 1005 known as concentrating-fish-bottle 1040. In FIG. 24 it is shown as a spherical container, but its overall shape need not be spherical in the actual embodiment, as long as it can hold water and a sufficient quantity of fish.

Concentrating-fish-bottle 1040 can be closed off at its bottom by lower-fish-bottle-swing-check-valve 1045 and on the top by upper-fish-bottle-swing-check-valve 1060 which also extends through wall-of-dam 460 into upper-body-of-water-containing-fish 1001. Concentrating-fish-bottle 1040 also connects through fish-bottle-leak-valve-pipe 1070 to a lower water drain valve (fish-bottle-leak-valve 1050). The entrance to fish-bottle-leak-valve-pipe 1070 is covered by fish-bottle-leak-valve-grate 1065 so as to prevent fish 1005 from being sucked through fish-bottle-leak-valve-pipe 1070 when fish-bottle-leak-valve 1050 is open and leaking-water 1055 is flowing from concentrating-fish-bottle 1040.

As in FIG. 23A, electronic-compression-decompression-chamber 106 is used in embodiment FIG. 24A, embodiment 10 as a form of Fluid Interface Device (FID) to permit variably buoyant self-propelled objects in the form of fish 1005 to migrate from lower-body-of-water-containing-fish 1000 to upper-body-of-water-containing-fish 1001. The dual swing-check-valve style FID holds back the water pressure of the dam, and is used to create a standing-column-of-water in standing-column-of-water-pipe 1030 that is attached on the lower end to upper-swing-check-valve 25 within electronic-compression-decompression-chamber 106 and on the top end to lower-fish-bottle-swing-check-valve 1045, which is in turn connected to concentrating-fish-bottle 1040.

Fish 1005 swim into electronic-compression-decompression-chamber 106 when check-valve-flapper 550A of lower-swing-check-valve 20 is open and the water pressure within electronic-compression-decompression-chamber 106 has been equalized to the water pressure level in lower-body-of-water-containing-fish 1000. Pressure equalization occurs by opening electronic-low-pressure-fluid-valve 45 so as to permit a small amount of water to flow through lower-pressure-equalization-tube 55 into lower-body-of-water-containing-fish 1000. It is this slight water leakage that originates upstream from the fishes prospective, and that "smells" of their origin, and that attracts the fish to move into electronic-compression-decompression-chamber 106 in the first place. Fish entering electronic-compression-decompression-chamber 106 are counted by electronic-control-equipment 120 and fish-counter-sensor 1015. In addition electronic-control-equipment 120 starts a timer that can also cause electronic closure of check-valve-flapper 550A which is part of lower-swing-check-valve 20.

When there are sufficient fish in electronic-compression-decompression-chamber 106 and lower-concentrating-fish-pond 1010 which is contained in electronic-compression-decompression-chamber 106, or when sufficient time has elapsed since the last compression-decompression cycle within the embodiment 10, check-valve-flapper 550A and 550B of swing-check-valves 20 and 25 are both closed and electronic-compression-decompression-chamber 106 is equalized to the high pressure level at the bottom of the dam. High pressure equalization occurs when electronic-high-pressure-fluid-valve 50 is opened so as to permit water to flow through high-pressure-equalization-tube 60. When the internal water pressure of electronic-compression-decompression-chamber 106 is equal to the pressure created by the standing-column of water at the bottom of standing-column-of-water-pipe 1030 check-valve-flapper 550B of upper-swing-check-valve 25 is open so as to permit fish 1005 to swim out of electronic-compression-decompression-chamber 106. The pressure levels inside of electronic-compression-decompression-chamber 106 are monitored by electronic-control-equipment 120 through control-cables 125 and compression-decompression-chamber-pressure-sensor 107 so as to know when to open or close check-valve-flapper 550A and 550B.

Up this the point there have been no operational differences between that of FIG. 23A and the new improved FIG. 24A, however the differences between the two embodiments begins to show when lower-fish-bottle-swing-check-valve 1045, electronic-high-pressure-fluid-valve 50, and fish-bottle-leak-valve 1050 are opened while upper-fish-bottle-swing-check-valve 1060 remains closed. When fish-bottle-leak-valve 1050 is opened a current is established in the embodiment by the water escaping through fish-bottle-leak-valve-pipe 1070 and fish-bottle-leak-valve 1050. The current starts when water pressure at the lowest levels of the embodiment begin to force water outward from lower-fish-entrance-to-dam 1025, through high-pressure-equalization-tube 60 and into lower-concentrating-fish-pond 1010.

The flowing water propels and flushes fish contained in electronic-compression-decompression-chamber 106 out through electronic upper-swing-check-valve 25 up standing-column-of-water-pipe 1030, through lower-fish-bottle-swing-check-valve 1045 and into concentrating-fish-bottle 1040. Fish are levitated from lower-concentrating-fish-pond 1010 to concentrating-fish-bottle 1040 and are prevented from flowing down fish-bottle-leak-valve-pipe 1070 by fish-bottle-leak-valve-grate 1065. Once enough time has passed to ensure that all fish within electronic-compression-decompression-chamber 106 have been levitated into concentrating-fish-bottle 1040, fish-bottle-leak-valve 1050 and lower-fish-bottle-swing-check-valve 1045 are closed and upper-fish-bottle-swing-check-valve 1060 can be opened so as to permit fish 1005 to swim through upper-fish-bottle-swing-check-valve 1060 into upper-body-of-water-containing-fish 101. Fish having overcome the elevated dam are then free to populate the dam or migrate further upstream.

SUMMARY AND ADVANTAGES

Previously, other issued patents and applications have claimed to be able to create energy from the forces associated with buoyancy, and gravity, however the understanding of how to create an energy efficient Fluid Interface Device (FID) that functions under the motive power of gravity and buoyancy has not been achievable. In this application the fundamental link between gravity and buoyancy has been identified and harnessed using FIDs. The understanding gained generates several classes of mass-levitators, an open loop version that can act as a fluid elevator using a variably buoyant-object, a closed loop version that can act as an energy generator wherein the buoyant-objects continually circulate in a closed looping system, and a few variations of these two basic themes. The application scientifically shows how energy can be extracted from the gravitational field of the planet without breaking the laws of conservation of energy, in a device that is practical to build, breaks no know laws of physics, and which can be used to increase the gravitational potential energy of an arbitrary mass using less energy than is gained when the mass is elevated. Thus the closed loop embodiments of this application generate a net surplus of energy with each cyclic elevation of the arbitrary mass. By using suitable energy conversion techniques, such as a gravity wheel, or a linear induction generator the net surplus of energy can be transformed to other forms of power such as electrical, mechanical, or heat power.

While a simple open loop mass-levitator fluid elevator embodiments of FIG. 15A/16A, have numerous possible and practical applications in industry, the closed loop continuously cycling embodiments such a FIG. 17A, or FIG. 18A can provide continuous electrical power extracted from the gravitational field of the planet, and therefore represent very novel and innovative embodiments. The apparatus so designed are capable of generating low cost abundant energy which is free from pollution, require no fossil fuel inputs, and therefore represent the potential basis for an entirely new industry.

Due to the scalability of the apparatus's lift capabilities, which scale up as the cube of the radius when using spherical buoyant objects, the amount of energy that can be produced is also exceedingly scalable, and can be employed to serve individual consumers, cities, states, factories, or countries. Since the apparatus can be situated locally at any point on the planet, energy can be generated adjacent to the site where it is utilized. With local energy generation, there will be a reduction in the amount of power transmitted between cities, states, and countries, and there will be a consequential reduction in the electrical transport costs, resistive power loss, and the associated infrastructure maintenance requirements that are present with the current centrally located power generation stations.

Because the basic principles associated with the various embodiments of this patent can be easily understood by most human beings, there will be no intellectual barriers to its implementation. In addition, due to the intrinsic simplicity and elegance of the various embodiments, as outlined and documented by this application, the final production devices should be capable of extremely reliable operation (an important requirement for any energy generation system) and should hypothetically be operational for hundreds of years with no external energy input required. Once the embodiment's infrastructure (induction coils, tubing/pipes, buoyant-objects, with magnetic arrays etc.) are assembled, like a lock system—where the water flows downhill into the lock chamber without apparent cost, the laws of gravitation and buoyancy will propel the operation of the herein described embodiments, while simultaneous generating an abundance of energy for mankind.

Finally this applicant envisions two other very critical applications that are addressable by the various embodiments of this patent, namely the pumping of water for distribution to farmlands, population centers, and factories, and the lifting of fish and boats over structures such as dams. Since water, and in particular fresh water, is becoming a critical planetary resource, the ability to obtain water is one key to the survival of the planet's many billions of people. The water pump, ship, and fish lift embodiments are made possible when one considers that the mass M elevated to height H can be a quantity of water, any arbitrary matter, or even an arbitrary object such as a fish. For example, once water is encapsulated in the buoyant-object it can be lifted as easily as any other material and subsequently dumped upon reaching the top of the apparatus. Projects such as North American Water and Power Alliance (NAWAPA), and its sister project on other contents, which strive to irrigate deserts, and bring water to million (if not billions) of people, become more implementable since the gigantic power requirement to pump water over mountains are greatly reduce or eliminated by the embodiments contained in this patent. Given the ability to cyclically elevate water from the sea with a variation on the closed system embodiment, it also becomes possible to use reverse osmosis (or other similar water filtration techniques) to remove the salt to create fresh water supplies and distribute this clean water to the population of the planet. Hence this application holds the promise for clean abundant electrical energy, fresh water, less global warming, and a clean environment that can be supplied cheaply, and used by all the communities of the world.

While this invention has been particularly shown and described with references to example embodiments thereof, it will be understood by those skilled in the art that various changes in form and details may be made therein without departing from the scope of the invention encompassed by the appended claims.

What is claimed is:

1. A mass levitator comprising:
    an initial light fluid region;
    an adjacent dense fluid region;
    a plurality of buoyant material objects, the buoyant material objects being buoyant in the adjacent dense fluid region and sinking in the initial light fluid region, and being configured to encapsulate other objects;
    a fluid interface device interfacing the initial light fluid region and adjacent dense fluid region and configured to allow transit of the buoyant material objects from the initial light fluid region to the adjacent dense fluid region while maintaining a pressure differential between the initial light fluid region and the adjacent dense fluid region; and
    means for loading and unloading the other objects in and out of the buoyant material objects.

2. A mass levitator as in claim 1 wherein the buoyant material objects are configured to encapsulate other objects while still remaining buoyant; and
    the means for loading and unloading the other objects in and out of the buoyant material objects allows the other objects to be lifted from the location of the fluid interface device to a height greater than the fluid interface device.

3. A mass levitator as in claim 1 wherein the fluid interface device is a lower fluid interface device;
    wherein the mass levitator further includes an upper fluid interface device interfacing the initial light fluid region and adjacent dense fluid region and configured to allow transit of the buoyant material objects from the adjacent dense fluid region to the initial light fluid region while maintaining a pressure differential between the initial light fluid region and the adjacent dense fluid region; and
    wherein the means for loading and unloading the other objects in and out of the buoyant material objects allows the other objects to be lowered from the location of the upper fluid interface device to the location of the lower fluid interface device.

4. A mass levitator as in claim 1 wherein the fluid interface device is a lower fluid interface device, and wherein the mass levitator further includes:
    an upper fluid interface device interfacing the initial light fluid region and adjacent dense fluid region and configured to allow transit of the buoyant material objects from the adjacent dense fluid region to the initial light fluid region while maintaining a pressure differential between the initial light fluid region and the adjacent dense fluid region;
    wherein the arrangement of the lower and upper fluid interface devices with connecting components forms a closed loop for plurality of buoyant material objects to cyclically move through a continuously connected fluid path, such that (i) the buoyant material objects float and move upward from the lower fluid interface device to the upper fluid interface device under a motive force of buoyancy through components connecting the lower fluid interface device and upper fluid interface device, and (ii) the buoyant material objects sink and move downward from the upper fluid interface device to the lower fluid interface device under a motive force of gravity through components connecting the upper fluid interface device and lower fluid interface device.

5. A mass levitator as in claim 4 wherein the plurality of buoyant material objects include magnetic material; and
    the mass levitator further including induction coils circumferentially surrounding the components connecting the lower fluid interface device and upper fluid interface device, and configured to induce electric impulses as the buoyant material objects approach, enter, and leave the induction coils to convert kinetic energy generated by the forces of buoyancy and gravity that act on the buoyant material objects to other forms of energy.

6. A mass levitator as in claim 4 wherein the plurality of buoyant material objects include magnetic arrays shaped so as to permit the buoyant material objects to be rolled down an inclined component connecting the lower fluid interface device and upper fluid interface device; and
    the mass levitator further including induction coils circumferentially surrounding the components connecting the lower fluid interface device and upper fluid interface device, wherein the components connecting the lower fluid interface device and upper fluid interface device are inclined downward so as to induce the buoyant material objects to roll or spin as they move downward toward the lower fluid interface device;
    wherein the induction coils circumferentially surround the inclined, components so as to induce electrical energy pulses from the rotational motion of the buoyant material objects as the buoyant material objects approach, enter, and leave the coils to convert kinetic energy generated by the forces of buoyancy and gravity that act on the buoyant material objects to other forms of energy.

7. A mass-levitator as in claim 4 further including:
    a wheel configured to rotate on a central axis and encapsulated by an exterior housing, the housing having recessed pockets or voids on the wheel's periphery and that moves with the wheel, the wheel configured to (i) accept ones of the buoyant material objects from a guide component into one of the pockets when at the top of the wheel's outer periphery and (ii) release the buoyant material objects into a guide component at the bottom of the wheel; and
    means for converting rotation of the wheel into energy.

8. A mass levitator comprising:
    an initial light fluid region;
    an adjacent dense fluid region;
    a plurality of buoyant material objects, the buoyant material objects being buoyant in the adjacent dense fluid region and sinking in the initial light fluid region, and being configured to encapsulate other objects;
    a fluid interface device interfacing the initial light fluid region and adjacent dense fluid region and configured to allow transit of the buoyant material objects from the initial light fluid region to the adjacent dense fluid region while maintaining a pressure differential between the initial light fluid region and the adjacent dense fluid region; and a closable aperture to load and unload the other objects in and out of the buoyant material objects.

* * * * *